(12) United States Patent
Goldstein et al.

(10) Patent No.: US 11,747,480 B2
(45) Date of Patent: Sep. 5, 2023

(54) AUTOMATED THREAT DETECTION AND DETERRENCE APPARATUS

(71) Applicant: IntelliShot Holdings, Inc., Delray Beach, FL (US)

(72) Inventors: Steven W. Goldstein, Delray Beach, FL (US); Michael Strauss, Raleigh, NC (US)

(73) Assignee: IntelliShot Holdings, Inc., Delray Beach, FL (US)

( * ) Notice: Subject to any disclaimer, the term of this patent is extended or adjusted under 35 U.S.C. 154(b) by 0 days.

(21) Appl. No.: 17/406,018

(22) Filed: Aug. 18, 2021

(65) Prior Publication Data

US 2022/0057519 A1 Feb. 24, 2022

Related U.S. Application Data

(60) Provisional application No. 63/067,142, filed on Aug. 18, 2020.

(51) Int. Cl.
*G01S 17/894* (2020.01)
*G01S 17/04* (2020.01)

(52) U.S. Cl.
CPC ............ *G01S 17/894* (2020.01); *G01S 17/04* (2020.01)

(58) Field of Classification Search
None
See application file for complete search history.

(56) References Cited

U.S. PATENT DOCUMENTS 5,612,503 A * 3/1997 Sepp .................. F41H 13/0056
 89/1.11
6,603,134 B1 * 8/2003 Wild ....................... G02B 5/12
 250/342

(Continued)

FOREIGN PATENT DOCUMENTS

WO WO-2017038125 A1 * 3/2017 ............. G08G 1/005

OTHER PUBLICATIONS

Yu-Bo Yuan, Gao Yang David, and Shan Zhao, Machine Learning in Intelligent Video and Automated Monitoring, Dec. 31, 2015.

(Continued)

*Primary Examiner* — Yuqing Xiao
*Assistant Examiner* — Jempson Noel
(74) *Attorney, Agent, or Firm* — HEA Law PLLC; Darrin Auito

(57) ABSTRACT

An automated threat detection and deterrence apparatus includes an imaging device configured to detect a subject in a subject area, a deterrent component including a directed light deterrent, wherein the directed light deterrent includes a first deterrent mode and a second deterrent mode, the directed light deterrent is configured to perform a first deterrent action on the subject when in the first mode, the directed light deterrent is configured to perform a second deterrent action on the subject when in the second mode, and a processor communicatively connected to the imaging device and the deterrent component, wherein the processor is configured to identify the subject as a function of the detection of the subject, determine a behavior descriptor associated with the subject, select one of the first deterrent mode and the second deterrent mode and command the directed light deterrent to perform an action based on the selection.

51 Claims, 42 Drawing Sheets

(56) References Cited

U.S. PATENT DOCUMENTS

| | | | | |
|---|---|---|---|---|
| 8,063,348 B1* | 11/2011 | Swaminathan | ......... | G01S 17/04 250/221 |
| 8,132,491 B2* | 3/2012 | Real | ............ | F41H 13/0056 42/1.08 |
| 8,471,700 B1* | 6/2013 | Merrill | ............ | G08B 25/01 340/539.1 |
| 8,994,819 B2* | 3/2015 | Bennett | ............ | G01S 17/42 348/143 |
| 9,472,067 B1* | 10/2016 | Jentoft | ............ | G08B 15/02 |
| 9,564,034 B2 | 2/2017 | Foster et al. | | |
| 10,117,309 B1 | 10/2018 | Fu et al. | | |
| 10,212,778 B1 | 2/2019 | Fu et al. | | |
| 10,586,442 B1 | 3/2020 | Jensen et al. | | |
| 10,600,297 B2 | 3/2020 | Kerzner | | |
| 10,614,689 B2 | 4/2020 | Bess et al. | | |
| 2006/0197661 A1 | 9/2006 | Tracy et al. | | |
| 2006/0232774 A1 | 10/2006 | Kunze | | |
| 2012/0188081 A1* | 7/2012 | Van Katwijk | ...... | G08B 13/2494 340/541 |
| 2014/0334684 A1 | 11/2014 | Strimling | | |
| 2015/0253253 A1* | 9/2015 | Smith | ............ | G01S 7/4802 250/461.1 |
| 2015/0301182 A1* | 10/2015 | Geiger | ............ | G01S 17/04 250/201.1 |
| 2015/0347902 A1* | 12/2015 | Butler, Jr. | ............ | G08B 25/009 706/46 |
| 2018/0113200 A1* | 4/2018 | Steinberg | ............ | G01S 17/89 |
| 2018/0158305 A1 | 6/2018 | Noland et al. | | |
| 2019/0095820 A1 | 3/2019 | Pourmohammad | | |
| 2019/0212125 A1* | 7/2019 | Deleule | ............ | G01S 17/89 |
| 2020/0211345 A1 | 7/2020 | Gordon-Carroll et al. | | |

OTHER PUBLICATIONS

International Search Report; PCT/US21/46583; dated Nov. 20, 2021, By: Authorized Officer Karl Rodriquez.

* cited by examiner

AUTOMATED THREAT DETECTION AND DETERRENCE APPARATUS

CROSS-REFERENCE TO RELATED APPLICATIONS

This application claims the benefit of priority of U.S. Provisional Patent Application Ser. No. 63/067,142, filed on Aug. 18, 2020, and titled "AUTOMATED THREAT DETECTION AND DETERRENCE APPARATUS," which is incorporated by reference herein in its entirety.

FIELD OF THE INVENTION

The present invention generally relates to the field of security. In particular, the present invention is directed to an automated or manual threat detection and deterrence apparatus.

BACKGROUND

Existing security apparatuses are prone to error and fail adequately to distinguish between genuine threats and harmless bystanders such as children. On the other hand, human security is expensive and prone to error and biases.

SUMMARY OF THE DISCLOSURE

In an aspect, an automated threat detection and deterrence apparatus includes a detection and sensing component consisting of one or more sensors, including, but not limited to, imaging, acoustic, radar, lidar, time-of-flight, and/or other sensor or sensors, configured to detect and track a subject in a subject area, a deterrent component including, one or more of directed light, sound, chemical, neurostimulator, and/or entanglement deterrent, wherein the deterrent component includes a first deterrent mode and one or more secondary deterrent modes, the deterrent component is configured to perform a first deterrent action on the subject when in the first mode, the deterrent component is configured to perform additional deterrent actions on the subject when in supplementary modes, and the first deterrent action is distinct from the additional deterrent actions, and a processor communicatively connected to the detection and sensing component and the deterrent component, wherein the processor is configured to identify the subject as a function of the detection of the subject, determine a behavior descriptor, object recognizer, or ruleset associated with the subject, select, as a function of the behavior, object recognizer, or ruleset descriptor, choose a mode of the first deterrent mode and the additional deterrent modes and command the deterrent component or components to perform an action of the first deterrent action and additional deterrent actions as a function of the current mode.

In another aspect a method of automated or manual threat detection and deterrence includes identifying, by a processor communicatively connected to a detection and sensing component, and a deterrent component, a subject as a function of a detection of the subject by the detection and sensing component, determining, by the processor or the device operator, a behavior descriptor, object recognizer, or ruleset associated with the subject, selecting, by the processor or the device operator, a mode of a first deterrent mode and additional deterrent modes as a function of the behavior descriptor, object recognizer, or ruleset, and commanding, by the processor or device operator, the deterrent component to perform an action of a first deterrent action and additional deterrent action or actions as a function of the mode, wherein each deterrent action is distinct from the other deterrent action or actions.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
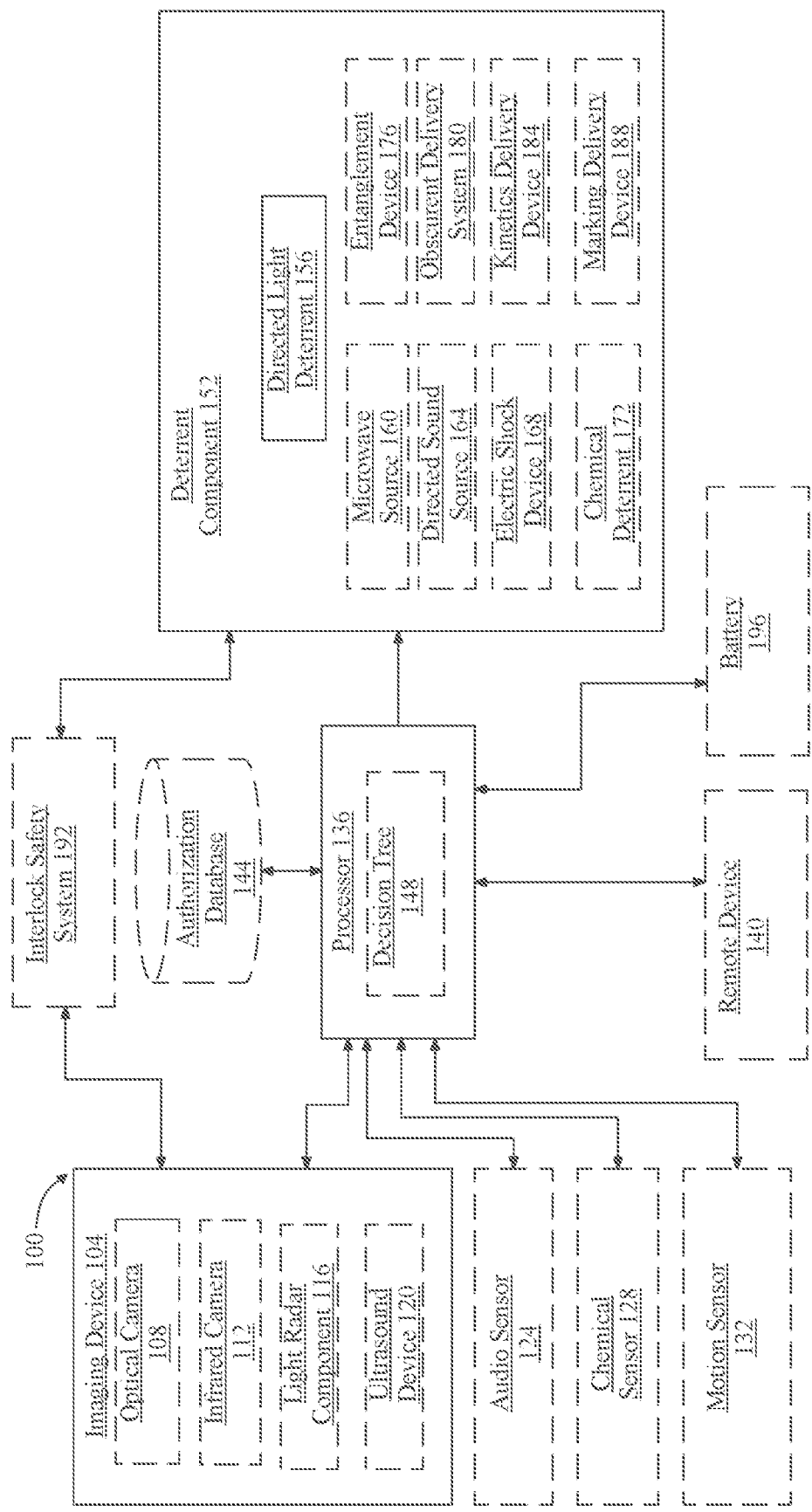
FIG. 1 is a block diagram of an embodiment of an automated threat detection and deterrence apparatus.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Recent events have revealed that security services provided by human beings, from protection of buildings to law enforcement in public, is often inadequate at best and biased at worst. Recently a federal building was breached by representatives of a political faction, despite advance warning that political unrest was likely on the day the breach occurred. The reasons for this mishap are still a subject of investigation, but apparently were a mixture of divided loyalties, confusion, and uncertainty about how to respond to the burgeoning threat. Examples of unpredictable violence run amuck abound, leading one to question whether technology may be used in a more positive way, to innovate our way out of these attacks. How do we keep safe what is sacred? How do we protect the unprotected? Could we respond and protect before these horrific events erupt to the point of no return? We have social media getting the word out but making the crowd crazy by fueling the fire. We can and must do better. Technology can be the solution if used responsibly. A new paradigm of protection is vitally needed.

In the face of this problem, automated security systems could provide a lower-cost alternative free from bias and emotion. However, existing security apparatuses are prone to error and fail adequately to distinguish between genuine threats and harmless bystanders such as children, and none thus far has succeeded in performing all the functions necessary for a comprehensive security solution.

Embodiments described herein provide for an automated or manually assisted security system that reduces error in human judgement and/or provides for an ability to adequately distinguish between genuine threatening actions and/or behaviors exhibited by civilians, devices, and/or animals and harmless bystanders. A combination of carefully calibrated artificial intelligence solutions with efficient protocols and configurations designed to harness advanced analysis of psychological effect produces a system capable of emulating the best of human security response, while substituting for a mind prone to panic and prejudice an inexorable and unflagging system that responds to genuine threats proportionally without bias or overreaction.

Through the automation and calibration of responses in preventing bias, anxiety, or cognitive load a reduced number of overreactions, mistakes, and/or injuries may be achieved that result in reduced emergent situations that may otherwise occur due to limited human understanding. In embodiments, automation may be designed to escalate from gentle warnings to more stringent tactics that may be decided faster and with more precision than human judgement. Automating the escalation allows for gradual and/or rapid adjustments of counter measures without incorporating emotions and/or other extraneous parameters in determining the appropriate counter measure to apply. In an embodiment, this disclosure reduces liability for security personnel as a function of identifying an undesirable goal and modulating the behavior and/or actions directed towards achieving the undesirable goal. Embodiments described herein harness behavior and/or situational analysis protocols, combined with human psychology and/or physiology, to select and enact counter measures that are minimally disruptive to distract an individual of a plurality of individuals, wherein the counter measures may be designed to stay within safety limits and to emphasize psychological impact over physical impact. In an embodiment, this disclosure interacts with at least one of five senses that the organisms contain to mitigate unwanted behaviors and/or actions directed towards achieving the undesirable goal. In embodiments, counter measures may include counter measures that overstimulate at least one of the five senses, such that a motivation to cease the action and/or behavior and leave is established. In other embodiments, counter measures may be persistent, inexorable, immovable, implacable, and the like thereof.

Embodiments disclosed herein may detect entry of persons or animals into subject areas and respond consistently with determined behavior descriptors, object recognition, or rulesets using a graduated deterrence system. Embodiments may use a combination of imaging and other sensors, such as optical cameras, infrared cameras, 3D cameras, multispectral cameras, hyperspectral cameras, polarized cameras, chemical sensors, motion sensors, ranging sensors, light radar component, such as lidar, detection or imaging using radio frequencies component, such as radar, terahertz or millimeter wave imagers, seismic sensors, magnetic sensors, weight/mass sensors, ionizing radiation sensors, and/or acoustical sensors, to accurately recognize and spatially determine entrance into the subject area, to distinguish between known or whitelisted persons, children, animals, and potential threats. Embodiments may further distinguish casual or accidental intruders from those with more purposeful or malicious intent and may calibrate responses according both to detected behavior, imminence of threat, or other rulesets. Deterrent responses may be calibrated to detected behavior descriptors and rulesets so as to generate a graduated response that can escalate from warnings to irritating or off-putting responses or further to incapacitating responses as needed to achieve security objectives with a minimal harm to the intended target.

Embodiments as described in this disclosure may provide an advantage of force multiplication. In scenarios where multiple persons such as sharpshooters would be required to engage a potential assailant at 100 yards of separation with near total confidence, use of embodiments described in this disclosure may enable engagement of multiple assailants, at a comparable distance, by a single device which may be operating autonomously or with minimal human input. Such engagement, moreover, may be calibrated to avoid harming potential assailants and to deploy no more energy or force for interdiction than is necessary.

Embodiments described herein may further provide a benefit of distance interdiction. In many scenarios, an ability to engaged and/or dissuade a potential assailant and/or malefactor before such a person has a chance to approach near to a target person or property may be highly advantageous; for instance, a would-be school shooter or home invader may be much more difficult to deter once they have entered the school or home they are targeting. Embodiments of apparatuses described herein may be able to detect and interdict potentially problematic persons at distances of 100 yards or more, preventing close engagement from becoming an issue.

Embodiments described herein may be able to create an impression in a potential assailant and/or other subject of potential interdiction that they are interacting with a live human such as security personnel, rather than with an automated apparatus as described in this disclosure. This may be enabled by intelligent deployment of deterrents, for instance avoiding attempts to target a user when they have taken cover or otherwise made themselves unavailable for targeting. Imitation of a live human may be further augmented using text-to-speech technology to imitate a voice and/or diction of a live person.

Some embodiments described in this disclosure may present a technology that is far safer than an attack dog or even a Taser, that can be unleashed hundreds of feet away from the troubled hotspot. Embodiments may provide an Active Denial Area solution providing layers of active denial countermeasures without causing any long-term harm. Technology may serve as an escalating barrier to inform and warn an individual that they are about to violate a secured property and persuade them to leave before an irreversible outcome would make it to headline news as is too often the case involving flying bullets. Embodiments described herein may be able to stop an offender dead in their tracks faster than the blink of an eye, without any bloodshed. Some embodiments may be able to simultaneously intercept and interdict 30 offenders at 300 feet in 3 tenths of a second all without any long-term harm to the offenders.

Embodiments described in this disclosure may have the potential to replace or significantly reduce costs of human assets, minimize unexpected outcomes and stand guard endlessly. If a situation requires human intervention embodiments may serve as a force multiplier. Embodiments of apparatus may, at best, prevent access to a secured area and at worst, delay and confuse a perpetrator sufficiently as to allow the authorities to respond and secure the situation.

In some embodiments, apparatus may perform a graduated response, initiating with hailing an intruder, followed by informing them and if necessary, interdicting to repel them. Apparatus may follow a subject's every movement even while they are running and target an ever-increasing barrage of countermeasures. Apparatus may maintain an intensifying state of persuasion and dissuasion until an offender and/or violator is forced to vacate a secured area.

Some embodiments of apparatus may be capable of detection and interdiction at a 100 m range. Apparatus may operate day and night, indoors or outdoors. Apparatus may ultimately acquire, track and target up to 30 individuals simultaneously providing a 50° FOV for the computer vision (CV), laser and steerable speaker array.

Referring now to FIG. 1, an exemplary embodiment of an automated threat detection and deterrence apparatus 100 is illustrated. Apparatus 100 includes an imaging device 104 configured to detect a subject 308 in a subject area. Imaging device 104 may include an optical camera 108. An "optical camera," as used in this disclosure, is a device that generates still, video, and/or event-based images by capturing senses electromagnetic radiation in the visible spectrum, having wavelengths between approximately 380 nm and 740 nm, which radiation in this range may be referred to for the purposes of this disclosure as "visible light," wavelengths approximately between 740 nm and 1,100 nm, which radiation in this range may be referred to for the purposes of this disclosure as "near-infrared light" or "NIR," and wavelengths approximately between 300 nm and 380 nm, which radiation in this range may be referred to for the purposes of this disclosure as "ultraviolet light" or "UV". Optical camera 108 may include a plurality of optical detectors, visible photodetectors, or photodetectors, where an "optical detector," "visible photodetector," or "photodetector" is defined as an electronic device that alters any parameter of an electronic circuit when contacted by visible, UV, and/or NIR light. Optical detectors may include, without limitation, charge-coupled devices (CCD), photodiodes, avalanche photodiodes (APDs), silicon photo-multipliers (SiPMs), complementary metal-oxide-semiconductor (CMOS), scientific CMOS (sCMOS), micro-channel plates (MCPs), micro-channel plate photomultiplier tubes (MCP-PMTs), single photon avalanche diode (SPAD), Electron Bombarded Active Pixel Sensor (EBAPS), quanta image sensor (QIS), spatial phase imagers (SPI), quantum dot cameras, image intensification tubes, photovoltaic imagers, optical flow sensors and/or imagers, photoresistors and/or photosensitive or photon-detecting circuit elements, semiconductors and/or transducers. APDs, as used herein, are diodes (e.g. without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. APDs may provide a built-in stage of gain through avalanche multiplication. When a reverse bias is less than breakdown voltage, a gain of an APD may be approximately linear. For silicon APDs this gain may be on the order of 10-100. The material of the APD may contribute to gains.

Still referring to FIG. 1, individual photodetectors in optical camera 108 may be sensitive to specific wavelengths of light, for instance by use of optical filters to exclude such wavelengths; for instance, and without limitation, some photodetectors may be sensitive to blue light, defined as light having a wavelength of approximately 420 nm to 480 nm, some may be sensitive to green light, defined as light having a wavelength of approximately 495 nm to 545 nm, and some may be sensitive to red light, defined as light having a wavelength of approximately 620 nm to 750 nm. Combinations of photodetectors specifically sensitive to red, green, and blue wavelengths may correspond to wavelength sensitivity of human retinal cone cells, which detect light in similar frequency ranges. Photodetectors may be grouped into a three-dimensional array of pixels, each pixel including a red photodetector, a blue photodetector, and a green photodetector. Pixels may be small enough to fit millions into a rectangular array less than an inch across. Optical camera may include one or more reflective, diffractive, refractive, and/or adaptive components that focus incident light onto photodetectors.

With continued reference to FIG. 1, imaging device 104 may include an infrared camera 112. An "infrared camera," as used in this disclosure, is a camera that detects electromagnetic radiation in the infrared spectrum, defined as a spectrum of electromagnetic radiation having wavelengths between approximately 740 nm and 14.0 which radiation in this range may be generally referred to for the purposes of this disclosure as "infrared light,". As non-limiting examples, infrared camera 112 may detect light in the 1.0 to 3.0 µm range, which radiation in this range may be referred to for the purposes of this disclosure as "shortwave infrared light" or "SWIR," may detect light in the 3.0 to 5.0 µm range, which radiation in this range may be referred to for the purposes of this disclosure as "midwave infrared light" or "MWIR," or may detect light in the 8.0 to 14.0 µm range, which radiation in this range may be referred to for the purposes of this disclosure as "longwave infrared light" or "LWIR." Infrared camera 112 may include a plurality of infrared detectors or infrared photodetectors, where an "infrared detector" or "infrared photodetector" is defined as an electronic device that device that alters any parameter of an electronic circuit when contacted by infrared light. Infrared detectors may include, without limitation, silicon photodiodes doped to detect infrared light, strained-layer super lattice (SLS) photodetectors, quantum well infrared photodetectors (QWIP), amorphous silicon (αSi) photodetectors, Vanadium Oxide (VOx) microbolometers, Barium Strontium Titanate (BST), thermopile array detector, pyroelectric infrared detectors, detectors constructed from narrow bandgap detector materials from the III-V elemental group, and/or other infrared photoelectric, photovoltaic and/or microbolometer based detectors. A "microbolometer" is defined for the purposes of this disclosure as a specific type of bolometer used as a detector in a LWIR camera, also known as a "thermal camera." Microbolometer may detect infrared light when infrared radiation with wavelengths between 7.5-14 µm strikes detector material, heating it, and thus changing its electrical resistance. Alternatively or additionally, an infrared camera may consist of a single, sensitive large pixel, such as a passive infrared (PIR) sensor or other single element infrared sensitive detector.

Continuing to refer to FIG. 1, infrared camera 112 may use a separate aperture and/or focal plane from optical camera 108, and/or may be integrated together with optical camera 108. There may be a plurality of optical cameras 108 and/or a plurality of infrared cameras 112, for instance with different angles, magnifications, and/or fields-of-view or perspective on a subject area. Alternatively or additionally, two or more apparatuses coordinated using a communication network, as described in further detail below, may be combined to generate two or more images from varying perspectives to aid in multi-dimensional imaging and/or analysis.

Still referring to FIG. 1, imaging device 104 may include a light radar component 116. A "light radar component," as defined in this disclosure, is an active imaging source that transmits light toward an object or field of interest and detects back-scattered, absorbed, or reflected light, measuring time of flight (ToF), interferometry, and/or phase of such back-scattered and/or reflected light to compute distances to, velocities, and/or accelerations of objects at points from which back-scatter and/or reflection occurred. A light radar component 116 may include, without limitation, LIDAR or related mechanisms. In some embodiments, active light source may include a high-intensity light source, which may be focused, collimated, and/or coherent, enabling fine placement within a coordinate system, for instance as described below, of points in a field of view and/or at an object of interests at which transmitted light is scattered and/or reflected; active light source may include without limitation a laser such as an edge-emitting laser diode (EELD), a high-intensity light-emitting diode, a high-intensity "super" light-emitting diode consisting of a single or plurality of lasers and/or phosphor material, super-luminescent light-emitting diode, and/or vertical-cavity surface-emitting laser (VCSEL) or EELD or VCSEL array. A laser may include a laser diode, which may be electrically pumped; alternatively or additionally, laser may be pumped optically. Active light source may transmit light in a narrow band of wavelengths; for instance, active light source may transmit light that is substantially monochromatic. In embodiment, light transmitted by active light source may pass through a dichroic filter, polarizing filter, diffractive optical element, meta-material, spatial light modulator (SLM), or similar optical element, which may further narrow a transmitted wavelength range, modify the shape or pattern, modify the polarization, modify the wavefront, or affect other properties of the active light source. Wavelength of light may be outside the range of visible light; for instance, and without limitation, wavelength may be in the infrared range as described above. Light radar component may include a "flash lidar" component, mechanical or non-mechanical beam steering, light patterns, and/or computational imaging methods, such as plenoptic or other multi-aperture embodiments.

Still referring to FIG. 1, light radar component 116 may include one or more optical elements for focusing, collimating, and/or transmitting light emitted by light source. One or more optical elements may include a focal optical suite, which may bend light to converge to a real and/or virtual focal point. Focal optical suite may be reflective, diffractive, adaptive, and/or refractive; for instance, and without limitation, focal optical suite may include two or more lenses spaced apart, where spacing between lenses may be varied to modify a focal length of transmitted light. Dispersal and/or focus of transmitted light may be controlled using electronically focused lens assembly, where adjustment of distances or alignment between lenses may be electrically or mechanically actuated. Intensity or temporal composition of transmitted light may be variable as well, where variation may be modified using varied voltage levels, electrical current levels, waveforms, multiple pulses, duty cycles, pulse widths, passive or active optical elements, such as Q-switches, acoustical optical tunable filters (AOTF), and/or spatial light modulators (SLM). Electrical voltage and current levels, and durations to light source may be regulated analog or digitally by output of a logic circuit and/or processor 136 to a digital to analog converter, an on/off cycle to a transistor such as a power field-effect transistor, pulse width modulation provided natively by a processor, or the like. In an embodiment, intensity and/or focus may default to minimally harmful settings, permitting allowing ToF ranging or the like to determine a distance to a nearest subject 308 in a subject space, after which focal length and intensity may be set as permitted by standards of safe exposure. Alternatively or additionally, where a wavelength of light source is invisible and non-ionizing, intensity levels may be intrinsically safe across an operational range of light source.

With continued reference to FIG. 1, light radar component 116 may include one or more optical elements may include one or more reflective, diffractive, refractive, and/or metamaterial scanning elements for directing a beam from light source across a space to be scanned. As a non-limiting example, one or more optical elements may make use of a mirror galvanometer to direct a beam in scanning pattern. Scanning may be performed across two dimensions, using one or more optical elements and methods of directing individually or in combination for "beam steering," including but not limited to, two flat or polygonal mirrors that may be driven by a galvanometer, electric motors, micro-electro machined systems (MEMS) or micro-optical electro machined systems (MOEMS) microscanner devices, piezoelectric actuated devices, magnetostrictive actuated devices, liquid, polymer, or other mechanically deformable devices, fast steering mirrors (FSM), Risley prisms, decentered macro-optical elements and micro-lens arrays, blazed grating optical elements, MOEMS or MEMS combined with macro-optical elements, phased arrays, electronically steered arrays, spatial light modulators (SLM), holographic optical elements, laser intra-cavity beam steering, and/or metamaterial surfaces or structures. A beam may alternatively or additionally be aimed and/or focused in three or more dimensions, for instance by using a servo-controlled lens system, which may be referred to without limitation as a "focus shifter," "beam expander," or "z-shifter." Intensity of emitted light may alternatively or additionally be used. Mirrors perform a periodic motion using, for instance, rotating polygonal mirrors and/or a freely addressable motion, as in servo-controlled galvanometer scanners. Control of scanning motion may be effected via a rotary encoder and/or control electronics providing electric current to a motor or galvanometer controlling mirror angle. Electrical current may be varied using a servo controller digital to analog converter such as a DAC81516 as produced by Texas Instruments, Inc. of Dallas, Tex. Alternatively or additionally, the beam may be aimed and/or focused using a "non-mechanical" beam steering method, such as spatial light modulators (SLM) by adjusting the liquid crystal matrix that makes up the pixels of such device using digital or analog drive controllers to modify the angles of alignment of the liquid crystals as to make dynamic diffractive patterns to provide beam shaping and aiming. A laser's wavefront passing through the liquid crystal matrix is affected by the calculated diffractive patterns to provide both deflection of the beam for aiming, and an optical function for focusing or shaping the profile of the beam.

Still referring to FIG. 1, light radar component 116 may include at least a visible or infrared photodetector, which may be implemented using any suitable visible or infrared photodetector and/or plurality of visible or infrared photodetectors as described above. For instance, and without limitation, at least a photodetector may include a detector array, such as a detector array suitable for use in an optical or infrared camera 112 as described above. Detectors in detector array may be sensitive specifically to a narrow band of wavelengths transmitted by light source, and/or may be sensitive to a range of wavelengths that includes the band transmitted by the light source. Detectors may be designed to react quickly to initial detection of photons, for instance through use of APDs or other highly sensitive detectors. Light radar component 116 may include one or more receptive optical elements, which may include collimating and/or focusing mirrors and/or lenses. One or more receptive optical elements may include filters such as without limitation dichroic, polarization, bandpass, notch, and/or other optical filters, which may act to screen out light that is not transmitted by light source; this may drastically increase signal to noise ratio, and may further act to prevent disruption of light radar component 116 by a directed light deterrent as described in further detail below. Alternatively or additionally, signal to noise ratio can be increased for the light radar component 116 by modulating the signal such that the timing or frequency shifting of the transmitted beam is recognized by the detection circuit over the constant background ambient signal by subtracting the background from the signal.

Still referring to FIG. 1, one or more optical, electronic, and/or digital filters may be employed at optical sensors to limit effects of noise. For instance, and without limitation, a sensor attempting to detect a particular wavelength, such as a sensor used in light-radar devices as described in this disclosure, may have an optical, electrical, and/or digital bandpass filter designed to permit passage and/or detection of the wavelength of interest. Such a notch filter may prevent "blooming" energy in background. For instance, where a camera is configured to detect a reflection of 850 nm light, or any other wavelength described in this disclosure as suitable for use with light radar, a filter may exclude and/or drastically attenuate substantially all other wavelengths. As a further non-limiting example, light used in light radar and/or other detection processes and/or components may be set at a wavelength for which natural light sources are generally attenuated. For instance, an absorption spectrum of water may be higher around 850-900 nm. Any wavelength from the visible spectrum up to 2 microns may alternatively or additionally be used. Thus, the atmosphere may tend to block solar radiation at such a spectrum; generally, frequencies may be used that are in low-transmissivity bands for sunlight and/or other potential sources of electromagnetic noise, to reduce noise therefrom. As a further example, ultraviolet frequencies may be largely attenuated from solar radiation, enabling use thereof with relatively low solar interference. In an embodiment, different wavelengths may be used under different circumstances to maximize signal to noise ratio; for instance, different wavelengths may be employed for light radar at night than during the day.

In an embodiment, and further referring to FIG. 1, light radar component 116 may perform ToF calculation, by firing pulses of light and measuring time required for a backscattered and/or reflected pulse to return. Time may be measured using an oscillator-based clock, where a faster clock signal may enable more accurate measure of the time a pulse takes to return to detector. ToF may alternatively or additionally be measured using an amplitude modulated continuous wave (AMCW) technique, whereby light is emitted continuously from light source with a varying amplitude, and a phase of returning detected light is compared to a phase of transmitted light. For instance, light source may cast a modulated illumination in a near-infrared (NIR) or short-wave infrared (SWIR) spectrum onto a scene, and then record an indirect measurement of the time it takes the light to travel from the light source to a portion of the scene and back using phase and/or interferometric comparison; phase comparison may, without limitation, be performed by comparing a phase of returning light to a phase of a reference beam separated from transmitted light using a beam splitter.

Still referring to FIG. 1, ToF may be used to measure a distance from light radar component 116 to a point from which light is scattered; this may be used, without limitation, to detect distance to an object such as a subject 308 into a subject area. Distance may be computed using a single reading of ToF, by averaging two or more ToF readings, and/or measuring multiple returns to reduce false readings from clutter. ToF may be used to detect edges of objects such as a subject 308, a portion of anatomy of a subject 308, an object held by a subject 308, or the like. For instance, and without limitation, an edge may be detected by comparison of ToF at detected points to nearby and/or adjacent ToF readings, where a border separating a region of relatively smaller ToF readings from a region of relatively more distant ToF readings may identify an edge. As a non-limiting example, such a border may define an outline of a person with a wall or other object behind the person. ToF may be used to generate an image, for instance by repeatedly capturing readings of ToF to different portions of an object; a three-dimensional surface contour of the object, such as facial features, details of an object a person is holding, or the like, may be rendered using the ToF data. ToF measurements may be processed to generate a depth map or point cloud, defined for the purposes of this disclosure as a set of Z-coordinate values for every pixel of the image, which may be measured in units of millimeters, micrometers, or the like. Depth map data may be combined with other imaging data; for instance, intensity or phase values of pixels in an infrared reading may be measured as proportional to an amount of light returned from a scene.

In an embodiment, and still referring to FIG. 1, light radar component 116 and/or imaging component may include and/or communicate with a surveillance component. As used in this disclosure a "surveillance component" is a device and/or component capable of tracking and/or monitoring an individual of a plurality of individuals. For example, and without limitation, surveillance component may track an individual in a crowd, wherein the individual may be monitored in addition to monitoring the crowd. As a further non-limiting example, surveillance component may track one or more behaviors, wherein behaviors are described below in detail.

Continuing to refer to FIG. 1, imaging device 104 may include an ultrasound device 120. An ultrasound device, as used in this disclosure, is a device that emits sound having frequencies in excess of 20 kilohertz. An ultrasound device may measure distances to objects such as boundaries of a subject area, items in the subject area, and/or subjects therein using time of flight measurements, by emitting sounds and measuring time until detection of returning echoes; range-finding using such measurements may be described as "sonar." Ultrasound device 120 may be used to measure distances in combination with and/or in lieu of distance finding using stereoscopic camera and/or light radar ToF techniques. In an embodiment, ultrasound device 120 may generate images, which may be combined with and/or used to supplement images taken using optical camera 108, infrared camera, 112, light radar component 116, or any combination thereof.

Figure 2:
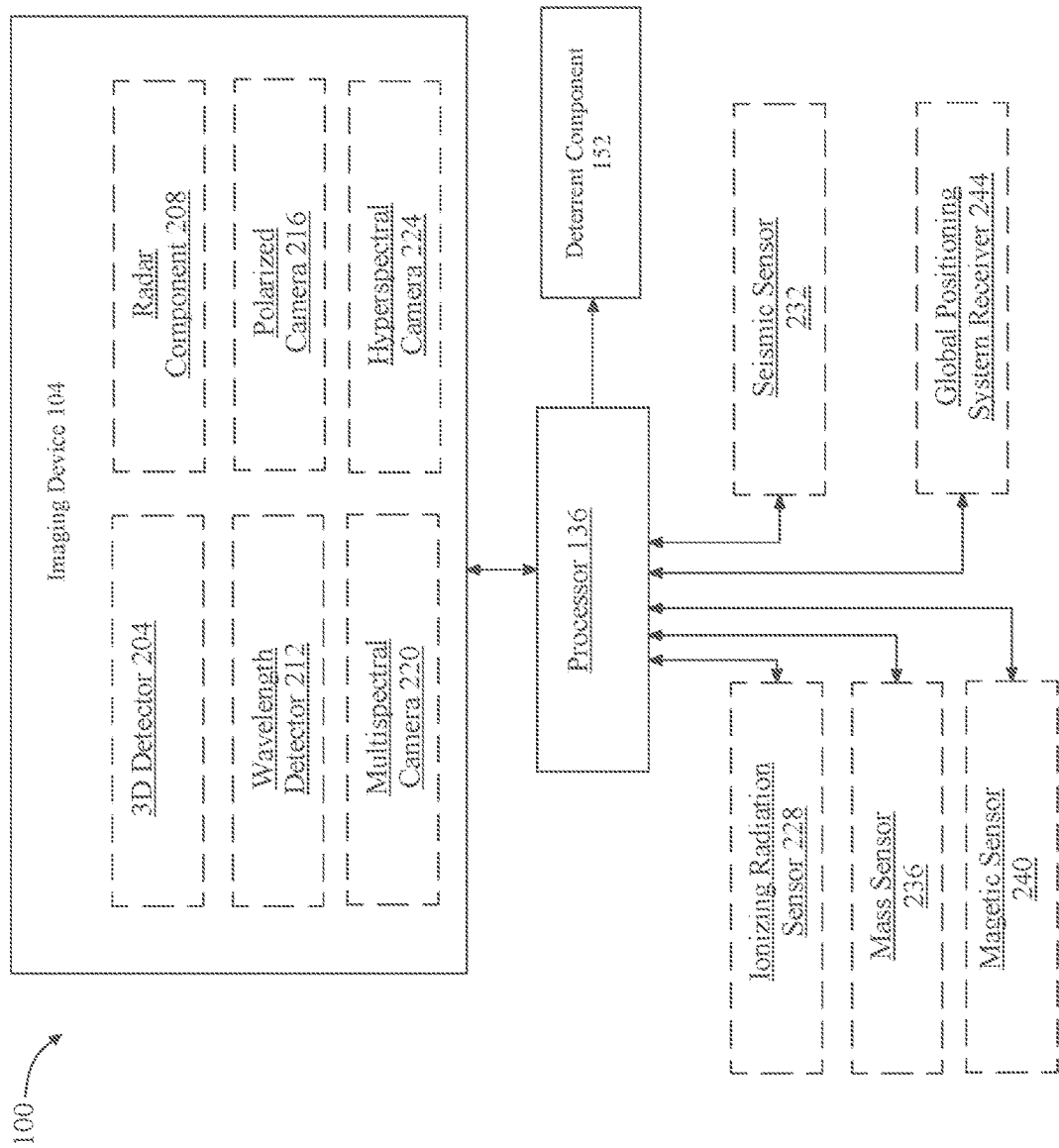
FIG. 2 is a block diagram of an exemplary embodiment of an apparatus.

Now referring to FIG. 2, an exemplary embodiment 200 of apparatus 100 is illustrated. Imaging device 104 may include a 3D detector 204. 3D detector 204 may include, without limitation 3D cameras, sensors, or computational methods. 3D detector 204 may include, without limitation, optical detectors, visible photodetectors, photodetectors, infrared detectors, laser range finders, and/or light or radio frequency radar components. Components of 3D detector 204 may implement passive methods, defined as methods that do not require admission of any electromagnetic and/or acoustical energy, to determine a three-dimensional structure of a real-world scene. Components of 3D detector 204 may implement active methods, defined as methods that require emission of electromagnetic and/or acoustical energy, to determine a three-dimensional structure of a real-world scene. 3D detector 204 may process the data gathered using mathematical, temporal, and/or logical algorithms or electronics to create a three or more-dimensional representation of a real-world scene; representation may provide relative spatial coordinates from 3D detector 204 field of view and/or field of regard. "Field of view" is defined for the purposes of this disclosure as an instantaneous image that a sensor is capable of capturing, while a "field of regard" is a combination of multiple fields of view and/or the possible range of fields of view a sensor can capture based on changing parameters of the sensor, such as, and without limitation, changing a sensor's location, orientation, direction, rotation, roll, inclination, magnification, etc. through motion, optics, physical manipulation, and/or other methods to change its ability to image or detect a scene.

Still referring to FIG. 2, 3D detector 204 can use methods for determining a 3D makeup of a scene, for instance, and without limitation, using multiple cameras for stereo imaging, photogrammetry, time of flight methods, structured light, shape from motion, shape from polarimetry, lidar, radar, sonar, synthetic aperture imaging, multiple disparate apertures, gated imaging, single or multiple pixel range finding, artificial intelligence methods, event, and/or other ranging methods. A resulting output may include and/or be included in an accessible data format providing positional and/or compositional information of some or all of the objects in a scene that represent a real world in a system of coordinates, for instance, and without limitation, Euclidean, Cartesian, and/or polar coordinates. Data included in output may also contain additional information, such as without limitation an object's electromagnetic or acoustical reflectivity, electromagnetic or acoustical absorption, material makeup, obscuration, occlusion, electromagnetic or acoustical emissions, optical characteristics, acoustical characteristics, and/or shape characteristics.

Still referring to FIG. 2, imaging device 104 may include components for detection or imaging using radio frequencies, such without limitation a radar component 208 and/or a wavelength detector 212, where a wavelength detector may include a millimeter wave sensor or imager and/or terahertz sensor or imager. As non-limiting examples, "radio frequency," "radio frequencies," and/or "RF" sensors or imagers may detect electromagnetic radiation in the approximate range of 30 hertz (Hz) to 400 gigahertz (GHz) (wavelengths of approximately 10,000 km to 1 mm, respectively). "Millimeter wave," "MMW," or "microwave," as used in this disclosure, is defined as a spectrum of electromagnetic radiation having frequencies between approximately 3 GHz to 400 GHz (wavelengths of approximately 100 mm to 1 mm, respectively). "Terahertz" or "THz," as used in this disclosure, is defined as a spectrum of electromagnetic radiation having frequencies between approximately 0.1 THz to 22 THz (wavelengths of approximately 3 mm to 14 respectively). Such devices may use RF sources, in either an active embodiment, where a device provides its own RF emissions for detection, or in a passive embodiment, where a device relies on external RF sources to provide energy for detection. RF sensors and imagers may include a receiver and/or transmitter (if active). A receiver may include a front-end with an antenna and/or optics used to collect, direct, and/or manipulate incoming RF energy into a detector of a receiving subsystem. An antenna and/or one or more elements of optics may include a plurality of configurations, materials, meta-materials, geometries, structures, and/or methods to specify, enhance, reject, amplify, focus, filter, provide directionally, and/or further modify frequencies of the RF spectrum for an RF detector to receive. An "RF detector," as used in this disclosure, may include a plurality of "RF receivers," "RF detectors," "RF sensors," or "RF focal plane arrays" that are defined as an electronic device or structure that alters any parameter of an electronic circuit when contacted by radio frequencies. RF detectors may include, without limitation, resistor-capacitor (RC) resonant circuits, inductor-capacitor (LC) resonant circuit, resistor-inductor-capacitor (RLC) resonant circuit, resonant RF photodetectors (RRFP), tuned micro-engineered meta-structures, Schottky diodes, Schottky receivers, microbolometers, antenna/microbolometer structures, RF sensitive photodiodes, resonant tunneling diode (RTD), pair braking detectors, hot electron mixers and/or field-effect transistor detectors. After a signal is converted by a RF detector, it may, as an example, be further processed by a low noise amplifier to improve signal to noise ratio of received energy and then converted to a digital signal for processing that may include, without limitation, determination of range to an object, determination of chemical makeup of an object, detection and/or identification of hidden objects, determination of speed of an object, creation of an image an object and/or scene in the respective frequency, and/or change detection.

Still referring to FIG. 2, imaging device 104 may include a polarized camera 216, multispectral camera 220, and/or hyperspectral camera 224. A "polarized camera," as defined in this disclosure, is a camera or sensor that uses methods or filters to determine, measure, and/or analyze Stokes parameters of an object. "Stokes parameters" or "Stokes vectors," as defined in this disclosure, are mathematical representations or descriptions used to characterize the radiance (intensity) or flux and state of polarization of a beam of electromagnetic radiation. Stokes parameters were first introduced by G. C. Stokes in 1852 in the publication "On the composition and resolution of streams of polarized light from different sources." These are usually represented as six general values of 0°, 45°, 90°, 135°, right hand circular, and left-hand circular. A polarized camera may be able to discern between Stokes vectors and provide them for further processing, analysis, viewing, or storage. A "multispectral camera," as defined in this disclosure, is an imaging system that can concurrently detect and image several spectra of electromagnetic, acoustic, and/or other modalities, for instance, and without limitation, visible light, NIR light, SWIR light, MWIR light, LWIR light, portions thereof, and acoustic energy and/or radiofrequencies, instead of a single spectrum. In an embodiment, a multispectral camera may include several types of visible photodetectors and infrared photodetectors collocated with each other on a single detecting sensor. In another embodiment, a multispectral camera may include a plurality of visible cameras and/or infrared cameras whose imagery is combined into a single output for analysis. A "hyperspectral camera," as defined in this disclosure, is an imaging system that can detect and discriminate specific frequencies, wavelengths, or wave numbers of electromagnetic, acoustic, radiological, or other energy emissions, within a spectral band of a sensor or camera. In an embodiment, a hyperspectral visible camera may be able to discern, from a spatial image, highly detailed wavelength reflection per pixel of a real-world scene. For instance, but without limitation, this may include splitting a typical visible camera detection spectrum of visible light (380 nm-740 nm) and NIR light (740 nm-1,100 nm) into 16 ranges, about 45 nm per "band," that results in a spatial image with 16 channels consisting of image data with reflected electromagnetic energy ranging from 380 nm-425 nm, 425 nm-470 nm, and so on, continuing to 1,055 nm-1,100 nm. This data may then be exploited to determine special characteristics of the scene, for instance, and without limitation, per pixel information of chemical makeup, material properties, organic or inorganic, spectroscopy, and/or other characteristics of the object that was imaged.

With continued reference to FIG. 2, imaging device 104 may include both high-resolution and low-resolution visual sensors. In an embodiment, imaging device 104 and/or one or more processors, computing devices, logic circuits, or the like in and/or communicating with apparatus 100 may select low-resolution or high-resolution sensors as a function of one or more determinations based on accuracy, speed, and resource allocation. For instance, and without limitation, use of a low-resolution sensor may require less bandwidth; as an example, a camera or other imaging device that captures fewer pixels and/or voxels may require fewer parallel wires and/or fewer bits of data per two-dimensional or three-dimensional image and/or frame, and thus require a lower volume of data per two-dimensional or three-dimensional image and/or frame. Where data transmission and/or exchange is serialized anywhere within apparatus 100, broken into "words" for register, cache, and/or memory retrieval and/or for computation using arithmetic and logic units (ALUs), floating-point units (FPU)s, or the like, time spent on serialization and/or performance of multiple instructions may be reduced for lower bandwidths, improving potential processing speeds. Similarly, a multitasking processor or circuit element may be able to free up more resources for additional sensors if a given sensor is lower in resolution. Alternatively, where processing speeds at higher bandwidths are still sufficient and/or greater parallelization and/or multithreading of hardware and/or software routines, bundling of serial lines, or the like permit and/or enable higher processing speeds at high resolution, a high-resolution sensor may provide greater detail and/or more information without sacrificing performance. In some embodiments, and without limitation, apparatus 100 may include a low-resolution sensor with a high level of reliability and/or confidence, which may be used to locate and/or aim a higher-resolution sensor to obtain details; as a non-limiting example, a low-resolution sensor may be used to find a general outline of a person's head or face, to detect eyes using gross features, retinal reflection, or the like, and once the location of the head or face is identified a high-resolution camera, LIDAR device, or the like may be used to obtain more detailed visual data from the face to permit, for instance, image classifiers that identify individuals, behavior classifiers that determine expressions, or the like to use the high-resolution data as inputs. Alternatively or additionally, high-resolution sensors may be used to identify a feature of interest which thereafter may be tracked using a low-resolution sensor; for instance a high-resolution sensor may be used to identify and determine facial recognition and/or expression data concerning an individual, as well as one or more landmarks for low-resolution tracking, the latter of which may be provided to a low-resolution sensor and/or a circuit controlling a low-resolution sensor, which may then be used to track the identified feature using the landmarks. For instance, edges of a visual band as described below may be identified using an image classifier and a high-resolution sensor, and thereafter a low-resolution sensor may be used to track the edges and thus the visual band. Each of these processes may be combined and/or repeated; for instance, a face may be initially identified using a low-resolution sensor and tracked thereafter therewith, while a high-resolution sensor may periodically take snapshots or brief captures of additional data to maintain and confirm accuracy of tracking, update facial expression data, and the like.

More generally, and continuing to refer to FIG. 2, apparatus 100 may combine multiple sensors together to detect subject and/or make any determinations as described in this disclosure. Combinations may include any combinations described below.

Still referring to FIG. 2, one or more sensors may include an ionizing radiation sensor 228, defined as a sensor that detects ionizing radiation, such as alpha, beta, gamma, and/or neutron radiation, from radioactive material that is in solid, liquid, or gas form. An ionizing radiation sensor 228 may include, without limitation, a Geiger-Mueller tube, silicon photodetector, scintillation material (such as organic crystals, organic liquids, plastic scintillators, inorganic crystals, gaseous scintillators, glasses, solution-based perovskite scintillators), scintillator coupled with a photomultiplier, bubble detectors, semiconductor based detectors (such as cadmium zinc telluride (CZT), boron nitride (BN), gallium nitride (GaN), Gadolinium Nitride (GdN)), and/or ionizing radiation imaging techniques, for instance, and without limitation, imaging ionized gas florescence due to the emitted radiation field. One or more ionizing radiation sensors 228 may be configured to detect radioactive material in possession of a subject or that is in the vicinity of subject area. One or more ionizing radiation sensors 228 may include one or more directional sensors or imagers that enable spatial location of a radiation material. One or more ionizing radiation sensors 228 may detect ionizing radiation, direction of emanation of ionizing radiation, and the like and convert such detected signals and/or directional data into electrical signals, which may be processed further by apparatus 100. Persons skilled in the art, upon reviewing the entirety of this disclosure, will be aware of various forms of ionizing radiation sensors 228 that may be deployed, as well as various ionizing radiation phenomenon that ionizing radiation sensors 228 may be used to detect.

Still referring to FIG. 2, one or more additional sensors may include a seismic sensor 232, defined as a sensor that detects vibrations transmitted through the ground, building, or other object apparatus 100 may be attached to and/or in communication with, or through a remote sensor in the vicinity of the apparatus 100. At least a seismic sensor 232 may include, without limitation, a MEMS sensor, infrasound detector, and/or counter balanced weight. One or more seismic sensors may be configured to detect vibrations made by subjects in a subject area, such as people, animals, and/or machines. One or more seismic sensor may include one or more directional seismic sensors, defined as seismic sensors that are exclusively or preferentially sensitive to vibrations emanated from a particular direction within subject area or vicinity; a directional seismic sensor may include arrays of seismic sensors. One or more seismic sensors 232 may detect vibrations, direction of emanation of vibrations, or the like and convert such detected signals and/or directional data into electrical signals, which may be processed further by apparatus 100 as described in further detail below.

Still referring to FIG. 2, one or more additional sensors may include a mass sensor 236, defined as a sensor that detects changes in mass or weight in a specific area and sends resulting information to apparatus 100. At least a mass sensor 236 may include without limitation, a MEMS sensor, stress gauge, or and/or spring scale. One or more mass sensors may be configured to detect mass or weight changes made by subjects in a subject area, such as people, animals, and/or machines. One or more mass or weight sensors 236 may detect changes in mass or weight, or the like and convert such detected signals into electrical signals, which may be processed further by apparatus 100 as described in further detail below.

Still referring to FIG. 2, one or more additional sensors may include a magnetic sensor 240, defined as a sensor that detects changes in magnetic fields, such as from metal objects that are concealed or not originally present in subject area. At least a magnetic sensor 240 may include without limitation, a MEMS sensor or a sensor including one or more wire coils. One or more magnetic sensors may be configured to detect changes in magnetic fields by subjects or objects in a subject area, such as weapons, machines, electronic devices, and/or other objects consisting of metal. Magnetic sensors may be active or passive, where active sensors may use modulated signals emitted from a transmitter, such as a wire coil, to induce electrical eddy currents in metal objects; these induced currents may then be received by a similar coil to detect and possibly discriminate metals, both ferrous and non-ferrous. Passive magnetic sensors may sense changes to a baseline magnetic field that they are in and detect changes in the field by induced electrical current in coils or Hall effect sensors. One or more magnetic sensors 240 may detect changes in magnetic field or the like and convert such detected signals into electrical signals, which may be processed further by apparatus 100 as described in further detail below.

Still referring to FIG. 2, one or more additional sensors may include a location detection device such as without limitation a global positioning system (GPS) receiver 244, defined as a receiver that receives signals from the GPS, Global Navigation Satellite System (GLONASS), BeiDou, Galileo, and/or Navigation with Indian Constellation (NavIC) satellite constellations and/or similar emitting systems, that can calculate its location based on the time and/or phase difference of the received signals. At least a GPS receiver 244 may include without limitation, a receiving antenna, accompanying circuits, and processing. One or more GPS receivers may be configured to determine an orientation of apparatus 100 in relation to the Earth's true North, and/or other locations that are fixed within a coordinate system such as a universal and/or Earth-centric coordinate system, using differential GPS, phase differences, and/or other methods to exploit satellite constellations and their positions. One or more GPS receivers may be configured to receive and determine the local time based on the time information received from the satellite signals. One or more GPS receivers 244 may receive position and timing signals, and the like and convert such detected signals into electrical signals, which may be processed further by apparatus 100 as described in further detail below. Location detection may alternatively or additionally be determined by proximity to electromagnetic transmitters having known locations, including without limitation location determination using cell tower triangulation, determination based on proximity to wireless routers, or the like.

In an embodiment, and with further reference to FIG. 2, two or more of optical camera 108, infrared camera 112, light radar component 116, ultrasound device 120, 3D detector 204, Radar Component 208, Wavelength Detector 212, Polarized Camera 216, Multispectral Camera 220, Hyperspectral Camera 224, and/or other sensor data, for instance, and without limitation, including audio sensor 124, chemical sensor 128, motion sensor 132, ionizing radiation sensor 228, seismic sensor 232, mass or weight sensor 236, magnetic sensor 240, and/or global positioning system receiver 244 may function together as a fusion camera. A "fusion camera," as used in this disclosure, is an imaging device 104 that receives two or more different kinds of imaging or other spatially derived data, which may be combined to form an image combining the two or more different kinds of imaging or other spatially derived data. For instance, and without limitation, light radar data may be superimposed upon and/or combined with data captured using an optical and/or infrared camera 112, enabling a coordinate system more accurately to capture depth in a resulting three-dimensional image. As a further non-limiting example, edge detection using ToF as described above may be enhanced and/or corrected using edge detection image processing algorithms as described in further detail below. Infrared imaging may be used to verify that a subject 308 depicted in an image created by other means is likely a living human through body temperature detection. Persons skilled in the art, upon reviewing the entirety of this disclosure, will be aware of various alternative or additional ways in which different imaging data may be combined using a fusion camera to track, identify, and/or understand detected elements.

Figure 3:
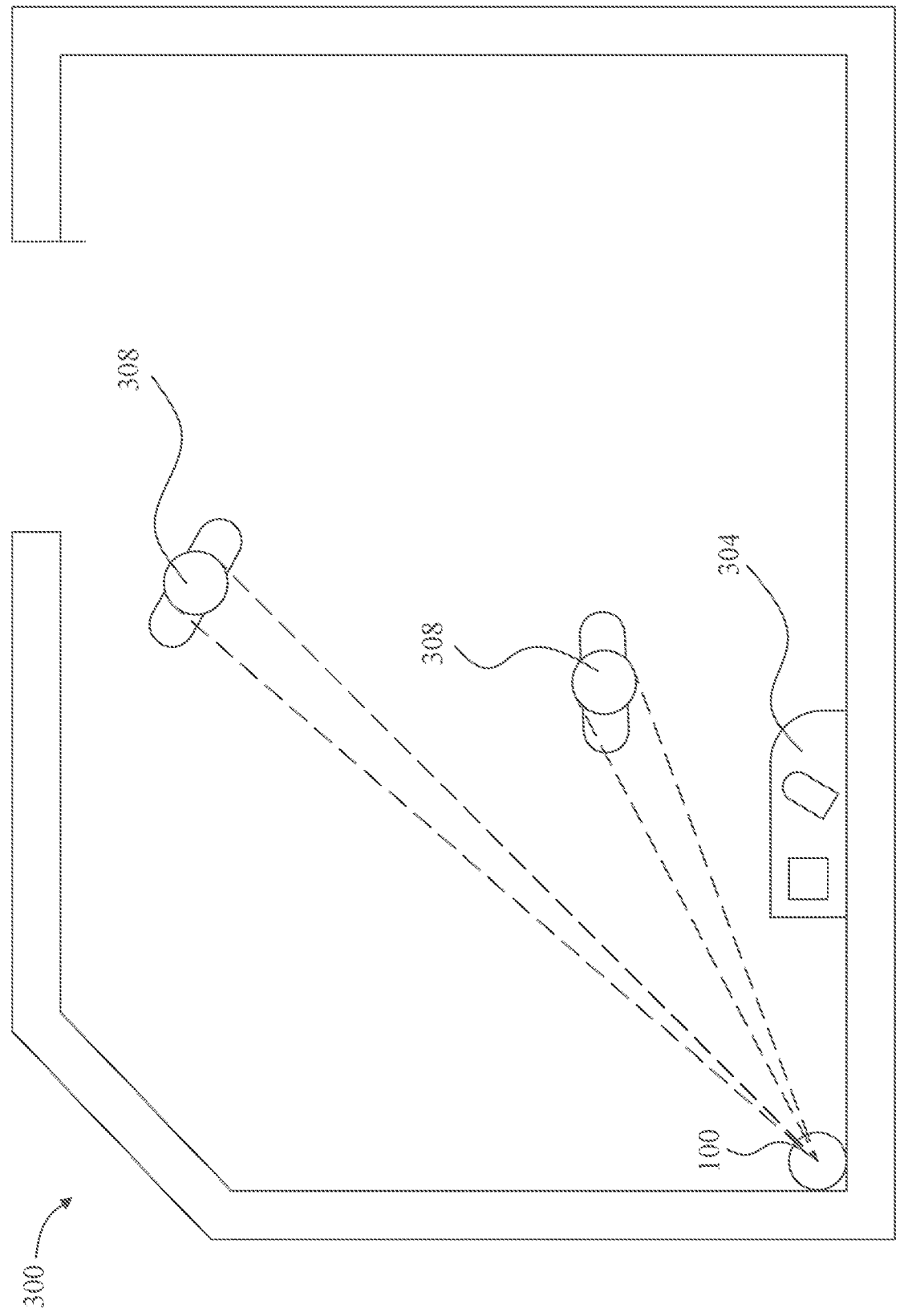
FIG. 3 is a schematic diagram of an embodiment of a subject area.

Referring now to FIG. 3, apparatus 100 may be mounted and/or deployed in a subject area. A "subject area," as used in this disclosure, is region within which apparatus 100 is configured to enforce one or more security objectives. In an embodiment, subject area may include one or more buildings, shopping centers, office spaces, zones, fields, and the like thereof. In an embodiment, and without limitation, subject area may include one or more residential homes and/or residential buildings. Security objectives may include exclusion of unauthorized persons from subject area, prevention of unauthorized persons from entering a door in subject area, prevention of unauthorized persons from accessing an item to be protected 304, such as a valuable and/or dangerous item, protection of a person or object in subject area from harm, prevention of harm to apparatus 100, or the like. Subject area may include, without limitation, a room, corridor, or other internal space, a fixed outdoor area such as a porch, patio, gazebo, stage, or the like, a geometrically defined area around a handheld or drone-mounted device such as a cylindrical and/or spherical area defined by a given radius, or the like. A user may use a computing device such as a control station, desktop computer, tablet, laptop, or the like to set bounds of subject area; alternatively or additionally, apparatus 100 may use automated detection using any imaging device 104 or the like to image and/or scan the subject area for processing to determine the locations of walls, objects, animals, features, or other boundary delineators to find potential boundaries, which a user may confirm from a user computing device.

Still referring to FIG. 3, apparatus 100 may use one or more imaging devices 104 to determine a baseline condition of subject area. Imaging device 104 may map points within subject area to a coordinate system. Coordinate system may include x and y coordinates, which may correspond to axes on one or more focal planes of imaging device 104, substantially horizontal and vertical axes, or the like, and a z coordinate corresponding to depth and/or distance from imaging device 104. Depth may be determined using image analysis such as parallax and/or analysis of relative sizes of objects, and/or using ToF range-finding, and/or artificial intelligence inferred methods, and/or shape from motion or polarimetry, and/or computational vision methods and algorithms. Optical, infrared, light radar devices, RF sensors, radar components, THz imagers, MMW imagers, polarized cameras, multispectral cameras, and/or hyperspectral cameras may each be used to register boundaries of subject area and/or a geometric center thereof to coordinate system. Objects within subject area may then be located within coordinate system to establish a baseline condition.

In an embodiment, and with continued reference to FIG. 3, each separate camera, motion detector, or other component and/or device in apparatus 100 may have an associated Cartesian and/or polar coordinate system. Apparatus 100 may relate each such separate coordinate system to a master coordinate system used by apparatus 100, using without limitation, one or more affine transformations, rotational transformations, perspective transformations, perspective transformations, and/or scaling operations, sometimes collectively referred to as a "homography transformation" or "homography."

With further reference to FIG. 3, one or more subjects 308 may be detected via detection of changes to a baseline condition. A "subject," as used herein, is a person, animal, object phenomenon, and/or substance introduced into subject area after baseline has been established. A subject 308 may include one or more persons who are authorized to enter subject area and/or one or more persons who are not authorized to enter subject area. Subjects 308 may be identified, tracked, imaged, recorded, analyzed, hailed, marked and/or subjected to deterrent actions by apparatus 100 while within subject area, as described in further detail below. In an embodiment, and without limitation, subject 308 may be identified as a function of one or more anonymous qualifications. As used in this disclosure an "anonymous qualification" is a metric and/or element denoting a unique parameter of an individual. For example, and without limitation, anonymous qualifications may include a gender, ethnicity, age, weight, facial, hair, eye color, and the like thereof. In a non-limiting embodiment, apparatus 100 may track anonymous qualifications of subject and/or provide such qualifications to persons or other devices without providing additional data usable to identify the subject as a particular person; in an embodiment, this may be used to preserve the privacy of a subject while still being able to distinguish the subject from other persons in an area and/or subjects.

Referring again to FIG. 1, apparatus 100 may include one or more additional sensors. One or more additional sensors may include, without limitation, at least an audio sensor 124. At least an audio sensor 124 may include, without limitation, one or more microphones such as MEMS microphones. One or more microphones may be configured to detect sounds made by subjects 308 in a subject area, such as people, animals, and/or machines. One or more microphones may include one or more directional microphones, defined as microphones that are exclusively or preferentially sensitive to sound emanated from a particular direction within subject area; directional microphones may include directional MEMS microphones, microphone arrays, acousto-optical detectors, and/or acoustic velocity sensors (AVS). One or more audio sensors 124 may detect audio signals, direction of emanation of audio signals, and the like and convert such detected signals and/or directional data into electrical signals, which may be processed further by apparatus 100 as described in further detail below.

Still referring to FIG. 1, one or more additional sensors may include a chemical sensor 128, defined as a sensor that detects airborne chemicals such as gases, aerosols, biological and/or particulate matter. A chemical sensor 128 may include, without limitation a MEMS chemical sensor 128, which may detect, without limitation, volatile organic compounds (VOCs), carbon dioxide and/or a compound suitable for estimation of carbon dioxide such as hydrogen gas, flammable volatiles, gases associated with explosives and/or exhaust of firearms, or the like. Chemical sensor 128 may be used to detect, without limitation, chemicals consistent with human presence, such as $CO_2$, $H_2$, or the like. Chemical sensor 128 may be used to detect one or more hazardous chemicals and/or chemicals associated with weaponry, such as nitroaromatic compounds for detection of explosives, gun powder and/or gun oils. Chemical sensor 128 may be used to detect one or more hazardous chemicals and/or chemicals associated with chemical and/or biological warfare, such as nerve agents (such as sarin, soman, cyclohexylsarin, tabun, VX), blistering agents (such as mustards, lewisite), choking agents or lung toxicants (such as chlorine, phosgene, diphosgene), cyanides, incapacitating agents (such as anticholinergic compounds), lacrimating agents (such as pepper gas, chloroacetophenone, CS), vomiting agents (such as adamsite), and/or biological agents (such as anthrax, smallpox, plague, tularemia, and/or other detrimental bacteria, viruses, prions). Persons skilled in the art, upon reviewing the entirety of this disclosure, will be aware of various forms of chemical sensors 128 that may be deployed, as well as various chemical phenomena that chemical sensors 128 may be used to detect.

With continued reference to FIG. 1, one or more additional sensors may include a motion sensor 132 configured to detect motion in three or more dimensions and/or orientation in three dimensions of apparatus 100, for instance when apparatus 100 is mounted to a drone and/or being used as a handheld device. At least a motion sensor 132 may include, without limitation, a MEMS sensor. At least a motion sensor 132 may include, without limitation, an inertial measurement unit (IMU). At least a motion sensor 132 may include one or more accelerometers; one or more accelerometers may include a plurality of accelerometers, such as three or more accelerometers positioned to span three dimensions of possible acceleration, so that any direction and magnitude of acceleration in three dimensions may be detected and measured in three dimensions. At least a motion sensor 132 may include one or more gyroscopes; one or more gyroscopes may include a plurality of gyroscopes, such as three or more gyroscopes positioned to span three dimensions of possible acceleration, so that any direction and magnitude of change in angular position in three dimensions may be detected and measured in three dimensions. At least a motion sensor 132 may include, without limitation, one or more magnetic sensors or magnetometers such as Hall effect sensors, compasses such as solid-state compasses, or the like; one or more magnetometers may include a plurality of magnetometers, such as three or more magnetometers positioned to span three dimensions of possible orientation, so that any direction and magnitude of change in magnetic field in three dimensions may be detected and measured in three dimensions, possibly for measurement of the apparatus' 100 orientation to the Earth's true North or detection of magnetic anomalies. Persons skilled in the art, upon reviewing the entirety of this disclosure, will be aware of various components and/or devices that may be used as at least a motion sensor 132 consistently with this disclosure.

Still referring to FIG. 1, apparatus 100 includes a processor 136 communicatively connected to the imaging device 104. Processor 136 may include any computing device and/or processor 136 as described in this disclosure, including without limitation a microcontroller, microprocessor 136, digital signal processor 136 (DSP), graphics processing unit (GPU), vision processing unit (VPU), field programmable gate array (FPGA), artificial intelligence accelerator, neural net accelerator, and/or system on a chip (SoC) as described in this disclosure. As used herein, a device, component, or circuit is "communicatively connected" where the device, component, or circuit is able to receive data from and/or transmit data to another device, component, or circuit. In an embodiment, devices are placed in communicative connection by electrically coupling at least an output of one device, component, or circuit to at least an input of another device, component, or circuit. Devices may further be placed in communicatively connection by creating an optical, inductive, or other coupling between two or more devices. Communicatively connected device may be placed in near field communication with one another. Two or more devices may be communicatively connected where the two or more devices are configured to send and/or receive signals to or from each other. Placement of devices in communicative connection may include direct or indirect connection and/or transmission of data; for instance, two or more devices may be connected or otherwise communicatively connected by way of an intermediate circuit. Placement of devices in communicative connection with each other may be performed via a bus or other facility for intercommunication between elements of a computing device 508 as described in further detail below. Placement of devices in communicative connection with each other may include fabrication together on a shared integrated circuit and/or wafer; for instance, and without limitation, two or more communicatively coupled devices may be combined in a single monolithic unit or module.

Further referring to FIG. 1, processor 136 may be communicatively connected to a remote device 140. Remote device 140 may include any computing device as described in this disclosure. Remote device 140 may include, be included in, and/or communicate with a computer, laptop, and/or mobile device such as a mobile telephone or smartphone. Remote device 140 may include a single computing device operating independently, or may include two or more computing device operating in concert, in parallel, sequentially or the like; two or more computing devices may be included together in a single computing device or in two or more computing devices. Remote device 140 may interface or communicate with one or more additional devices as described below in further detail via a network interface device. Network interface device may be utilized for connecting remote device 140 to one or more of a variety of networks, and one or more devices. Examples of a network interface device include, but are not limited to, a network interface card (e.g., a mobile network interface card, an LTE card, a 5G card, a fiber optic network card, a power over ethernet (PoE) card, a LAN card), a modem, and any combination thereof. Examples of a network include, but are not limited to, a wide area network (e.g., the Internet, an enterprise network), a metropolitan area network (e.g., a private network setup specifically for use amongst several buildings or physically close locations), a cloud network (e.g., a network associated with hosted storage and/or processing off-site with parts located locally or distributed), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Remote device 140 may include but is not limited to, for example, a computing device or cluster of computing devices in a first location and a second computing device or cluster of computing devices in a second location. Remote device 140 may include one or more computing devices dedicated to data storage, security, distribution of traffic for load balancing, and the like. Remote device 140 may distribute one or more computing tasks as described below across a plurality of computing devices of computing device, which may operate in parallel, in series, redundantly, or in any other manner used for distribution of tasks or memory between computing devices. Remote device 140 may be implemented using a "shared nothing" architecture in which data is cached at the worker, in an embodiment, this may enable scalability of system 100 and/or computing device.

Still referring to FIG. 1, processor 136 and/or remote device 140 may be designed and/or configured to perform any method, method step, or sequence of method steps in any embodiment described in this disclosure, in any order and with any degree of repetition. For instance, processor 136 and/or remote device 140 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 136 and/or remote device 140 may perform any step or sequence of steps as described in this disclosure in parallel, such as simultaneously and/or substantially simultaneously performing a step two or more times using two or more parallel threads, processor 136 cores, processor 136 cores of other apparatus 100 or processors of remote devices 140 in the network, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, processor 136 is configured to identify at least a subject 308 as a function of detection of subject 308 using imaging device 104 and/or additional sensors on the apparatus 100. As used in this disclosure, "identification" may include differentiation of subject from other persons, animals, and/or objects in or near subject area, assignment of a district and/or unique identifier to subject, identification of subject as a particular person, species, member of a group, or the like, or any other association of data with subject that enables tracking subject specifically within subject area, for instance and without limitation as set forth in further detail below. Processor 136 may periodically and/or continuously poll imaging device 104 and/or other sensors to determine whether a change from baseline has occurred; for instance, apparatus 100 may periodically scan room using light radar, take photo/video data, or the like. Processor 136 may iteratively compare baseline data to polled and/or event-driven data to detect changes.

In an embodiment, processor 136 and/or remote device 140 may perform one or more image or signal processing algorithms to identify and/or track objects in subject area, which objects may include subjects 308 or other objects of interest. Initial identification of objects may be performed using an edge detection algorithm. An "edge detection algorithm," as used in this disclosure, includes a mathematical method that identifies points in a digital image at which the image brightness changes sharply and/or has discontinuities. In an embodiment, such points may be organized into straight and/or curved line segments, which may be referred to as "edges." Edge detection may be performed using any suitable edge detection algorithm, including without limitation Canny edge detection, Sobel operator edge detection, Prewitt operator edge detection, Laplacian operator edge detection, and/or Differential edge detection. Edge detection may include phase congruency-based edge detection, which finds all locations of an image where all sinusoids in the frequency domain, for instance as generated using a Fourier decomposition, may have matching phases which may indicate a location of an edge. Other methods for tracking, for instance, and without limitation, may include algorithms, such as AdaBoost, BOOSTING, Multiple Instance Learning (MIL), Generic Object Tracking Using Regression Networks, Kernelized Correlation Filter, Medial Flow Tracker, Minimum Output Sum of Squared Error, Tracking/Learning/Detection, Channel and Spatial Reliability, and/or other similar algorithms. Persons skilled in the art, upon reviewing the entirety of this disclosure, will be aware of various ways in which the object can track of objects of interest using various image and signal processing algorithms.

In an embodiment, processor 136 and/or remote device 140 may apply algorithms to smooth or enhance tracking of moving objects in the subject area to enhance accuracy of pointing devices and minimize error, hysteresis, and/or latency of deterrents. These include, but are not limited to, Kalman filters, derivative controls, proportional/integral/derivative (PID) controls, moving averages, weighted averages, and/or other noise and error mitigation techniques.

Still referring to FIG. 1, object detection and/or edge detection may alternatively or additionally be performed using light radar data, RF sensor or radar component data, and/or 3D camera, sensor or computational method data. For instance, and without limitation, processor 136 and/or remote device 140 may receive, from light radar component 116 and/or radar component 208, raw modulated images. Processor 136 and/or remote device 140 may use a graphical processing unit (GPU) or alternative acceleration processors as described for Processor 136 to implement accelerated depth engine software converting raw signal into depth maps; edges may be detected using depth map data. In a non-limiting embodiment, light radar pixels may be invalidated when they contain a saturated signal from overexposure. When pixels are saturated, phase information may be lost. Pixels may alternatively or additionally be invalidated if they received signals from more than one object in subject area. A common case where this sort of invalidation may be seen is in corners. Because of detected geometry, light from light source may be reflected off one wall and onto another. This reflected light may cause ambiguity in measured depth of a pixel. Filters in depth algorithm may be used to detect these ambiguous signals and invalidate such pixels. Another common case of multipath may be caused by pixels that contain a mixed signal from foreground and background, such as around object edges. Invalidation of pixels around edges may be accentuated due to fast motion of objects such as subject 308. Thus, processor 136 and/or remote device 140 may detect an edge by detection of a fringe of ambiguous and/or invalidated pixels; edge may be confirmed by comparing ToF depths on either side of such a fringe, which may demonstrate depth differences consistent with a figure such as a subject 308 standing in front of a more distant background. ToF edge detection and computer vision edge detection may be combined to identify edges with a high degree of certainty.

Still referring to FIG. 1, processor 136 and/or a remote device 140 may be configured to perform one or more corrective processes to counteract distortions such as parallax and/or pincushion distortions; this may be performed, without limitation, by comparing geometries within subject area as captured by an optical camera 108 to geometries as detected using light radar and/or ToF devices as described above. For example and without limitation, a LIDAR image in two-dimensions may be oriented and/or overlaid such that a representative three-dimensional object and/or shape is established, wherein an imaging device, sensor, and/or circuit connected thereto converts the image to cartesian mapping such that a barrel distorted image is identified. The galvanometer may then be instructed to project a matrix and/or homographic matrix with a plurality of lines and vertices. A flat field corrected camera and/or sensor may then be instructed to determine the magnitude of distortion from the matrix, wherein a corrective homography matrix is determined based off several images taken of the calibration pattern that is provided. This homography matrix can then be used by processor 136 or other parts of the apparatus 100 to calculate a corrected image, for instance by multiplying the homography matrix to the image data. Multiple cameras can use this method to create alignment and scaling homography matrices to correct off axis optical paths, distortion errors, rotational errors, and other inconsistencies between multiple cameras and/or sensors. In an embodiment, and without limitation, calibration patters may include a flat card comprising a checkerboard pattern, wherein imaging device 104 and/or optical camera 108 detects vertices and creates an alignment to the homography matrix. For example, and without limitation, processor 136 and/or remote device 140 may detect one or more barrel distortions and/or rotations, wherein the calibration corrects for the distortions as a function of a flat field. In some embodiments, calibration patterns and the sensor's derived homography matrices may be used in various methods and/or processes for distortion correction. For instance, a first sensor may be chosen as a primary sensor, and intrinsically calibrated to remove barrel distortion and pincushioning. Multiple additional sensors may each be first intrinsically calibrated to have a flat field of vision. Subsequently, and all other sensors thus calibrated may be further calibrated against the primary sensor to determine their homography matrices in order to all be aligned and have a shared relative coordinate system, which may require translational and/or affine matrices to adjust for rotations, displacements, and the like.

Further referring to FIG. 1, homography matrices or other similar methods may alternatively or additionally be used to calibrate reflective or other beam steering devices such as galvanometers, fast-steering mirrors, and/or other beam steering devices used to aim directed light or other emissive deterrents, camera and/or imaging inputs, ToF inputs or outputs, or the like. In an embodiment, a laser or other directed and/or focused light source may be output through such a reflective device to form a calibration pattern on a surface such as a wall or screen. The calibration pattern may include, without limitation, a 6×4 matrix or other geometrical shapes that provide the necessary contrast. The calibration pattern, due to intrinsic errors in the beam steering apparatus, may be output with a barrel distortion, pincushion, rotational, affine, perspective, or other geometrical errors; the distorted image may be captured by a camera or other sensor that has its intrinsic errors corrected using methods described above. The apparatus may use the sensor's image to detect points or patterns of the captured, distorted calibration pattern as keypoints or centroids, then using the image or data, generate a homography matrix to cause the centroids to be corrected to a flat matrix; this homography matrix may be used to correct reflective device, causing output to be flat in the same manner as a flat camera image without intrinsic errors. A flat output field of reflective device may then be registered to a field of vision of primary sensor to ensure that output of directed light deterrent is accurately aimed within a coordinate system of primary and/or other sensors.

Still referring to FIG. 1, if the optics of a beam steering device are not aligned perfectly, there may be drift based on the optics' positions relative to each other; for instance, for a variable beam expander, as the apparatus sweeps through magnifications or other optical changes, misalignment may cause the beam or optical path to divert by a few microradian (μrad) every step the assembly moves or changes. This may cause significant error at far distances. In order to overcome this, the apparatus may be configured to calibrate this drift by mapping a position of the laser beam with all or critical perturbations of the opto-mechanics and/or other parts that would affect the directionality of beam or optical path and record a deviation from a base configuration using a camera or other sensors. An image may be processed such that a single pic is taken for each position of the components by finding the centroid of each beam spot, such as using a threshold of the image, then contour and/or center finding of the results. This may then be stored with regard to current settings of optics. The above-described process may be repeated for every optical component and/or component that may affect a laser that can be manipulated for a minimum and/or maximum and stepped in between to a degree and accuracy needed to achieve error requirements for aiming the laser. Apparatus may then create a correction method such as a lookup table, and may interpolate corrections, for instance using a quadratic fit function, or the like, between values therefrom. Apparatus may then apply corrections to beam steering or other necessary optical, mechanical, or other affected components.

Still referring to FIG. 1, if other components, such as acoustic or kinetic countermeasures, are used, cameras and sensors may be used to align them. For example, to align a beam-forming acoustic array, microphones may be placed in the far field at several locations in a sensor's field of view. Microphones may have an optical marker, or fiducial, on them so each microphone can be uniquely identified by apparatus and/or system. Apparatus may then sweep a sound source in space, with each microphone noting when maximum sound pressure is reached at given steering values, along with the microphones' locations in the sensor's coordinate system. These values may then be used to determine alignment of acoustical sound patterns to other sensors and systems on apparatus.

Figure 4:
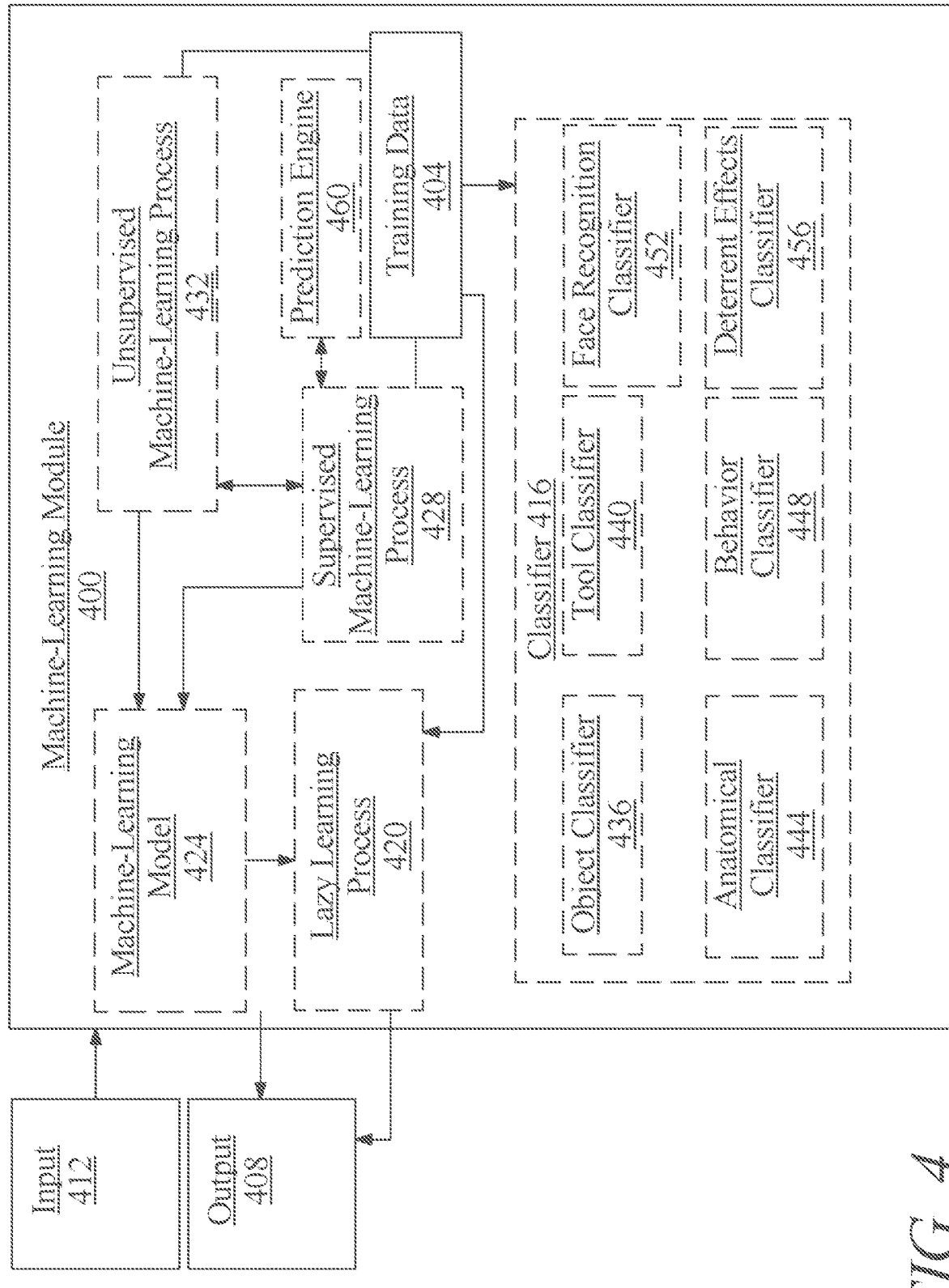
FIG. 4 is a block diagram of an embodiment of a machine-learning module.

Referring now to FIG. 4, processor 136 and/or remote device 140 may be configured to perform one or more machine-learning processes to analyze data captured by sensors, feedback loops, and/or imaging devices 104. Such processes may be performed using a machine-learning module 400, which may include any processor 136, computing device, and/or hardware and/or software component thereof, as described in this disclosure. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure.

Further referring to FIG. 4, images and/or geometry detected in images, such as without limitation as detected using edge detection, ToF processes, or the like, may be filtered, sorted, and/or selected using one or more supervised and/or unsupervised machine-learning processes and/or models as described in further detail below; such models may include without limitation a classifier 416. Classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a process whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

As a non-limiting example, a classifier a used in this disclosure may be generated, using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of an element is independent of the value of any other element, given a class variable. Naïve Bayes classification algorithm may be based on Bayes Theorem expressed as $P(A/B)=P(B/A)\ P(A)\div P(B)$, where $P(AB)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and P(B) is the probability of the data regardless of the hypothesis. A naïve Bayes algorithm may be generated by first transforming training data into a frequency table. Portable computing device 104 may then calculate a likelihood table by calculating probabilities of different data entries and classification labels. Processor 136 and/or remote device 140 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs as described in this disclosure as inputs, outputs as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree 148 classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 4, models may be generated using alternative or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using training data 404.

With continued reference to FIG. 4, Classifier may include an object classifier 436. Object classifier 436, which may be implemented using any classification method and/or algorithm as described above, may be used to sort objects detected in subject area into categories and/or types of objects. For instance, and without limitation, object classifier may identify a first object detected using computer vision techniques and/or ToF as described above as a human body, which may be further classified as an adult and/or child, a second object as an animal such as a dog, rat, racoon, bird, or the like, a third object as an inanimate object, which may be further classified as described below, or the like. Object classifier may classify and/or identify several objects that are in subject area simultaneously. For instance, and without limitation, object classifier may identify multiple persons as persons, one or more objects being held by persons as belonging to one or more categories of object, or the like.

Still referring to FIG. 4, Classifier may include a tool classifier 440. Tool classifier 440 may identify one or more objects held by or on a person of subject 308 by classification to one or more categories of object, such as tools, weapons, communication devices, or the like. One or more categories may identify such an object as, and/or distinguish object from, a weapon, a tool usable for a break-in, a tool designed to damage objects and/or people, a tool capable of damaging objects and/or people, and/or an innocuous object such as a sandwich or coffee cup.

With further reference to FIG. 4, once objects, persons, and/or other subjects 308 are defined, imaging device 104 and/or processor 136 may be configured to track motion and/or actions of such persons and/or objects relative to apparatus 100. For instance, and without limitation, a label may be associated with each identified object and/or person, which may be tracked subsequently. Similarly, labels may be associated with individual anatomical elements and/or targets, which may also be tracked using imaging device 104. A number of people in subject area may be calculated and/or tracked.

Still referring to FIG. 4, Classifier may include an anatomical classifier 444. Anatomical classifier may identify, on a person (i.e., an image element that has been classified as being a person), one or more elements of anatomy. One or more elements of anatomy may include a face; in other words, anatomical classifier may identify a face of a user. Anatomical classifier may identify, and permit processor 136 and/or remote device 140 to track, one or more anatomical landmarks such as joints, eyes, or the like. For instance, and as illustrated for exemplary purposes in FIG. 7, landmarks such as joints may be identified and/or tracked according to position and/or orientation on one or more images 700 of a person. Landmark position and/or orientation may be determined as estimates relative to a global depth sensor frame of reference and/or a frame of reference established using a coordinate system used with imaging device 104 as described above. Position may be specified, without limitation, using distance computation within a three-dimensional coordinate system which may be computed in units of length at a given resolution such as millimeters. Orientation may be expressed using any suitable mathematical and/or geometrical construct such as vectors, quaternions, or the like, any of which may be normalized. A position and/or orientation of each landmark and/or joint may form its own landmark and/or joint coordinate system. All landmark and/or joint coordinate systems may be formed as absolute coordinate systems relative to a 3D coordinate system used by and/or with imaging device 104. Landmark coordinates may be used in axis orientation.

Figure 5:
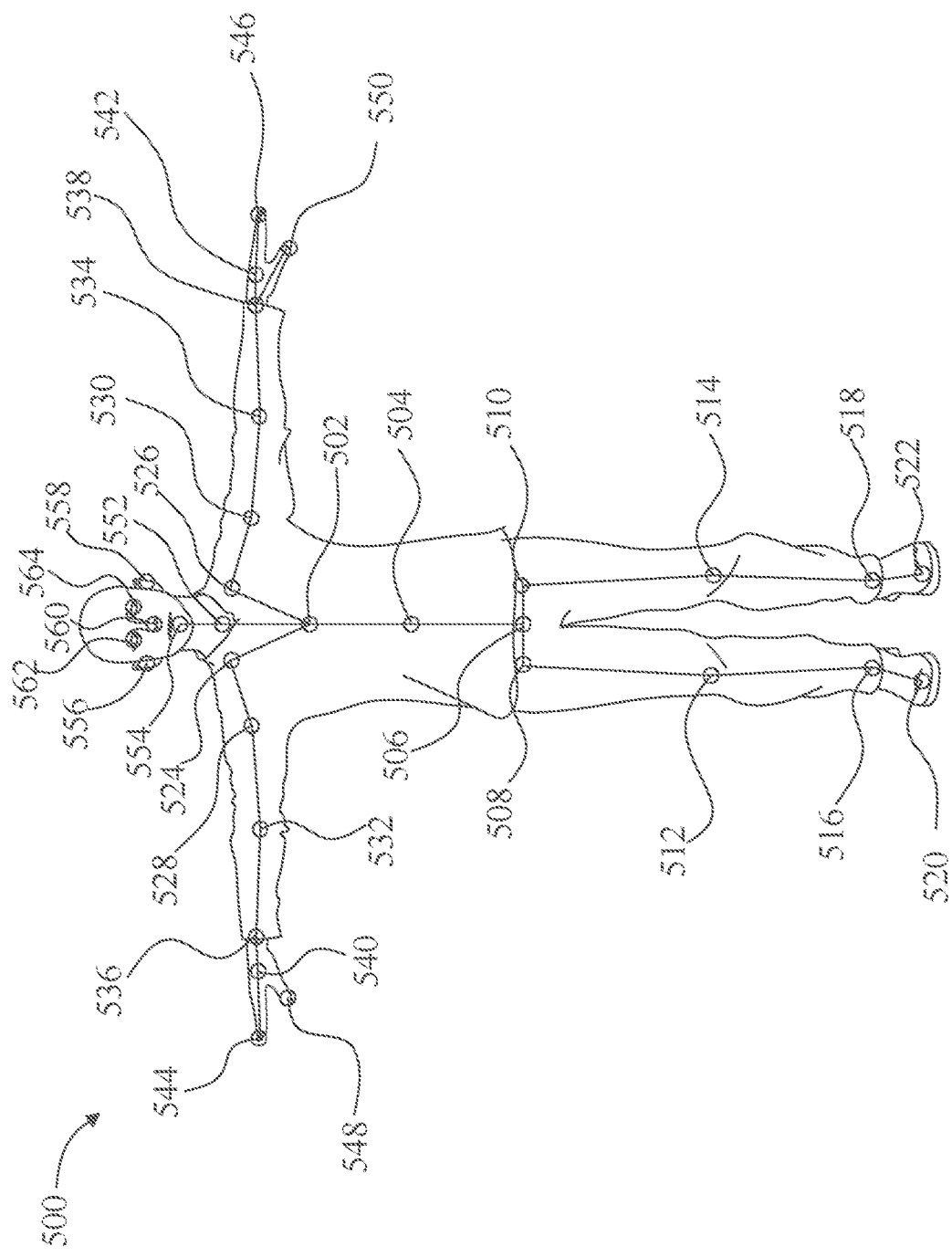
FIG. 5 is a schematic diagram of embodiments of anatomical landmarks.

In an embodiment, and now with continued reference to FIG. 5, identified landmarks may be organized and/or tracked according to a joint hierarchy. For instance, and without limitation, a skeleton may include 32 joints with a joint hierarchy flowing from a center of the body to a plurality of extremities. Each connection, such as a bone, may link a parent joint with a child joint. Processor 136 and/or remote device 140 may track relative positions of landmarks, in combination with joint hierarchy, to determine poses and/or actions of a person being tracked; poses and/or sequences of poses may be further classified to behaviors as described below. For instance, and without limitation; processor 136 and/or remote device 140 may track a position and/or orientation of a person's face and/or anatomical features thereon. This may be effected using a geometric object such as without limitation a face rectangle. A face rectangle, one or which may be associated with each detected face, may mark a location and size of the face in an image. Rotation of face rectangle with respect to an image coordinate system may provide a simple and thus rapidly computable way to track orientation and position of elements of a person's face, including without limitation the eyes. A head pose attribute may alternatively or additionally be generated and/or tracked to determine and/or render a position of a person's facial or other anatomy.

Still referring to FIG. 5, landmarks may include, as a non-limiting example, a spinal landmark at the sternum 502, a spinal landmark at the naval region 504, a pelvic landmark 506, a right hip landmark 508, a left hip landmark 510, a right knee landmark 512, a left knee landmark 514, a right ankle landmark 516, a left ankle landmark 518, a right foot landmark 520, a left foot landmark 522, a right clavicle landmark 524, a left clavicle landmark 526, a right shoulder landmark 528, a left shoulder landmark 530, a right elbow landmark 532, a left elbow landmark 534, a right wrist landmark 536, a left wrist landmark 538, a right hand landmark 540, a left hand landmark 542, a right hand tip landmark 544, a left hand tip landmark 546, a right thumb landmark 548, a left thumb landmark 550, a neck landmark 552, a head landmark 554, a right ear landmark 556, a left ear landmark 558, a nose landmark 560, a right eye landmark 562, and/or a left eye landmark 564.

In an embodiment, and continuing to refer to FIG. 5, apparatus 100 and/or anatomical classifier 444 may be designed to be agnostic to one or more variations in appearance. One or more variations in appearance may include without limitation variations in gender, ethnicity, skin tone, height, weight, body composition, age, national origin, traditional clothing such as hijabs and/or yarmulkes, sartorial choices, and/or body modifications such as tattoos, piercings, or the like. In an embodiment, machine-learning models in apparatus such as without limitation classifiers, may be trained using training data having images that vary according to one or more such variations; for instance, training data may include training examples for each of various ethnic groups, age brackets, body compositions, body modifications, traditional clothing, or the like, and may also include training examples of any or all such variations for each sex and/or gender. In some embodiments, apparatus 100, anatomical classifier 444, and/or other classifiers and/or machine-learning models may be tested against a plurality of persons, where the plurality may be designed to span a possible range of variations as described above; identification of anatomical features, facial recognition, and/or other machine-learning and/or classification outputs may be tested for accuracy, for instance by a person and/or group of people acting as an auditor and/or test administrator. Where accuracy falls below a threshold level, additional training examples pertaining to variations for which accuracy is low may be used to further train models, classifiers, and/or apparatus 100. In an embodiment, approaches described above may function to prevent apparatus 100 from behaving differently for people having different demographic characteristics, aiding in ensuring unbiased performance.

Still referring to FIG. 5, sensitivity to human bias has risen to unprecedented levels across the globe. This is an all-consuming responsibly for every company, law enforcement agency in the world. Many technology companies have created executive teams just to counteract inherent bias into AI algorithmic development. A deep resource commitment is beginning to be seen focused on this area with an emphasis of ethics and balance at its foundational cornerstone. Embodiments described herein may completely remove any nefarious profiling by only considering physical boundary conditions of a protected area along with violators' actions to be markers for interdiction. Apparatus may be agnostic relating to a subject's ethnicity, gender or dress. Apparatus may act in such a way as to produce no bias.

Referring again to FIG. 4, anatomical classifier 444, tool classifier 440, computer vision, and/or ToF may be combined to identify one or more elements that are worn on or held by a person. For instance, and without limitation, processor 136 and/or remote device 140 may perform glasses detection. Glasses may be identified by detecting edges on one or more regions of facial anatomy such as a nose-bridge area, an area around eye sockets, or the like; detection such edges may be used to identify glasses, and/or geometry of such edges may be classified using a tool classifier 440 or the like to determine that a user is wearing glasses. A user determined to be wearing glasses may be subjected to a different threat response as described in further detail below. Eyewear may, in some embodiments, be further classified to identify categories of eyewear such as sunglasses, eyewear that protects against light, physical hazards, or the like, night-vision and/or infrared goggles, and/or visual corrective lenses, each of which may indicate a modified threat response as described in further detail below.

Now back to FIG. 4, machine-learning module 400 may include additional elements that use identification of anatomical features, objects, and/or other visual data to determine and/or estimate further information concerning phenomena detected using sensor and/or imaging device 104. For instance, and without limitation, machine-learning module 400 may include and/or generate a behavior classifier 448. Behavior classifier 448 may link one or more postures, actions, objects, and/or identity of and/or associated with a person to one or more behaviors. For instance, a series of postures and/or movements indicating approach toward an item to protect may be classified to an intent to abrogate protection of the item. A series of postures separated by small increments of time may indicate rapid motion, which may be classified based on reduction of distance to apparatus 100 and/or item to protect, which may indicate aggressive intent, and/or increase of such distance, which may indicate an attempt to flee or otherwise vacate subject area. As a further example, postures and/or movements may be classified, without limitation, to aggressive acts such as throwing objects, smashing objects, striking another person, forcing entry to one or more locations, stomping on objects, vandalizing and/or defacing objects and/or surfaces or the like. Behavior classifier 448 may alternatively or additionally associate objects held by a person with potential actions and/or behaviors, potentially in combination with poses and/or actions. For instance, and without limitation, an object identified as a gun, knife, bludgeon, and/or other weapon may be associated with aggressive behaviors, while other objects such as containers, tools, or the like may be associated with aggressive behavior only when associated with particular postures and/or actions; as a non-limiting example, actions associated with setting a fire, when combined with a box-like object may indicate likely use of contents of the box-like object as an incendiary, while an action associated with striking, throwing, and/or prying, combined with an identified tool usable to cause damage, steal, force access to an item, or the like may be classified to an aggressive behavior.

Further referring to FIG. 4, behavior classifier 448 may classify objects, persons, postures, and/or actions to aggression levels and/or degrees of severity of behavior, which may be used in threat-level calculation as described in further detail below. Alternatively or additionally, objects, persons, postures, and/or actions may be linked to identifiers of specific behaviors; such behaviors may be linked to specific responses as described in further detail below, and/or may be linked to degrees of severity and/or aggression levels. Behavior analysis and/or classification may alternatively or additionally be performed on verbal inputs captured by audio input devices, which may be converted to textual form using speech-to-text software or the like and compared to keywords or other linguistic elements. Keywords may include one or more words associated with undesirable and/or dangerous actions, as determined by classifiers trained to associate particular words with subsequent and/or concurrent actions, and/or using a look-up table or database of keywords. The system may further process the speech for characteristics, such as, but not limited to, inflections, tones, variability, pace, and other features that may be correlated to moods, aggression levels, deceptive intentions, irritability, anger, frustration, and/or other emotions, feelings, and/or intents. The system may further track facial or other features, such as, but not limited to, eye movements, facial muscle movements, facial pore dilations, and/or other features to analyze a persons' intent, moods, aggression, possible influence by chemicals, and/or other key behaviors.

Still referring to FIG. 4, machine-learning module 400 may include a face recognition classifier 452. Face recognition classifier 452 may be configured to classify one or more images of a face of a subject 308 to a personal identity. Such classification may be done with a series of images of a subject 308's face; in an embodiment, classification of two or more images of the face of the same subject 308 may be compared to one another, with an identification having greatest proximity, given a distance and/or proximity measurement used in a classifier as described above, across the different classifications may be treated as the correct identification. A degree of proximity of one or more images so classified may be mapped to a likelihood of correct identification, which may be expressed as a probability; where likelihood is less than a preconfigured threshold amount, processor 136 and/or remote device 140 may not treat subject 308 as identified. Repeated and/or iterative classification of facial images may be continued until an identification is made. Threshold may be set at a default value and/or configured and/or selected by a user of system.

With continued reference to FIG. 4, facial recognition processes may include identification of the visual landmarks of human faces and/or of bounding-box locations. A face's features may be extracted and stored for use in identification. Bounding box, visual landmarks, and/or features may be stored as a representation of one face and used as inputs facial recognition classifier 452. Facial recognition classifier 452 may be used to match a facial representation to a data structure representing a person, including without limitation an identifier of a person, a data structure including various attributes of a person, or the like. Identification using facial recognition classifier may be used to retrieve data concerning an identified subject 308 from one or more databases and/or datastores as described in further detail below. In an embodiment, a classifier may be trained to recognize a person at a distance; for instance, recent data taken at closer range may be used to identify gross identifying markers, a plurality of which combined may exceed a threshold probability that a person is subject. This may in turn be used to determine that a person at a greater distance is a subject to be deterred, permitting interdiction at distances of 100 yards or more, so that a person can be headed off before attempting to enter a building, start shooting, or otherwise engage in nefarious activities.

Further referring to FIG. 4, classifiers may further perform voice recognition. For instance, a voice recognition classifier in an embodiment may be trained using training data that correlates audio recordings of a subject's voice with identification of the subject; such identification may be performed automatically using any other classifier described above and/or may be entered by a user.

Still referring to FIG. 4, machine-learning module 400 may include a deterrent effects classifier 456. Deterrent effects classifier 456 may be configured to classify one or more images or data from sensors to determine success or failure of a deterrent used on a subject 308. This can be in the form of behaviors, movements, and/or other characteristics that provide information to the processor 136 to determine if a deterrent's application was successful or not. For example, if an optical deterrent is used, the deterrent effects classifier can try to determine if the person is still focused on an object in the subject area, or if they are dazzled and currently unable to progress.

Still referring to FIG. 4, processor 136 and/or remote device 140 may use any or all sensor feedback and/or machine-learning to perform liveliness detection, defined as a process used to distinguish a person from a static image or inanimate object, for instance by tracking movements, classifying behavior, sensing body temperature, or the like. Processor 136 and/or remote device 140 may be configured to differentiate between children and adults, through classification of size, developmental feature models, or the like. Processor 136 and/or remote device 140 may be configured to distinguish people from other animals such as dogs.

Still referring to FIG. 4, a machine-learning model may include a prediction engine 460, which may be used, without limitation, to predict a probable direction of travel and/or other motion by subject based on one or more previous actions. Prediction engine 460 may include, without limitation, a supervised machine-learning model, which may be generated using any supervised machine-learning process 428 as described above. Training data 404 used to generate prediction engine 460 may include entries having sequences of motion vectors, whereby outputs of predicted motion vectors given a previous sequence of motion vectors may be trained. Training data may alternatively or additionally include sequences velocity vectors and/or acceleration vectors, which may enable prediction engine to predict both a direction and rate of movement of a subject and/or a body part of subject given a sequence of one or more previous movements as described using one or more previous velocity vectors. Velocity vectors and/or other motion vectors may be represented as n-tuples, such as triples of numbers representing components of motion in three dimension according to a coordinate system and/or any suitable set of three vectors spanning three dimensions, sextuples describing both translational and rotational velocity vectors, or the like. Prediction engine may, for instance generate a result that a person who has moved his head to quickly to the right is most likely to move his head sharply downward next, pivot it to the left, and/or any other such description.

Figure 6:
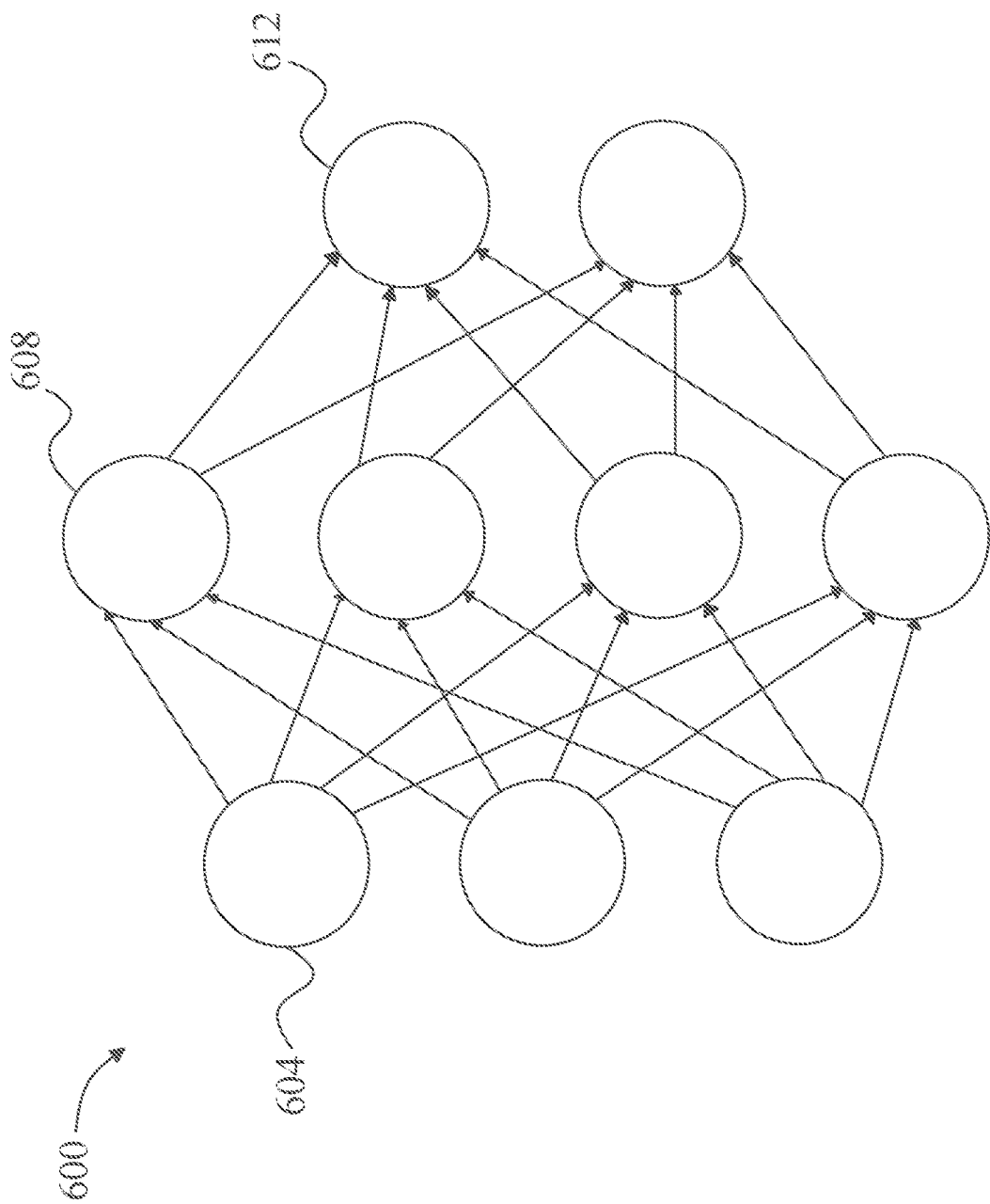
FIG. 6 is a block diagram of an exemplary embodiment of a neural network.

Referring now to FIG. 6, an exemplary embodiment of neural network 600 is illustrated. A neural network 600 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network."

Figure 7:
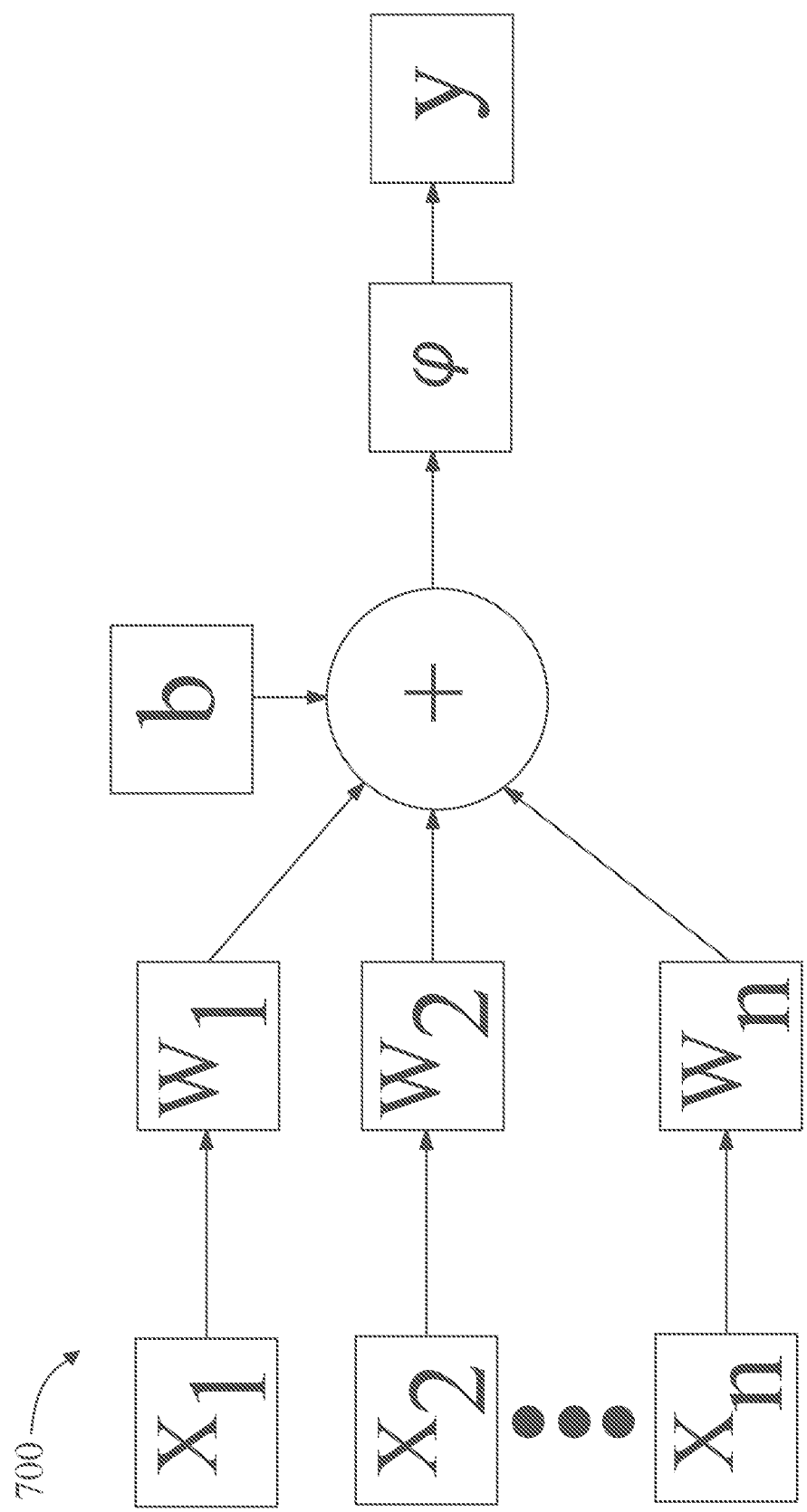
FIG. 7 is a block diagram of an exemplary embodiment of a node in a neural network.

Referring now to FIG. 7, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Referring again to FIG. 1, processor 136 is configured to determine a behavior descriptor associated with the subject 308. A "behavior descriptor," as used in this disclosure, is an element of data describing a degree of threat and/or probability of taking an action by a subject. A behavior descriptor may describe a violation of a boundary condition, where a "boundary condition" is an element of data describing one or more specific actions apparatus is configured to and/or deter a subject from performing. A boundary condition may include entrance into, egress from, and/or persistent presence in subject area and/or a subset thereof. A boundary condition may include an action that exceeds a threshold level of speed, amount of time idle at or within a boundary, density of traffic at or within the boundary, or other measurable physical parameter. A boundary condition may include performance of a specific behavior and/or a range of behaviors apparatus is configured to prevent and/or deter. Different boundary conditions may be associated with different threat levels and/or deterrent modes. A behavior descriptor may include a threat level represented by subject. A behavior descriptor may include a current threat level, boundary condition violation, behavior, and/or identity of subject, and/or a future threat level, boundary condition violation, and/or behavior of subject. Persons skilled in the art, upon reviewing the entirety of this disclosure, will be aware of various alternative or additional examples of behavior descriptors and/or boundary conditions. Determination of a behavior descriptor may include, without limitation, receiving a manual threat determination, which may be entered as a user command; for instance, a user may press a button, pulling a trigger, or otherwise enter a command indicating that subject 308 is, or is not, a threat. In an embodiment, information concerning subject 308 may be displayed to user; such information may include without limitation an identification of subject 308 generated using facial recognition as described above, an automatically generated threat-level determination as described in further detail below, one or more images and/or video feeds of subject 308 as captured using imaging device 104, or the like. Manual threat determination may include responding to an automatically determined behavior descriptor in the affirmative, or disagreement therewith. Threat determination may be hardwired or immediately tied to a threat response; for instance, user may make a mode select on an embodiment of apparatus 100 that is in the form of a handheld weapon and/or object that determines a response when they pull a trigger or otherwise deploy responses.

With continued reference to FIG. 1, behavior descriptor determination may be performed automatically. Determination may be performed by reference to an authorization database 144. Authorization database 144 may be implemented, without limitation, as a relational authorization database 144, a key-value retrieval authorization database 144 such as a NOSQL authorization database 144, or any other format or structure for use as an authorization database 144 that a person skilled in the art would recognize as suitable upon review of the entirety of this disclosure. Authorization database 144 may alternatively or additionally be implemented using a distributed data storage protocol and/or data structure, such as a distributed hash table or the like. Authorization database 144 may include a plurality of data entries and/or records as described above. Data entries in an authorization database 144 may be flagged with or linked to one or more additional elements of information, which may be reflected in data entry cells and/or in linked tables such as tables related by one or more indices in a relational authorization database 144. Persons skilled in the art, upon reviewing the entirety of this disclosure, will be aware of various ways in which data entries in an authorization database 144 may store, retrieve, organize, and/or reflect data and/or records as used herein, as well as categories and/or populations of data consistently with this disclosure. Authorization database 144 may include one or more entries tied to identification of subjects 308, for instance as shown in Table 1 below. One or more entries may, for instance, include data entered in fields for a name, position within an organization, threat categorization, authorization level, or the like; additional entries and/or tables may indicate precisely which actions a subject 308 is permitted to engage in, times of day at which a subject 308 is permitted to be in subject area and/or to engage in a given activity, whether subject 308 is "blacklisted" and/or treated as a threat per se based solely on the subject 308's identity, whether the subject 308 is in a "friend file" or listing of persons for whom no security response is warranted, or the like. For instance, and without limitation, where apparatus 100 is a home security system, residents of the home and/or persons added to a friend file thereby may never be treated as having any behavior descriptor, and thus apparatus 100 may take no deterrent action against such persons. As a further non-limiting example, an employee currently on a shift at subject area may be authorized to be there and receive no deterrent response. On the other hand, an employee who is in subject area outside of a shift, or who is not authorized to be specifically in subject area, albeit authorized to perform other actions or be in other areas within a building that contains subject area, for example may be treated as a potential threat and may not be treated as exempt from deterrent responses, depending upon other threat determinations as set forth in greater detail below.

TABLE 1

| Identifier | Name | Blacklist | Friend File | Shift | Security Level |
|---|---|---|---|---|---|
| 4239945 | Gerald Smith | N | Y | — | 5 |
| 9850059 | Jane Doe | Y | N | — | — |
| 8709855 | Ann Salk | N | N | Morning | 3 |

Alternatively or additionally, apparatus 100, processor 136, and or remote device 140 may perform behavior descriptor determination by reference to a decision tree 148 which evaluates behavior descriptors based upon inputs from imaging device 104 and/or other sensors by subjecting such behavior descriptors to a hierarchical set of evaluations represented as decision nodes to determine at leaf nodes whether a given behavior descriptor applies to subject 308.

Figure 8:
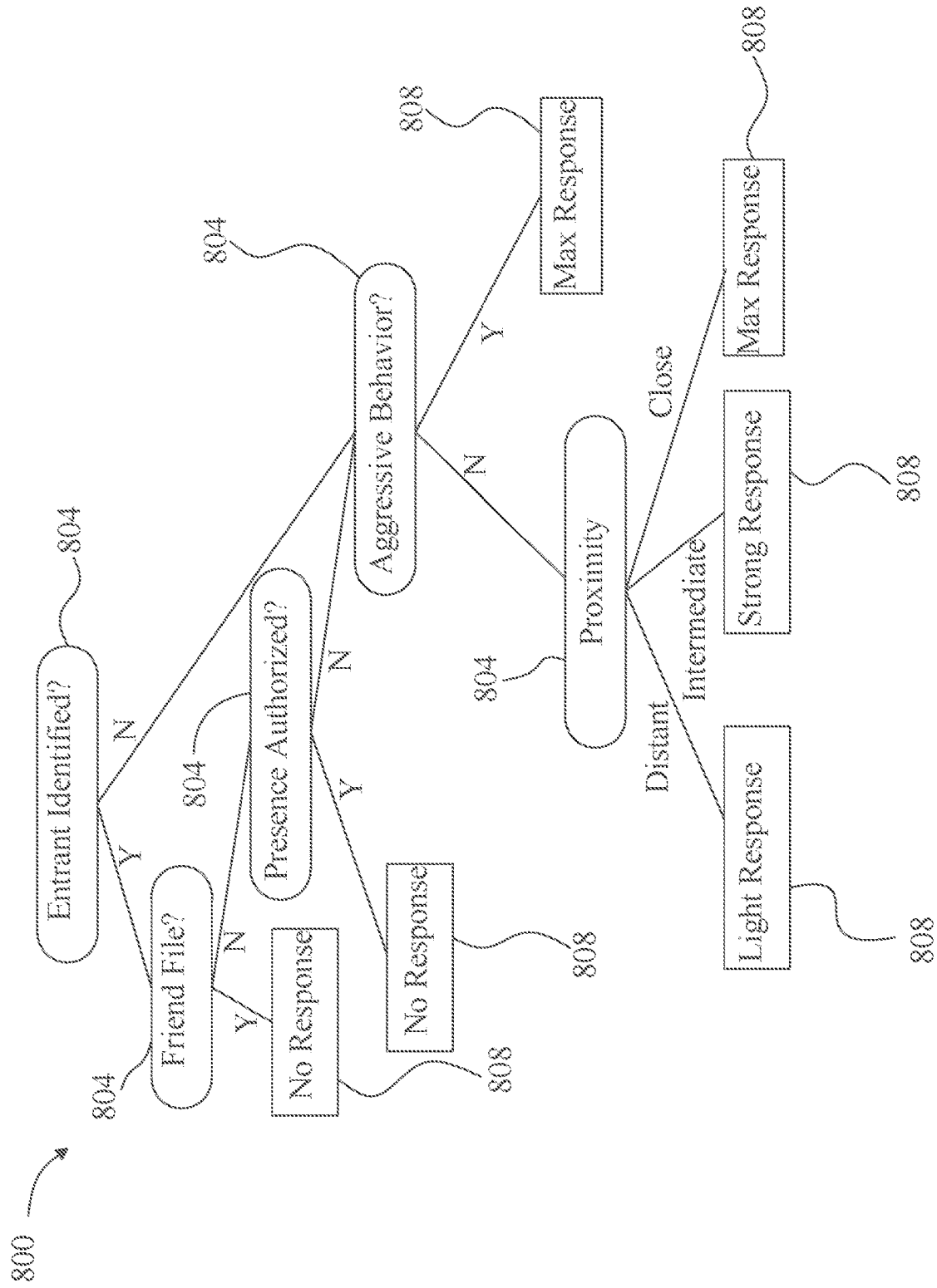
FIG. 8 is a block diagram of an embodiment of a decision tree.

Referring now to FIG. 8, an exemplary embodiment 800 of decision tree 148 for threat determination is illustrated. Decision tree 148 may include a plurality of internal nodes 804 that evaluate one or more tests to determine behavior descriptor. Decision tree 148 may include a plurality of leaf nodes 808 corresponding to behavior descriptor determinations and/or determinations of responses to perform based on behavior descriptors. Processor 136 may traverse decision tree 148 once and/or iteratively, with each iteration potentially arriving at different behavior descriptors depending on additional data collected, outcomes and/or determinations of each previous iteration, or the like. For instance, and without limitation, if a first iteration of decision tree 148 indicated a first behavior descriptor, a second iteration with no change in data from sensors and/or imaging device 104 a certain period of time later may cause an increase in behavior descriptor. As a further example, if an initial iteration determines a first behavior descriptor sufficient to warrant a first response, and a second iteration occurs after the first response, the second iteration may escalate the behavior descriptor if the first response produced no change in data concerning subject. Alternatively, subject may not be recognized on a first iteration, but a second iteration may identify subject, which may reduce behavior descriptor for a friend-listed subject and/or a subject authorized to be present, while behavior descriptor may be increased for a blacklisted subject. Each iteration may further evaluate position, proximity to item to be protected and/or apparatus 100, whether subject is armed, or the like.

With further reference to FIG. 8, apparatus may identify and/or track subject by detecting and/or interacting with an electronic device, characteristic, object or other defining characteristic of and/or on the person of subject. For instance, and without limitation, may send a signal to a subject's phone leaving a breadcrumb or other tracking datum suitable for later identification thereof. Identification of the subject device may alternatively or additionally include fingerprinting a subject device; this may be performed as a function of at least a field parameter of at least a communication received therefrom. At least a field parameter may be any characteristic and/or specific value set by a subject device and/or user thereof for any exchanged data or phenomena according to protocols for electronic communication or intrinsic characteristics or capabilities of the subject and/or device. As a non-limiting example, the International Mobile Equipment Identity (IEMI) number may be detected to identify a phone a person is in possession of to recognize the person or data communications and data fields passed with a network using HTTP from the phone may be used to identify or fingerprint the phone. Additional fields that may be used may include browser settings such as "user-agent" header of browser, "accept-language" header, "session_age" representing a number of seconds from time of creation of session to time of a current transaction or communication, "session_id," 'transaction_id," and the like. Determining the identity of a subject device may include fingerprinting a subject device as a function of at least a machine operation parameter described in at least a communication. At least a machine operation parameter, as used herein, may include a parameter describing one or more metrics or parameters of performance for a computing device and/or incorporated or attached components; at least a machine operation parameter may include, without limitation, clock speed, monitor refresh rate, hardware or software versions of, for instance, components of a subject device, a browser running on a subject device, or the like, or any other parameters of machine control or action available in at least a communication. In an embodiment, a plurality of such values may be assembled to identify a subject device and distinguish it from other devices of one or more remote devices.

Apparatus may alternatively or additionally perform communication with subject via subject device, both when subject is in subject area and thereafter. For instance, apparatus may call or message subject via subject device to provide warnings or instructions thereto, and/or to follow up with communications, warnings, summonses, or the like regarding a past encounter.

Still referring to FIG. 8, decision tree 148 evaluations of behavior descriptor may depend on whether subject is in friend file; a level corresponding to no threat and/or no response warranted may correspond to an identification of subject in friend file. Processor 136 may determine an authorization level of subject 308 as a function of a personal identity of subject, such as without limitation an authorization level of a subject who is an employee permitted to be in subject area for certain periods of time, or the like. Decision tree 148 evaluations of behavior descriptor may depend on a distance to subject; for instance, where subject is far from item to be protected and/or apparatus 100, a behavior descriptor may be moderate, warranting a warning or the like; where subject is at an intermediate distance, behavior descriptor may be raised to medium indicating a need for a slightly elevated response as described in further detail below, and where subject is close to apparatus 100 and/or item to protect, behavior descriptor may be raised to a higher level corresponding to a more aggressive response. As a further non-limiting example, processor 136 may be configured to detect a behavior of the subject 308 and determine a behavior descriptor as function of behavior, where aggressive behavior may correspond to a high behavior descriptor while less aggressive behavior may correspond to a lower behavior descriptor; degree of aggression of behavior may depend, without limitation, on a determination by a behavior classifier 448 as described above.

With continued reference to FIG. 8, processor 136 may be configured to identify an object in possession of the subject 308 and determine the behavior descriptor as a function of the object; identification of object may be performed without limitation using tool classifier 440. For instance, and without limitation, an object in control of subject that is classified as a weapon and/or tool used in breaking and entry, vandalism, or the like may map to a high behavior descriptor, an object that could be used for innocuous or malicious actions may map to a medium or intermediate behavior descriptor, and an innocuous object such as a sandwich, coffee cup, or the like may not increase behavior descriptor at all. Behavior descriptor determination may further depend on a time of day; for instance, all behavior descriptor determinations may be increased by one or more levels or quantities at night, during a time when subject area is closed to the public, or the like. Behavior descriptor determination may also depend on an alert status, which may be set, without limitation, by a user input or a transmission from a remote device 140; for instance, where nearby civil unrest, a crime wave, a disaster, or the like has caused an elevated risk of malicious or otherwise damaging activity, alert level may be raised, which may cause behavior descriptors determined as described herein to be greater than they otherwise would be.

Still referring to FIG. 8, behavior descriptor determinations may be based upon any combination of elements described in this disclosure. For instance, an object on and/or held by subject may have a higher behavior descriptor when coupled with an aggressive behavior and/or a previous disregard for a warning and/or deterrent action. As a further example, a time of day corresponding to nighttime and/or a time at which the public are not expected in subject area may increase a behavior descriptor associated with a tool that could have either innocuous or malicious purposes, such as a tool suitable for aiding in vandalism or theft, which may get a higher behavior descriptor if used after dark.

With continued reference to FIG. 8, alternative or additional objects and or processes may be used in place of, or in combination with, a decision tree 148. For example and without limitation, a supervised machine learning model representing a linear equation or other mathematical relationship combining various parameters which may be received from imaging device 104, and or other sensor inputs, and or which may be developed using processes disclosed in this disclosure, may be used to calculate behavior descriptors. A supervised machine learning model of this kind may be developed using training data that associates behavior descriptors with different sets of parameters, for instance as input by users, and or as developed in previous iterations of methods as described in this disclosure. Supervised machine learning model may be generated using any supervised machine-learning process as described above. As a non-limiting example, machine-learning models may be used to generate nodes of decision tree.

Still referring to FIG. 8, behavior descriptors may be associated with actions or states of entrance other than Those associated with malicious behavior, such as accidental trespass, and our entry into a location while suffering from an infectious disease, such as a disease that is currently part of an outbreak. For instance, behavior descriptor may be determined based upon body temperature, as computed according to processes described in this disclosure.

With further reference to FIG. 8, behavior descriptor determination may be performed recursively and or iteratively. For instance, and without limitation, processor 136 may be configured to perform decision tree 148 processes and or other processes for threat determination repeatedly in response to new parameters and or data being received from imaging device 104 and or sensors, in response to passage of time, as a regular polled process, and/or in response to deterrent actions and or responses thereto by subject. Persons skills in the art, upon reviewing the entirety of this disclosure, will be aware of various alternative and or additional ways in which threat determinations may be performed once iteratively recursively or like, as consistent with this disclosure. Each such variation is within the scope of this disclosure.

Referring again to FIG. 1, apparatus 100 includes a deterrent component 152 communicatively connected to processor 136. A "deterrent component," as used in this disclosure, is a component and/or device configured to generate a non-lethal deterrent at subject 308. A deterrent may include any physical or psychological interaction with subject 308 that discourages and/or stops subject 308 from performing a behavior contrary to objectives of apparatus 100.

With further reference to FIG. 1, in an embodiment, and without limitation, deterrent component 152 may include one or more non-lethal deterrents for vermin and/or species external to *Homo sapiens*. Deterrent component may include a directed light deterrent 156. A "directed light deterrent," as used in this disclosure, is a deterrent that uses a high-intensity light source, such as, but not limited to, a laser, super LED, laser illuminated LED, super-luminescent LED, EELD, VCSEL, plasma discharge lamp, and/or high-intensity LED that is actively aimed at and/or focused on subject 308, to generate a deterrent effect. In an embodiment, deterrents such as without limitation directed light deterrent may be used to blind or otherwise attack snakes. This may include permanent damage for non-human animals. Where retroreflection, as defined and described in further detail below, indicates a signature of a species to be exterminated, such as invasive species in the wildlife, deterrents and/or lethal devices may be used to blind or otherwise damage them. In an embodiment, apparatus may use a classifier to identify species of animal; for instance, any classifier as described in this disclosure may be trained using training examples correlating user-entered identifications of animals with images thereof, which may be used to identify image data of animals and/or classify such images to particular animal species.

Figure 9:
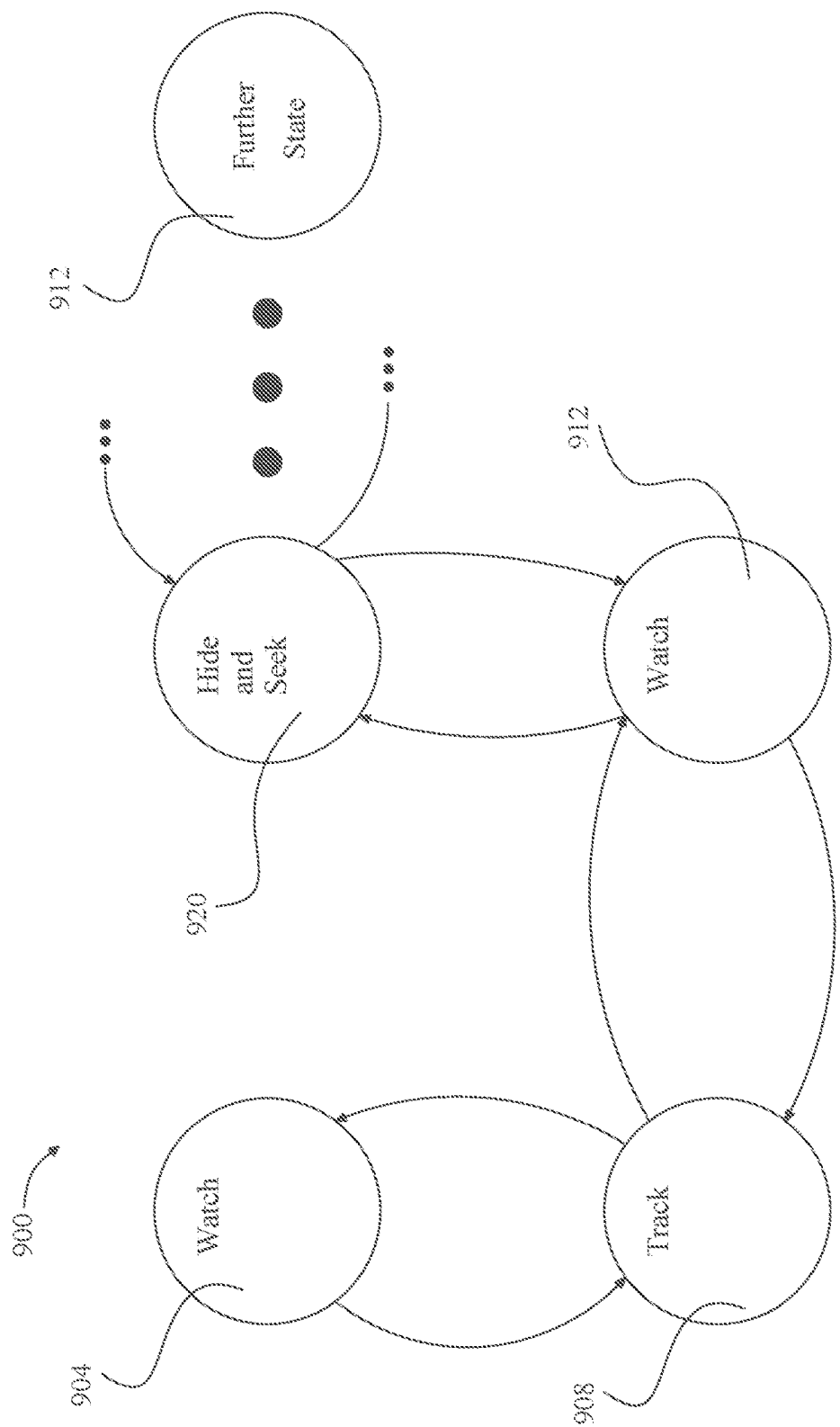
FIG. 9 is a schematic diagram of an exemplary embodiment of a finite state machine.

Referring now to FIG. 9, an exemplary embodiment of a finite state machine (FSM) 900 that may execute on apparatus and be used to determine a deterrent action to be performed by apparatus 100 is illustrated. In some embodiments, an initial watch state 904 may function as a default state of FSM 900. Watch state may include a state in which apparatus 100 uses sensors to check whether a subject has entered subject area. During watch state, apparatus 100 may scan a subject area with light radar devices, listen on and/or poll sensors as described above, or the like. Upon detection of a subject in subject area, FSM 900 may proceed to a track state 908, in which the apparatus monitors movements of the subject, for instance and without limitation to determine whether the subject is in an unauthorized location, is behaving in one or more undesirable ways as described in data store in apparatus, or the like. In track state 908, apparatus 100 may additionally determine whether subject is on a "friend list" or otherwise is permitted to be in subject area and/or to perform one or more actions that may not be permitted to persons not authorized, whether subject is blacklisted due to previous activities and/or encounters, whether subject has been previously monitored and/or interacted with at another apparatus, sensor, or other device connected to apparatus 100 via a communication network, or the like. If any trigger action takes place, FSM may move to an escalated state from track state 908; which escalated state follows may depend on trigger actions detected. Escalated states may include a warning state 912, in which, for instance, a directed light deterrent may be deployed on a chest of subject, a warning message may issue, or the like.

An additional escalated state may include an interdiction state 916, in which one or more deterrent outputs are generated; in an embodiment, outputs in interdiction state may depend on any determination regarding threat levels, types of behavior, data concerning likely efficacy of any given deterrent and/or deterrent mix, or the like. Triggers, threat levels, types of behavior, data concerning likely efficacy of any given deterrent and/or deterrent mix, or the like may cause different outputs at a given state and/or transfer to another state associated with a different output. Escalated states may include a hide and seek state 920, in which hide and seek procedures using directed light deterrent, as described in this disclosure, may be employed. De-escalation triggers may cause return to track state, warning state, and/or watch state.

With continued reference to FIG. 9, apparatus may be paired and/or combined with one or more elements of signage and/or warning systems and/or labels to inform subject that an area is secured. Apparatus may output a plurality of warnings, which may escalate in tone, intensity, vocabulary, or the like, to ensure that subject is given sufficient notice of possible trespass and/or interdiction prior to use of deterrents. Warnings by apparatus may be calibrated to sufficiently identify and/or put subject on notice of deterrents to comport with local regulation concerning notice prior to use of force.

Still referring to FIG. 9, in an embodiment, one or more escalation triggers that may cause a modification of states and/or outputs to generate a more aggressive deterrent may include a reduction in distance from apparatus 100 and/or an object, person, and/or area to be guarded, an amount of time spent in an unauthorized area, a speed, velocity, acceleration, and/or direction of movement of subject, time spent at a given speed, and/or any threat level and/or behavioral determination as described in this disclosure. De-escalation triggers may include, without limitation, modifications to less threatening behavior, reduction in determined threat level, compliance with instructions issued from apparatus 100, departure from subject area and/or an unauthorized area, reduction in speed, velocity, acceleration, and any other action that would occur to any person skilled in the art upon reviewing the entirety of this disclosure.

Figure 10:
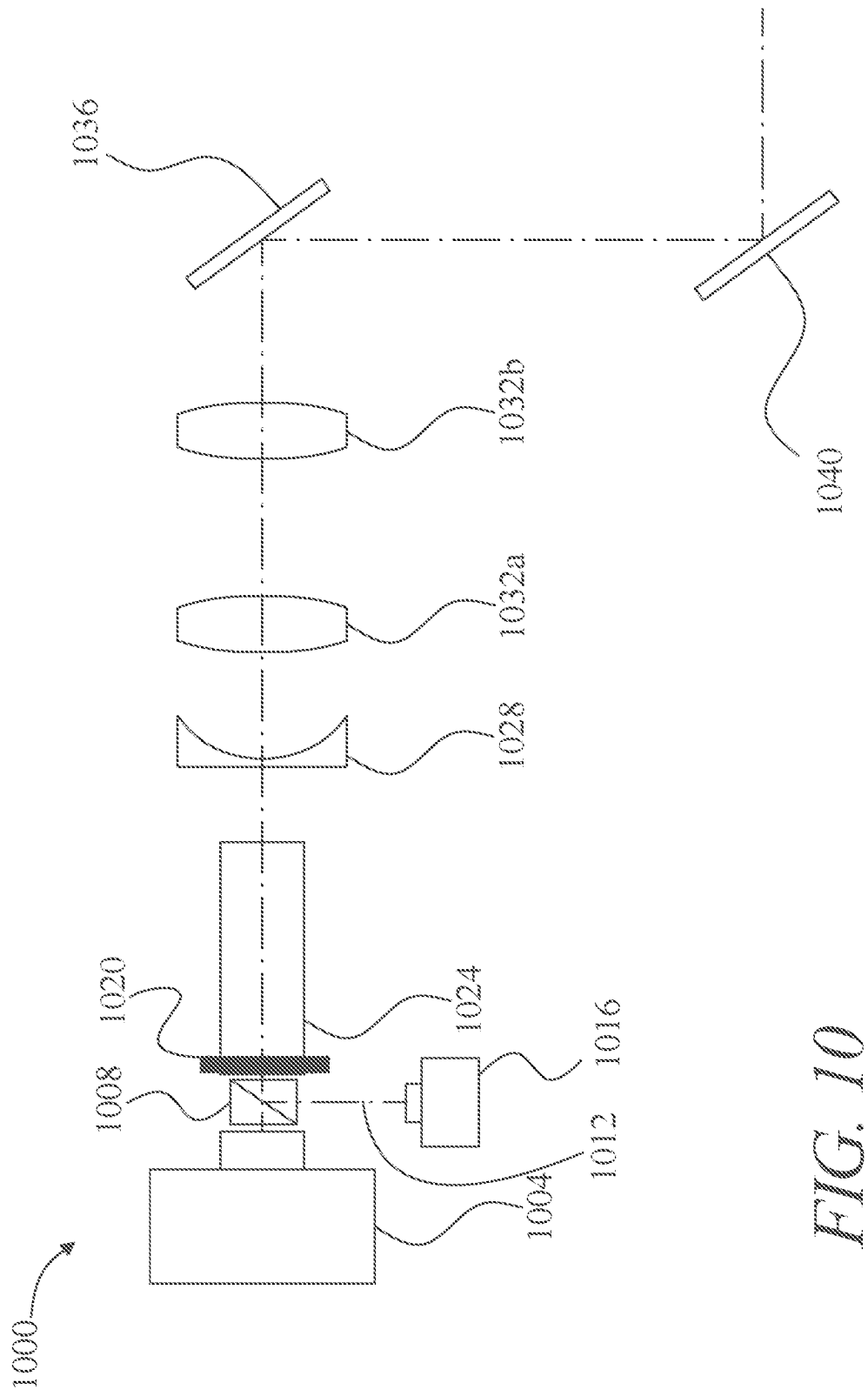
FIG. 10 is a schematic diagram of an embodiment of a directed light deterrent.

Referring now to FIG. 10, an exemplary embodiment 1000 of a directed light deterrent 156 is illustrated. Directed light deterrent 156 may include a light source 1004. Light source may include, without limitation, one or more elements of a laser, such as an electrical or optical pumping source, an amplifier, and or one or more beam shapers, homogenizers, directors, filters, focus elements, expanders or the like. Light source may alternatively or additionally include a super LED, laser illuminated LED, super-luminescent LED, EELD, VCSEL, plasma discharge lamp, and/or high intensity LED, which may be used directly, and or as an optical pumping source. Directed light deterrent 156 may include a photodiode 1016 either integral to the light source 1004, or external to the light source 1004 with the use of a beam splitter 1008 or similar optical device that directs a fraction of the outputted light energy as a sample beam 1012 to the photodiode 1016 or similar sensing device for determination of laser safety, efficiency, power use, and/or other critical parameters of the light source. Directed light deterrent 156 may include an optional shutter 1020 or similar device that interrupts the outputted light source separate from the direct power controls of the light source 1004. This shutter 1020 may provide enhanced safety characteristics for the device as a backup and/or failsafe deterrent interruption based on operating parameters of the apparatus 100. Directed light deterrent 156 may include a beam expander 1024. Beam expander may convert a laser beam or other light sources used in this disclosure of having a first width to an output beam having a second width. The beam expander may be a set power or be variable in nature being controlled electronically or mechanically to vary the expansion or focusing effect of the light beam. Directed light deterrent 156 may include a free beam spreader 1028. A beam spreader 1028 may cause the beam to diverge to a greater extent than if it were not passed there are beings better period beams better may include, without limitation, a lens which is concave with respect to the outward transmission of light. Alternatively or additionally, beam spreader may include any refractive, diffractive, and or reflective element which has the effect of causing greater diversions of a beam. Directed light source may include one or more focusing optics 1032a-b one or more focusing optics 1032a-b may include two or more refractive elements having inability to change a focal point of a beam passing through two or more refractive elements that may be separated by a distance, which may be variable. For instance, two or more optical elements may be separated by a servo controlled, liquid/polymer variable optic, voice coil motors/actuators and lens, piezo motors and lens, and/or MEMS controlled adjustable distance, which an electronic device, such as processor 136, and or driving electronics as described in further detail below modify a focal point of an outgoing beam. Directed light deterrent may be configured, without limitation, to modify an energy density of light output from directed light deterrent based on distance to a target; distance may be determined, without limitation, using ToF calculations, parallax, measurement and/or comparison of relative apparent size of subject, or the like. Energy density may be modified, without limitation, to ensure equivalent momentary and/or total energy delivery at all distances. Energy density may be modified using beam expanders that are configured to change a beam width rapidly. Calibration of directed light deterrent aiming may be done with each level of beam expander to correct for distortion, differences in direction of beam, or the like that may occur at different degrees of beam expansion by measuring beam direction using, e.g., cameras at different beam expansion levels and determining corrective biases and/or factors for aiming coordinates from divergences from intended coordinates that are observed.

Audio system may be used to determine safe audio levels at different distances in a given space. When apparatus 100 starts to broadcast audio, sound picked up by microphones can be compared to distances and/or dimensions as measured for instance using time of flight calculations; this may then be used to determine whether sound delivery is at or above 140 dB or another set limit for the target zone.

Still referring to FIG. 10, directed light deterrent 156 may include a beam steering component, which may consist of, but not limited to, two or more reflective elements used as scanning mirrors, spatial light modulators, metamaterials/metasurfaces, liquid crystal directors, Risley prisms, microoptical arrays, fast steering mirrors, tip/tilt optics, holographic phase modulators, and/or off-centered lens elements. In one embodiment, reflective elements, which may include any reflective elements for use in scanning mirrors as described above in reference to light radar component 116, may be arranged in close proximity to one another on axes that are substantially orthogonal causing one mirror to act as a vertical scanning mirror 1036 and another mirror to act as a horizontal scanning mirror 1040. Such an arrangement may enable rapid scanning of laser and or other light beams across objects in subject area. Directed light deterrent 156 may include any additional optics suitable for use in optical instruments such as lasers or other high intensity light sources, including additional amplifiers, beam expanders, or the like. In an embodiment, a beam may be collimated, or may not be collimated at one or more different stages in its processing by optical instruments within directed light deterrent 156. Light from directed light deterrent may be coherent or may not be coherent, depending on desired applications. In some embodiments, optical elements through which a beam may pass in directed light deterrent 156 may have an effect of dissipating, polarizing, wavelength shifting, filtering, modifying, homogenizing, interrupting, or spreading power of the beam. As a result, a beam incident on objects in subject area 300, including without limitation a face or eyes of a subject, may have substantially lower intensity than at initial production of the beam.

Still referring to FIG. 10, directed light deterrent 156 includes a plurality of deterrent modes, each deterrent mode corresponding to a distinct deterrent action. For instance, directed light deterrent 156 may include a first deterrent mode and a second deterrent mode, and may be configured to perform a first deterrent action on the subject 308 when in the first mode and a second deterrent action on the subject 308 when in the second mode, where the first deterrent action is distinct from the second deterrent action. Deterrent actions that may be performed in corresponding deterrent modes may include a "startle" action or rapid flash across the eyes of subject 308, which may surprise and/or warn subject 308 of presence of deterrent action. In an embodiment, different wavelengths, pulse patterns, intensities, phases, polarizations, or combinations thereof may cause different degrees of discomfort and/or emotional distress in subjects 308; for instance and without limitation, a blue wavelength may be more distressing when combined with a green wavelength and alternatively pulsed at varying rates than a single red and/or green wavelength, while persons may have a maximal sensitivity to intensity levels in a green wavelength. Additionally or alternatively, deterrent mode may include a "hide and seek mode", wherein a "hide and seek mode," as used herein, is a mode that initiates directed light deterrent 156 to pulse a light or other countermeasure as a function of detecting a specific landmark, characteristic, phenomenon and/or behavior. For example, and without limitation, hide and seek mode may denote that a subject hiding behind a post should be coerced and/or coaxed away from behind the post prior emitting the pulsed wavelength of light to ensure maximal effectiveness. As a further non-limiting example, hide and seek mode may include coaxing and/or coercing a subject to turn their head to reveal and/or expose their eyes, wherein directed light deterrent 156 may emit a light targeted at subject's 308 eye. In an embodiment, "hide and seek" mode and other techniques may be used to frighten, startle, scare, or otherwise induce anxiety in a subject; this may make them more susceptible to deterrence using deterrent devices. Further psychological tools, such as training a red dot on somebody's clothes to make them believe they are being targeted, may also be employed. In some embodiments, and without limitation, hide and seek mode may be combined with audio outputs such as text to speech and/or other modes, to create the impression, for a subject, that the subject is interacting with a person rather than a machine; audio outputs may include instructions reacting to user behaviors, for instance and without limitation as determined by behavior classifier, enabling apparatus 100 to react to evasive maneuvers by subject with comments concerning such maneuvers, or the like. Hide and seek mode may also be useful for determining when a user is not able to be targeted in general and/or specifically at the eyes by a light deterrent and/or directed light deterrent, such that, when a light deterrent is fired, exposure counts and/or aggregations used to calculate Maximum Permissible Exposure (MPE), for instance as defined in international laser safety standards, or the like may not add to the subject's accumulated dosage for a set time period.

Continuing to refer to FIG. 10, deterrent actions may include a "glare" action whereby light source may illuminate retina of subject 308 for a longer period of time, either in a single apparently constant scanning operation or in a series of distinct pulses, intensities, patterns, or other variations than in the startle action, but may not generate an afterimage or cause short-term impairment of vision after exposure; glare action may interfere with vision during glare action, which may cause a temporary cessation of activity by subject 308, cause subject 308 to cover eyes, and/or create a sensation of discomfort in subject 308 tending to discourage subject 308 from further activity.

In an embodiment, and still referring to FIG. 10, glare may be caused by an excess of total irradiation and/or by excessive luminance range. "Disability glare" as defined herein causes reduction in visibility, at least in part due to "veiling glare" characterized by an inability to distinguish contrast in a field of vision, relative to usual ability, as a result of the glare light source. "Discomfort glare," as used in this disclosure, causes an annoying and/or painful sensation. Reduction in visibility may be attributable to light scatter in the eye. A magnitude of disability glare may be estimated according to veiling luminance $L_v$ according to the following equation:

$$L_v = 9.2 \sum_{i=1}^{n} \frac{E_i}{\theta_i(\theta_i + 1.5)}$$

where $E_i$ is illuminance from an $i^{th}$ glare source and $\theta_i$ is an angle between a target to be tracked by the person experiencing the glare and the $i^{th}$ glare source. Disability glare may be proportional to a "luminance contrast" C between target luminance $L_t$ and background luminance $L_b$, as expressed by the following equation:

$$C = \left(\frac{L_t - L_b}{L_b}\right)$$

C may be further characterized in terms of $L_v$ by:

$$C = \left(\frac{L_t - L_b}{L_b + L_v}\right)$$

Discomfort glare for a given light source having illuminance E and angle of incidence to a target θ may be quantified by:

$$W = 5 - 2\log\left(\frac{E}{0.02(1 + \sqrt{L/0.04})\theta^{0.46}}\right)$$

or a similar equation. In an embodiment, readaptation to lower light levels after glare exposure may take time, and visual performance may be reduced during a readaptation period. Glare may generally be a function of parameters which may include, without limitation, illuminance at an eye, an angle from the eye of a glare source, luminance and/or size of the glare source, spectral power distribution of the light, and/or duration of an experience of illumination. Environmental parameters that may affect visual performance in presence of glare may include environmental conditions such as ambient conditions and/or complexity/difficulty of a location, as well as parameters pertaining to subject such as age and/or visual health. Glare may have a greater disabling effect for detection of harder to see targets. As a result, in an embodiment, an object to be protected using embodiments of system 100 may be darkened, disguised, and/or camouflaged where glare from light deterrents is employed as a deterrent mechanism.

With continued reference to FIG. 10, parameters affecting visual performance after exposure to a light source may include illuminance at the eye, duration of exposure, total irradiance or "dose" experienced during exposure, ambient light levels, age, and visual health. Increased illuminance, veiling luminance, duration, and/or irradiance at the eye may increase recovery time, thus increasing the period of impairment, while youth, higher ambient light, and/or visual health may decrease recovery time. Similar parameters may also affect discomfort from glare, as well as experience dealing with glare and/or light deterrents, which may heighten coping mechanisms and/or resistance to discomfort.

In some embodiments, and still referring to FIG. 10, apparatus may make use of one or more methods to determine when a subject is looking directly at a directed light deterrent, or in other words when directed light deterrent is able to strike the subject on a fovea of one or more eyes. Such targeting methods may be selected to limit data needed to process large resolutions that are needed to cover the targeting processes, e.g. by using a computationally less intensive process and/or a process that requires less resolution; moreover, if eye location can be determined precisely, it may be possible subsequently to restrict targeting and tracking to a subject's face and/or eye box. Targeting and tracking processes may be configured to ensure having a high enough angular resolution of imaging devices to meet minimum range requirements so as to have enough "pixels on target" at a given range. Sensors may be used singly or in combination, along with artificial intelligence, machine vision, machine learning, image processing, or the like as described in further detail herein to first find a subject, then analyze the facial area specifically for tracking and/or targeting purposes.

Still referring to FIG. 10, eye detection algorithms may include methods that involve retro reflection, which may use ambient and/or illumination light as described in this disclosure to purposely cause a retro reflection from a person's retina or other structure regarding their eyes, including contacts, glasses, eye lids, sclera, fundus, or the like. In an embodiment, if an illuminated spot on the retina acts as a secondary source of light, light that is scattered from that spot and returns back through the front of the eye may exit in the same direction it entered, headed back toward a light source, which may include a distant light source. In many nocturnal vertebrates, the retina has a special reflective layer called the tapetum lucidum that acts almost like a mirror at the backs of their eyes. This surface reflects light outward and thereby allows a second chance for its absorption by visual pigments at very low light intensities. Tapeta lucida produce the familiar eye shine of nocturnal animals; this effect may enhance detection of a non-human subject and/or eyes thereof. Humans do not have this tapetum lucidum layer in their retinas. However, a sufficiently bright light such as a flash or other intense, albeit potentially brief, illumination may cause a reflection off of a human retina, colored red by blood vessels nourishing the eye.

In an embodiment, and still referring to FIG. 10, apparatus may use any wavelength described in this disclosure, including without limitation 850 nm light, to cause a retro reflection. A resulting image may then be processed for a "cateye" effect. Improvements for a signal to noise of apparatus to use in sunlight, around artificial light, or the like may include, without limitation, using light sources with very tight emission wavelengths, for instance and without limitation as described elsewhere in this disclosure, in addition to matching optical filters on the cameras to eliminate other light sources or significantly minimize them, "photonic starvation" and/or other methods to manipulate the signal to maximize it against the scene's background. Apparatus may alternatively or additionally use polarization or other optical filters to take advantage of polarization of light retro reflected off the retina, for instance by selectively detecting and/or analyzing circularly or other polarized light from eyes of subject, which may attenuate light reflected by subject's face, clothes, and the like while letting the polarized light from the retro pass, greatly improving signal to noise ratio. As a non-limiting example, A focusing eye may act as a high-performance retroreflector, potentially appearing millions of times brighter when illuminated from a distance than would a matte white surface of the same area. As another non-limiting example, ocular retroreflection may produce circularly polarized light, circular polarizing filters on the sensors may be used to further enhanced the signal to noise ratio of the image.

Still referring to FIG. 10, retroreflection may be performed using any illumination and/or interdiction source described in this disclosure. In some embodiments, a maximum of 880 or 900 nm may be used as an upper wavelength in retro reflection. Apparatus may perform retroreflection detection using two different wavelengths such as without limitation 850 nm and 940 nm which may light skin similarly, but produce a different retro reflection phenomenon. These differing images may be combined such that the retro reflection is isolated versus the illuminated surfaces. The apparatus may use VCSELs, and/or other lasers or other light sources for illumination, which may be covert to humans, animals, and/or specific imagers and/or sensors. In an embodiment, apparatus may employ an "illumination" system for scanning, measuring, and/or observing subject area and/or subject, and a separate "interdiction" system for use as a light deterrent.

Further referring to FIG. 10, one or more eye movement and/or detection methods may alternatively or additionally be employed. Methods may include corneal reflection detection, which may utilize a reflection of a beam of light from various surfaces of an eye the beam crosses. the brightest reflection being at the outer corneal surface, known as a first Purkinje image with second, third and fourth Purkinje images being dimmer and corresponding respectively to the inner surface of the cornea and the outer and the inner surfaces of the lens. A reflection from an outer surface of the cornea and an inner surface of the lens are the two that are utilized.

Another technique employed, and still referring to FIG. 10 may include limbus tracking which detects a sharp boundary between the dark eyes and the white sclera (the limbus) which can be easily detected optically as to an identifiable edge, using any suitable edge detection process such as without limitation canny edge detection. Another technique may include measurement of ellipticity of a pupil which may vary from circular, as it is viewed head on, to elliptical as it rotates away from an axis upon which it is viewed. An additional technique may include a movement measurement based on a head and/or eyes being moved together or singularly, using anatomical landmarks, image classification, or the like. An additional technique may include use of and/or emulation of an oculometer, which may determine a center of the pupil and a corneal highlight from a reflected light and the change in a distance and direction between the two as an eye is rotated.

In an embodiment, and still referring to FIG. 10, an eye image may be produced by illumination of a face with light from a light source, which may include any light source described herein including without limitation a near infrared light emitting diode source positioned out of focus at a center of a camera lens. Eye image may be captured and/or added to a video frame image all or part of a face, and may include white and iris portions (dark), the back reflected infrared light out of the pupil (bright eye effect) and the corneal reflection of the source (glint). Eye gaze may be computed at relative x,y coordinates of the glint and a center of the pupil determined from an eye image using pattern recognition software. Determination of the thresholds between a pupil and surrounding eye portions and between a high intensity glint and surrounding eye portions may be performed using a histogram analysis of pixel intensities near the pupil and glint. An eye image region may be identified within an overall frame image by a search for a maximum pixel intensity due to a corneal glint.

Still referring to FIG. 10, a source of illumination employed for eye and/or gaze detection may include, without limitation, an infrared light emitting gallium arsenide diode or the like, which may emit light in an infrared region at 880 nm, 900 nm, 905 nm, or the like. Light used may be invisible and of a sufficiently low intensity that it is perfectly safe for continued use. A near infrared wavelength of 880 nanometers may accomplish the invisibility and safety parameters. Any exposure to electro-magnetic or other radiation will be applied to the subject's maximum permissible exposure when safety aspects are calculated by the system.

In an embodiment, and with further reference to FIG. 10, a frame that is grabbed may be plotted as to an intensity of each individual pixel into a pixel intensity histogram. Histogram may include one or more points of higher intensity representing a high intensity glint and/or retinal retroreflection, which may be used to determine a direction of gaze. A histogram may alternatively or additionally be input to a machine-learning algorithm trained using training data correlating histograms to gaze directions; in this way, histogram data corresponding to more distant faces may be used to estimate and/or determine a gaze direction.

Still referring to FIG. 10, Purkinje Image-based glint detection may alternatively or additionally used to detect eyeglasses, safety goggles, or other surfaces generating specular reflections.

Alternatively or additionally, and with continued reference to FIG. 10, detection may be model based, for instance and without limitation using a shape of a cornea, sclera, or the like to determine a direction of gaze; models may include models trained using machine learning algorithms as described in this disclosure, and/or models based on one or more predictions of light intensity and/or shapes detected using computer vision. In an embodiment, an eye of a subject may have one or more curvatures that may be used for determining a model of the eye from remote 3D imaging, such as shape from polarization, LIDAR, synthetic aperture lidar, multiwavelength laser for interferometry, or the like. A laser may use typical time of flight processing to find general range to target, but may use several closely spaced wavelengths in the beam may then be employed, permitting apparatus to use interferometric or other phase processing techniques, use the results for extremely fine localized ranging to within a few microns of structures. This may be used to confirm an object that has the depth of an eyeball on a target for confirmation that it is an eyeball.

Further referring to FIG. 10, different pattern recognition techniques, such as template matching and classification, may be employed to determine eye movement and/or gaze direction. For instance, and without limitation, methods may include use of principal component analysis to find a first six principal components of an eye image to reduce dimensionality problems, which arise when using all image pixels to compare images. A neural network or other machine-learning model may then be used to classify a pupil position. Training data for a neural network and/or other machine-learning model may be gathered during calibration, where for instance a user may be required to observe five points indicating five different pupil positions.

Still referring to FIG. 10, an alternative or additional eye tracking system may use a particle filter which estimates a sequence of hidden parameters depending on data observed. After detecting possible eyes positions, a process of eye tracking may commence. For effective and reliable eye tracking, a gray level histogram may be selected as the characteristics of the particle filter. In an embodiment, low-level features in the image may be used to reduce computational overhead for a fast algorithm. An alternative or additional approach may use a Viola-Jones face detector, which is based on Haar features, to locate a face in an image, after which template matching may be applied to detect eyes. Zernike moments may be used to extract rotation invariant eye characteristics. Support vector machine and/or other machine learning may be used to classify images to eye/non-eye patterns. Exact positions of the left and right eyes may be determined by selecting two positions having highest values among found local maximums in an eye probability map. Detecting an eye region may be helpful as a pre-processing stage before iris/pupil tracking.

In other embodiments, and continuing to refer to FIG. 10, eye gaze direction may be estimated by iris detection using edge detection and Hough circle detection. Eye detection may alternatively or additionally be performed using a sequence of face detection and Gabor, wherein an eye candidate region is determined automatically using the geometric structure of the face; four Gabor filters with different directions $(0, \pi/4, \pi/2, 3\pi/4)$ may applied to an eye candidate region. The pupil of the eye does not have directions and thus, it may be detected by combining the four responses of the four Gabor filters with a logical product.

In other embodiments, and continuing to refer to FIG. 10, eye gaze direction may be estimated by iris detection using edge detection and Hough circle detection. Eye detection may alternatively or additionally be performed using a sequence of face detection and Gabor, wherein an eye candidate region is determined automatically using the geometric structure of the face; four Gabor filters with different directions $(0, \pi/4, \pi/2, 3\pi/4)$ may applied to an eye candidate region. The pupil of the eye does not have directions and thus, it may be detected by combining the four responses of the four Gabor filters with a logical product.

Still referring to FIG. 10, eye movement may be analyzed in terms of saccades, fixations, and blinks. Saccade detection may be used as a basis for fixation detection, eye movement encoding, and the wordbook analysis. In an embodiment, apparatus may first compute a continuous 1D wavelet coefficients at scale 20 using a Haar mother wavelet. For instance, where s is one of these signal components and the mother wavelet, a wavelet coefficient $C_b^a$ of s at scale a and position b may be defined $$C_b^a = \int S(t) \frac{1}{\sqrt{a}} \varphi\left(\frac{t-b}{a}\right) dt$$

where the integral is evaluated over the infrared spectrum in question. By applying an application-specific threshold $th_{sd}$ on the coefficients $C_i(s)=c_i^{20}(s)$ further analysis may create a vector M with elements $M_i$:

$$M_i = \begin{cases} 1, & \forall i: C_i(s) < -th_{sd} \\ -1, & \forall i: C_i(s) > th_{sd} \\ 0, & \forall i: -th_{sd} \leq C_i(s) \leq th_{sd} \end{cases}$$

This step may divide detected motions into saccadic (M=1,−1) and nonsaccadic (fixational) (M=0) segments. Saccadic segments shorter than 20 ms and longer than 200 ms may be removed. These boundaries may approximate typical physiological saccade characteristics. Apparatus may then calculate an amplitude and direction of each detected saccade. A saccade amplitude SA may represent a difference in motion signal amplitude before and after a saccade. A direction of motion may be derived from a sign of corresponding elements in M. Each saccade is encoded into a character representing a combination of amplitude and direction. Humans typically alternate between saccades and fixations. Thus, detection of saccades may be used for detection of fixations. An algorithm may exploit the fact that gaze remains stable during a fixation. This may result in derivation and/or detection of corresponding gaze points. Fixations may be identified by thresholding on a dispersion of these gaze points. For a segment S of length n comprised of a horizontal and a vertical signal component, dispersion may be calculated as Dispersion(S)=max($s_h$)−min($s_h$)+max($s_v$)−min($s_v$)

Initially, all nonsaccadic segments may be assumed to contain a fixation. Apparatus may then drop segments for which the dispersion is above a maximum threshold of 10,000 or if its duration is below a minimum threshold of 200 ms.

Further referring to FIG. 10. for blink detection, an algorithm may use a threshold on wavelet coefficients to detect blinks in a vertical direction. In contrast to a saccade, a blink is characterized by a sequence of two large peaks in a coefficient vector directly following each other: one positive, the other negative. Time between these peaks may be smaller than the minimum time between two successive saccades rapidly performed in opposite direction. This is because, typically, two saccades have at least a short fixation in between them. For this reason, blinks may be detected by applying a maximum threshold on this time difference.

Further referring to FIG. 10, gaze fixation of the subject may be estimated using one or more of measured or inferred measurements of the scene and/or subject. In an embodiment, if resolution is not high enough to directly measure the subject's gaze fixation direction, the apparatus may use the pose of the head and inferred human eye behaviors, such as, human's will usually keep their gaze to within ±20° of their central vision cone, favoring smaller angles, before turning their heads. The apparatus may infer if the subject's head is posed 5° off the direction of the apparatus, that the gaze is most likely within ±15° from this position and decide to engage the subject with optical countermeasures.

In an embodiment, and still referring to FIG. 10, directed light deterrent may produce wavelengths that cause a subject ocular lens to fluoresce, which may cause glare even for directed light deterrent that strikes subject eye off-axis, missing the retina and/or fovea. For instance, wavelengths in the near-UV or short-visible wavelengths may induce a blue-green fluorescence, which may function as a source of intraocular veiling glare. Wavelengths longer than a~365-nm lens absorption peak may induce progressively weaker but also progressively more red-shifted fluorescence emission. A more red-shifted emission may have a higher luminous efficiency and result in an approximately constant luminous efficiency when excited by equal radiant exposures over the wavelength range from 350 to 430 nm. Perceived color of fluoresced light depends on a wavelength of excitation light, with a wavelength range of 390-410 nm associated with a green to yellowish green perceived fluoresced color, while excitation wavelengths in approximate region of 430 nm may produce fluoresced light having blue green to purplish-red perceived colors. Perceived wavelengths may depend, without limitation, on age of a subject. Lens fluorescence may cause glare in eyes of a person even based on incident or off-axis exposure to light, such that light that is not directly entering the fovea and/or pupil may still cause visual deterrent effects. In some embodiments, directed light deterrent may combine colors that cause ocular lens fluorescence with other visible spectrum colors; in an embodiment, colors may be alternated using multiplexing mirror devices as described in further detail below. Wavelength used may be approximately 405 nm, which may be generated using a solid-state laser such as an EELD or a VCSEL.

In an embodiment, and with further reference to FIG. 10, lasers and/or directed light deterrents at different angles to a subject may emit different wavelengths depending on relative angle to eyes, which may be determined using any processes and/or techniques described herein. green, red, blue or other visible wavelengths may be provided by on-axis light sources, while violet may be on the side, off-axis, for instance with 405 nm fluorescing glare. In addition, where directed light deterrents are acting in concert, a subject may be unable to avoid lights by moving his or her head. This can have the effect of simulating presence of a larger force of persons and/or devices, acting as a "force multiplier."

Still referring to FIG. 10, deterrent actions may include an "after-image" action, which may cause some degree of occlusion of vision with an after-image due to greater exposure to light than in "glare" or "startle" actions. After-image may interfere with effective use of vision for some period after after-image action, impairing an ability of subject 308 to continue carrying out an action contrary to security objective. Duration of impairment may depend, without limitation, on a wavelength used by directed light deterrent 156; for instance, a red wavelength may create a more lasting afterimage or other impairment than a blue and/or green wavelength. Accordingly, where apparatus 100 is being used in a mobile setting such as a hand-held and/or drone device, a red wavelength may be used to create longer-lasting impairment to help a user in escaping from and/or subduing subject 308, while if area denial or encouragement of subject 308 to leave is of interest, a blue wavelength may be used for shorter-duration impairment, permitting and/or enabling subject 308 to escape from subject area.

Further referring to FIG. 10, deterrent actions may include, without limitation, a "saturation" action, which may include a sufficient exposure to high-intensity light to saturate an optic nerve of subject 308. Saturation may cause total and/or near total temporary impairment of vision, and/or loss of short-term visual memory, where as before, blue light may create a shorter-acting impairment and red light may create a longer-lasting impairment. Saturation may also cause sensations of pain, headache, and/or nausea, irritation, confusion, occasioning severe discomfort in subject 308, and thus producing a strong deterrent effect. In an embodiment, a glare action may transform an order of magnitude greater power to a retina of subject 308 than a startle action, while a saturation action may deliver an order of magnitude greater power to a retina of subject 308 retina than a glare action.

In an embodiment, and still referring to FIG. 10, deterrent actions may include a "strobe" action, in which light is pulsed against retina of subject 308 at a rate that causes discomfort and/or neurological impairment, such as pre-epileptic effects. For instance, a visible light source may be configured to strobe at a rate between approximately eight Hertz and approximately twenty-five Hertz, such as without limitation 12 Hz. As a further non-limiting example, visible light source may be configured to strobe between two colors of light, one or both of which may excite cones in a retina which are not excited at all and/or substantially by the other wavelength; for instance, a first visible light source may generate a red wavelength followed by a second visible light source generating a blue wavelength—a pure red light may not excite cones sensitive to blue/violet light. In an embodiment, and without limitation, strobing may induce a strobe effect. As used in this disclosure a "strobe effect" is a physiological response that occurs as a result of strobing. For example, and without limitation, strobe effect may result in a physiological effect of differential and/or conflicting signals being transmitted to the rods and/or cones of the retina of an individual. In an embodiment, strobe effect may include one or more effects such as but not limited to Flicker vertigo, nausea, disorientation, seizures such as tonic and/or clonic seizures, "grand mal" seizures, "petit mal" seizures, absences, or the like. In an embodiment, and without limitation, strobing effect may be enhanced and/or mitigated as a function of a wavelength of the visible light source. For example, and without limitation, a red wavelength of the visible light source may result in a greater epileptogenic effect. Strobing may be combined with any actions described above, including without limitation glare, afterimage, and/or saturation actions. Alternatively or additionally, deterrent actions may include one or more random and/or pseudorandom pulse sequence generation processes, such as without limitation pulses of spacing and/or duration as generated using a random number generator and/or pseudorandom number generator; random and/or pseudorandom number generator may be implemented using any suitable hardware and/or software implementation, including without limitation linear feedback shift registers or the like. In an embodiment, and without limitation, random and/or pseudorandom pulsing may have a disorienting and/or confusing effect, inducing anxiety or other psychological effects in a user.

Additional effects produced may include fanning light in an array creating a plurality of beams such as ten beams, strobing left and/or strobing down, or the like. In some embodiments, behavior classifiers may be configured to detect entry into a seizure state and/or one or other symptoms indicating sensitivity to strobing; apparatus 100 may be configured to cease strobing effect and transition to another deterrent output upon detection—detection of strobing sensitivity symptoms, such as any symptoms of physiological effects described above, may be treated as a de-escalation trigger as described above. In an embodiment, apparatus 100 may be configured to avoid triggering seizures that sufficiently incapacitate subject to prevent subject from leaving. In addition to seizure and/or near-seizure effects, light may be used to generate flicker vertigo, sometimes called the Bucha effect, which may include an Unbalance in brain-cell activity caused by exposure to low-frequency flickering (or flashing) of a relatively bright light.

With continued reference to FIG. 10, where apparatus 100 is networked with multiple other apparatuses having high-intensity light sources that produce different wavelengths of high-intensity light, and/or where directed light deterrent 156 includes light sources that produce multiple wavelengths of light, deterrent effect may include performing any or all of above-described deterrent actions using multiple and/or varied colors. This may, in an embodiment, defeat attempts at eye protection by subject 308; for instance, and without limitation, where eye protection has low transmittance at a first wavelength, it may have higher transmittance at a second wavelength, for example so that subject 308 is still able to see while wearing eyewear. In addition, visible, UV, and/or infrared wavelengths may be used to exploit weaknesses in the eyewear causing local fluorescing, temperature changes, and/or other effects that would reduce the effectiveness of the eyewear without harm to the subject 308.

Further referring to FIG. 10, apparatus 100 may be configured to detect countermeasures by subject. Countermeasures may include, without limitation, protective behaviors such as aversion of eyes, covering ears, crawling on the ground, using cover, or the like, protective equipment such as eye protection goggles and/or other eyewear, eye protection such as protective and/or noise-cancelling earphones and/or headsets, or the like. Apparatus 100 may be configured to select deterrents to bypass countermeasures. Selection may be performed, without limitation, using a look-up table for behaviors and/or equipment identified using behavioral and/or image classifiers, using an additional classifier and/or other machine-learning process, which may be trained using training examples correlating countermeasures to successful deterrents previously deployed against such countermeasures; training examples may be input by users. As a non-limiting example, where countermeasure blocks or otherwise avoids light deterrents, apparatus 100 may be configured to select and/or output another deterrent such as an audio deterrent. Alternatively, a frequency of an audio and/or light deterrent may be modified to circumvent protection against other frequencies; for instance, and without limitation, where a subject is wearing eyewear that selectively reflects a first wavelength, apparatus may output a second wavelength that the eyewear does not selectively reflect. As a further example, where apparatus detections hearing protection, apparatus may output a low-frequency sound, which subject may feel as a result of bone conduction or the like; in an embodiment, lower-frequency sound may also heighten a psychological effect and/or "fear factor" from those lower-frequency sounds, even with hearing protection, because of the unsettling sensation of vibration in apparent silence. Apparatus 100 may alternatively or additionally randomize and/or vary deterrent payload until a desired reaction by subject, such as compliance with instructions and/or retreat, is detected.

In an embodiment, and still referring to FIG. 10, deterrent actions may include generating a visual impairment zone. As used in this disclosure a "visual impairment zone" is a barrier and/or area that is secured by an illuminated source. For example, and without limitation, visual impairment zone may include an area and/or barrier that generates an illuminated barrier such that a subject that enters the area and/or interacts with the barrier is susceptible to the light deterrent. For example, and without limitation, visual impairment zone may include an area wherein no aiming control unit and/or targeting of a subject's retina and/or eyeball is required.

Figure 11:
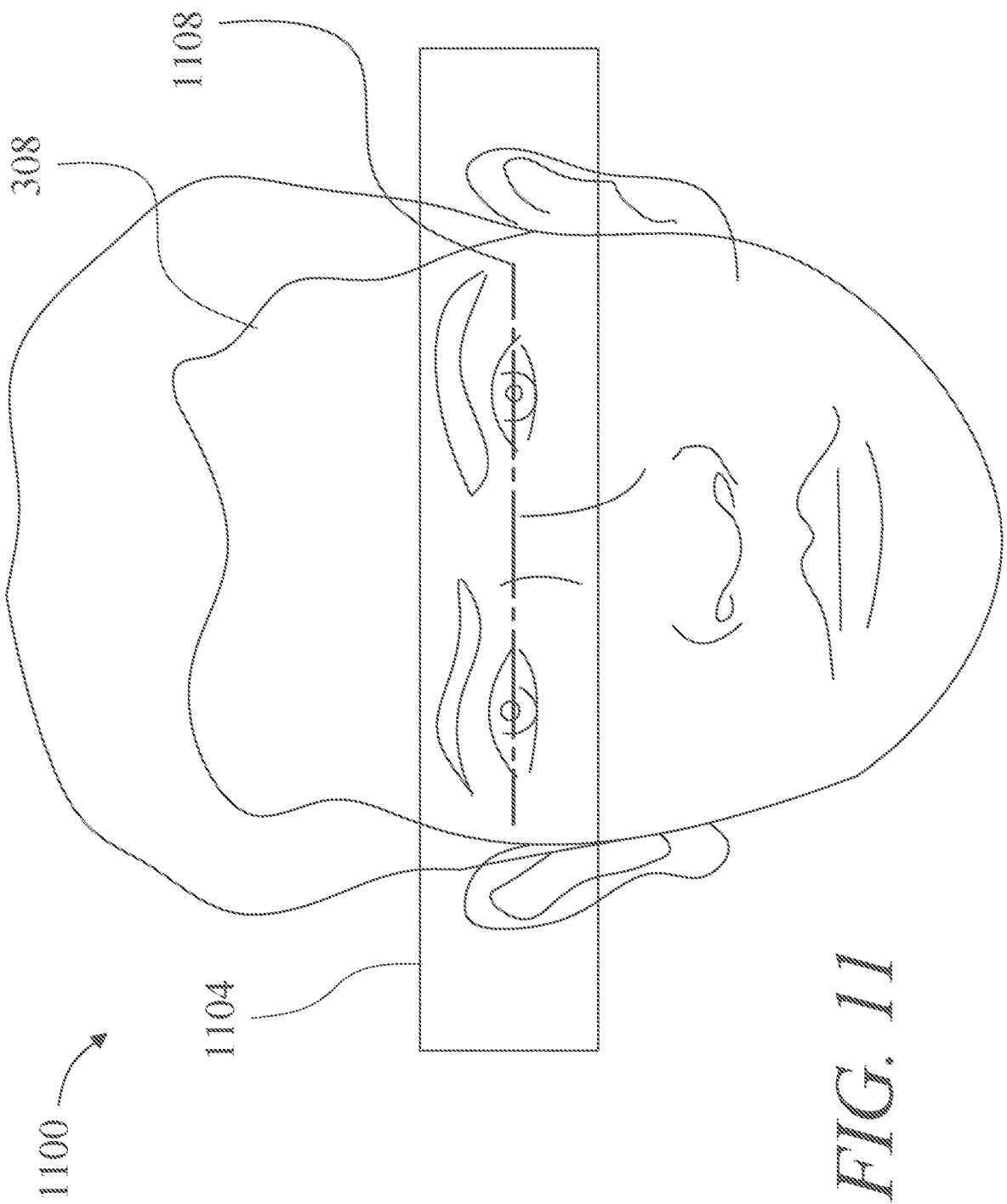
FIG. 11 is a schematic diagram illustrating an embodiment of a visual band.

Referring now to FIG. 11, an exemplary embodiment 1100, directed light deterrent 156 may time emission to illuminate a vision band 1104 of subject 308. Vision band 1104 may be defined as a geometrical region encompassing both eyes of subject 308. In an embodiment, directed light deterrent 156 may be configured to illuminate only vision band 1104, by blanking or switching off light transmission except when the beam is pointed at or scanning through vision band 1104. This may have an effect of adding to a surprise for the subject 308, as the subject 308 cannot see the light shooting at various locations before the high intensity light source finally makes its way to the vision band 1104. Timing of light source activation and/or pulses may be synchronized with beam steering and other modulation actions to pulse at a desired rate within vision band 1104, while remaining off outside vision band 1104. Such timing may further illuminate vision bands 1104 of two or more subjects 308 while maintaining the light source without activation at other times. In an embodiment, light intensity may have a first setting for a first subject 308 and a second setting for a second subject 308, depending on distances of each subject 308 from light source and/or sources, for instance as determined in further detail below. Processor 136 and/or other elements of apparatus 100 may track motion of subject 308 head, foot, and/or leg movement, for instance using anatomical landmark identification and tracking as described above, maintaining vision band 1104 centered about an axis halfway between subject 308 eyes. Vision band 1104 may, for instance, be greater than 80 mm wide about the axis 1108 connecting the subject's eyes, pertaining to the average interpupillary distance of humans of 64 mm to 80 mm. Where machine-learning processes are used to predict future movements of subject 308, placement of vision band 1104 may be directed according to such predictions; in an embodiment, this may enable more exact timing of vision band 1104 illumination using pulses or the like. Apparatus 100 may perform time multiplexing to set intensity, focal lengths, pulse widths, pulse frequencies, wavelengths of light sources, and/or other parameters for differently for two different targets. Time multiplexing may be accomplished, without limitation, using one or more multiplexing mirror components as described in further detail below.

Still referring to FIG. 11, directed light deterrent 156 may be configured to adjust power and/or intensity of light source according to one or more efficacy and/or safety considerations. Adjustment of light source power may be accomplished, without limitation, by means of regulation of current to light source, regulating voltage to the light source, combing two or more light sources, using varying pulse width modulation and duty cycle, adjusting divergence and/or beam shape of the light source, and/or by adjusting an amplifier to vary optical gain. For instance, power emitted by light source may be increased for a subject 308 detected as having eyewear as described above. Where eyewear is further classified to identify categories of eyewear such as sunglasses, eyewear that protects against light, physical hazards, or the like, night-vision and/or infrared goggles, and/or visual corrective lenses, light intensity may be increased to counteract attenuative effect of such eyewear; intensity increase may be limited according to one or more safety limits as described in further detail below. Alternatively or additionally, detection of eyewear may cause processor 136 and/or apparatus 100 to use non-optical deterrents instead of and/or in combination with optical deterrents.

In an embodiment, and still referring to FIG. 11, adjustment of power and/or intensity of directed light deterrent 156 may be performed as directed by detected ambient light and/or detected state of subject's 308 eyes, for instance, and without limitation, to eye color, pupil dilation, retina retroreflection, and/or other factors that affect the subject's 308 sensitivity to light. For instance, and without limitation, where apparatus 100 is mounted in a dark area, a lesser intensity may be used, while placement in an area with a higher degree of ambient light may cause apparatus 100 to use a higher degree of intensity. Detection of ambient light may be performed using an optical camera 108 as described above, for instance and without limitation by measuring luma and/or chroma values captured from ambient light in subject area. Setting of intensity and/or power level according to ambient light may depend on an amount of time that apparatus 100 has determined subject 308 has been present in subject area. For instance, it may take 20 minutes for a pupil to become dark-adapted after entry into a dark room or other space from daylight. Apparatus 100 may therefore configure directed light deterrent 156 to transmit at a high intensity for a subject 308 who has recently entered subject area during daylight hours. Where, as described in further detail below, apparatus 100 is in communication with additional apparatuses in a mesh network or the like, additional apparatuses may track subject 308 through two or more subject areas, each having measured ambient light intensities; apparatus 100 may thus determine an ambient light level to which subject 308 has become accustomed as a function of amounts of time subject 308 has spent in subject areas, and may adjust intensity accordingly.

With further reference to FIG. 11, the apparatus 100 may measure the current state of the subject's 308 eyes, for instance, and without limitations, using an infrared light to illuminate the subject's retinas and using a visible camera to measure the size of the pupils shown with retroreflected infrared light from the retina, measure the flux of the infrared light that is retroreflected from the retina, and/or other methods to determine the current dilation of the subject's pupils. In addition, a visible camera may image the subject's iris color to infer sensitivity to light, as blue-eyed individuals are statistically more sensitive to light. The apparatus 100 may use an imaging device, such as, but not limited to, a polarized camera or visible camera to detect the relative glance angle of the subject with respect to the apparatus 100 to determine off angle energy calculations for energy exposure or predictive effects. In an embodiment, and without limitation, measuring the current state of the subject's 308 eyes may include identifying a species. For example, and without limitation, identifying species of the subject's eyes may include identifying one or more eye sizes, eye colors, eye reflection colors, distance from a first eyeball to a second eyeball, quantity of eyeballs present on subject 308, vibro-acoustical measurements, and the like thereof.

Still referring to FIG. 11, apparatus 100 may be configured to detect sub-pixel signals indicative of phenomena of interest, such as without limitation retinal retroreflection. For instance, and without limitation, a classifier, which may include any classifier as described in this disclosure, may be trained with images captured from a sufficient distance that a retinal reflection occupies less than one pixel of resolution; such images may be correlated with images simultaneously or nearly simultaneously captured using a coaxially positioned imaging device that is closer to a picture subject, and which thus has sufficient resolution to confirm retroreflection. This training data may be used to train an image classifier that can identify retinal retroreflection at low relative resolutions within a given degree of confidence. Rapidly captured multiple images may be used to increase degree of confidence past a preconfigured threshold level such that detection of retroreflection is essentially certain; this may in turn be used to determine orientation of a subject's head and/or to trigger directed light deterrent when in "hide and seek" mode as described in further detail below.

With further reference to FIG. 11, apparatus 100 may use a phased and/or multistep approach to detect eyes and/or other features using retroreflection. For instance, and without limitation, apparatus 100 may use a light radar component, infrared detector, and/or imaging device such as camera to detect a probable location of an eye, pair of eyes, other portion of anatomy containing eyes, and/or other objects to be retro reflected. Apparatus 100 may then rapidly illuminate a subject area with a burst of high illumination, which may be transmitted as a rapid pulse, for instance and without limitation to minimize overall illumination despite high-intensity light. High intensity light may be produced, without limitation, using one or more component lasers and/or other light sources of a light radar device, such as at least an EELD or a vertical-cavity surface-emitting laser (VCSEL). Timing of burst may be controlled, without limitation, using q-switching components such as without limitation an electro-optical transducer, acousto-optical transducer, or the like; persons skilled in the art, upon reviewing the entirety of this disclosure, will be aware of various alternative or additional elements that may be used to control burst emission timing.

Still referring to FIG. 11, light reflected from a pulsed burst as described above, and/or other light to be detected in short bursts, may be detected with APDs, SPADs, and/or other photodetectors, for instance as described above. Such photodetectors may be gated, which may be accomplished without limitation using any mechanism suitable for q-switching and/or gated release of light. A timing circuit, such as an asynchronous timing circuit, may time exposure of photodetectors to occur during a brief window, such as a few milliseconds, during which detection may occur. Apparatus 100 may measure a flux of retroreflected light and/or other detected light using photodetectors. A bias of photodetectors may be adjusted to set a threshold for detection at some average threshold of photons. One or more filters, dichroic reflectors, or the like may be used to filter out one or more wavelengths of light other than an expected wavelength to be detected, such as a wavelength emitted to produce retroreflection. Signal to noise ratio may be further improved by "photonic starving"—a detection window may be limited to a very short time to minimize influx of light other than an expected signal light. For instance, given a known and/or calculated distance to a user, an asynchronous circuit and/or very high-speed clocked circuit may be set to time a camera shutter to pick up a retro-reflected photon; asynchronous circuit may be, e.g. triggered using a switching diode reverse biased using a capacitor and resistor circuit having a voltage in excess of reverse-bias voltage by an amount to be discharged by the capacitor and resistor circuit during the time between emission and return of reflected photons so as to detect only at a moment of return reflection. Such a circuit may alternatively or additionally be used to set and/or discharge a control terminal, such as a base or gate of a transistor.

In an embodiment, and further referring to FIG. 11, emission of bursts and/or LIDAR may include emission of a pulse train rather than a single pulse. Pulse train may be pulse code modulated, with a pulse code modulated (PCM) code; apparatus may be configured to ignore return signals not including the code.

In an embodiment, and continuing to refer to FIG. 11, light used for retroreflection may be pulsed at about 50 watts for approximately 5 ns. This may be performed using LIDAR and/or non-LIDAR laser sources at any suitable wavelength, such as without limitation 805, 850, and/or 930 nm.

In an embodiment, and continuing to view FIG. 11, once apparatus has established eye tracking, it can be used to guide various other processes and/or deterrents. For instance, and without limitation, eye locations and separation may be used to determine locations of other parts of the body. A thermal map may alternatively or additionally show different areas of face. Thus, for instance, a microwave "pain ray" as described in this disclosure could be aimed at soft and/or sensitive areas of a subject's body, such as the vermillion, at lips, backs of hands, other sensitive spots. Ears can also be located to perform directed and/or focused audio delivery to one or more ears to create a directional effect. Retroreflection may alternatively or additionally be used to determine if a user is currently seeing a Morse code transmitter. In an embodiment, where eye is not fixated, and/or is dithering, a beam of a directed light deterrent may be configured to be large enough to compensate for traveling and/or dithering of eye. Directed light deterrent may alternatively or additionally dither to augment and/or increase exposure levels and/or probability. In an embodiment, retroreflection data may be used to determine quickly if somebody is wearing eyewear, protective goggles, or the like.

Eye detection and/or retroreflection may be performed at large distances. For instance, a beam at approximately 850 nm beam may be able to produce detectable retroreflection up to 20 kilometers away; this may be used to detect a subject at a distance. Some data may also be available at distance, such as a wavelength of retro-reflected light, and/or distances between eyes, which may be used to determine what species subject belong to. In some embodiments, various VCSELs and/or light output devices may be spread widely at high energy to detect retroreflection; upon detection, light output may be dropped down in energy to cover the eyes more specifically, which may be used to continue eye tracking at lower energy outputs.

Still referring to FIG. 11, alternatively or additionally to directed light deterrent, an alternative light source, which may not be directed, may be used, such as one or more LEDs, SLEDS, laser-pumped phosphor devices, strobes, or other light-emission devices strobes or the like to broadcast light.

In an embodiment, and still referring to FIG. 11, apparatus may manage power density through variable beam expansion based proportionally to distance so that energy density is constant; for instance, and without limitation, beam expanders and/or focusing optics may be used to maintain a constant spot size on a target and/or subject regardless of distance. In an embodiment, this may keep energy density delivered to subject at a constant amount in mW/cm² constant. Any other parameters of directed light deterrent may alternatively or additionally be varied, including without limitation frequency, pulse width, or the like.

With further reference to FIG. 11, intensity and/or power levels of directed light deterrent 156 may alternatively or additionally be set according to one or more safety limitations. For instance, and without limitation, intensity and/or duration of light output may be limited to less than maximum permissible exposure and/or some percentage less than 100% of MPE, as determined as a function of beam intensity, beam divergence, and distance from light source of subject 308. For instance, where light source is non-collimated and diverging, MPE for a subject 308 at an opposite side of subject area may permit a substantially higher intensity than MPE for a subject 308 who is near to light source. As noted above, intensity of light source may be varied according to which subject 308 is being exposed to light. In an embodiment, a visible light source may be configured to shut off automatically where distance to subject 308 is less than a preconfigured threshold amount. Distance to subject 308 may be determined, without limitation, using ToF calculation, object inference, stereoscopic vision, and/or other 3D measuring techniques. MPE may be calculated, without limitation, according to ANSI 1504, ANSI 136.4, or other power exposure safety limitations. MPE levels from directed light source may be measured at various power output levels using a power meter, to determine how MPE depends on output intensity, distance to subject 308, and/or any other parameters, permitting accurate safety determinations and/or computation of preconfigured distance threshold for shutoff. Power provided to subject 308 may alternatively or additionally be determined using real-time feedback. For instance, power density in a target area such as vision band 1104 may be measured using chroma and/or luma values captured at a wavelength of directed light deterrent 156; such feedback may be used to adjust intensity in real time and/or provided to remote device 140 for updated safety thresholds and/or firmware updates. Alternative or additional safety standards with which apparatus may comply may include ANSI Z136.1-1974 for laser safety, NIOSH 1998 for noise exposure (both continuous and impulse), and CFR 1910.95 (1971a, 1983) and CFR 1910.95 (1971b) for noise exposure (both continuous and impulse) in U.S. general industry and construction work, respectively. Basic metrics to be applied for exposure limits may include without limitation Laser Maximum Permissible Exposure (MPE) in J/cm2 for less than 10 seconds (e.g., Table 5, ANSI, 2014), continuous noise Time-Weighted Average (TWA) in decibels A-weighted (dBA) for an 8-hour equivalent exposure duration (e.g., NIOSH, 1998), and impulse-impact noise in decibels peak (dBP) for sounds with dBP levels having maximum at intervals greater than 1 second (e.g., NIOSH, 1998). An outdoor laser safety standard employed may include ANSI 136; an indoor laser safety standard may include ANSI 134.

Still referring to FIG. 11, in addition to MPE, safety determinations and/or desired effects of directed light deterrent may be determined using maximum dazzle exposure (MDE); where MDE is calculated using a single wavelength, apparatus may determine MDE for multiple wavelengths and calculate it based on combined effective ratios of perceived MDE per wavelength. For example, if a 25-year-old person with brown eyes requires 32 µW/cm² for a 520 nm laser and 234 µW/cm² for a 450 nm laser individually for a dazzle effect to occur, apparatus may combine half of each, i.e., 16 µW/cm² of 520 nm and 117 µW/cm² of 450 nm laser power to achieve a comparable dazzle effect. This may be used to create more psychological and physiological effects. These ratios may be based on the MDE calculations and photopic, mesopic and/or scotopic responses of human eyes in response to wavelengths.

In an embodiment, and still referring to FIG. 11, MDE may be determined with respect to one or more equations and/or formulas. For instance, glare may be calculated as follows:

$$g_{eye}(\theta, A, p) = \frac{10}{\theta^3} + \left[\frac{5}{\theta^2} + \frac{0.1p}{\theta}\right]\left[1 + \left(\frac{A}{62.5}\right)^4\right]$$

where θ is an angle between the glare source and the line of sight (0.1°<θ<100°), A is an age of the individual (years), and p is an eye pigmentation factor (p=0 for black, 0.5 for brown, 1.0 for light, and 1.2 for very light eyes). Two calibration factors, $S_1$ and $T_1$, may be applied to eye scatter function as follows:

$$f_{eye}(\theta, A, p, L_b) = S_1 L_b^{T_1} g_{eye}(\theta, A, p)$$

where $L_b$ is the background luminance (cd·m⁻²), the values for $S_1$ and $T_1$ are 0.9239 and 0.6795 respectively, and $f_{eye}$ is in units of sr⁻¹.

Still referring to FIG. 11, a light source at an angle θ with an eye's viewing direction may produce an illuminance of $E_l$ (lux or lm·m⁻²) at the front of the eye, causing a light veil on the retina with luminance $L_v$ (cd·m⁻²) that reduces a contrast of a retinal image. This "equivalent veiling luminance" may represent dazzle. These two quantities may be related to a scatter function by the following equation:

$$f_{eye} = \frac{L_v}{E_l}$$

To find the equivalent veiling luminance caused by a laser source may require knowledge of an appropriate scatter function together with laser illumination in units of lux. Lasers may be characterized by their power in watts or their irradiance in W·m⁻², which may be converted to illuminance by use of the following equation:

$$E_l = 683 V_\lambda U$$

where $V_\lambda$ is the eye's photopic efficiency at the laser wavelength, λ, and U is the laser irradiance at the observer in W·m⁻². The factor of 683 is the lumens per watt at 555 nm for photopic vision—the wavelength at which $V_\lambda$=1. The resulting units of $E_l$ are lm·m⁻²=lux. Thus, an equivalent veiling luminance, $L_v$ (cd·m⁻²), caused by a laser source may be given by $$L_v = f_{eye} 683 V_\lambda U$$

In case of positive contrast (i.e., the target luminance, $L_t$, is greater than the background luminance, $L_b$), the contrast without a laser present may be represented by standard Weber contrast as follows:

$$C_{orig} = \frac{L_t - L_b}{L_b}$$

For a situation where a laser is present, both target and the background luminance may be increased by the equivalent veiling luminance of the laser source, $L_v$, and the resulting contrast within the eye, $C_v$, may become $$C_v = \frac{L_t - L_b}{L_b + L_v} = \frac{L_b C_{orig}}{L_b + L_v}$$

With continued reference to FIG. 11, an eye's threshold contrast for detection of a target may on background luminance, $L_b$, and an angular size, $\alpha$ (deg), of the target. A contrast threshold $C_{thr}$, detection may be characterized according to the following equation:

$$C_{thr}(L_b, \alpha, A) = \Omega AF$$

$$\Omega(L_b, \alpha) = \frac{2.6\left(\frac{\phi(L_b)}{60\alpha} + L(L_b)^2\right)}{L_b}$$

$$AF(A) = \begin{cases} \frac{(A-19)^2}{2160} + 0.99, & \text{for } 23 < A < 64 \\ \frac{(A-56.6)^2}{116.3} + 1.43, & \text{for } 64 < A < 75 \end{cases}$$

where AF is an age adjustment factor to account for the decrease in contrast threshold with age, A (years), and $\Omega$ contains the factors $\phi$ and L, which depend on the background luminance as given by $L=0.054946 L_b^{.466}$ where $L_b \geq 0.6$ cd·m$^{-2}$ and $\phi = \log(4.1925 L_b^{0.1556}) + 0.1684 L_b^{0.5867}$ and by $L = 10^{-0.891 + 0.5275 \ \log \ L_b + 0.0227 (\log \ L_b)^2}$ where $L_b \leq 0.00418$ and $\phi = 10^{0.028 + 0.173 \ \log \ L_b}$, and by $L = 10^{-1.256 + 0.3372 \ \log \ L^b}$ where $0.00418 < L_b < 0.6$ and $\phi = 10^{-0.072 + 0.3372 \ \log \ L^{b} + 0.0866 (\log \ L_b)^2}$. $\Omega$ and AF may include a range of stored and/or experimentally derived values.

In order for laser dazzle to obscure a target, an equivalent veiling luminance of the laser source may be sufficient to reduce a contrast of the target to just below its detection threshold contrast. In an embodiment, this may occur where Lv causes a contrast, $C_v$, to be equal to $C_{thr}$, as follows:

$$C_v = C_{thr}$$

and $$\frac{L_b C_{orig}}{L_b + L_v} = \Omega AF \Rightarrow L_v = \frac{L_b C_{orig}}{\Omega AF} - L_b$$

In an embodiment, and continuing to refer to FIG. 11, MDE is defined as a threshold laser irradiance at an eye below which a given target can be detected; or equivalently as a measure of a minimum laser irradiance required to obscure a given target. This supplements MPE, which determines the safe level of laser irradiance below which there is no risk of permanent eye damage. MDE may be applicable for continuous wave laser sources and may also be calculated for the average power of repetitively pulsed laser sources. MDE in Watts per square meter for a given target may be derived by equating Lv and rearranging equations described above as follows:

$$f_{eye} 683 V_\lambda U = \frac{L_b C_{orig}}{\Omega AF} - L_b \Rightarrow MDE = U_{threshold} = \left(\frac{\frac{L_b C_{orig}}{\Omega AF} - L_b}{f_{eye} 683 V_\lambda}\right)$$

Still referring to FIG. 11, when determining minimum necessary countermeasures, apparatus may use MDE, and other factors such as ambient light, shadows, sun position, other illumination systems, atmospheric conditions such as fog, rain, snow, or the like to calculate in situ, countermeasure effects based on environment.

With continued reference to FIG. 11, apparatus may pick off and/or sample a small fraction of directed light or other deterrent output, for instance by using a splitter to redirect a small fraction of output light to a sensor and/or photodetector. This and/or other methods of measuring output, as described in this disclosure, may be used by apparatus to keep track per person and/or subject of how much dosage of light the subject has received; output may be combined with various other variables to determine energy density, dosage, and effect at the target, and several confirmatory systems to keep track of the person's dosage in regard to laser, audio, RF, or any other energy emitted. In an embodiment, apparatus may first determine the target to engage; this may be performed in any manner described in this disclosure. Apparatus 100 may identify a target and/or subject using any method described in this disclosure; identification may be used to determine whether subject is a known, previous target, for instance according to any internal identification used to distinguish one subject from another. If the subject is determined to be a never before seen subject, the apparatus may start a new safety accumulator, while if the subject is recognized as having previously encountered the apparatus, the apparatus may use their existing known dosage values. The apparatus may store these values along with other critical measurements, such as video, images, environmental conditions, audio, and/or other supporting data, in a secure method, as to retain their values, integrity, and prove a chain of custody for later analysis, such as for forensic examination of the delivering of countermeasures and safety considerations.

Still referring to FIG. 11, apparatus may be configured to determine opportune time during which a subject looking at apparatus 100 using any or all methods therefore described herein and/or use a detected current pose and/or position of subject to determine an appropriate one or more countermeasures combined together or in a sequence to use for maximum efficacy.

Further referring to FIG. 11, apparatus may determine a best "payload" to use on a given subject and provide one dose and/or unit of such payload. A "payload" can consist of one or more countermeasures that are to be delivered in a set and/or calculated sequence. These payloads are chosen based on the mode the apparatus is in to illicit a response from the subject. For example, a payload may consist of a 638 nm red laser that is on for 50 µs, off for 50 µs, on for 100 µs, then off for 110 µs, in addition to a 520 nm green laser that has a repetition rate of 12 hertz, with a 25% duty cycle, and a single, loud impulse sound file played 2 seconds into the initiation of the payload. The apparatus still tracks each countermeasure for safety levels individually. For instance and without limitation, apparatus may compare measured and/or determined output power with other possible system settings, such as galvanometer and/or other beam-steering apparatus's positions, beam divergence, speed of a laser sweep, speaker setup, or the like. Apparatus may use real time measurement of energy to calculate a temporal accumulated dosage. For example, if apparatus is delivering 1 mW/cm² of 520 nm laser for 2 ms, apparatus may add to a subject's accumulator the specific laser energy delivered over the amount of time including wavelength, or the like, so a normalized MPE can be calculated using mW/s/cm² or similar acceptable method.

Still referring to FIG. 11, apparatus may use one or more factors to modify a calculated MPE for a subject. Such factors may include, without limitation, whether subject is using glasses or other eyewear to attenuate laser or other directed light, an angle of a subject's gaze with regard to the laser, calculation of MPE separately for different regions of the retina, for instance by splitting the retina conceptually into two or more areas and calculating a different dosage per angle entry into the eye, what atmospheric conditions may have attenuated the laser, or the like. This would also extend to other countermeasures, such as, but not limited to, audio, RF, and kinetic countermeasures, and their applicable approved safety dosage limits.

In an embodiment, if the apparatus 100 can determine the subject's identity, whether through distinguishable permanent characteristics or their true identity, this metadata can be used to track the subject's identity across separate encounters, including, but not limited to, the dosage over longer periods of time, including use of this info for other reasons. In an embodiment, if subject's accumulator for MPE or other exposure is exceeded, apparatus may withhold engaging the subject, possibly limit to only observing and analyzing what the situation is, and possibly raise the alarm state of the system or other appropriate action. A subject's dosage may be tracked until the necessary time period expires, such as a recovery time of 24 hours or other amounts before MPE "resets" according to applicable standards. This countermeasure usage data may be stored for analysis and used to improve and/or expand the capabilities of the system.

Still referring to FIG. 11, there may be a certain amount of energy per pulse generated by a light deterrent such as directed light deterrent, where amount of energy may be a fraction of total MPE. In an embodiment, each pulse may be approximately 200 ms in duration, for instance to match a period of exposure prior to blinking and/or turning of head and/or eyes, which may take approximately 150-200 ms. Pulses may alternatively be less, such as 100 ms, 20 ms, or the like. A counter in apparatus 100 may track a number of pulses of light emitted; there may be a counter per person that drops a number of "photonic bullets," which may be distinct pulses, in a "magazine" representing MPE; for instance, if MPE is 10 seconds of light reception at an emitted transmission level, 100 pulses of 100 ms may be in the "magazine," after which for a recognized person the apparatus may not emit light deterrent at that person, who may be identified using any means and/or method for identification described in this disclosure. MPE may be calculated based on dwell time. As used in this disclosure, "dwell time" is an amount of time a person actually has a laser and/or other light source on the eye of the person. In an embodiment, beam spread may be selected sufficiently to make sure that a spot on a subject is big enough to nullify aversive response such as a turn of head and/or eyes during a pulse. In some embodiments, determination and/or calculation of MPE may depend on a plurality of different factors. For instance, MPE may be calculated in some embodiments as a function of distance to a target, dwell time, divergence of a beam, and/or wavelength of light. Calculation may be determined using any suitable mathematical combination of such factors, such as weighted sum, multiplication together, or the like.

Still referring to FIG. 11, determination of MPE and/or other safety measures may depend on distance, radiance, beam divergence, whether it is light or dark outside and/or retroreflection to determine whether a subject is intoxicated or otherwise has some degree of pupil dilation and/or contraction outside a normal range for a degree of ambient light. MPE may be determined according to any standard, including without limitation ANSI 136.4. Alternatively, a standard may include ED50, representing a dose having a 50% probability of producing a criterion response. ED50 may not constitute a threshold; it may not be possible to determine a true threshold for these effects. An ED50 for laser-induced retinal injury may be dependent on a number of factors. Inherent to a laser and/or other directed light deterrent source may include wavelength, pulse duration, and pulse repetition rate. In an embodiment, damage to retina may depend on melanin absorption in a retinal pigment epithelium (RPE) determinations of melanin absorption may be reasonably approximated by the function $$A_\lambda = 1 - e^{-\alpha_\lambda s}$$

where $\alpha_\lambda = \alpha_0 (\lambda_0/\lambda)^{3.5}$ An absorption length, s, may be 5 μm. A fit to an RPE absorption data may be obtained when $\alpha_0$ is set to 4100 cm−1 at the wavelength λ0 of 380 nm. Energy absorbed by the RPE $Qr_\lambda$, may be given by $$Qr_\lambda = Qp_\lambda T_\lambda Tb_\lambda A_\lambda$$

where $Qp_\lambda$ is the energy at the cornea within the area of the pupil, $T_\lambda$ the transmission of the preretinal ocular media at wavelength), $Tb_\lambda$ is the transmission of blood assuming a 5-μm absorption path, and $A_\lambda$ is the absorption of the retina at wavelength A, as given by $$A_\lambda = A_\lambda(RPE) + A_\lambda(H_2O)$$

Thus, a relative retinal hazard as a function of wavelength of collimated laser energy incident at the cornea may be given by $$\frac{Qp_\lambda}{Qr_\lambda} = \frac{1}{(T_\lambda Tb_\lambda A_\lambda)}$$

Qrλ may alternatively or additionally e expressed by the function $$Qr_\lambda = Qr_0 \left(\frac{D_\lambda}{D_0}\right)^X$$

where Qr0 is the required energy for a minimum retinal irradiance diameter D0, and Dλ the chromatic aberration-induced diameter at wavelength λ. Thus, $$Qp_\lambda = Qr_0 \frac{(D_\lambda^X / D_0)}{T_\lambda Tb_\lambda A_\lambda}$$

The value of X, which determines the variation of ED50 with the retinal irradiance diameter, varies from a value of 2 for exposures of nanoseconds to microseconds to a value of 1 for 0.25-second duration and longer exposures. As a result, a time relationship predicted by thermal models may closely approximate a dependence shown by the bioeffects data. Values in energy of the ED50 for visible laser exposure may increase proportional to $t^{0.75}$ for exposure durations longer than about 10 microseconds. Safety guidelines may adopt an $n-\frac{1}{4}$ relationship for determination of MPE for exposure to repetitive pulsed lasers. Exposure for any single pulse in a pulse may not be able to exceed single-pulse MPE multiplied by a multiple pulse correction factor $C=n^{1/4}$, where n is a number of pulses. A relationship governing MPE may be expressed by $$MPE(RP)=MPE(SP)n^{-1/4}$$

where MPE(RP) is a maximum permissible exposure for the repetitive pulse train expressed as energy per pulse and MPE(SP) maximum permissible exposure for a single pulse from the same laser. On the average $$ED_{50}(RP)=ED_{50}(SP)n^{-1/4}$$

This result may be relatively independent of a wavelength, pulse duration, or pulse repetition frequency of a laser. Models based on a thermal damage mechanism cannot readily explain this result. A safety margin, defined to be a ratio ED50/MPE and commonly assumed to 10, may best be viewed as a measure of confidence in the experimentally determined value of ED50. That degree of confidence may be greater for some combinations of exposure parameters than for others. The least confidence is assigned to ED50 for pulsed exposure to a highly collimated laser beam. A Spot-Size dependence may include uncertainty regarding a true dependence of ED50 on retinal irradiance diameter for diameters less than 80-100 which may leave that the threshold for damage might be lower in the actively blinking, actively accommodating eye of an alert young human.

Still referring to FIG. 11, people may move their eyes and/or head upon glare. In an embodiment, where fovea is a target area, apparatus 100 may use retroreflection to determine where eye is, and find center of pupil with that targeting and/or retroreflection laser, and then shoot directed light deterrent immediately and/or microseconds later. This may occur so fast that it is safe to assume successful strike on target area. This may cover a 10 cm burst of energy, within which a person may be unable to avoid interdiction. MPE may operate as a "magazine" of energy may be transmitted, which may be transmitted a small amount at a time, to permit interdiction and/or deterrence multiple times prior to reaching MPE. Standards may require allowance of recovery time after MPE or a fraction thereof above a threshold level has been reached. Apparatus may determine that recovery time has elapsed, and/or a record of transmissions at subject, by using any means of recognition and/or identification of subject, including without limitation location in space, tracking, facial recognition, and/or other metrics.

In some embodiments, and still referring to FIG. 11, eye movement and head movement may reduce actual dwell time on a retinal point. For instance, eye movement may cause a given light source to illuminate a larger retinal area with a more diffuse amount of energy, which may be lower, per point on the retina, than might be assumed given a degree of concentration and/or collimation of a light source. As a further example, head movement may cause illumination of an area such as the macula and/or fovea to cease once subject's head has moved by more than a certain amount, reducing the overall time of exposure to on-axis illumination. Either or both of these motions may reduce the overall energy delivered in any given period of illumination by directed light deterrent, which may permit direct light deterrent to output a greater quantity of energy while remaining within safety limits. A beam may be dithered along a vertical axis to ensure striking the fovea.

Still referring to FIG. 11, retroflection may be detected using direct and/or indirect retinal reflection. Because of eye fluorescence, there may be orthogonal reflection pathways, which may cause retroreflection to occur when a person is looking sideways. Pose detection may be utilized to develop confidence about direction of gaze, by detecting other anatomical features.

Further referring to FIG. 11, directed light deterrent 156 may be configured to respond to gaze detection as feedback. For instance, where a retinal reflection, such as a "cat's eye" reflection, of light from directed light deterrent 156 and/or any other light source is detected by imaging device 104, processor 136 may determine that subject 308 is exposed for a directed light deterrent 156 action as described above, and/or that subject 308 has been successfully hit by a deterrent action.

Still referring to FIG. 11, processor 136 and/or remote device 140 may detect one or more reflective surfaces in subject area during baseline establishment as described above, where reflectivity may be measured according to intensity of returned and/or backscattered light. In an embodiment, processor 136 and/or remote device 140 may determine angles of reflection off one or more such reflective surfaces toward visual band of subject 308, permitting deterrent actions to be performed by reflection off reflective surfaces. For example, and without limitation, where subject 308 has turned away from apparatus 100, placed a hand or arm over eyes, or the like, a direct shot from directed light deterrent 156 may be difficult or impossible, while a reflected shot may wholly or partially access visual band. Each of the above-described evasive actions by a subject 308 may be detected and/or predicted using machine-learning and/or anatomical landmark tracking processes as described above.

With continued reference to FIG. 11, directed light deterrent 156 may alternatively or additionally be configured to render images using processes analogous to laser painting on walls and/or other structural features in or around subject area; this may be used to convey verbal, pictorial messages, and/or video messages to subject 308 such as directional arrows or the like, which may be used to indicate to subject 308 how to vacate subject area and/or otherwise comply with directions of apparatus 100, a user thereof, or the like. Video messages can take a novel form of videos processed with edge detection to provide a high contrast image and optimize the video for laser scanning or other beam steering methods. In addition, directed light deterrent 156 may render user interfaces on the wall that when combined with an imaging device 104 and processor 136, approved subject 308 may interact with said renderings to interact with apparatus, such as, but not limited to, option menus, system settings, system modes, internet functions, and/or other uses of user interfaces to the apparatus 100.

With continued reference to FIG. 11, directed light deterrent 156 may alternatively or additionally be configured to flash a pulse of light from the light source 1004 or an alternative light source, such as, but not limited to, an omnidirectional LED. This may cause a startle reflex in the subject 308 and result in them gazing directly at the apparatus 100, exposing their eyes optimally for a possible use of a directed light deterrent. In addition, the apparatus may use a plurality of deterrents in attention getting modes to have the subject 308 gaze directly at it, such as, but not limited to, a short burst of sound.

With continued reference to FIG. 11, directed light deterrent 156 may alternatively or additionally be configured to use motion sensor 132 IMU's accelerometer data by processor 136 to determine the apparatus' 100 orientation to level in 3 dimensions, including inclination and roll. This angular measurement can be used to determine relative angles to subject 308 and used to enhance calculations, such as, but not limited to, eye safety and dazzle energy calculations for off angle uses. The IMU data may also be used to calculate directionality of the directed light deterrent 156 to avoid shining light into the sky that may interfere with pilots, satellites, and/or other aerial imaging or vision systems.

Figure 12B:
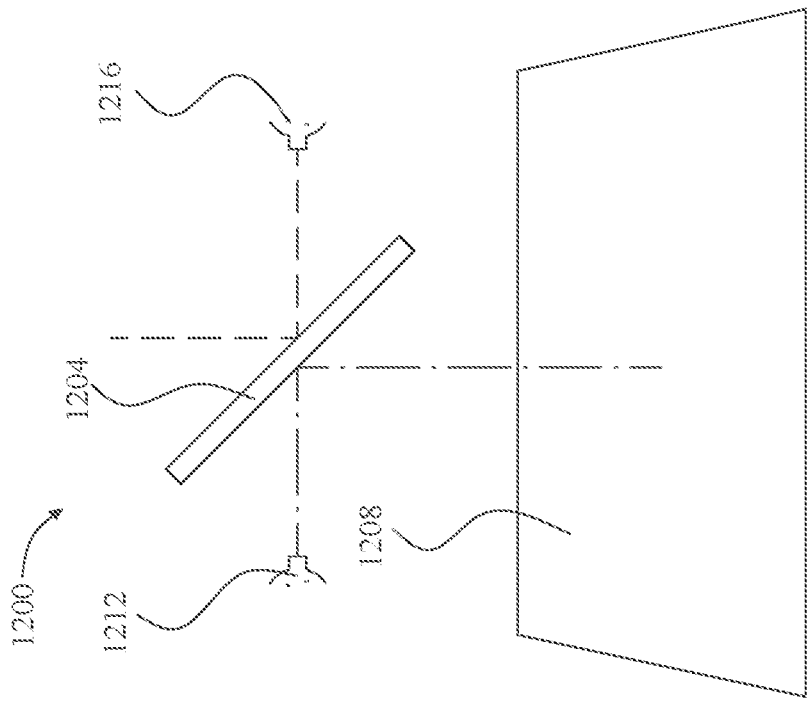
FIGS. 12A-B are schematic diagrams illustrating an embodiment of a multiplexing mirror component.
Figure 12A:
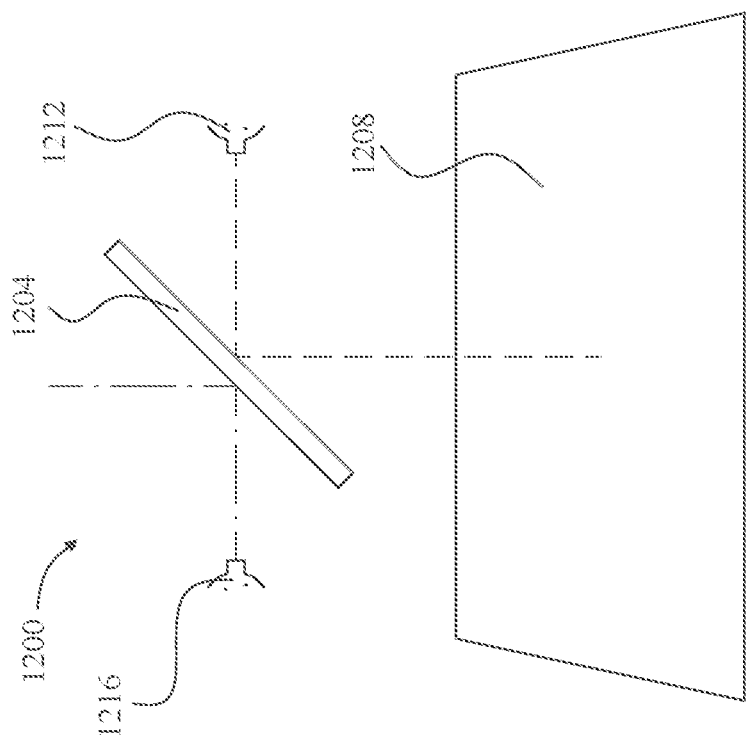

Referring now to FIG. 12A, an exemplary embodiment of a multiplexing mirror component 1200 is illustrated. Multiplexing mirror component 1200 may include a first mirror 1204 and second mirror 1208; first mirror 1204 and second mirror 1208 may have axes of rotation about which reflective panes of mirrors may rotate, such that an angle of reflection of light, which may include ToF light, laser light, directed light deterrent light, ambient light or any other light emitted from apparatus 100 and/or accepted into directed mirror deterrent may be able to cover a range across one dimension of a field of vision. Axes of rotation may be orthogonal or otherwise span two dimensions permitting coverage of a field of vision, where "coverage" as used here means ability to emit light reflected off of the mirrors to any point within the field of vision and/or receive light from any such point and direct such light toward sensors positioned to receive light reflected off first mirror 1204. For instance, and without limitation, first mirror 1204 may be an x mirror, and second mirror 1208 a y mirror of an xy galvanometer or similar device. A first emitter 1212, which may include any emitter of electromagnetic radiation described in this disclosure, may be positioned such that light emitted therefrom is reflected off of first mirror 1204 onto second mirror 1208, and thence out an aperture and/or into a field of coverage, such as subject area, when first mirror 1204 is in a first position. A second emitter 1216 may be reflected away from second mirror 1208 when first mirror 1204 is in first position. In an embodiment, placement of a camera, rangefinder, infrared emitter and/or detector, or the like behind first mirror 1204 may have an ability to track objects within a field of coverage of multiplexing mirror component 1200; in some embodiments, use of multiplexing mirror component 1200 to perform such scans may permit very rapid sensor scans of subject area. Multiplexing mirror component 1200 may be used to target and emit directed light deterrents, ToF or other light radar devices such as LIDAR rangefinders, or any other emission sources that may occur to a person skilled in the art upon viewing the entirety of this disclosure.

Referring now to FIG. 12B, an exemplary embodiment of multiplexing mirror component 1200 with first mirror 1204 in a second position is illustrated. In this configuration, first emitter 1212 no longer is reflected to second mirror 1208 while second emitter 1216 is. A light sensor in position of second emitter 1216 may similarly be used to scan subject area instead of a light sensor in position of first emitter 1212. In some embodiments, first mirror 1204 may have multiple positions corresponding to multiple emitters having different positions such that selective repositioning of first mirror may result in selective reflection of each emitter's light, allowing rapid switching between emitted light sources, for instance to vary incident colors at a subject's face, to alternate visible light with lens-fluorescing light, or the like.

Further referring to FIG. 12B, first mirror 1204 and/or second mirror 1208 may be implemented using any kind of reflector, including without limitation reflectors having different properties for different wavelengths. For instance, in an embodiment where there are multiple positions for first mirror 1204 first mirror 1204 and/or second mirror 1208 may include a reflector, such as a reflective grating, with different angles of reflection for different wavelengths positions of first mirror 1204, second mirror 1208, and/or an emission source may be selected such that a reflection angle at a wavelength of an emitted light source will cause the light to center on second mirror 1208 and/or otherwise correct for offset positions such that a central position of first mirror 1204 and/or second mirror 1208 corresponds to a central position of a desired field of coverage, to maximize a possible field of coverage.

In an embodiment, and still referring to FIG. 12B, first mirror 1204 and/or second mirror 1208 may be positioned and/or designed to spread a beam vertically to catch eyes of persons who are looking downward and/or upward; this may be combined with a mount that permits directed light deterrent to be moved up or down vertically, for instance using an elevator screw, "worm gear," pulley system, and/or pneumatic, hydraulic, or other actuators, permitting light to be directed at various angles, from various heights. A choice of height and/or angle may be determined using retroreflection of light radar and/or any other imaging techniques and/or devices described in this disclosure.

Figure 13:
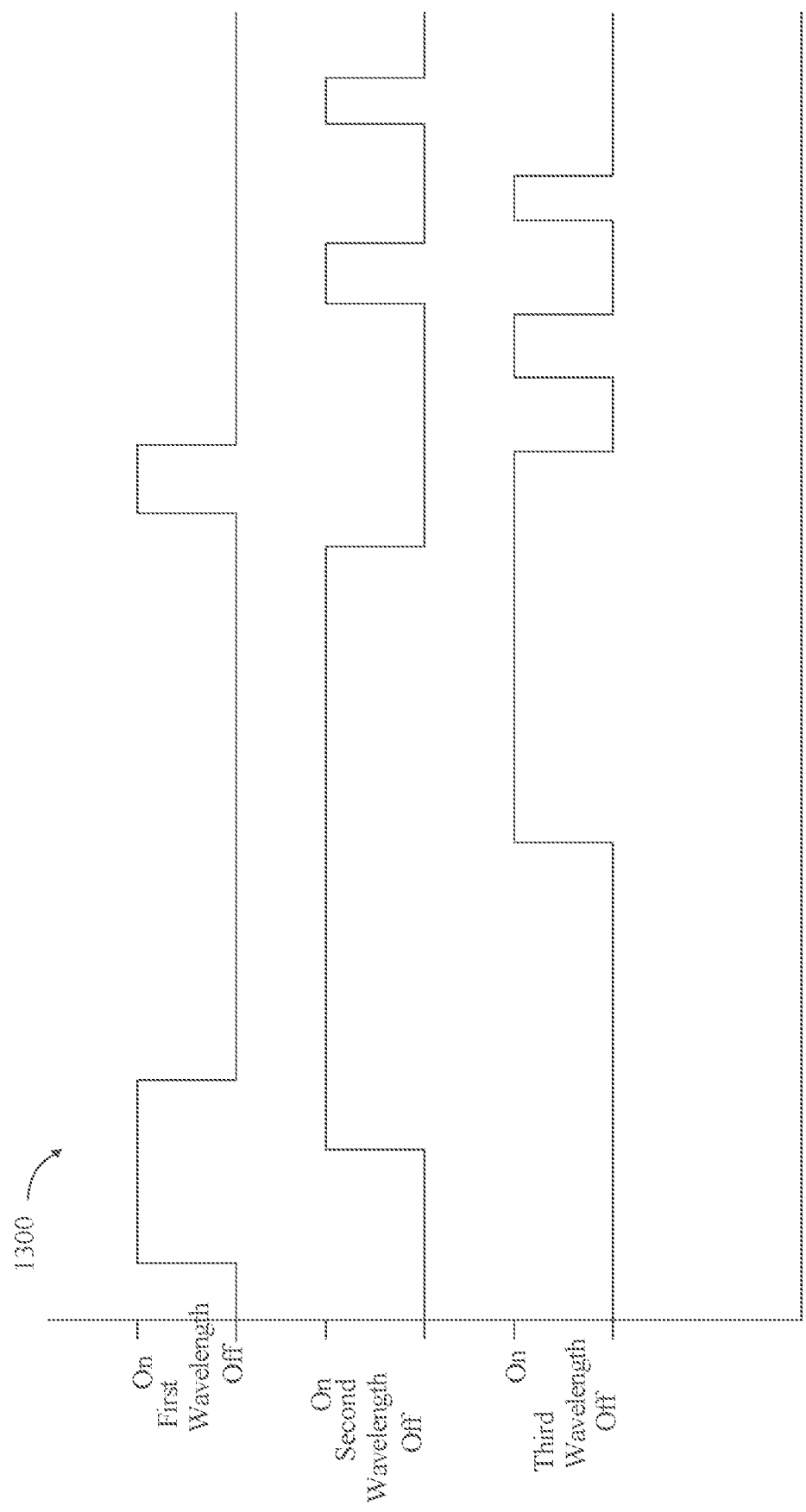
FIG. 13 is a graph illustrating an exemplary embodiment of color output from a directed light deterrent.

Referring now to FIG. 13, a graph illustrating exemplary output patterns, represented as on-off duty cycles, of different wavelengths, which may be emitted using any devices, reflectors, or the like as part of directed light deterrent. A first wavelength may be emitted on a first duty cycle, which may vary according to any instructions generated by apparatus 100. A second wavelength may be emitted on a second duty cycle. A third wavelength may be emitted on a third duty cycle. In an embodiment, alternation, combination, and/or on/off cycles of different wavelengths may be combined for a desired psychological and/or physiological effect at subject, as described in further detail in this disclosure.

In an embodiment, and still referring to FIG. 13, apparatus 100 may include two systems of laser or otherwise directed light: a first light radar system at a first wavelength set and a second directed light deterrent system at a second wavelength set; first wavelength set, and second wavelength set may be disjoint. For instance, first wavelength set may include one or more wavelengths useful for light radar, such as wavelengths in the far red to near infrared spectrum, or approximately 750 nm to 980 nm. First wavelength set may include, for instance, a wavelength of approximately 850 nm, a wavelength of approximately 805 nm, or the like. Light radar may operate at near invisible wavelengths and/or slightly visible wavelengths. Light radar may transmit at 5 nanosecond bursts, which may be of overly short duration to be visible. As a result, light radar may operate without reaction and/or awareness of subject. Accurate light radar may prevent target acquisition jitter for directed light deterrent. Second wavelength set may include visible spectrum wavelengths, such as red, blue, green, and/or violet light as described above. First wavelength set may be used for detection of retroreflection of retinas or the like, permitting operation of a single, unified targeting system.

Referring again to FIG. 1, directed light deterrent 156 may include a microwave or MMW source 160. Microwave or MMW source 160 may emit light and/or radiation at a wavelength that causes non-lethal pain, burning sensations, and/or other intended effect; for instance, and without limitation, microwave and MMW source 160 may generate radiation having a frequency of approximately 96 GHz that interacts with a subject's pain receptors 1/64" under the skin surface, causing a perceived intense pain of burning, without any tissue damage actually occurring as part of a neurostimulation deterrent.

Still referring to FIG. 1, deterrent component 152 may include a directed sound source 164 and/or directed audio deterrent. Directed sound source 164 may include a sound source that may be aimed at specific subjects 308 in a manner analogous to a directed light source. Directed sound source 164 may include, without limitation, a long-range acoustic device (LRAD), which may use a plurality of closely packed, coordinated piezoelectric transducers to produce highly directional sound waves. A laser generating localized plasmas in the atmosphere may be used to create modulating plasmas near the subject 308 such that audible sound is produced for warning messages and/or other sounds to deter the subject. An ultrasonic carrier wave may be modulated to create audible sound, including through parametrically generated pressure waves, which may be selectively audible to a person who is standing in the direction of transmission while being far less audible or essentially inaudible to a person who is not. A spark gap emitter may be modulated to create audible sound, including through sending electrons across a spark gap of a plasma arc, wherein the transmission results in an emission of a high frequency wave. In an embodiment, very high startup speed devices, like spark gap devices, may evince a stronger startle response from subject. In an embodiment, and without limitation, spark gap emitter may emit a 165-175 dB wave. In an embodiment, a spark gap emitter may function to create "artificial lightning" at a set frequencies for extremely loud audio output. In an embodiment, spark gap audio is wideband, and thus may be used as-is for deterrence, obfuscation of other audio such as a person on a megaphone or the like, or may be manipulated using mechanical or spatial filters, pulse width modulation, pulse coded modulation, amplitude modulation, or the like to create more defined sounds. In some embodiments, where multiple gap generators are placed in an array, such as without limitation a linear, 2D, or 3D array in repeating, fractal, or other deliberate pattern, standard beamforming methods in conjunction shaping of cavity(ies) to enhance the spark gap acoustics may be used to create an electronically steered and/or tuned acoustic source from the spark gap generator. In some embodiments, a spark gap emitter may be used to acoustically map a room, area, outdoor environment, or the like. Spark gap emitter may be so employed so the system may best apply acoustic countermeasures, possibly taking advantage of occlusions, objects, materials, or the like to bounce, aim, avoid, or the like when steering around acoustical countermeasures. Apparatus may even use such methods to determine ranging, weather, or other phenomenon. In an embodiment, the apparatus may use one or more methods to reduce the electrical potential of the air to be traversed by a spark; for instance, the apparatus may ionize the air using electrical sources or use ultra-short pulse lasers to filament the air. In some embodiments, modifying the potential and/or resistivity of air permits more volume control and/or lowers voltage threshold to generate sparks, which may reduce energy consumption.

Continuing to refer to FIG. 1, methods to generate plasmas at a distance may be used to generate sound at a given location. This could include use of nano second and/or femto second laser combining to generate necessary energy densities at a given distance to create localized plasmas. These plasmas may then be modulated to create sound from their acoustic shockwaves. This may include modulation of a single spot to create audible, broadband audio, or may be more complex, with multiple modulated sources in a 3D arrangement relative to themselves and/or to the target to generate complex sound fields using high order ambisonics or other beam forming techniques. Laser energy at high intensity but very short duration may generate a small plasma ball in air or other gas, with cavitation and/or pressure waves generated by rapid expansion and contraction thereof producing sound waves having frequencies and/or other characteristics driven by frequencies and/or characteristics of lasers used to generate the plasma balls.

With further reference to FIG. 1, multiple LRAD speakers, and/or sequential aiming of a single LRAD speaker may be used to send different audio signals to different subjects 308. This may be used to generate highly specific instructions such as directions to leave subject area which vary based on a position of a receiving person, and/or to generate distinct messages and/or sounds to distinct persons to cause further confusion and/or disorientation. For instance, a first subject 308 alerted by this means may hear a police siren, while a second subject 308 may hear a barking dog, a third a voice saying "hey," or the like.

With further reference to FIG. 1, LRAD or other directed sound sources 164 may be mounted on two or more rotational devices, permitting scanning and aiming across a portion or all of subject area. Varied audio counter measures may use multiple sounds to drive a single subject 308 into a state of anxiety, confusion, or concern. All of these stimuli may be varied by location, behavior, velocity. Additional or alternative acoustic sources may be employed, such as an ultrasonic transducer generating 18,000 Hz sound to preferentially deter teenaged and/or young adult persons from subject area. Additionally or alternatively, directed sound source 164 may include one or more audio signals that appear to follow and/or track an individual. For example, and without limitation, an audio signal directed towards a first location may occur, wherein as subject 308 moves around the subject area, directed sound source 164 may move and/or shift the direction of the audio signal to track and/or follow subject 308. In an embodiment, where an audio transducer has a field of sound such as a 60-degree field of sound, sounds may be aimed within that field to capture particular subject of a plurality of subject. In an embodiment, where apparatus 100 has located eyes of a subject, or other landmark feature, apparatus may know a location of ears, and how to cause sound to appear to come from one location or another, depending on a desired effect at subject.

Still referring to FIG. 1, audio deterrent may include a system that uses some number, such as 25, horn-shaped items with compression drivers to direct sound in a particular direction. Electronic beam forming may be used to aim sound; it may be possible for aiming to be varied along horizontal and vertical axis up to 60 degrees. In an embodiment, sound produced may be up to 140 Db at 30 meters away in a highly directional, extremely focused beam. Sound may be producible So behind each person in subject area, sending each, concurrently, a different audio message. A subject may hear, 30 meters to their left a barking dog, and 10 feet in another direction, a police siren. Then a voice in front of subject may identify them, referring to a distinguishing feature thereof, and may issue commands. In an embodiment, this may have the effect of convincing subject that a live human is watching their every move, following them with their voice. Hearing a natural, authoritative voice speaking to them, calling them out by what they are wearing and a direction they are walking, an illusion may be established and maintained, increasing a likelihood of de-escalation. This may function at least to delay need for human intervention, and thus may act as a force multiplier for human beings. In an embodiment, human behavior may altered by sound; alterations may be characterized as innate and/or genetic, adapted based on evolutionary experience, and/or culturally informed. Psychoacoustic systems may be naturally adept at listening to human speech. Persons may furthermore be especially attuned to speech that they deem is directed at us (both spatially and contextually) as an individual. In an embodiment, apparatus 100 may incorporate natural human speech, capable of saying anything on demand, with parametrically controllable expressivity and emotion. Instructions to TTS models may be provided in SSML, which is a self-describing XML-style standard that allows text to be tagged for a TTS engine and rendered according to desired tonal inflection, emotional intent, pitch, cadence, or the like. An exemplary SSML example may include:

<prosody rate="slow" pitch="-2st">Can you hear me now?</prosody>

Another example may include:

<prosody rate="slow" emotion="maxAnger" alertLevel="9" pitchCurve=23.3>Hey you in the blue shirt. Leave the premises!/prosody>

In an embodiment, neural TTS models may be implemented on embedded processors, without any network connectivity. This may have lower latency than cloud communication at a similar level of quality. In an embodiment, system and/or apparatus may use above-described functionality to incorporate natural human speech, capable of saying anything on demand, with parametrically controllable expressivity and emotion. Parameters may be provided and/or adjusted to correspond to one or more "expressive components," including speed of speech, volume, pitch, and/or vocabulary—for instance, expressive components for a shocking or strong audio output may include strong or forceful language, a rise in intonation, and increased volume. These parameters may be determined by using a behavioral classifier to determine what a subject is doing initially and/or in reaction to stimuli. Behavior and/or progression of behavior as classified may be linked by another classifier and/or a lookup table to a tone of voice, prosody, word choice, expression of response, or the like.

Figure 14:
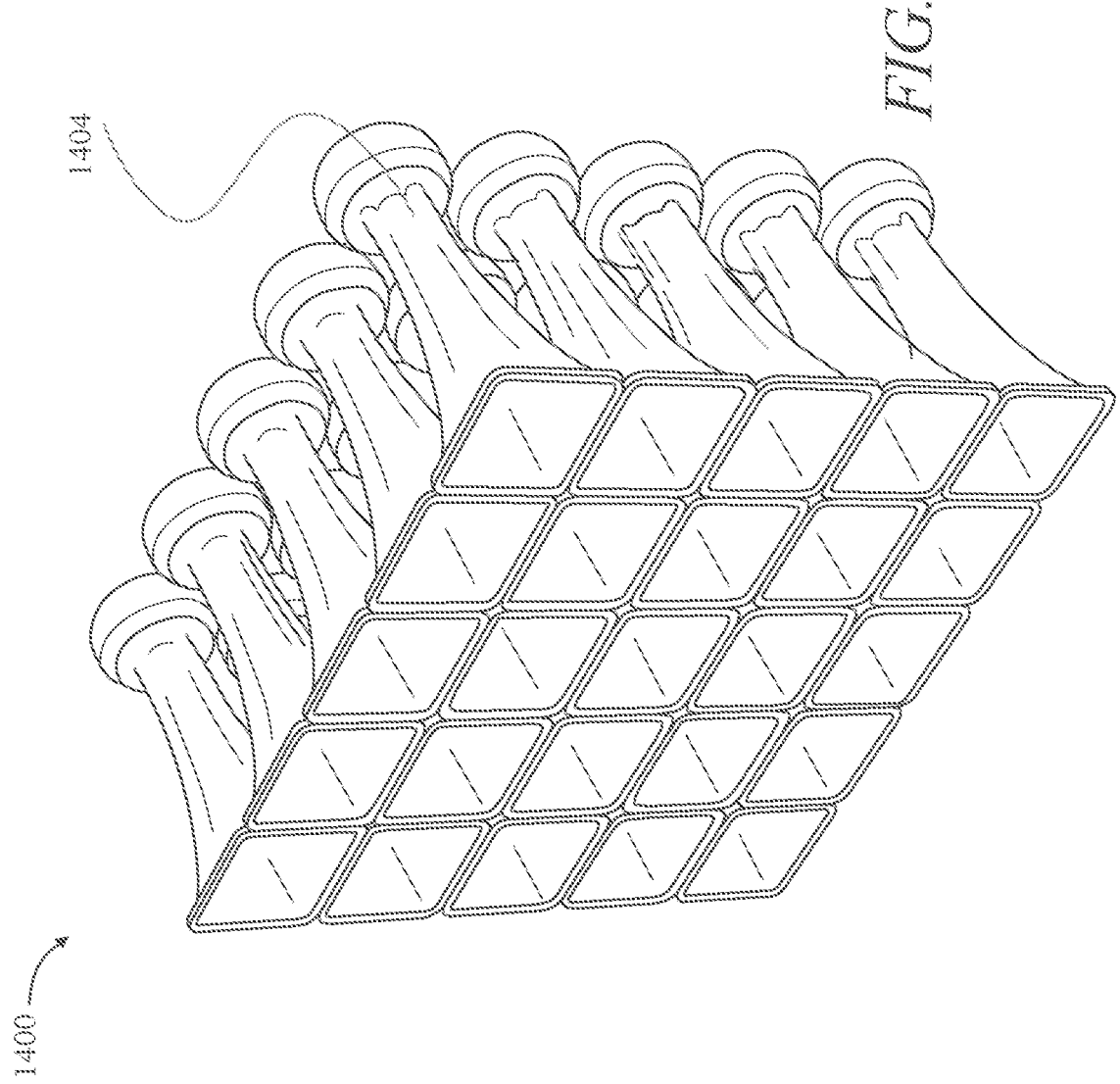
FIG. 14 is a schematic diagram illustrating an exemplary embodiment of a directed audio deterrent.

Referring now to FIG. 14, an exemplary embodiment of a steerable speaker system 1400 is illustrated. Steerable speaker 1400 may be capable of being swept across a large field and/or to transverse a very tall wall interdicting a single or multiple intruders. Steerable speaker 14 may be fully controllable for coverage of ±30 degrees in both the horizontal and vertical plane while producing a plurality such as without limitation 8 individual simultaneous sound fields, each with its own unique acoustic payload which may include sounds, voice output, and/or words as described elsewhere in this disclosure, as well as SPL volume level controlled under the direction of other systems within and/or connected to apparatus 100. Steerable speaker 1400 may also produce extraordinarily levels of "white noise" or other noise, such that anyone in its field will experience complete disintermediation of communications—the inability to hear another's voices.

Still referring to FIG. 14, steerable speaker 1400 may include one or more horns 1404, such as without limitation a plurality of horns in a matrix array, such as a 5×5 matrix horn array. Dimensions and source-to-source distances may be imposed by a maximum SPL that to be achieved. Such arrays may achieve very good steering precision into a vocal intelligibility range (2 kHz to 3.2 kHz). In embodiments, significant beam tightness of a projected audio beam may be achieved. For instance, at 57 m distance, beam tightness may range form 60 degrees at 500 Hz to approximately 3 degrees at 7 kHz, with approximately 30 degrees at 2 kHz.

Still referring to FIG. 14, steerable speaker 1400 may create a powerful sound beam out of a compact loudspeaker array. In an embodiment, each horn element 1404 may be optimized to provide proper acoustic loading in a desired range of use which is between 450 Hz up to about 7.5 kHz. A compression driver of each horn 1404 may include, in a non-limiting example, a titanium dome diaphragm installed in front of a phase plug, which may have a moderate compression ratio. This may allow a transducer incorporated therein to reach high sound pressure levels, still keeping the distortion level acceptable. Compression driver diaphragm may feature a high compliance suspension. This aspect may advantageously assure a driver's ability to present its natural mechanical resonance frequency significantly below the range of use, thus assuring safe operation and good quality of voice or other tonality within an intended range of use.

Still referring to FIG. 14, steerable speaker 1400 may be arranged by creating an array of multiple horn cells 1404, each one loaded with one or more high output compression drivers. In the case of multiple drivers loading, a high efficiency and accurate manifolding system may be provided in order to ensure efficient loading and accurate phase summation at the highest frequency to avoid detrimental interferences at the top of the bandwidth. Array of multiple units may be arranged in the form of a "n×m" matrix to provide steerability and/or directivity control, both in horizontal and in the vertical planes. For instance, and without limitation, an array may be arranged in the form of a squared matrix of horn elements 1404, such as a 5 by 5 element matrix. An odd number of elements may preserve a better stability of a center lobe in terms of polar response than an even number of elements, even when side lobes can become quite severe.

Continuing to refer to FIG. 14, a specific choice of horn size and number of units 1404 belonging to a target SPL that has been assigned to the system; target SPL may include, without limitation, a 140 dB SPL peak at 30 m distance from the source. A size of horn elements may be selected as a tradeoff between a maximum SPL that can be generated and the creation of side lobes above a certain frequency. One or more design features may be optimized with different parameters to reduce the amount of side lobes and their intensity, for instance and without limitation by using smaller horns 1404 at the expenses of maximum SPL and/or channel count, or it may be optimized to further increase the SPL increasing the horn size and the number of elements at the expenses of side lobe generation and overall dimensions.

Still referring to FIG. 14, an algorithm used for steering processing may mix standard beam steering techniques based on the application of individual delay and level variation to each single cell to determine the direction of the main beam, with steering functions determined by assignment of target response functions in a covered space and performing direct inversion of a filter matrix to optimize plant functions. This mixing technique may include combining an SPL yield of simple beam steering based on a delay matrix with an advantage of additional refinements carried on by a matrix of functions that may reduce aggressivity of side lobes in most cases.

With continued reference to FIG. 14, in a loudspeaker system 1400 described above, each element 1404 may have its response optimized for correct summation and to generate a homogeneous response when an array is pointed straight and not steered around. Moreover, dedicated processing channels may also take care of individual workloads of loudspeaker elements in order to protect them from diaphragm or voice coil damage due to excessive drive unit power. Input voltage and/or input current that are sent to each driver unit may be monitored and subject to a power limiter to not overcome the power handling of each loudspeaker in the long term. Voltage and current sent to a loudspeaker may also be used, in conjunction to a prediction software, to make sure that at given point in space where the loudspeaker beam is pointed, a maximum SPL delivery to a single individual will never overcome a limit, such as a 140 dB limit, above which hearing impairment could be produced.

Still referring to FIG. 14, beam steering parameters may be calculated in real time by a dedicated implementation of a previously explained algorithm, and a current direction of a main beam may be assigned by an external control. A camera and/or other imaging device as described above, which may be dedicated to steerable array 1400 and/or may include any imaging device of apparatus 100, may be able to recognize presence of a person in an area of interest, and may be capable of determining a position in space of such person and/or subject and a distance therefrom. These data may be sent in a continuous real time stream to beam steering algorithm, updating in real time a position in space where a main beam may be sent. A dynamic real time implementation of beam steering algorithm may be realized either or both with real time calculation and using a look up table or similar data structure to select an appropriate function among a high number of precalculated target functions.

Further referring to FIG. 14, messages and sounds to be reproduced and/or sent in each desired direction may be saved into a sound bank, which may be implemented using any suitable form of digital memory. Alternatively or additionally, sounds may be provided from a live signal. Beam steering algorithm may be designed to steer multiple sources in different directions, simultaneously, since system may be configured to manage multiple input signals, where each input may require the entire beam steering mechanism to be instantiated.

In embodiments, and continuing to refer to FIG. 14, output capability may accomplish a maximum output capability of 140 dB SPL peak (128dBSPL Rms) or more (full bandwidth) at 30 m distance (98 ft) when 3 beams are shot in −20, 0 and +20 degrees, simultaneously or quasi simultaneously. This output capability may be rated for short period of time <=10 Seconds. Output frequency response may range from approximately 450 Hz to approximately 7.5 kHz when measured at 1 m, with deviations from flat to be held to within +/−6 dB, specifications listed below. System 1400 may be able to be steered both horizontally and vertically. Steering capability may reach+/−30 deg on both planes for the vocal range f=<3000 Hz. Fully steerable bandwidth may expand increasingly a 3000 Hz limit when steering angle is less than 30 degrees. Steering capability may include a capability to manage multiple beams (up to 3) in different directions and with different sound sources. System may be able to sustain the maximum power handling continuously for at least 120 seconds, followed by a maximum off period of 7.5 seconds, for a total event duration of 15 minutes, without suffering thermal or electrical load problems. Available maximum output capability may be reduced accordingly as per occurring thermal and dynamic power compression. Protection limiters may also be set in order to reduce diaphragm fatigue and potential breakout.

In an embodiment, and still referring to FIG. 14, system 1400 may be able to play multiple audio stimuli concurrently in "cones" of sound opening from a port to a few meters, which can aim to different locations in a subject area and/or space. A plurality of such cones and/or beams of sound may be projected simultaneously. For instance, if there are 8 users system 1400 may be able to create a beam focused on each of them. Apparatus may be able to select the most aggressive subjects and send them tailored messages referring to identifying features. Beams may be spaced apart sufficiently such that a beam on a subject drowns out a beam that is not on the subject: if one source is 10 dB louder than another subject will be unable to hear the other sound. As a result, subject may only hear the sound pointed at that subject. Thus, apparatus may be able to present distinct stimuli to each person, or different sounds at different spots for the same person. In some embodiments, people may react most aggressively in terms of fear and anxiety if they are not sure where the sound is coming from. System 1400 may have the ability to deliver specific information and/or payloads we can deliver with a TTS engine and or create multiple channels placed in different locations to create "holographic" acoustic imagery, for instance placing different audio stimuli at different locations relative to a subject as described in further detail herein.

With continued reference to FIG. 1, deterrent component 152 may include an electric shock or Human Electro-Muscular Incapacitation (HEMI) device 168. Electric shock or HEMI device 168 may include a "stun gun" and/or taser, which may, for instance be able to fire two or more cartridges up to 25 feet, as in a taser area denial system (TADS). Alternatively or additionally, shock device may be used to electrify one or more objects or surfaces to generate a shock upon contact or near approach by a user. Alternatively or additionally, shock and HEMI device may use generated plasmas, electric fields, ionization, and/or other methods to convey a neurostimulation to the subject from a distance.

With further reference to FIG. 1, deterrent component 152 may include one or more sources of noxious smells and/or other chemical deterrents 172, such as pepper spray, "skunk" or malodorant weapons, tear gas, pacifying agent, pepper balls, chemical darts, or the like, which may be squirted out of nozzles in liquid, vapor, and/or gaseous form, or fired as projectiles that break open and/or otherwise disperse such irritants. Chemical deterrents may further take a form of a sticky and/or slippery substance released onto a walking surface to make proceeding and/or aggressive motions more difficult. Further deterrents may include paint balls, pepper balls, air bursts, electronic darts, chemical darts, or the like.

With further reference to FIG. 1, deterrent component 152 may include one or more sources of entanglement device 176, such as, but not limited to, nets, bolas, and/or other entanglement or entrapment devices that are launched ballistically at the subject 207 in order to limit or stop the subject's 308 ability to move normally. The deterrent component 152 may use the processor 136 and imaging devices 104 to calculate and predict, based on the distance and movement of the subject, in addition to the ballistic properties of the entanglement device, a corrected point of aim to launch the entanglement device.

With further reference to FIG. 1, deterrent component 152 may include one or more sources of obscurant delivery system 180, such as, but not limited to, methods to obscure the vision or other senses of the subject 308. For instance, and without limitation, these may include biodegradable fog generators, smoke generators, and/or water mist generators. The effect can be further enhanced by illuminating the obscurants with light sources from the deterrent component 152.

With further reference to FIG. 1, deterrent component 152 may include one or more sources of blunt force or kinetics delivery devices 184, such as, but not limited to, bean bag round launchers, stingballs, non-lethal grenade or payload launchers, water cannons, air cannons, and/or other methods to deliver non-lethal kinetic effects to the subject 308.

With further reference to FIG. 1, deterrent component 152 may include one or more sources of marking delivery device 188, such as, but not limited to, paintball launchers, dye sprayers, paint sprayers, malodorant launchers, and/or other methods that will optically, odorant, or other senses tag a subject 308 for later identification. This can include dyes that are visible or non-visible to the human eye that require special lighting or other methods to detect at a future time. In addition, the dyes, paints, and/or markers may be formulated to make removal extremely difficult. Digital "marking" using light and/or augmented reality output may alternatively or additionally be used.

With further referring to FIG. 1, deterrent component 152 may include one or more sources of electromagnetism and/or electromagnetic deterrents. As used in this disclosure an "electromagnetic deterrent" is a deterrent that emits a high-powered electromagnetic wave. For example, and without limitation, electromagnetic deterrent may emit a 95 GHz wave towards a subject. As a further non-limiting example, electromagnetic deterrent may emit a wave comprising a wavelength of 3.2 mm. As a further non-limiting example, electromagnetic deterrent may include one or more sources and/or deterrents that penetrate the top layers of the epidermis of a subject, wherein the penetration is absorbed within 0.4 mm of interacting with the epidermis. In an embodiment, and without limitation, electromagnetic deterrent may be oriented along a turret and/or actuator, wherein electromagnetic deterrent may be rotated and/or shifted as a function of the subject. In an embodiment, and without limitation, electromagnetic deterrent may be rotated and/or shifted as a function of localizing the target to a subject's physiological tissues that are susceptible to the electromagnetism such as, but not limited to, nose, lips, eyes, ears, and the like thereof. In an embodiment, and without limitation, electromagnetic deterrent may be rotated and/or shifted to interact with a plurality of reflectors such that the electromagnetic wave may be aimed and/or controlled after the electromagnetic wave is emitted from electromagnetic deterrent.

Still referring to FIG. 1, processor 136 is configured to select a mode of first deterrent mode and second deterrent mode as a function of the behavior descriptor. Each behavior descriptor may be associated in a database or other memory of and/or accessible to processor 136 with a deterrent mode and/or deterrent action as described above. For instance, a lowest behavior descriptor, such as a behavior descriptor associated with a person entered in a "friendly file," a resident of a house to be protected, an employee engaging in actions within a scope of employment thereof, or the like may be associated with no deterrent response. A behavior descriptor corresponding to an accidental and/or casual trespasser may be associated with a startle action and/or other warning deterrent such as an audio output directing subject 308 to leave subject area, stop engaging in an action, or the like. A behavior descriptor corresponding to persistent trespassing and/or some initial aggressive behavior may be associated with a more stringent deterrent, such as a glare action, louder and/or more unsettling noises, strong smells, or the like. Extremely aggressive behavior and/or presence of a blacklisted subject 308 may be associated with stronger responses such as afterimage, saturation, and/or strobe actions, electric shock, disorienting sounds, or the like. Processor 136 may command the directed light deterrent 156 to perform an action of the first deterrent action and the second deterrent action as a function of the mode.

In an embodiment, and further referring to FIG. 1, one or more types of deterrent may be combined simultaneously and/or sequentially to create a flanking effect. For instance, optical deterrent actions may be combined with startling noises and/or commands to vacate subject area and/or cease one or more activities. Alternatively, if subject 308 has recently had vision temporarily impaired, directional audio outputs may be used to urge subject 308 toward an exit and/or to increase disorientation of subject 308.

In embodiments, and still referring to FIG. 1, two or more deterrent modalities may be coordinated using timing to compensate for different deployment speeds. For instance, sonic deterrents may take longer to deploy than optical deterrents. To compensate for this, in an embodiment, directed light deterrent 156, and or other light-based deterrent or radiation-based deterrent devices may have a built-in delay whereby circuitry driving such devices uses a timer to wait so as to coordinate output with associated sonic outputs. As a non-limiting example, it may require 2-10 milliseconds for a high sample rate in the order of 16K to be routed through most computer DSP platforms. Furthermore, sound propagates at a lower rate of velocity through air than light; thus a delay built into a directed light deterrent 156 or other optical or radiation-based deterrent may also account for the difference in propagation particularly for entrances who are at a greater distance from apparatus 100. In an embodiment, and without limitation, two or more deterrent modalities may be a light deterrent and a directed sound source, wherein the directed sound source emits a non-lethal sound such as a firing noise and/or emission noise, wherein the light deterrent interacts with the subject. As a non-limiting example, a directed sound source may be emitted such as a gun fire, wherein the laser interacts with the subject. In another embodiment, and without limitation, a deterrent of the two or more deterrent modalities may be modulated as a function of the intensity of the two or more deterrent modalities. For example, and without limitation, a directed sound source may be louder and/or softer as a function of the intensity of a laser that is emitted. As a further non-limiting example, a light may be brighter and/or dimmer as a function of an intensity of an electromagnetic wave. Additionally or alternatively, two or more deterrent modalities may identify one or more directions as a function of landmarks of the body. For example, a landmark of a subject's eyes may be visible, wherein processor 136 may determine the location of a landmark of a subject's ears, wherein apparatus 100 may direct one or more deterrents to the location of the determined location of the landmark of the subject's ears. As a non-limiting example, a sizzling or other heat-associated noise may accompany pain ray, while "blaster" noises may accompany directed light deterrent output, or the like Still referring to FIG. 1, deterrent effect of a directed light deterrent and/or other deterrent may be designed to escalate in intensity in response to escalations in behavior and/or reduction in distance from subject to item to protect. Thus, as a non-limiting example, intensity and/or a strobing and/or pulse frequency of light from directed light deterrent 156 may be varied according to a distance between apparatus 100 and subject 308. As a non-limiting, illustrative example, a pulse frequency may be configured to be 8 Hertz at 20 feet of distance, 10 Hertz at fifteen feet of distance, 15 Hertz at 10 feed of distance, and/or 20 Hertz at 5 feet of distance. Bursts of light from directed light deterrent 156 may alternatively or additionally increase in length and/or intensity with closer approach, as permitted by MPE and/or other safety considerations as described above. Alternatively or additionally, bursts and/or pulses may increase in frequency while decreasing a duty cycle so that there is no increase in power delivered and/or a smaller increase in power than would otherwise occur. Similarly, outputs from audio output devices such as directed sound source 164 may increase in frequency, volume, aggressiveness of content as subject behavior and/or proximity escalates.

Further referring to FIG. 1, a sequence of escalations related to behavior descriptors may begin at a point along sequence selected by an initial behavior descriptor determination; for instance, an initial point for a subject showing low aggression, and/or a subject initially entering with a high temperature, may be a quick flash of light from directed light deterrent 156 and/or an audio warning such as "back up," or "please do not enter" at an ordinary speaking volume, while an initial point for a subject running into subject area, brandishing an object, or otherwise representing a more aggressive profile may include a more aggressive initial response such as a startle, glare, and/or saturation response, a strobing or other pulsing at some rate along an escalating scale as described above, a loud, startling, and/or aggressive noise, an emission of a chemical deterrent, and/or an electric shock, depending on a degree of aggression determined. In an embodiment, and without limitation, an audio warning may include one or more unique and/or recognizable tones. For example, and without limitation, unique tones may denote one or more tones associated with a stern, commanding, authoritative, and the like thereof tone. As a further non-limiting example, unique tones may include one or more famous tones such as law enforcement, military personnel, celebrities, actors, singers, and the like thereof. In another embodiment, and without limitation, audio warning may include one or more instructions and/or commands such as directions to leave and/or conduct a behavior. For example, and without limitation, audio warning may denote "hey you with the watch and the glasses, drop the backpack or leave," wherein the audio warning may further denote a specific deterrent and/or action that apparatus 100 may perform should the subject not head the audio warning.

In an embodiment, and further referring to FIG. 1, text to speech can use machine-learning models, neural networks, or the like that are trained using training examples including voices of particular persons, to imitate those voices; so trained, such elements may enable apparatus 100 to generate text to speech output imitating such voices, using ranges of expression and/or volume, or the like. Apparatus may have enough resolution to look where a subject is in a room, what the subject is wearing, and the like, and then generate text, and thus speech, referring to such characteristics, such as without limitation "hey you with the watch and the glasses, drop the backpack or leave." This may have the effect of imitating a human being such as a police officer, creating an illusion that security personnel is present. In an embodiment, imitation of voices may include imitation of prosody, intonation, raised voices, different emotional expressions, or the like. Given enough samples from a voice as training examples, a machine-learning model and/or neural network may be used to transfer text into voice output that has various levels of expression, or the like. For instance, a text output may be generated having a given expression or intonation, such as an angry, authoritative, or other voice.

Still referring to FIG. 1, two or more deterrent modalities may be coordinated using timing to denote a location and/or direction of the deterrent. For example, and without limitation, a first directed sound source may denote that a laser and/or electric shock may originate from a first location, wherein the laser and/or shock is then subsequently emitted from the first location. As a further non-limiting example, a first directed light deterrent may illuminate a location and/or area wherein the location and/or area may emit a deterrent of the plurality of deterrents.

In an embodiment, and still referring to FIG. 1, apparatus 100 may output deterrents in various different combinations. Each combination may include a distinct combination of deterrent outputs, including without limitation different combinations of deterrent types such as light, audio, electromagnetic, chemical, and/or other types, as well as different deterrent output types within deterrent types, such as different colors and/or patterns of light, different sounds such as vocalizations, instructions or the like, different orders of output, and/or any other combination of variations that may occur to a person skilled in the art upon reviewing the entirety of this disclosure. In an embodiment, apparatus 100 may track past deterrent output used with a particular subject, and produce outputs that differ from past outputs and/or emulate a maximally effective past output. Alternatively or additionally, elements of deterrent outputs may be selected randomly from various possible choices. In an embodiment, this may prevent subject from becoming acclimatized to any particular deterrent combination, retaining a deterrent effect of deterrent combinations that are output.

Still referring to FIG. 1, deterrents from any one deterrent component and or any combination of deterrent components may fall along a spectrum from low severity and or warning level responses to higher severity or stronger responses, along which spectrum responses may escalate, for example as subject comes closer to an item to protect, fails to vacate secure area, or becomes more aggressive, among other examples. In an embodiment, and without limitation, a spectrum response may be monitored as a function of a servo feedback such as a microphone and/or imaging device that measures one or more audio signals and/or visual signals from subject 308 and identifies the response of subject 308. As an illustrative example, a subject who walks into subject area at a time in which people are not permitted in subject area may initially receive a verbal warning to vacate the area, delivered at an ordinary speaking volume; if the subject persists in remaining in subject area and or proceeds further into subject area and trend may receive a louder or more strongly worded warning, which may for instance be accompanied, for instance, with a flash or startle action from directed light deterrent. If subject proceeds still further, or if at any point in time begins to behave aggressively, or to brandish a weapon, and response may be stronger still, such as a glare, a very loud noise, a burst from the microwave source, or the like. Strong microwave bursts, electric shock, or extremely loud noises may be used for an especially aggressive and/or persistent subject. In an embodiment, and without limitation, a first low severity deterrent may include an electronic gate and/or light curtain, wherein a subject is refused entry to one or more subject areas. In another embodiment, and without limitation, electronic gate and/or light curtain may be outlined and/or presented to subject 308 to at least denote an exit path and/or safety route. Alternatively or additionally, laser writing and/or pictures on surfaces may direct subject and/or other persons to inform them which way to move. Electronic gate technology may be used, without limitation, at vehicle checkpoints.

Still referring to FIG. 1, in embodiments, apparatus 100 may operate as an intelligent gate, which may alternatively be referred to as a "smart gate," which can keep out people who are not authorized to enter, while allowing people who are authorized to enter, or people identified as their guests, to enter the gate. Intelligent gate may simultaneously let through people who are authorized to enter while interdicting those who are not. In some situations because of this ability, intelligent gate may enable someone to enter instantaneously while providing them with a level of protection commensurate with a physical gate. In other words, this gate may enable someone to flee a potential pursuer or other difficult situation by running straight through the gate as if it was wide open while the gate behaves as if it were closed uptight for a person who is not meant to enter. In some situations, this means that smart gate does a superior job of protecting the persons, objects, and property that it is meant to protect.

Continuing to refer to FIG. 1, smart gate may use any processes described in this disclosure to determine who is to be admitted and who is to be excluded. For instance, smart gate may have a whitelist or friend list describing persons who are generally authorized to enter through smart gate and/or who have been authorized temporarily to enter their end temporary authorization may be timestamped and may be associated with a time limit which may be expressed in any unit of time and counted down using a watchdog timer references to external time sources, such as network-connected sources, or the like. Friend list may be updated dynamically; for instance a person who has been recognized as on the friend list may be able to indicate that another person who is with them is also on the friend list using a gesture, a word, or any other suitable means of communication, which gesture, word or the like may be recognized by apparatus 100. In some cases, a person on a friends list may not be authorized to designate another friend. In other words friends list may have more than one level of entry, which may be which may distinguish between people who are on the friend list either permanently or temporarily, and people who are on the friends list and capable of introducing other people. Status on a friend list that may be time limited may include status that enables a person to designate other people who are on the friend list. Smart gate may recognize a person as being on friend list in any suitable manner, including using facial recognition, behavior or other classifiers, or any other means that may be used to distinguish one person from another person. Alternatively or additionally, smart gate may use voice recognition to identify a person as being on \ friend list, or may accept a verbal and/or written authorization password or code from a person. Verbally submitted passwords or codes may be converted to text using speech to text processes as described elsewhere in this disclosure. Alternatively or additionally, system may use biometric authentications, which may include any fingerprint retinal scan or other biometric data. As a further non-limiting example, smart gate may use communication with a computing device, such as a mobile phone and/or smart phone, on the person of a user to identify the bearer of that device as being on a friend list.

Continuing to refer to FIG. 1, intelligent gate may also operate a blacklist or excluded persons list. This may include people who have been specifically identified by name, and/or by appearance, or any other indicia of past interactions. In an embodiment, a person who is not on friends list but who is detected as behaving in an aggressive or otherwise problematical manner, for instance by behavior classifier, may be added to a blacklist and excluded until such time as they are removed. Membership on a blacklist may be revoked, as may membership on friends list, by persons who are on the friends list, and who have authorization to provide such revocations and/or changes to other people/status to the smart gate and/or apparatus.

In an embodiment, apparatus and/or smart gate may use any means and our process of interdiction as described in this disclosure to exclude persons who are not permitted to enter smart gate. For instance, a directed light deterrent may be aimed at, and potentially only at, persons who are to be excluded while avoiding targeting persons who are not excluded. This may be performed using any masking and/or targeting processes described herein. Likewise, directed audio deterrents may be directed at persons who are excluded informing them that they are not allowed and/or producing noises of sufficient volume to deter them. Pain rays, and/or microwave energy sources, as described in this disclosure, may be used to exclude people who are not authorized to enter as well. Any or all of these processes and/or devices may be combined solely to focus on a person who is to be excluded while avoiding harming or deterring a person who is allowed to enter.

In some embodiments, and continuing to refer to FIG. 1, a person who is allowed to enter smart gate may be provided with instructions, visual indicators such as arrows and/or signs drawn on the ground or on other surfaces using directed light deterrent, audio cues informing them which way to go, light curtains guiding them along a path, indicators guiding them along a path, or the like; for instance and without limitation a voice output directed at a person who is permitted to enter gate may direct that person to lie down, to run forward, to move to one side or the other, or otherwise in order to aid smart gate in interdicting a person who is not permitted to enter and to aid the person who is permitted to enter in avoiding interdiction and an unwanted visitor who is to be interdicted.

Still referring to FIG. 1, smart gate may alternatively or additionally include a physical gate, which may be automatically operated using one or more actuators, motors or the like, and may be activated to close when a person who is permitted to enter the gate has passed through the threshold, while a person to be interdicted remains outside. In this case an ability of apparatus to buy time while waiting for backup or other additional resources to be deployed may be used to give a person time to enter the smart gate while excluding other people until such a time as the smart gate may engage a physical barrier to prevent further entry. Physical barrier may alternatively or additionally automatically open to allow entry or escape of a person who is permitted to pass through smart gate.

In an embodiment, and with continuing reference to FIG. 1, smart gate may have emergency override functions. For example, when there is a fire alarm, smart gate may be designed to prevent all persons to evacuate property that is guarded by smart gate, while permitting any persons who may be entering the property to fight a fire to enter through the smart gate, whether they are currently on our friends list or not. Alternatively or additionally, smart gate may use visual, behavioral and/or equipment classifiers to determine whether a person attempting to enter the smart gate during an emergent situation is likely to be law enforcement, search and rescue, firefighters, or other personnel who can help in the crisis. Alternatively or additionally, persons who are authorized to help in emergencies may be identified on a friend list, or maybe given pass codes, transponders, or applications on mobile devices, that can be used to signal to the apparatus that those persons should be permitted to enter.

In some embodiments, and still referring to FIG. 1, smart gate may be programmed to identify situations that require human intervention. For instance, where a person who is not permitted in smart gate is especially persistent, or engaging in passive noncompliance, smart gate may signal a human, such as without limitation a person from their friend, a person who is within the property, and/or a security worker, as identified using any of the systems center modalities for identification of people as described above or the like to enable such a person to override and or further instruct smart gate to deal with a situation. Likewise, smart gate may be able to identify when it is unable to identify a person, for example when identification of a person has is associated with a confidence level below a given threshold. In such a situation, smart gate may provide a video feed to a device operated by a user on their friend list, security personnel, or the like permitting that person to make a decision regarding whether a person that smart gate has been unable to identify is to be admitted.

In some exemplary embodiments, and still referring to FIG. 1, smart gate may have a mode in which it operates to regulate guests to an event. For instance, smart gate may be designed to have a friend list that is specific to the event, a list listing people who are permitted to enter, and/or times at which different parties are permitted to enter. Smart gate may, for instance, inform a person who is trying to enter before the time of their reservation that they are excluded and/or that they have to wait until their entry is permitted. Smart gate may have a number of very gradually escalating prompts to provide to a person who is attempting to enter early, and or late, to an event so as to avoid especially harsh interdictions of person who is a potential customer, if not currently permitted to attend a particular event. Similarly, a person who is behaving especially belligerently, inebriated, or persistently attempting to quote crash and quote an event to which they are not invited, may be submitted may be subjected to more severe interdiction, such as startle, glare, or other outputs directed by the eyes, use of the microwave pain ray, and/or use of especially loud noises or threats of violence.

Still referring to FIG. 1, smart gate may, in some embodiments, be configured to guide persons to events to which they are authorized to attend. For instance, smart gate may use light curtains, audio indicators, and/or any visual indicators to guide persons to an event they are permitted to attend. In an embodiment, smart gate may use directed light to provide a spot or other indicator that a particular person is authorized to follow. For instance, indicator may have a color specific to a particular person, and/or may list their name or other identifying information. Where there are a plurality of apparatuses in a venue, each apparatus may receive from another apparatus a location and/or status of a person who is to be guided, as well as the particular indicator which is meant to guide that person, so that as the person moves from a range of one apparatus to a range of another down a hallway through a corridor through a series of rooms or the like; apparatus acting as a mesh network may be able to continue to guide the person along their prescribed path. Light curtains and/or other visual indicia may also be used in a similar fashion. System may warn a person who is straying from their designated path that they are entering dangerous or unauthorized areas, such as areas designated for different parties than one to which they are to attend, and or areas where construction or other activities that could endanger them may be taking place. Likewise, indicators and/or any level of interdiction may be used to prevent a person from accidentally or intentionally entering into areas operated by venue personnel and not accessible to the public, such as kitchens, orchestral pits, stages, or the like Still referring to FIG. 1, embodiments described above may be extended to other situations; for instance, where construction is taking place, apparatus may indicate safe paths for people to travel when not wearing protective equipment, and/or may generally interdict and or warn off persons who are attempting to enter an area without protective equipment. Image classifiers may be used to detect whether someone is wearing correct protective equipment in a construction area, or when about to enter it. For instance, where hearing protection, head protection, and/or visual protection is required in a given construction area, to prevent, for instance, hearing loss, head trauma, and/or damage to the retina's from welding equipment or the like, system may inform such people that they are not permitted, attempt to interdict them from entering using any form of interdiction described in this disclosure, and/or transmitted message to security personnel and/or other persons working in the construction zone to prevent entry of the unprotected and or unauthorized person.

As a further non limiting example, and still referring to FIG. 1, smart gate may be used to exclude from a stage area persons who have not been permitted onto the stage, for instance during a concert such as a rock concert. Apparatus 100 may be configured to detect when a person who is on a stage, such as a performer, has invited a particular person onto the stage. For instance, where a performer is inviting a member of an audience to come up onstage, such performer may be able to indicate with a gesture a word or the like that a particular person is permitted on the stage. This may operate in any of two ways the first, is by indicating that a particular person is permitted to enter on the stage. In some cases, apparatus may cast a light on that person, for example on their chest, and await a verbal or other confirmation such as gestural confirmation by a performer that the person is permitted onstage. As an alternative, apparatus may suspend interdiction functions for a short period of time upon indicated by a performer, relying on security personnel to maintain order while a particular person is allowed by security personnel to enter the stage.

Still referring to FIG. 1, apparatus 100 may have an interlock safety system 192, that consists of one or many safety features that use sensor and other data to determine safety of the system. This may include, but is not limited to, laser energy measurement devices, scanning mirror movement detectors, power usage, distance measurement, "trip wires," disturbance sensors (e.g., subject 308 physically shakes apparatus 100), enclosure opening, current or voltage monitors, microwave/MMW energy sensors, microphones, accelerometers to measure projectile velocity, pressure sensors, and/or other methods to detect safety or efficacy of the system. The processor 136 in analyzing this data may use interlocks to interrupt deterrents in order to prevent injuries, violations, or other negative consequences. This may be accomplished with methods, such as, but not limited to, optical shutters, filters, attenuators, power switches, physical interruptions, current/voltage limiters, and/or other methods to inhibit the performance of systems or subsystems to maintain safe operating parameters.

Still referring to FIG. 1, apparatus 100 may have a battery, 196, which may act as a primary power source and/or as a backup power source to provide additional operating time if power is interrupted to the system. Battery may include one or more battery elements in parallel and/or series configured to provide power components of apparatus 100. For example, battery may include one or more lithium-ion batteries, alkaline batteries, lead-acid batteries, aluminum-ion batteries, flow batteries, magnesium-ion batteries, metal-air electrochemical cells, nickel-ion batteries, zinc-ion batteries, or any combination thereof, to name a few. According to embodiments, battery may include an alternative power source such as an alternating current ("AC") power source, direct current ("DC") power source, power over ethernet (PoE), a solar photovoltaic cell, a wind turbine, or any combination thereof, and/or power electronics such as a half-bridge rectifier, full-bridge rectifier, inverter, maximum-point power tracker, power converter (such as a buck converter, boost converter, buck-boost converter, flyback converter, transformer, etc.), or any combination thereof, to name a few. According to embodiments, battery may be configured to provide power to one or more elements of apparatus as described in further detail below. This may be accomplished using power management circuitry including, for example, a power microcontroller, switches, relays, transistors, linear regulators, power converters, or any combination thereof, to name a few.

In an embodiment, and still referring to FIG. 1, apparatus 100 may be configured to perform a training protocol. As used in this disclosure a "training protocol" is a method and/or scenario that allows an individual to track and/or follow a projectile as a function of a plurality of emitted deterrents. For example, and without limitation, law enforcement may enter a subject area, wherein a light directed deterrent is emitted at a location, wherein the law enforcement fires a projectile towards the location at which the light directed deterrent is directed. Apparatus 104 may emit a plurality of deterrents to signal a location at which the projectile interacted with the location and/or to signal a location at which the projectile missed the location. For example, and without limitation, apparatus may project a target and/or point on a wall, wherein a golfer may hit a projectile towards the target, and wherein apparatus may utilize light radar component 116 to identify a distance at which the projectile missed the target and/or point on the wall. In an embodiment, and without limitation, apparatus may track one or more projectiles located within subject area. For example, and without limitation, a golfer may hit a golf ball, wherein apparatus 100 may track and/or identify a plurality of projectile elements. As used in this disclosure a "projectile element" is an element of datum associated with a projectiles kinematics. For example, and without limitation, apparatus 100 may track and/or identify a golf ball's velocity, spin, launch angle, landing angle, peak height, and the like thereof. In a golf context, apparatus may be able to tracks where the balls went. Apparatus may track everything there is about a golf ball, golf shot, and perform shot-by-shot analytics. Detection directions from which a projectile and/or shot has emanated may include detection of sound pattern to detect whose gun just fired by tracking and/or detecting a "crack-bang" noise of a shot, sensing a muzzle flash, or performing millimeter-wave detection of bullets.

Further referring to FIG. 1, apparatus 100 may be configured to determine a source of a projectile and/or beam. For instance, and without limitation, imaging device may be used to determine a trajectory of a bullet or other projectile. Apparatus 100 may determine a source of a bullet, projectile, or the like, where a "source" is a location and/or device from which the bullet, projectile, or the like may have been fired, launched, or the like. Apparatus 100 may determine a terminus of the bullet or other projectile, where a "terminus" is landing point, target, and/or endpoint of bullet or other projectile. Apparatus 100 may use a visual or other indicator to indicate a trajectory, source, and/or terminus of a bullet and/or projectile; for instance, and without limitation, apparatus 100 may use directed light deterrent to place a dot or other marker illuminating a source, target, and/or one or more points along a trajectory and/or a projection thereof on one or more physical surfaces; for instance markers along ground, buildings, walls, or the like may illustrate trajectory, while a spot, marker or the like may indicate a source and/or a location nearby. This may be performed, without limitation, in an "active shooter" and/or combat situation, permitting a user to locate an origin of bullets and/or other projectiles, and thus identify choices for cover, and/or target a source, or the like. Apparatus 100 may alternatively or additionally emit one or more deterrents at source. Use of a marker to highlight persons and/or items may include use of the marker to highlight one or more persons behaving erratically and/or problematically, such as two persons engaging in behavior indicating mutual aggression and/or a likely impending and/or current altercation, a person who has engaged in any potentially criminal and/or harmful behavior, harassment, sexual harassment, or any other person who may be behaving in a problematic manner in any way that may occur to persons skilled in the art upon reviewing the entirety of this disclosure. As a further non-limiting example, a group of soldiers, marines. Or the like in an urban environment who are pinned down by a larger force may each have an apparatus that they stake into the ground; apparatuses may be meshable, so they communicate with each other, and may perform one or more actions as described herein, for instance blinding people who are trying to target combatants while also informing them of antagonists' positions, providing targeting data, or the like. Apparatus 100 may place a "scope" spot, such as with a red laser, on a selected target, where target may be selected according to any threat-assessment and/or prioritization protocol as described herein. Scope spot may alternatively or additionally be in an invisible wavelength which may be visible in goggles or other displays visible to a user of apparatus 100. Apparatus may alternatively or additionally be provided with and/or store data describing one or more mission objectives. For instance, where apparatus when a mission objective includes finding a particular person, object, or building, apparatus may use image classification to aid in identification thereof. Similarly, apparatus 100 may identify routes and/or hazards along routes, and may provide guidance for combatants to traverse such routes.

In some embodiments, cameras and/or imaging devices of apparatus may be used to detect threats and act on them, such as a person using a laser pointer to blind cops, vehicle operators, other cameras, or the like. Apparatus may track people using a threat and/or laser pointer and/or may determine which group of people is to be protected, and which group is using threats such as without limitation laser pointers on them. Apparatus may then disrupt and/or track an identified malefactor, for instance using video handing off information to people that need to know, visible or IR laser pointer on the malefactor follow them in crowd, and/or use of any countermeasures described herein to disrupt malefactor's use of pointers and/or other harmful measures. Similar methods may also track people that may use mace or tear gas sprays, paintball guns, or the like, for instance using source identification as described in this disclosure.

Alternatively or additionally, and still referring to FIG. 1 apparatus may identify situations where apparatus and or combatants are unable to respond to hazards and are enemy combatants that present themselves. For instance, apparatus may use projectile detection to determine that a threshold number of projectiles are incoming, or that a number of incoming projectiles exceeds outgoing projectiles from combatants using apparatus by some threshold amount, indicating that combatants may be outnumbered. Apparatus may automatically open a communication channel to a command center and/or to backup forces permitting combatants to call for help, and/or may actually transmit such a call for help automatically. Apparatus may also use targeting and/or source detection protocols to transmit information to a complementary force such as a drone, Air Force air support, or the like, permitting an airstrike or other targeted action to be performed against an enemy combatant that has been identified.

In an embodiment, and continuing to refer to FIG. 1, apparatus may alternatively or additionally interfere with enemy combatants' ability to engage compounds, for instance by obfuscating or making more difficult one or more senses of the enemy combatants. This may be performed using dazzle and/or glare effects with light, and/or may include generation of sound at a sufficient volume at the location of enemy combatants to interfere with communication there between. This may be used to decrease the combat efficacy of enemy combatants and provide combatants with an ability to get an upper hand, may be used to provide "cover" to combatants so that enemy combatants may temporarily be engaging apparatus at first location while combatant move into a second location to outflank or otherwise outmaneuver enemy combatants. Alternatively, apparatus 100 may use any or all interdiction techniques described herein to protect and or provide cover for combatants that are attempting to evacuate, or retreat from enemy engagement.

Figure 15:
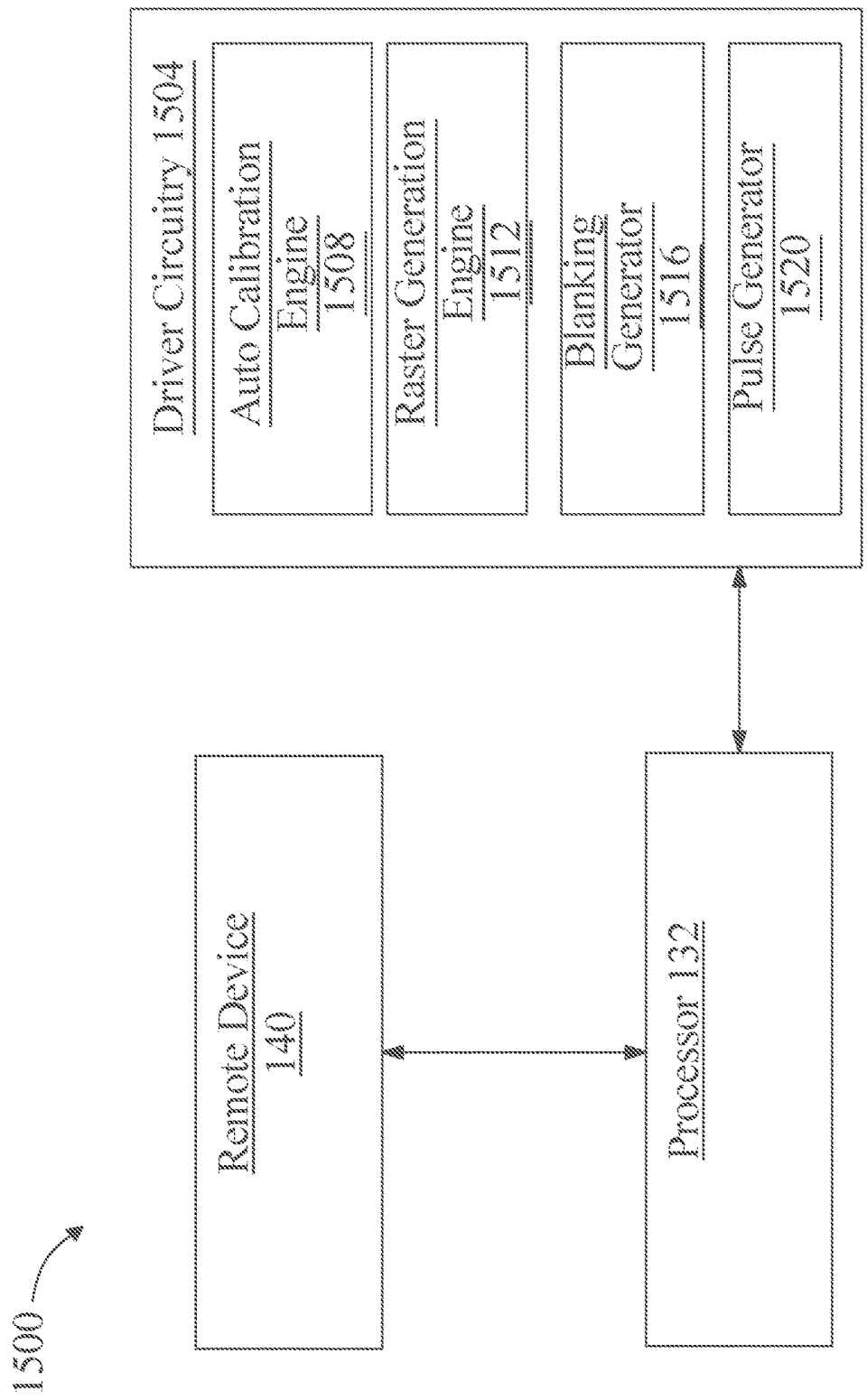
FIG. 15 is a schematic diagram illustrating an embodiment of architecture of automated threat detection and deterrence apparatus.

Referring now to FIG. 15, an exemplary embodiment 1500 of an architectural layout for apparatus 100 is illustrated. Driver circuitry 1504 which may be used to direct timing and synchronization of optical devices such as directed light deterrent 156, light radar device, and or Sonic or other deterrent devices, may be rendered using hardware programming such as without limitation ASIC, microcontroller, and/or FPGA designs. Such circuitry may perform scan timing, modulation, and intensity settings, including without limitation pulse on and off timing for directed light deterrent 156 within one or more electromagnetic bands, including, but not limited to, visual light, as described above. Intensity, pulse-width, pulse frequency, and/or x/y reference coordinates and/or ranges may be by inputs from processor 136 as determined according to behavior descriptor determinations, deterrent selections, detected and/or predicted locations of a subject 308 and/or one or more anatomical features such as without limitation visual band, or the like.

Still referring to FIG. 15, driver circuitry 1504 may perform scanning commands for directed light source (laser), microwave ray, sonic aiming, setting of intensity, and/or focal length, or the like. Driver circuitry 1504 may record ToF detections and/or timing, ToF edge detection, retinal retroreflection, optics detection, or the like. Driver circuitry 1504 may update scanning ranges without processor 136 input based on detected changes in edge position and/or object position based on ToF measurements or other sensor measurements; processor 136 may further process and/or correct scanning ranges and override initial changes, permitting a very rapid response to be tempered by data integration, analysis, and/or prediction at a processor 136 level. As a non-limiting example, driver circuitry 1504 for directed light deterrent 156 may include an XY2-100 controller interface, which operates on four differential signals: x position, y position, clock, and sync signals, to govern scanning apparatuses such as galvanometric reflectors or the like, or control non-mechanical beam steering apparatus to point the light or other deterrent sources. Driver circuitry 1504 may further input received sensor signals and/or perform initial signal processing, filtering, or the like. In an embodiment, driver circuitry 1504 may input intensity readings as described above for ongoing monitoring of intensity levels of directed light deterrent 156, which may be relayed to processor 136 and/or remote device 140. Firmware updates may be received from processor 136 and/or remote device 140 to modify driver circuitry 1504, for instance for improvements to tracking, power usage, image and/or signal processing, reductions in power output for MPE limitation, or the like. Apparatus 100 may update coefficients, weights, biases, and/or other elements of any machine-learning model and/or neural network.

With further reference to FIG. 15, driver circuitry 1504 may include, without limitation, an auto calibration engine 1508 for galvanometer or other scanning optics by laser beam firing and computer vision (CV) obtaining location data with relative respect to the imaging device 104. Driver circuitry 1504 may include a raster generator engine 1512 for scanning optics with CV window size, position, speed and number of targets. Driver circuitry 1504 may include a blanking generator 1516 for deactivation of light sources when outside visual band as described above or when not needed. Driver circuitry 1504 may include a pulse generator 1520 for laser voltage current, pulse width, pulse time, strobe effect, or the like. Driver circuitry 1504 may include safety features to limit the power, exposure, or use of the laser should safety thresholds be crossed.

Still referring to FIG. 15, processor 136 may perform actions as described above such as implementation of decision trees 148 or other computational processes for behavior descriptor determination, tracking of individual subjects 308 and/or anatomical landmarks, determination of deterrent response based on behavior descriptor and/or inputs from sensors, imaging device 104, or the like, modification of deterrent response based on detected and/or predicted subject 308 actions, or the like. Processor 136 may perform image generator software, including rendering and/or signaling of raster, words, graphics, or the like for driver circuits. Processor 136 may generate scan timing and intensity settings to be provided to driver circuits.

With continued reference to FIG. 15, processor 136 may receive and/or implement one or more machine-learning models and/or heuristics, for instance for movement trend prediction, classification, or the like. That is, where a machine-learning process produces a model that is relatively compact and/or simple to evaluate, such as a regression model, a vector or other distance-metric based classifier, or the like, the model may be loaded to processor 136 from a remote device 140 and used to generate outputs classifying images and/or behaviors, predicting motion, or the like. Alternatively or additionally, one or more machine-learning processes may be performed on processor 136.

Still referring to FIG. 15, a remote device 140 may perform one or more computationally intensive, and/or memory storage intensive processes and/or tasks, based upon sensory input received from processor 136 and/or driver circuitry 1504. Such tasks may include, without limitation, machine learning processes such as generation of classifiers for image classification, object classification, face recognition and/or biometrics. Remote device 140 may additionally or alternatively be used to perform database look ups and queries, for example queries to databases containing friend lists friend files whitelists blacklists come up or other data describing authorization levels corresponding to identified subjects 308. Remote device 140 may alternatively or additionally perform computer image processing tasks, such as edge detection object detection classification or the like, for instance as described above. Remote device 140 may perform image coordination and or fusion techniques, such as combinations of optical, infrared, and/or ToF imaging data, to produce integrated images having greater accuracy or wealth of information. Remote device 140 may alternatively or additionally collect and store data from disparate apparatuses 100 that are used by different entities. Remote device 140 may then process this data to determine trends, new behaviors, errors, service issues, warranty information, and/or other uses deemed valuable to enhance the performance of the system as a whole, improve user experiences, improve deterrent effects, improve reliability, and/or other benefits.

Still referring to FIG. 15, remote device 140 may and alternatively or additionally communicate with further devices under services, such as cloud services, which may perform, without limitation, cross platform data aggregation and/or analysis, data storage, or other tasks, such as updated safety regulation and/or settings, as well as software, FPGA and/or firmware updates. Find stamps, and without limitation, remote device 140 and or processor 136 may regularly, iteratively, are continuously, update stream and or otherwise provide video, sensor, and other data, to one or more remote services such as cloud services. Alternatively or additionally, processor 136 and/or remote device 140 may be configured to transmit alerts to users, such as silent alarms or other security data that a user may be able to utilize in taking action in response to a perceived or sensed security threat. Remote communication may further be used to contact law enforcement and/or security services which may coordinate their efforts with actions taken by apparatus 100. Security services may be provided with safety equipment and our overrides, so that they made either deactivate responses arrival area, and or maybe a responses by, for instance, eyewear having dichroic lenses or other optical elements to protect security personnel from directed light deterrent 156 actions or the like.

With continued reference to FIG. 15, it should be noted that the above-described architectural distributions of tasks are provided for exemplary purposes only and are not intended to be limiting. For instance, and without limitation, processor 136 may perform one or more tasks described above as performed by driver circuitry 1504, such as scanning timing and order image reception processes. Similarly, processor 136 may perform one or more actions described above as performed by remote device 140, and or cloud services, depending on Computational and are storage resources deployed with or at processor 136. Alternatively or additionally, remote device 140 may perform one or more processes described above for processor 136 and or driver circuitry 1504, for instance using a thin client architecture for many of the tasks to be performed by apparatus 100.

Still referring to FIG. 15, one or more tasks performed by apparatus 100 may be evaluated or overwritten, or else performed by a human in the loop, who may be a user, to whom one or more determinations from above-described processes, threat responses, threat determinations, identifications, or the like maybe provided. User may in turn enter commands, authorizing, overriding, and/or specifying threat responses identifications or the like. For instance, user may include an operator of a security desk, such as a security desk in a school, mall, or other institution, where proprietors may be interested in preventing accidental harm and or distress of innocent persons such as students under customers, it may need or require based upon regulations a human decision maker to be a part of any security response protocol. A human in loop may be provided with an option to engage with lethal force, which may not be enabled without human authorization. In some embodiments during an initial customer deployment, apparatus may be connected to a manned monitoring center. Monitoring center may provide oversight, operational redundancy, communications and/or direct access with a local police department and/or security detail. In some embodiments, manned monitoring centers may be continually or periodically employed, such as with K-12 schools.

Still referring to FIG. 15, two or more apparatuses may communicate, either directly, for instance through wired or wireless communicative connections, and/or indirectly, for instance via remote device 140, or other services, to form a mesh network. Mesh networks may be used to coordinate responses between two or more apparatuses. For instance, two apparatuses in the same subject area may coordinate transmission of directed light deterrent 156 actions, or other actions based upon detected user subject 308 behavior, postures, or the like. For instance, and without limitation, two or more apparatuses may have two or more deterrent light wavelengths which may be deployed concurrently or sequentially in order to add to confusion and/or resistance to eyewear protection as described above. Alternatively or additionally, two or more apparatuses deployed in two or more separate security zones and/or subject areas may coordinate by communicating actions and/or determinations concerning entrance and/or intrusions in such security areas. This may be used, for instance, to determine what ambient light exposure a subject 308 has experienced, which direction the subject 308 has come from, and/or what activity subject 308 may be expected to perform. For instance, where one apparatus 100 has detected aggressive behavior by subject 308, this may be used as an immediate blacklist by other apparatuses, where a subject 308 identified as the same subject 308 entering a new subject area may be immediately responded to with more aggressive responses such as saturation, strobing, electric shock or other responses, on the basis that this subject 308 has been identified as a threat that must be neutralized. Such data may also be transmitted remotely, and sent as updates to security teams, law enforcement, or other users attempting to respond to an ongoing or developing security threat. Such user may use such information to determine a likely current location of a perpetrator and or other subject 308 as well as to formulate or plan a strategy for counteracting the actions of the subject 308 and neutralizing any threat. Two or more apparatuses deployed in the same area may be used to create one or more additional coordinated actions, such as creation of light curtains, to indicate divisions between authorized and unauthorized areas, guide crowd movement, or the light. As a further example, a series of apparatus is may provide directional indicators such as directional images or the like which made direct entrance and our users in Direction Evacuation, or the like.

Still referring to FIG. 15, apparatus 100 may deploy any suitable architecture and/or protocol for intercommunication with other devices. One such architecture may include edge/individual architecture; edge/individual architecture may include a single apparatus. Apparatus may operate in this mode by itself autonomously or semi-autonomously (user defined) with on-board AI. A user my choose whether to get firmware and/or AI updates via "over the air" or through other secure update methods; alternatively or additionally, apparatus 100 may be configured to receive such updates according to a default protocol, which may be factory present or the like. A single system may have no countermeasures, for instance acting similarly to a smart security camera, and/or may have one or more audio, optical, and/or other countermeasures as described in this disclosure under its control. An individual apparatus may store, analyze, and/or archive data, videos, or the like securely for later retrieval, processing; storage may be local and/or may be performed at a remote device, cloud system, or the like.

With further reference to FIG. 15, an apparatus 100 may participate in and/or instantiate on-premise/distributed architecture, in which several individual systems may be networked together to share information, data, models, countermeasures, sensors, or the like; in some embodiments apparatuses in such a configuration may interact with and/or share with other companies' sensors such as without limitation ONVIF enabled security cameras, countermeasures such as automatic vehicle barriers, and the like and/or data recording systems. This may be accomplished using any suitable topology that may occur to a person skilled in the art upon reviewing the entirety of this disclosure.

Alternatively or additionally, and still referring to FIG. 15, apparatus may be deployed in a point to point, bus, hybrid, mesh, or similar network, where each apparatus may be directly communicating to each other apparatus, and/or wherein an apparatus acting as a primary system may be chosen manually by a user or automatically by AI; selection of a primary system may be dynamic. Alternatively, a mesh network may be a network of coequal devices, which may individually and/or in concert react to threats and/or incidents on an event-driven basis.

Still referring to FIG. 15, apparatus 100 may participate in an architecture that is controlled through a centralized topology, such as a star, bus, and/or hybrid network topology, a topology with one or more hub(s) with hubs including a hardware appliance and/or software that runs on a server, or any other computing device as described herein, that collects, amalgamates, processes, and disseminates decisions, data, models, threats, alerts, or the like. A hub may use data from systems a user, customer, and/or proprietor owns; hub may process video, incidents, or the like to share threats across a system and/or network including apparatus 100 so the system and/or apparatuses or other devices therein may coordinate countermeasures, prepare for threats, share countermeasures, or the like. In an embodiment, data may also help improve performance for apparatus and/or network thereof based on outcomes.

Still referring to FIG. 15, apparatus and/or a system incorporating apparatus may be controlled autonomously or semi-autonomously from command-and-control operation centers with people if desired.

With further reference to FIG. 15, apparatus may communicated with and/or participate in a cloud computing architecture and/or system. Apparatus and/or a network thereof may connect to a cloud processing facility that may amalgamate all data, for instance according to a single user's site or two or more user sites, according to a common customer, according to a region, or the like. Cloud processing facility may use this data to process better performance, learn new threats, learn better methods for countermeasures, enhance sensor performance, enhance sensor fusion, or any other improvements or corrections that may be gained from the data. Cloud processing facility may then distribute this back to on-premises and/or edge device across an entire deployment. Human overwatch may be provided from these cloud locations to watch over several systems to provide person-in-the-loop, if desired. Part of data AI and/or apparatus may store may include countermeasure effectiveness, success versus MDE, "waveform", time of day, other recorded conditions, person characteristics (if available) such as age, color eyes, glasses, or the like, and/or any other data that may occur to persons skilled in the art upon reviewing the entirety of this disclosure. Such data may be used to refine countermeasure use. This information may be used locally, on premise, and/or shared in the cloud.

Still referring to FIG. 15, apparatus may be deployed in one or more portable, and or sessile packages, including, without limitation, a handheld device or other non-lethal weapon and/or self-defense device. Devices may be deployed in the form of a portable or projectile device such as a quote flash bang and quote grenade or similar item which means be thrown into subject area to neutralize or surprise potential threats therein. Where apparatus 100 is deployed as a flash bang grenade, certain analytical processes may be performed in a truncated manner or skipped, such as scanning for threat determination Biometrics, or the like. For instance, a flash bang grenade version of apparatus 100 may simply pulse high intensity light from directed light source in various directions to maximize an area of spread, in a strobed or other high intensity pattern, so as to disrupt as many people in an area as possible. Similarly, loud noises may be broadcast in all directions create spread out deterrent effect. As a further example, such a flash bang grenade embodiment may be used to disperse one or more irritants and or noxious smells as described above to further neutralize or clear an area of malefactors.

With continued reference to FIG. 15, apparatus 100 may be deployed in one or more self-contained packages, such as a light bulb, which may be inserted into a conventional light socket, drying electrical power there from, and performing any or all tasks including threat detection threat determination, threat response, communication with other devices in an ash network and our remote device 140, or the like. In an embodiment, device may further function as a conventional light bulb, using one or more lower intensity light sources while surreptitiously, or otherwise nondestructively, performing optical and or time of flight scans of subject area to ensure security is in safety are maintained.

As a further example, and still referring to FIG. 15, apparatus 100 may be mounted to a person and/or other moving object such as a drone and/or robot. For instance, and without limitation, a version of apparatus 100 may be deployed on the person of a police officer or the like who may wear it in a position typically reserved for a body camera. For instance, apparatus may function as a body camera, performing all actions currently performed by a body camera, while also performing automatic deterrent actions as described above. In some embodiments, and apparatus so the deployed system may enable a police officer to remain calm and worry less about protecting the officer's person, while deciding how to respond to various situations that may arise, because the officers on safety may be protected, or at least alleviated by the presence and actions of apparatus. Such deployment may maintain members of the public at a certain distance from the police officer, or otherwise to aid in non-lethally neutralizing any threats posed by an erratically behaving and or aggressive person towards the officer. This additional level of nonlethal protection may, in some instances, prevent the officer him or herself from having to become aggressive, or stressed, as a certain distance and degree of safety may be maintained.

In some embodiments, and still referring to FIG. 15, apparatus 100 may be deployed on the person, or on a vehicle, or both, of a police officer, or a team of police officers. In an embodiment, apparatus may act as a force multiplier for police, by detecting, interdicting, or otherwise aiding in control and prevention of criminal and/or threatening behavior. For instance, an apparatus on the person or near to a police officer may be able to detect potential threats, and/or people who are approaching too close to the officer, that the officer is unable to detect. As another example, apparatus may be able to detect and interdict persons who are behaving in a problematic manner, and who are not and or who are known to be a threat, so as to prevent them from arriving close enough to a police officer to present a physical danger thereto. In this way, apparatus may act to defuse potentially violent situations before they occur.

Further referring to FIG. 15 system where worn on the person of an individual such as an officer or the like may consist of one or more "pucks" positioned on the person to cover fields of view around the person. This may include, as a non-limiting example, a single apparatus mounted on an individual's chest, providing a 90° or so, on the individual's shoulder for a 270° coverage, or front and back providing 360° or similar arrangements to achieve what is needed. Pucks may include any elements described above for apparatus 100, including without limitation one or more of the following, sensors for video, which may be visible, infrared, thermal, or the like, ultrasonic, lidar, radar, acoustic, gunshot, temperature, humidity, inertial measurement unit, gyroscope, or other sensing modalities. Pucks may also optionally have countermeasures built in, such as an optical, acoustical, kinetic, such as sting ball, beanbag, bolo, or the like, neurostimulation Taser, shock, or the like, chemical, such as teargas, mace, pepper spray, indelible ink, or the like, and/or any other countermeasures described in this disclosure. These countermeasures may be steered or not. One pucks and/or a separate device may house a CPU and/or other processor for real-time processing of the sensor feeds. Such as system may be used to watch a user's surroundings, and if the situation warrants, taking the user's position, velocity, surrounding conditions, countermeasure(s) may be deployed as necessary to mitigate a situation, whether it be with another person, animal, drone, camera, or the like. Training may also be provided to a user to take advantage of system; for instance, if an optical disrupter is used on a person charging the user, the user will be trained to step aside to let the person charge past them since they cannot see them. System may also use video to time use of countermeasures to fire at the right time; for instance, if there is a pepper spray countermeasure, system may wait to fire when a target's range, velocity, and position are correct to improve delivery. Another use may include detection of gunshots fired at the user, in which case system may engage the threat with optical or other countermeasures. System may also record video and/or sensor data for later retrieval. This device may give special attention to limitations of a battery powered device and size/weight constraints for it to be on a person. Other systems on other people in the area may be authorized to assist the user or users that are under threat; for instance, an optical disrupter from another user may engage a threat detected by the original user.

Still referring to FIG. 15, apparatus may be mounted to and/or deployed on a patrol vehicle; such a deployment may act as a "guardian angel" device fitted on the vehicle to cover necessary FOVs. Such as system may have one or more sensors, countermeasures, processors, recording abilities as described previously. Since system may be mounted on a vehicle, system may have more power and size and/or weight available for design than a system mounted on a person. Scenarios of use may include when a suspect is pulled over and exits their car with a weapon; in this case system may engage them to disrupt them. As a further example, some people may try to sneak up on a vehicle, and system can hail them and ask if they need something based on their motion, distance, to the vehicle or the like; if they do not respond correctly, system may then engage them with countermeasures. This system may also extend to other vehicles and convoy use, including civilian, government, military, or other uses. For example, for a military convoy, system may provide overwatch as a convoy is traveling. If a convoy is engaged, system may detect threats with appropriate sensors and use countermeasures, such as optical, countermeasures or the like, to disrupt the attack. System may also be used to mark threats visually with a laser or other system for situational awareness. System may be activated for "on the move" and may take into consideration motion of a vehicle it is attached to while analyzing sensors, deploying countermeasures or the like.

Generally, and still referring to FIG. 15, a system deployed in a military and/or law enforcement context may have multiple potential forms including portable, fixed, vehicle-mounted, or other forms. For instance, a portable form factor may be small enough to be carried by a single or multiple people and quickly setup. Such a system may provide overwatch in a temporary location and use sensors to detect threats, which may include without limitation people, animal, drones, surveillance equipment, or the like, and disrupt them. Such a system may have its rules of engagement changed depending on needs and may be near an operator or remote from them, depending on needs. When a threat is detected, system may engage with countermeasures to disrupt the threat. System may be networked, for instance and without limitation according to any networking protocol as described above, and/or used independently. System may possibly share data, command/control, video, or the like across data links, if present. System may also be used to cause diversions or provide communication to others. Special consideration may be given to size, weight, power, and datalinks to ensure the system is portable and useful. System may possibly share data amongst other similar systems or a larger security architecture to enhance its performance by sharing information, countermeasures, data, capabilities, or the like, for instance and without limitation as described above.

Still referring to FIG. 15, apparatus may be provided in a fixed system. A fixed system may include a system that may be fixed to a location to provide semi-permanent or permanent overwatch, such as a building, perimeter, fence, wall, or the like. A system with this configuration may have the capacity to have more power, longer range and/or more countermeasures and sensors, due to increased capacity enabled by lesser need for portability. System may be networked according to any network configuration described in this disclosure. System may be used as a standalone or in tandem with other apparatuses, systems, and/or countermeasures including without limitation any described in this disclosure. System may also use, employ, and/or communicate with systems and/or technologies controlled or operated by other companies.

With further reference to FIG. 15, apparatus may be provided in or on a vehicle; such a deployment similar to a patrol vehicle installation as described above, but may be more military-specific, and may include lethal interdiction options such as ballistic weapons or the like. System may also be fixed to, installed in or on, or otherwise coupled with an aircraft, ship, or the like. System may be used, without limitation, to dazzle incoming aircraft, drones, and/or other vehicles and/or combatants; for instance, a fighter may use an installed system and/or apparatus to dazzle another aircraft that is dogfighting with it.

Still referring to FIG. 15, system and/or apparatus may be deployed in a handheld, portable, and/or weapon attachment form; this version may be specifically made to be held like a flashlight, attached to a weapon on a modular rail, and/or temporarily attached to a location. A system in this deployment may take into consideration motion of a person or object to which it is attached and/or threats' positions relative to it to engage them. System may cancel out motion of a user to keep sensors, countermeasures, pointers, or the like aligned to threats and/or objects of interest. System may use its own sensors, for instance as described above, or use other sensors located on an object or person it is attached to.

With continued reference to FIG. 15, apparatus may be designed to distinguish persons who present a threat, and/or persons who are otherwise problematic or need to be detained, from members of the general public, and/or from members of law enforcement. For instance, face recognition classifiers, and/or other image classifiers, may detect and/or identify a person known to be a fugitive, to have an outstanding warrant, or to present a threat, as non-limiting examples. Such a person may be indicated beforehand using photographs, such as "wanted" posters, electronically transmitted notices indicating that a person is being sought, is a suspect, has been reported missing, and/or is a person of interest in a case, or the like, and/or may be communicated to apparatus from a server and/or database containing images and/or classification data including such persons. Alternatively, an officer operating apparatus, and/or near the apparatus, may indicate verbally with a gesture or both that a particular person is a target, a person to be arrested, and/or a person to be kept at a distance. Apparatus may use different interdiction modes for different categories of persons to be interdicted. For instance, a first interdiction mode may be deployed for a person to be arrested. An interdiction mode for a person to be arrested may prompt apparatus to cast commands at that person that they should lie down, that they are surrounded, that they are covered by a weapon, or the like. Likewise, directed light deterrent may be used to interfere with visual process of such a person, for instance by creating glare as described in this disclosure. For persons who are to be arrested, body outputs may focus on disorientation pump and or prevention of affective function and or communication by that person. Lights may be used to generate stroboscopic effects, and/or other effects calculated to disable a person, and prevent them from leaving a given area, where they are to be intercepted. Similarly, a pain ray, and/or microwave radiation source, may be used to deter and/or disable a person, as may audio outputs, visual outputs, or the like. Indicators may inform a person verbally, or using vegetable indicia, of the direction in which they are to travel, whether to be arrested, or to vacate an area where they are not supposed to be.

Still referring to FIG. 15, a further category of person to be interdicted, for instance using a different interdiction mode, or persons who are considered a potential threat. Such persons may not be marked for arrest, but instead may be persons for whom apparatus is configured to keep at a distance, so as to prevent them from engaging in hostile activity with police officers, or security personnel. For instance, interdiction may act as a nonlethal deterrent for a potential attacker, while keeping such a potential attacker at bay, so that police do not have to resort to more stringent forms of deterrence, and/or violence.

In some embodiments, and further referring to FIG. 15, apparatus may use methods to detect situations where backup is needed, and may automatically call for backup. For instance, apparatus may detect when an officer operating apparatus has been disabled, and automatically cover backup even if the officer is unable to do so personally. Apparatus may to call for backup when detecting, for instance using classifiers, and or a finite state machine as described above, a situation in which matters have escalated, but officer may be unable to request backup in person. Apparatus may detect that an officer has been subjected to violence or disabled and may call for backup in that situation as well. Call for backup may include, without limitation, information describing a geographical location of apparatus, such as a geofence location or the like. This way, even if apparatus is disabled, and/or if officer is on able to communicate, it may be possible for personnel as part of a backup process to find a location at which a most recent message was transmitted, permitting people responding to such a call to be able to track malefactors and provide assistance more effectively than if the apparatus was not involved in the interdiction.

Still referring to FIG. 15, apparatus may alternatively or additionally interact with other apparatuses operated by other law enforcement personnel. For instance, where a group of officers are dealing with a group of civilians, rioters, or potential criminals, apparatus may coordinate to interdict such persons, identify them, keep them separate from each other, prevent cute communication there between using for instance white noise to disaggregate them, or the like. Apparatus may function to set up barriers between persons who otherwise might coordinate, while permitting police officers to cooperate. Similarly an apparatus operated by one police officer may transmit information about incidents and/or identification involving and/or of a particular person with whom one officer and/or apparatus has interacted so that apparatus belonging to a second officer may be able to respond effectively to such a person. For instance, if a person has knocked down, disabled, or otherwise harmed a first officer an apparatus of that officer may detected such occurrence has occurred for example for instance by detecting that the officer has so I'm using an inertial measurement sensor or the like, and or by using behavioral classification, and other sensor and our classification data to determine what has occurred. In this case, apparatus may send to ace remote server, and or to local apparatus is that are within range of apparatus, information detailing what has occurred. Other apparatus if so informed, may initiate escalation to a higher escalation level in a finite state machine corresponding to levels of response. May generate alerts for officers operating the apparatus that a person represents a threat, may put a spot on the person a target, or a quote smart flashlight quote beam that tracks the person on them, or the like permitting an officer operating apparatus, as well as apparatus itself, to engage in more aggressive interdiction, arrest, or other countermeasures against the potential assailant, or criminal.

Further referring to FIG. 15, in some embodiments, and as a further non-limiting example, apparatus may use audio classification and/or detection to determine that shots have been fired. Apparatus may use classification to distinguish between shots fired by an officer operating apparatus and shots fired by another person with whom officers are interacting. This may for instance be used to distinguish between shots fired by an officer and a shot fired by a person who is armed and dangerous. This may enable officers directing with apparatus and door apparatus itself to respond appropriately to the situation presented. As noted in this disclosure, apparatus may track trajectory of a projectile bullet, a rock, a Molotov cocktail, or other missile thrown or fired by a person, so as to determine a source from which the projectile has emanated. This may, for instance, permit apparatus to determine what person in a crowd has thrown and/or fired a projectile, which may enable apparatus to identify that person using a face recognition classifier, to put a spotlight on that persons for ease of detection by law enforcement forces personnel and or other apparatus is, to identify using visual classifiers one or more distinctive elements of clothing or other distinguishing characteristics of that person, to enable apparatus to use targeting functionality to follow that person as they move through an area and or through a crowd, or the like. Apparatus and they also use interdiction, such as directed light to turn, directed sound deterrent, and/or microwave pain ray against a particular person detected to have cast a projectile fired a projectile or the like.

In some embodiments, and still referring to FIG. 15, apparatus may identify particular persons according to behavioral classification, and may transmit relevant information concerning such classification to other apparatuses, and/or to law enforcement personnel. For instance, apparatus may generate a display and or audio output that identifies problematic behavior, as detected using behavioral classifiers, to officers. Likewise, where apparatus has used visual and or face recognition classifiers to recognize a particular person, such as a known fugitive, a person who has been reported missing, or the like, such indication may be transmitted to displayed to and are verbally output to an officer. In this manner, for instance, apparatus may act as a force multiplier for the function of searching for persons, for example in the crowd or the like. Apparatus may detect persons officers are looking for when the officer himself or herself is not actually looking at that person. This may increase the chance that an officer will find a person they are looking for, and increased their general vigilance for persons who need to be found, either for the sake of public safety, or for their own.

In an embodiment, and still referring to FIG. 15, data, analysis, and other information derived apparatus via processing and/or AI may be combined and/or provided to authorized users in an augmented reality (AR) format for complete human security integration. For instance, and without limitation, a law enforcement officer may have an AR display their person; AR display may be communicatively connected to apparatus. AR display may receive information from apparatus and/or a system including apparatus. Information may be displayed to provide indicia labeling any targeted and/or identified subject and/or other item according to any coordinate system described above; indicia may track such targeted and/or identified subject and/or other item such that indicia may remain on a displayed image thereof and/or of a location where targeted and/or identified subject and/or other item is determined and/or estimated to be. This may be used for aiming one or more weapons or other devices at such subject and/or other item; alternatively or additionally, one or more persons using AR display may be able to avoid and/or converge on a threat using indicia as a guide. Indicia may include, as a non-limiting example, geo-rectified icons that convey location based information, messaging from other devices and/or people, current status of systems, locations of threats, friendlies, neutrals, unknowns or the like, location and/or direction of detected gunshots or other events, warnings, "keep-out" zones of countermeasures or other devices, or the like, while also providing two-way communication back apparatus and/or a system thereof to provide real-time status of a user, such as their location, ammo remaining, current vital signs, status, radios, or the like. The edge apparatus, networked, and/or cloud services of a system may provide and/or coordinate to use human and/or AI analysis and planning to command and manage an integration of autonomous, semi-autonomous, and/or human response to a situation through direct communication, AR, and/or other communication methods.

With further reference to FIG. 15, AR device may be implemented in any suitable way, including without limitation incorporation of or in a head mounted display, a head-up display, a display incorporated in eyeglasses, googles, headsets, helmet display systems, weapon sights, handheld devices, or the like, a display incorporated in contact lenses, an eye tap display system including without limitation a laser eye tap device, VRD, or the like. AR device may alternatively or additionally be implemented using a projector, which may display indicia, as described in further detail below, onto one or more images depicted on display. Persons skilled in the art, upon reviewing the entirety of this disclosure, will be aware of various optical projection and/or display technologies that may be incorporated in augmented reality device consistently with this disclosure.

Further referring to FIG. 1, a view window, projection device, and/or other display devices incorporated in augmented reality device may implement a stereoscopic display. A "stereoscopic display," as used in this disclosure, is a display that simulates a user experience of viewing a three-dimensional space and/or object, for instance by simulating and/or replicating different perspectives of a user's two eyes; this is in contrast to a two-dimensional image, in which images presented to each eye are substantially identical, such as may occur when viewing a flat screen display. Stereoscopic display may display two flat images having different perspectives, each to only one eye, which may simulate the appearance of an object or space as seen from the perspective of that eye. Alternatively or additionally, stereoscopic display may include a three-dimensional display such as a holographic display or the like. Persons skilled in the art, upon reviewing the entirety of this disclosure, will be aware of various alternative or additional types of stereoscopic display that may be employed in augmented reality device.

In some embodiments, and with continued reference to FIG. 15, apparatus may be configured to connect to record data concerning a given encounter between apparatus, law enforcement, and/or a member of the public. For instance, where apparatus detects shots fired, or aggressive behavior, or any other event requiring interdiction, or involving interdiction or aggressive behavior by a police officer or a member of the public, apparatus may record data, video sensor data classification data, or the like which may be transmitted to a server, or other remote device, or start a memory of apparatus, for later use in analysis, trial, or other situations such as conduct investigation regarding the officer. Apparatus may aid in determining what happened in the heat of a moment, by recording data in a matter unlikely to be influenced by emotional concerns. In this way, apparatus may act as a dispassionate witness, ensuring that some form of objective truth may be available when fact finders need to determine what has happened in a given situation. This may enhance both public safety, confidence of law enforcement officers in performing their duties, and confidence of the public in the fair and equitable distribution and application of justice by persons charged with keeping the public peace.

In an embodiment, and still referring to FIG. 15, apparatus may use on-board and/or communicatively connected secure, anti-tamper methods to ensure data chain of custody and to make sure that data is not modified or damaged. These methods may be used for storing every use of countermeasures by apparatus, and/or any circumstances thereof, such as data recorded of subject, subject behavior, video, imagery, sensor data, and the like. Entries may be timestamped, along with imagery, audio, energy used with countermeasure, and/or other critical data for "blackboxing" any use of countermeasures so that they may be presented to a court and/or another reviewing body at a later time.

Continuing to refer to FIG. 15, records may be secured, stored, and/or transmitted according to one or more cryptographic systems. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

Still referring to FIG. 15, in embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, and with continued reference to FIG. 15, data recorded may be tamper-proofed by generation and storage of cryptographic hashes thereof, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, and still referring to FIG. 15 hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Continuing to refer to FIG. 15, one or more elements of data may be labeled, secured, and/or validated using secure proofs. A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Still referring to FIG. 15, secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, and further referring to FIG. 15, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Continuing to refer to FIG. 15, zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, and still referring to FIG. 15, secure proof may be implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Still referring to FIG. 15, one or more elements of data, cryptographic hashes, or the like, may be signed and/or stamped using a digital signature. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

Still viewing FIG. 15, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 15, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Still referring to FIG. 15, anti-tamper functions may use of encryption of data to obscure its contents and/or meaning; encrypted data may be timestamped but otherwise indecipherable until decrypted, ensuring that persons who are not authorized to view the data do not have an ability to determine what the data is. Timestamps may further be encrypted, and records placed in an arbitrary and/or non-chronological order, such that determination of a time relating to a particular record is contingent on decryption of a timestamp thereof.

Still referring to FIG. 15, apparatus and/or devices connected thereto may use full disk encryption to enforce encryption and prevent information leaks resulting from theft or loss. Full disc encryption may include automatic encryption of an entire hard disk and/or memory storage device, including an operating system (OS) of apparatus or other device, booting the encrypted OS, and prevention of a removed hard disk from being decrypted. For the first element, an encryption function may be built into a device driver layer of apparatus or other device, for instance as a filter driver. This may mean that an encryption function operates as part of an OS, and all write access to a hard disk or other memory system by application programs or the OS is encrypted automatically. Also, because it runs in the same layer as OS, encryption function may not affect behavior of application programs or other user operations. The second element described above may be accomplished using pre-boot authentication that performs authentication before the OS boots. The third element may be dealt with by using a proprietary boot loader to decrypt the OS as it boots.

In an embodiment, and continuing to refer to FIG. 15, full encryption may enforce encryption of all data on a hard disk, including files output by the OS. One advantage of this function may be information leaks from occurring through inattention, such as a user forgetting to encrypt data. Another advantage is that even files output by OS are encrypted. Although users may not be generally aware of files output by an OS, there have been cases when information has been extracted from these files. Paging files are one way this can happen. Paging files may be used by an OS to cache data temporarily when memory hardware capacity is insufficient. Such files may be a source of leaks because they may contain data from volatile memory unencrypted without a user knowing. While a simple file encryption function may not perform encryptions for these special files, a full disk encryption may, thereby preventing theft of information they contain.

Still referring to FIG. 15, reboot authentication may include a function added along with a full disk encryption function to perform user authentication prior to an OS booting. As decrypting of hard disk data cannot start until after this authentication is successful, an unauthorized user may be unable to read its contents even if they remove a hard disk and attach it to another PC. This function may provide PCs with a very robust authentication mechanism because it may use its own authentication method, making it separate to any other authentication such as that performed by a BIOS or OS.

Continuing to refer to FIG. 15, communications encryption may prevent leaks of information from communications data by encrypting all communications. Such encryption may ensure that the communications data from all application programs running on an OS is encrypted automatically. To achieve this, communications encryption may be implemented in a device driver layer, similarly to a full disk encryption function. This may ensure that communications data from all application programs is encrypted automatically, and there is no effect on the behavior of the application programs or user operation. This function may be provided for the following two types of communications, depending on the application: Communications via encrypted virtual hub may include a method that encrypts Ethernet frames and uses Transmission Control Protocol/Internet Protocol (TCP/IP) encapsulation. This method may be used for multipoint-to-multipoint communications. Also, authenticating each communications packet may prevent tampering with or spoofing of communications data, and communications can use proprietary cryptographic algorithms to achieve high levels of security, as required. Another feature of this method is that each device may communicate via a server called an "encrypted virtual hub." Encrypted virtual hubs, as used in this disclosure, are servers that emulate a physical hub. Encrypted virtual hubs may be used to run a single virtual network on top of a WAN (called an "overlay network") so that devices that connect to the encrypted virtual hubs can communicate as if they are all on the same local area network (LAN).

Still referring to FIG. 15, multipoint-to-multipoint communications may work according to similar principles to those described above. A feature of this communications mechanism may include that, since these communication traffic streams are encapsulated as TCP/IP packets (such as port No. 80: Hypertext Transfer Protocol packets), each peer in a network may communicate even over firewalls or Network Address Translation (NATs). For this reason, this way of communication may have an advantage when a user cannot choose an ideal network environment. IPsec transport mode communications Security Architecture for Internet Protocol (IPsec) transport mode communications may mean that IPsec communications in which only the Transmission Control Protocol/User Datagram Protocol (TCP/UDP) payload is encrypted. Like encrypted virtual hub communications, multipoint-to-multipoint communications may use proprietary cryptographic algorithms and perform authentication for each communications packet. Being simpler than encrypted virtual hub communications, high throughput may be an advantage. This may make it suitable for use on communication links that can be configured as required, such as between headquarters and branch offices, for example.

Still referring to FIG. 15, apparatus 100 and/or system may prevent tampering with data and/or code using one or more hardware-based protections. For instance, apparatus 100 and/or system may use a trusted processor. Trusted, tamper-resistant hardware may check and verify every piece of hardware and software that exists—or that requests to be run on a computer such as in apparatus 100 and/or system—starting at a boot-up process. Hardware may guarantee integrity by checking every entity when apparatus 100 and/or system boots up, and every entity that may be run or used on apparatus 100 and/or system after it boots up. Hardware may, for example, store all keys necessary to verify digital signatures, decrypt licenses, decrypt software before running it, and encrypt messages during any online protocols it may need to run (e.g., for updates) with another trusted remote entity (such as a software publisher). Software downloaded onto apparatus 100 and/or system may be stored in encrypted form on hard drive and may be decrypted and executed by secure hardware, which may also encrypt and decrypt information it sends and receives from its random-access memory. Similar or the same software, data, and/or media may be encrypted in a different way for each trusted processor that may execute it because each processor may have a distinctive decryption key. Alternatively or additionally hardware such as a smart card or physically secure token may be employed; such lightweight hardware protection techniques may require that such hardware be present for software to run, to have certain functionality, to access a media file, or the like.

Further referring to FIG. 15, apparatus 100 and/or system may employ encryption wrapper software security. With encryption wrapper software security, critical portions of software, or possibly all of it, may be encrypted and/or decrypted dynamically at run-time. In some embodiments, at no time during execution is the whole software in the clear; code may decrypt just before it executes, leaving other parts of the program still encrypted. Therefore, no single snapshot of memory may expose an entire decrypted program. Encryption wrappers often may use lightweight encryption to minimize computational cost of executing a protected program. Encryption may be advantageously combined with compression: This may result in a smaller amount of storage usage, and also may make encryption harder to defeat by cryptanalysis.

Still referring to FIG. 15, apparatus 100 and/or system may employ software and/or data watermarking and fingerprinting the goal of watermarking may be to embed information into software and/or data in a manner that makes it hard to remove by an adversary without damaging software functionality and/or data integrity. Information inserted may include purchaser information, or it may include an integrity check to detect modification, the placing of caption-type information, etc. A watermark need not be stealthy; visible watermarks may act as a deterrent (against piracy, for example). In steganography (the art of concealing the existence of information within seemingly innocuous carriers), a mark may be required to be stealthy: its very existence may not be detectable. A specific type of watermarking is fingerprinting, which embeds a unique message in each instance of the software for traitor tracing. This may have consequences for an adversary's ability to attack a watermark: two differently marked copies often make possible a diff attack that compares the two differently marked copies and can enable the adversary to create a usable copy that has neither one of the two marks. Thus, in any fingerprinting scheme, may be useful to use techniques that are resilient against such comparison attacks. A watermark may be robust (hard to remove). In some situations, however, a fragile watermark may be desirable; it is destroyed if even a small alteration is made to the software (e.g., this is useful for making the software tamper-evident). Software watermarks may be static, i.e., readable without running the software, or could appear only at run-time (preferably in an evanescent form). In either case, reading a watermark usually may require knowing a secret key, without which the watermark remains invisible.

Still referring to 15, apparatus 100 and/or system may perform tamper proofing by employing a guard. In an embodiment, a guard may include code that is injected into software for the sake of AT protection. A guard may not interfere with a program's basic functionality unless that program is tampered with—it is tampering that may trigger a guard to take action that deviates from normal program behavior. Examples of guard functionality range from tasks as simple as comparing a checksum of a code fragment to its expected value, to repairing code (in case it was maliciously damaged), to complex and indirect forms of protection through subtle side effects. Guarding may include injecting into code to be protected a large number of guards that mutually protect each other as well as a software program in which they now reside. Guards may also be used to good effect in conjunction with hardware-based protection techniques to further ensure that protected software is only executed in an authorized environment. Numbers, types, and stealthiness of guards; protection topology (who protects who); and where the guards are injected in the original code and how they are entangled with it are some of the parameters in the strength of the resulting protection: All such parameters may be tunable in a manner that depends on a type of code being protected, a desired level of protection, or the like. Such protection may be performed and/or inserted in a highly automated fashion using high-level scripts that specify the protection guidelines and parameters. It should be thought of as a part of the compilation process where an anti-tamper option results in code that is guarded and tamper resistant. A guard's response when it detects tampering may flexible and may range from a mild response to disruption of normal program execution through injection of run-time errors (crashes or even subtle errors in the answers computed); a reaction chosen may depend on the software publisher's business model and the expected adversary.

Still referring to FIG. 15, one or more elements of data may be tamper-proofed via including in an immutable sequential listing. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

Figure 16:
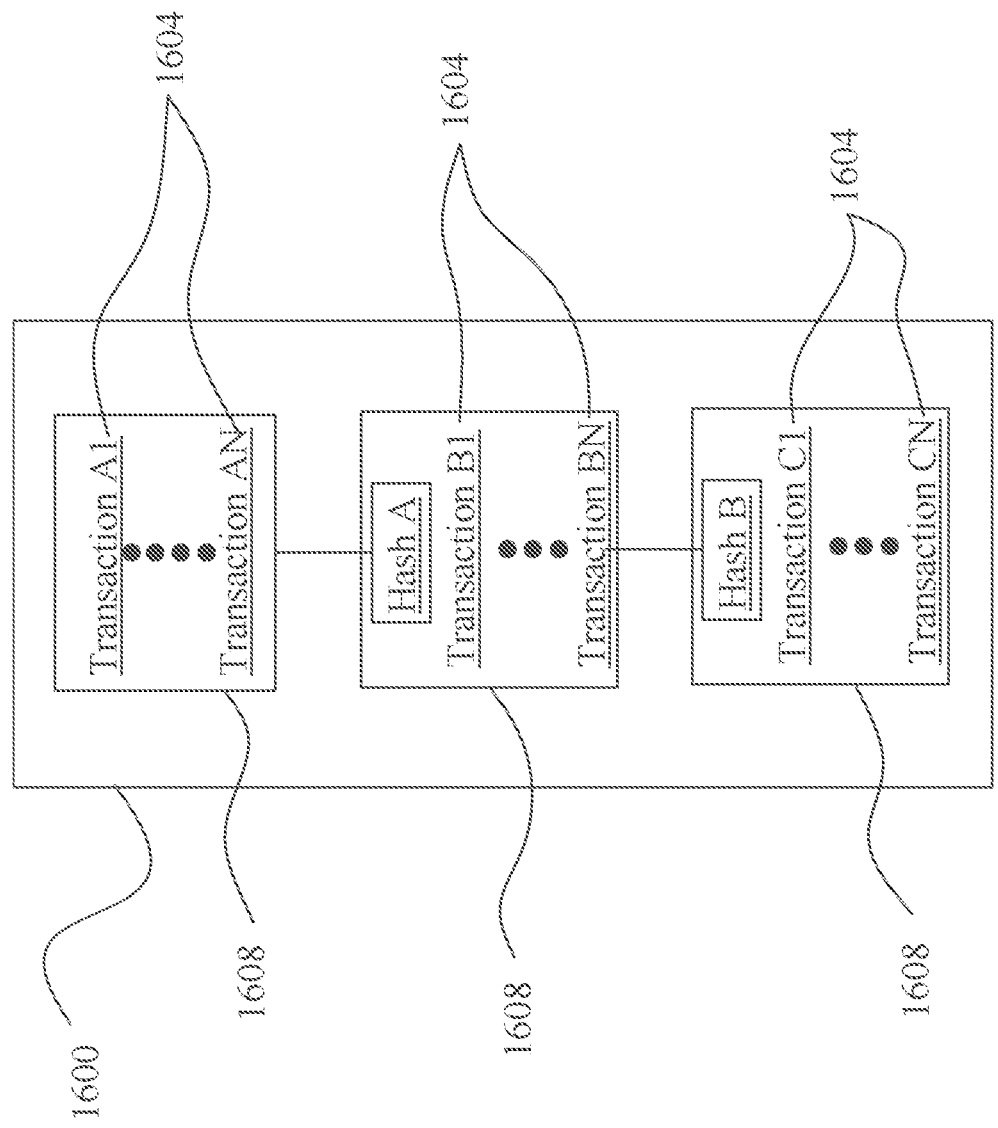
FIG. 16 is a schematic diagram illustrating an exemplary embodiment of an immutable sequential listing.

Referring now to FIG. 16, an exemplary embodiment of an immutable sequential listing 1600 is illustrated. Data elements are listing in immutable sequential listing 1600; data elements may include any form of data, including textual data, image data, encrypted data, cryptographically hashed data, and the like. Data elements may include, without limitation, one or more at least a digitally signed assertions. In one embodiment, a digitally signed assertion 1604 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 1604. In an embodiment, collection of textual data states that the owner of a certain transferable item represented in a digitally signed assertion 1604 register is transferring that item to the owner of an address. A digitally signed assertion 1604 may be signed by a digital signature created using the private key associated with the owner's public key, as described above.

Still referring to FIG. 16, a digitally signed assertion 1604 may describe a transfer of virtual currency, such as crypto currency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 1604 may describe the transfer of a physical good; for instance, a digitally signed assertion 1604 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 1604 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 16, in one embodiment, an address is a textual datum identifying the recipient of virtual currency or another item of value in a digitally signed assertion 1604. In some embodiments, address is linked to a public key, the corresponding private key of which is owned by the recipient of a digitally signed assertion 1604. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 1604 may record a subsequent a digitally signed assertion 1604 transferring some or all of the value transferred in the first a digitally signed assertion 1604 to a new address in the same manner. A digitally signed assertion 1604 may contain textual information that is not a transfer of some item of value in addition to, or as an alternative to, such a transfer. For instance, as described in further detail below, a digitally signed assertion 1604 may indicate a confidence level associated with a distributed storage node as described in further detail below.

In an embodiment, and still referring to FIG. 16 immutable sequential listing 1600 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 1600 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 16, immutable sequential listing 1600 may preserve the order in which the at least a posted content took place by listing them in chronological order; alternatively or additionally, immutable sequential listing 1600 may organize digitally signed assertions 1604 into sub-listings 1608 such as "blocks" in a blockchain, which may be themselves collected in a temporally sequential order; digitally signed assertions 1604 within a sub-listing 1608 may or may not be temporally sequential. The ledger may preserve the order in which at least a posted content took place by listing them in sub-listings 1608 and placing the sub-listings 1608 in chronological order. The immutable sequential listing 1600 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 1600 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 16, immutable sequential listing 1600, once formed, may be inalterable by any party, no matter what access rights that party possesses. For instance, immutable sequential listing 1600 may include a hash chain, in which data is added during a successive hashing process to ensure non-repudiation. Immutable sequential listing 1600 may include a block chain. In one embodiment, a block chain is immutable sequential listing 1600 that records one or more new at least a posted content in a data item known as a sub-listing 1608 or "block." An example of a block chain is the BITCOIN block chain used to record BITCOIN transactions and values. Sub-listings 1608 may be created in a way that places the sub-listings 1608 in chronological order and link each sub-listing 1608 to a previous sub-listing 1608 in the chronological order so that any computing device may traverse the sub-listings 1608 in reverse chronological order to verify any at least a posted content listed in the block chain. Each new sub-listing 1608 may be required to contain a cryptographic hash describing the previous sub-listing 1608. In some embodiments, the block chain contains a single first sub-listing 1608 sometimes known as a "genesis block."

Still referring to FIG. 16, the creation of a new sub-listing 1608 may be computationally expensive; for instance, the creation of a new sub-listing 1608 may be designed by a "proof of work" protocol accepted by all participants in forming the immutable sequential listing 1600 to take a powerful set of computing devices a certain period of time to produce. Where one sub-listing 1608 takes less time for a given set of computing devices to produce the sub-listing 1608 protocol may adjust the algorithm to produce the next sub-listing 1608 so that it will require more steps; where one sub-listing 1608 takes more time for a given set of computing devices to produce the sub-listing 1608 protocol may adjust the algorithm to produce the next sub-listing 1608 so that it will require fewer steps. As an example, protocol may require a new sub-listing 1608 to contain a cryptographic hash describing its contents; the cryptographic hash may be required to satisfy a mathematical condition, achieved by having the sub-listing 1608 contain a number, called a nonce, whose value is determined after the fact by the discovery of the hash that satisfies the mathematical condition. Continuing the example, the protocol may be able to adjust the mathematical condition so that the discovery of the hash describing a sub-listing 1608 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 1608 according to the protocol is known as "mining." The creation of a new sub-listing 1608 may be designed by a "proof of stake" protocol as will be apparent to those skilled in the art upon reviewing the entirety of this disclosure.

Continuing to refer to FIG. 16, in some embodiments, protocol also creates an incentive to mine new sub-listings 1608. The incentive may be financial; for instance, successfully mining a new sub-listing 1608 may result in the person or entity that mines the sub-listing 1608 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 1608 Each sub-listing 1608 created in immutable sequential listing 1600 may contain a record or at least a posted content describing one or more addresses that receive an incentive, such as virtual currency, as the result of successfully mining the sub-listing 1608.

With continued reference to FIG. 16, where two entities simultaneously create new sub-listings 1608, immutable sequential listing 1600 may develop a fork; protocol may determine which of the two alternate branches in the fork is the valid new portion of the immutable sequential listing 1600 by evaluating, after a certain amount of time has passed, which branch is longer. "Length" may be measured according to the number of sub-listings 1608 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 1608 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 1600 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 1600.

Still referring to FIG. 16, additional data linked to at least a posted content may be incorporated in sub-listings 1608 in the immutable sequential listing 1600; for instance, data may be incorporated in one or more fields recognized by block chain protocols that permit a person or computer forming a at least a posted content to insert additional data in the immutable sequential listing 1600. In some embodiments, additional data is incorporated in an unspendable at least a posted content field. For instance, the data may be incorporated in an OP RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 16, in some embodiments, virtual currency is traded as a crypto currency. In one embodiment, a crypto currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto currency may be centralized, with its protocols enforced or hosted by a particular entity. For instance, crypto currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 1608 in a block chain computationally challenging; the incentive for producing sub-listings 1608 may include the grant of new crypto currency to the miners. Quantities of crypto currency may be exchanged using at least a posted content as described above.

In an embodiment, and still referring to FIG. 16, when networked, system and/or apparatus may use an immutable sequential listing such as a blockchain or derivative thereof, to store a ledger of data so it can be especially secure and/or tamper evident. In an embodiment, this approach may enable secure backup and non-repudiation of the data; it may also not allow people to manipulate it such as in a court case if a plaintiff asks for data to be manipulated—defendants may check the data against a public ledger and see it was manipulated. In embodiments, there may be an ability to share data recorded by system anonymously if desired; for instance, a neighborhood with several systems present at different households may agree to share a face of a person that tried to break into one of the houses, a license plate of a car, or the like. System may use appropriate data scrubbing techniques to remove private and identifying information from the data so it can be shared to the other systems for use; for instance, recipients may not know who sent it, or where the incident took place, exactly, but may know there is a threat that needs shared.

In embodiments, and referring again to FIG. 15, a first apparatus may be mounted to a ventral surface of a person while may be mounted dorsally; these devices may continuously scan using any or all techniques described above to detect threatening behavior, and may automatically engage deterrents to protect a person, such as a police officer, wearing apparatuses. A cordon of officers with mounted devices may be able to mesh devices together, permitting coordination of deterrents as described herein; this may be used for crowd-control, deterrence of multiple persons simultaneously, or the like.

Still referring to FIG. 15, an apparatus may be integrated into a scope on the end of a gun; in an embodiment the first thing fired may be a deterrent such as a laser into subject's eyes. Alternatively, in the case of multiple assailants, deterrent could engage persons not in current line of fire of the gun, reducing their ability to combat the gun holder. Deterrent and/or a speaker system may be designed to go under and/or on top of a police car. For instance, a laser may be mounted top with a 360-degree rotation. Persons aggressively approaching car may be interdicted using any deterrent output as described herein. An apparatus mounted on a car or shoulder may be able to shine directed light deterrent through a rear-view mirror and/or window onto a face of a user; aiming may be guided using retroreflection. In an embodiment, apparatus 100 may use tracking functions as described above to keep a scope spot or other light on a subject. Apparatus 100, with one or more sensing components and one or more light sources, may include a handheld and/or head or body-mounted device that uses targeting functions as described above to keep a beam and/or spot of light such as a scope spot or a flashlight beam trained on a subject; apparatus 100 may function as a "smart flashlight" that uses tracking to keep an object and/or person of interest illuminated. In an embodiment, a user may activate tracking of object of interest by illuminating object and pressing a button, making a voice command, or otherwise entering a command to apparatus 100 to track an object currently being illuminated, which apparatus may detect using any light sensors and/or imaging devices as described above.

In an embodiment, apparatus 100 or a plurality of apparatuses may be used to provide messaging to vehicles and/or direct vehicles and/or traffic. For instance, and without limitation, a laser or other device may be used to draw and/or project messages on vehicle windows and/or interior surfaces; drawing may include lettering and/or indicators providing instructions such as directional instructions, warnings about traffic and/or weather conditions, detours, warnings of detours and/or construction, and/or simulated road signs. Apparatus and/or apparatuses may use indications projected onto roads or other driving surfaces to make temporary lane markers, any instructions as described above, or the like. Light curtains may be generated to demarcate lanes of permitted or suggested travel and/or to indicate desired traffic directions.

In an embodiment, and still referring to FIG. 15, apparatus may be deployed to perform traffic regulation, guidance, and or interdiction. Apparatus may identify individual drivers, individual cars, license plates, and or behaviors in which drivers are behaving. For instance apparatus may use image classifiers and or behavioral classifiers to determine that a person driving a particular make or model of car and having a particular license plate number is driving in an erratic manner, such as a manner indicative of inebriation, distraction, aggression, or the like apparatus may identify one or more problematic or illegal traffic behaviors, such as tailgating, "brake-checking", speeding, changing lanes without signaling, failure to yield in a passing lane, add or gestures or behaviors indicative of aggression, among many other examples that may occur to person skilled in the art upon reading the entirety of this disclosure. Apparatus may identify persons within cars, for instance using image classification. Alternatively, apparatus may associate license plate numbers or other indicia identifying particular cars with owners thereof. To perform traffic analysis detection or interdiction, apparatus may be mounted at the side of the road, in a traffic light, on highway signs or street signs, or in any other position. Apparatus may be mounted on the drone, which may fly above traffic detecting and or analyzing driver behavior, so as to detect problems before they arise. Apparatus may be deployed with a number of other apparatus, for instance in the form of a net mesh network, permitting coordinated responses along a length of road or highway. Apparatus may further be connected via network connections or any other suitable communications link to one or more remote devices, such as devices operated by weather services, then vice is operated by traffic authorities, or the like such a remote devices may provide two one or more instances of apparatus information describing a current state of construction, information indicating current weather conditions, information indicating current traffic position conditions, such as traffic density locations of backups, or locations of crashes that may be causing delays.

Still referring to FIG. 15, where apparatus is performing traffic analysis, guidance, and/or interdiction, apparatus and/or a network of apparatus may perform one or more actions to inform, warn, command, and/or interdict drivers. For instance, and without limitation, apparatus may draw and or right on road surfaces car windows and or rearview mirrors, interior surfaces of cars, or the like. Drawings may include one or more indicators, verbal messages, or the like. For instance, verbal messages may indicate to a driver that the driver should be slowing down, should try to merge into one or other lanes, or should be prepared more delays ahead, among other examples. Messages may also inform a driver of icy or flooded road conditions, or of other hazards that may be encountered ahead. Alternatively, output may be used to interdict, and/or warn a driver. For instance, a driver that is moving too fast may receive an output such as a spot of light indicating that the driver is moving too quickly, which may be color coded, or the like; light output by directed light deterrent may be output at a level of intensity that prevents glare and/or other kinds of visual impairment, while working within a range of intensities that permit escalation in attempts to draw the attention of the driver. For instance, apparatus may initially flash a light in a given color at the driver, in the driver's rear through window, or otherwise. Light may be directed off axis of the visual axis of the driver so as to avoid contacting a fovea or macula of the driver. And initial flash of light may be used to draw driver's attention. If driver does not look at the flash of light and/or continues to engage in an action that the flash of light is intended to warn the driver about the flashes of light may be repeated at a higher intensity, add greater frequency, with a more aggressive color such as a red color indicating more stringent need for attention, or the like.

Color coded and/or peripheral uses of lasers and/or other light sources may be used in peripheral vision of intended targets and/or persons to convey information to them; for instance if they see a green light, a user may know they are going at a speed limit, yellow may mean caution or that they are beginning to exceed the speed limit, and red may mean they are over the speed limit. This would purposely not be directed into their eyes using data from the scene to determine where to aim the laser. Such methods may be used to convey information quickly to the intended target. Similar color-coding and/or peripheral vision-based communication may alternatively or additionally be used to convey information in contexts besides traffic.

Still referring to FIG. 1, apparatus may first capture a driver's attention, and follow such an action with one or more indicators and our messages informing the driver of ways in which the driver should modify behavior, trajectory, or the like to avoid hazards and comply with regulations. Output may alternatively or additionally be in the form of guidance informing drivers which way to follow for detours, to avoid construction, and or to avoid hazardous road conditions. Messages may inform drivers of a location of a particular patch of black ice, for instance, which may be detected using a behavior classifier that detects cars slipping or skidding on black ice as they drive through that region. Cars may be warned in advance of an upcoming area, and advised to reduce lead reduce speed or otherwise prepare themselves to drive on the relatively hazardous patch of road. Similar approaches may be used for high wind conditions, flash flooding trauma or other hazards of the road. Apparatus, for instance in coordination with multiple apparatus, may use light curtains, and or indicia as described above, to indicate which way drivers should go. Apparatus may use directed light deterrent and/or other light output devices to paint temporary lane markers, indicators of a directional or other nature, or the like down on roads in front of cars, or beside cars, so that traffic maybe safely and effectively guided along different routes from the usual while avoiding hazardous conditions. Apparatus may interactively inform drivers of how to perform merges or the like, in order to ensure smooth traffic flow and reduce an overall impact on efficiency of any conditions that tend to increase traffic.

Alternatively, or additionally, and further referring to FIG. 15, apparatus may communicate directly with self-driving vehicles, and/or one or more automatic components of vehicles. For instance, a vehicle having cruise control may receive a command to slow down from apparatus owing to dangerous conditions in which case vehicle may slow down. Alternatively, where vehicles are autonomous, apparatus may transmit to vehicle a modified driving plan, in which the vehicle slows down to some extent to deal with hazardous conditions, and or is alerted to particular hazards which may be present on the ground.

In some embodiments, and further referring to FIG. 15, apparatus may receive signals from drivers indicating that driers have received a message transmitted thereto. For instance, and without limitation, drivers may perform a gesture such as a thumbs-up or other gesture indicative that they have received a message. Alternatively or additionally, apparatus may determine that a driver is, or is not, complying with an instruction transmitted by apparatus using a behavior classifier and/or one or more sensors. For instance, where apparatus has instructed driver to slow down, apparatus may measure a speed of driver's vehicle, using doppler effect determinations using LIDAR and/or radar, or based on ToF distance calculations.

In some embodiments, apparatus 100 may be mounted on a drone. In an embodiment, distance detection of retroreflection may enable a drone-mounted apparatus 100 to fire a directed light deterrent at sufficient distance from a subject to arrive at a sufficiently shallow angle to enter a subject's eyes on-axis; alternatively, where drone is at an off-axis angle, for instance where it is more directly overhead, violet light may be used as described above to fluoresce subject's lens. Drone-mounted apparatus may detect which of multiple persons in a crowd is viewing drone using retroreflection, and/or when any given person is looking away and/or able to be affected by on and/or off-axis light. In an embodiment, an apparatus and/or directed light deterrent mounted on a drone may determine a minimal angle from a vertical axis, calculated for instance as a direction of a gravity vector using one or more accelerometers, at which a directed light deterrent may fire from the drone; this angle may in turn determine a threshold distance from a person on the ground past which the drone may be unable to file into the eyes of that person. This angle may include a drone angle, determined by a flight attitude of the drone, and a gimbal angle indicating an angle at which a directed light deterrent is able to fire; these angles may be added to each other to attain an overall minimal angle. A third angle, which may depend on a head and/or eye position of a subject, may determine a minimal distance from the person from which a directed light deterrent may fire to strike a fovea or macula of the person; at a more proximate distance, violet light may be employed to strike eyes for which the fovea is not available, if the drone remains outside the minimal distance determined by the drone and gimbal angles. Drone may alternatively or additionally fire upon retroreflection detection of eye axes permitting access to fovea while outside minimal distance, and/or may use sounds or other stimuli to direct a subject to look at drone. Drone may hover or circle outside minimal distance. A drone may maximize its power budget using detection and/or "hide and seek" methodology as described in this disclosure, such as without limitation by determining when somebody's eye is open and looking at the system. LIDAR retroreflection may assist in detection.

Alternatively or additionally an apparatus mounted in any manner described in this disclosure may be used to disable another drone, such as one flying contraband into prisons or the like. Apparatus may be used to aim at and/or detect drones, and may interdict with directed light deterrent to disable, saturate, and/or damage light sensors, and/or to aim projectiles such as bullets, nets, or the like. For instance and without limitation, a laser or other output may be used to confuse and/or blind sensors on drones, ships, aircraft, flying missiles, or the like. Lasers can be used to burn out a vehicle's cameras without pursuing an aggressive action. In an embodiment, this may essentially blind drones and causes them to crash. Alternatively, a laser may "dazzle" optical systems of drones by saturation to wash out contrast, similarly to dazzle and/or veiling glare effects in human eyes as described above. In an embodiment, a laser may be able to do both, combining dazzler capabilities with actual destruction.

Still referring to FIG. 15, apparatus may use any suitable targeting and/or image analysis method to identify a drone and/or to identify and/or strike optics thereof. For instance, and without limitation, methods for detecting a specular reflection and/or "glint" off of a cornea and/or eyewear may similarly be used to detect specular reflection off a lens, transparent aperture cover, or the like. Alternatively or additionally, image classification and/or computer vision may be used to identify a drone and/or identify a location of optics thereof. Classifiers may be trained with images of known drones correlated to identifications thereof and/or of optics thereon; the former may be used to train a drone classifier to identify different varieties of drone, while the latter may train a drone optics classifier to locate optics on drones based on configuration and/or shape thereof. Classifiers may identify one or more locations that are more probably optics locations; apparatus may target all such locations simultaneously or substantially simultaneously.

Still referring to FIG. 15, apparatus may use one or more behavior classifiers to determine whether a given drone is a threat and/or risk; for instance, behavior classifier may determine whether a drone is attempting to damage property, is crossing a restricted space where it could collide with aircraft or sensitive equipment, or the like. Where a drone presents an immediate threat, apparatus may immediately interdict. Alternatively, apparatus may transmit warnings to drone using directed light deterrent, audio signals, and/or any wireless communication protocol; such warnings may be directed to an operator of drone, and/or to an AI thereof where drone is a UAV.

Apparatus may be used to fire anything that may be targeted, including BOLA wraps, nets, or the like; detection of body position may be used to fine-tune where and when to fire for maximum effect, such as firing at knees when mutually proximate to break a stride, firing at arms when at a subject's sides, or the like.

Further referring to FIG. 15, apparatus 100 may be mounted in the vicinity of a person to monitor and/or protect the person. For instance, and without limitation, apparatus 100 may be mounted on a vehicle such as a police car, in a corridor and/or room a person is in. Apparatus 100 may protect person from a subject and/or subjects such as populations of persons who are incarcerated or otherwise under guard, for instance in a correctional facility and/or psychiatric institution. In an embodiment, apparatus 100 and/or a network of apparatuses may operate as a "guardian angel" and protect a person within a subject area.

In an embodiment, and still referring to FIG. 15, apparatus may use one or more external devices (not shown) in the same manner as any imaging device and/or other sensor as described above. For instance, an external camera, or system of cameras, such as a security system or an element thereof, may be capable of communication, for instance using a wireless protocol. Apparatus 100 may communicate with such a camera and/or network to obtain visual data therefrom. For instance, apparatus 100 and/or an additional computing device connected thereto may analyze video information from a network of cameras or other imaging devices within a building or facility in which apparatus is installed; apparatus 100 may perform this analysis continuously, for instance to identify persons and/or other subjects within a larger building and/or facility beyond subject area. This may enable apparatus 100 to classify persons according to distinguishing features before and/or after arrival at subject area, to classify behaviors thereof to determine threat levels as described above, and/or to determine subsequent behavior after an encounter. Where a broader network of cameras and/or other apparatuses 100 communicates with apparatus 100 and/or stores image data and/or classifiers or parameters thereof, apparatus 100 may draw upon such information, for instance and without limitation as described above. This may enable an extensive augmentation of sensory breadth and data to be used by apparatus 100. For instance, it is estimated that of 126,000,000 homes in the United States, 25% currently having a security system. Such security devices systems experience a 4.5 million system a year churn, with contracts burning off, people leaving, and/or attempts at do-it-yourself projects by homeowners. It is further estimated that another 30,000,000 are being used in the commercial world. Communication with such devices may enable very extensive data to be available as training data and/or resources for tracking and/or locating behaviors of persons. Use of existing security infrastructure may also furnish a way to overcome installation costs where a more extensive network around apparatus 10 would be beneficial. Apparatus may transmit photos, video, current location of subject, or the like to law enforcement/military, or the like; this may be provide as a feed, which may be encrypted.

In an embodiment, and continuing to refer to FIG. 15, apparatus 100 may, upon installation, start-up, reset, and/or initiation of a process, use one or more wireless and/or wired communication protocols to poll nearby devices. Communication protocols may include any protocols that may occur to persons skilled in the art, including without limitation the BLUETOOTH protocol promulgated by the Bluetooth Special Interest Group of Kirkland, Wash., the ZIGBEE protocol developed by the Zigbee Alliance of Davis, Calif., or the like. Communication protocols may include, without limitation, any protocol used for exchange of data between devices, including ONVIF protocol as developed by Onvif, Inc. of San Ramon, Calif. for video streaming intercommunication. Apparatus 100 may pair with such devices and use communications protocols to receive data from and/or send data to such devices. Apparatus 100 may store in data of apparatus 100 a registry of such devices; registry may alternatively or additionally be received from a remote device, other apparatus 100 or the like, permitting apparatus 100 to attempt to communicated and/or pair with devices already on the registry, remove them or update their status on the registry based on attempted communication, and/or add new devices to the registry, which may be transmitted in turn to remote devices and/or apparatuses 100.

Still referring to FIG. 15, apparatuses, devices, and/or methods described herein may be used for one or more additional applications, such as without limitation advertisement techniques; for instance, directed light deterrent may be used to "paint" an image of a product logo, an advertisement slogan, a product name, trade name, trademark, service mark, or the like onto a person, object, structure, or the like. Image and/or behavior classifiers may be used, without limitation, to capture one or more persons, objects, or the like of interest. For instance, where a "kiss cam" is being sponsored by a given commercial entity, advertisements of and/or directed by such entity may be displayed on or near a couple that is kissing on the "kiss cam"; sound effects may be transmitted at the same time.

Further referring to FIG. 15, system and/or apparatus may use sensors to interact with people in singular or crowd settings. This may be used for art, entertainment, navigation, help, situational awareness, or the like. For example, a version of the system and/or apparatus may be installed in a dance club; it may watch the dance floor, customize a laser and/or sound to react with a crowd as a whole or sections— for instance, if a section is more active, it may get more laser show attention to either make them more active or entice other parts of the dance floor to increase their activity to get more attention for the laser show and/or acoustics. Another example may include deployment at a sports stadium such as a football stadium where the crowd starts a human wave; system may project an ocean scene with a virtual surfer riding the human wave. Another example may include use of sensors to detect a reaction of a crowd for voting purposes and display a sound meter above a section of the crowd or other indicators. In a further non-limiting example, system may write names of people on them at parties, so people know who is who. As a further non-limiting example, apparatus be drawing information on a field at a stadium to demonstrate a football or other play, rules, examples, or the like in real time to observers in a manner analogous to a virtual $1^{st}$ down line in television broadcasts. A threat level and/or behavioral descriptor may include and/or be calculated based on a number of people in and/or near subject area, an e existence of a crowd in or near subject area; for instance, a threat level may be determined to be elevated if more than a threshold number of people are present, may be weighted by a weight depending on a number of people present, or the like. As a further non-limiting example, a boundary condition applicable to a subject may be different when the subject is alone than when some other number of people are in the subject area.

In some embodiments, apparatus may be deployed as a light output for a light show. Light show may include, without limitation, an immersive light show, in which images and patterns are cast around persons, and/or on bodies of persons, as opposed to solely over their heads. Immersive light show may allow lasers to play across any part of users body, excluding the users' eye box as described above. In other words, apparatus may perform the same targeting procedure described above, including identification of eyes, light targeting area for eyes, or the like, but may perform masking in reverse to avoid the targeted area. Apparatus may alternatively or additionally reduce intensity and/or expand beamwidth when operating within a height range consistent with users head heights, in order to prevent any unpleasant or potentially hazardous exposure through there to light such as laser light apparatus may automatically detect and/or coordinate with music to perform light shows.

In some embodiments, and still referring to FIG. 15, light shows may be interactive with behaviors of users. For instance, lasers may be programmed by apparatus to perform patterns complementary to dancing that a person is performing. A person who appears to be dancing especially effectively and/or actively may be highlighted using lasers or other light outputs, for example. Detection of effective, or noteworthy, dancers may be performed by classifying behavior of people surrounding the dancer. For instance, apparatus may include a behavior classifier that is trained using training data that contains behaviors of persons who are observing another person dancing, where the observing person has indicated enthusiasm, for the performance of the dancer. Alternatively or additionally, actions and are motions of a dancer, and or the people around them, may be entered as training examples with a correlated identification of a level of ability and or achievement in the dancing that expert or a group of users as indicated the dancer possessed.

Still referring to FIG. 15, behavior classifier may also identify particular behaviors of persons in the crowd, for example at a light show. For instance, where two persons appear to be getting physically intimate, they may be identified in a celebratory or admonishing manner, by apparatus. Apparatus may also perform any or all detection of user behaviors such as problematic user behaviors that may be taking place during a light show, or other entertainment event. For instance, if a person is becoming violent, or otherwise disruptive of the event, apparatus may identify what the person is doing. Apparatus may transmit notification of the problematic behavior and/or identification of the offender, to security to permit discreet interception and or removal of the offending party.

Further referring to FIG. 15, one or more instances of apparatus 100 may be deployed in an amusement park, theme park, or similar venue. In an embodiment, apparatus or a network thereof may be deployed to perform crowd control, guidance, and/or amusement to persons therein, especially while they are trying to make their way from one ride or attraction to another. For instance, apparatus may detect where a person is heading, for instance by recognizing the person using facial recognition, and matching them up to a subsequent reservation of a ride that the person has booked. Apparatus may provide directions to persons who are looking for a next attraction, for instance by acting as a sort of interactive map. Apparatus may draw and or right on the ground directional instructions for users who are attempting to make their way to one place or another, including drawing instructions listing options for directions users could go in, as well as interactive instructions that may detect a direction in which a user is heading, and provide the user with further instructions and our feedback about where they are going, and what they are going to find their period alternatively or additionally, apparatus may receive from a user in verbal or gestural form, and or from a device belonging to users such as a smartphone or the like, a user instruction indicating what sort of attraction the user is looking for, what attraction of the user is looking for, or the like. For instance, a user might enter a name of a particular rollercoaster the user would like to ride on, and into their telephone, and or an app which may transmit the apparatus this identification. Apparatus may subsequently identify user, and provide instructions written on the ground in front of the user, which may be continually updated, and provide indicators indicating which way the user should go and providing turn by turn or other instructions.

Still referring to FIG. 15, apparatus, or a network of apparatus, deployed in an amusement park may generate outputs to entertain users who are waiting in lines, or in other situations. For instance, users in line may be provided with interactive games, in which apparatus detects motion of a user, which motion may be interacting with images drawn by apparatus on a ground or surface or on other persons, and apparatus may react to user gestures interacting with such depictions, triggering such depictions to move and or react to user activity. For instance, apparatus Bay project a board and pieces of a board game on ground near users, permitting them to play a game of chess, checkers, or the like. Alternatively, apparatus may project an image of a ball, which a user may pantomime kicking, which the apparatus may react to by causing the ball to quote roll End Quote away from the user. Apparatus may alternatively or additionally play messages and our music for individual users in crowds, and lines, or otherwise making their way through and or standing or sitting in amusement park, which messages may be user specific using directed sound as described elsewhere in this application.

In an embodiment, apparatus may alternatively or additionally provide users in an amusement park with event information, such as information indicating when a particular thought, production, parade, or the like is about to take place. Such a show or other event may be provided according to a schedule, which may be available to and are transmitted to apparatus. Apparatus may write, display and or produce verbal and or audio output indicative that this show is and or other event is about to start.

Still referring to FIG. 15, apparatuses, devices, and/or methods described herein may be used for one or more additional applications, such as without limitation entertainment systems. Entertainment systems applications may include, without limitation, use of stimuli described above as used for deterrents to induce reactions other than deterrent effects, such as without limitation reactions of euphoria, amusement, suspense, or the like; reactions may induce an emotional, physiological, or chemical state in people receiving effects. Entertainment may include color and/or light effects. For instance, apparatus 100 may light up people who are walking around, dancing, or the like at concerts, nightclubs, or the like to enhance an experience at such a venue. Combined sensing and output functions of apparatus 100 may be used to produce one of various game-like effects such as generation of simulated objects using light, such as a ball drawn on surfaces and/or media such as mist by directed light output devices, which a user can bat, or kick as detected using sensor elements such as imaging devices as described above. As another example, during a laser show, laser may be turned off when scanning across eyes, for instance to avoid eyebox, head, and/or retroreflection.

Still referring to FIG. 15, in a non-limiting embodiment, one or more lasers and/or other light output devices may be deployed in a swimming pool, such as beneath the water and/or on the surface. Light sources may generate images, illumination, and the like beneath and/or on the water, on walls or floors of a pool, on bodies of one or more persons within the pool, or the like. Deployment, images, interactions with persons, and/or safety protocols may be performed in any way described in this disclosure.

With continued reference to FIG. 15, an underwater deployment of apparatus may be used to create light shows for swimming pools, lakes, or other bodies of water taking advantage of scintillation of laser in the water for instance by leaving visible "laser beams" in the water. Apparatus may use a critical angle of laser incidence on surface of water to reflect back into the pool or out of the water to create above/below light show, an ability to interact with people or objects above and below water, or the like. For instance based on persons' location, apparatus may draw "clothes" on them, draw on pool walls, and/or use multiple sources to create intertwined complex patterns in the water, use peoples' motion to create interactive light show, or the like. Underwater and above water systems may work independently or together to take advantage of laser interaction with water to create unique light shows, in addition to possibly combining with standard laser projector to project completely above water. Underwater system heat generating components may be physically coupled to a housing that is exposed to pool water to provide heat dissipation, or water may be ingested into system and pumped through for heat dissipation. System may use RF, audio, or optical wireless communications to control and/or coordinate use of the system's single or multiple nodes under and above water. Safety features may be present to detect person approaching aperture and shut off using Time of Flight optical, ultrasonic, or other range measuring methods. System may use a single imaging sensor in conjunction with other systems to determine location of people or objects below and above water. System may use lasers to create light patterns that can be used to further enhance a single or multiple imaging sensor ability to determine 3D position of people or objects in the area.

In an embodiment, and still referring to FIG. 15, system may use increasing cadence, rhythm, color, or the like to indicate to a user to swim harder or lighter according to a predetermined intended pace, or the like. System may project a "warning" light for arrival at an edge during backstroke, or to signal that a user doing laps is getting closer to an edge so the user can execute a flipturn.

With continued reference to FIG. 15, apparatus when deployed in a pool may detect a number of swimmers, and identity of each swimmer, and/or a profile of each and/or any swimmer. A number of swimmers may be detected by any suitable means described in this disclosure, including detection of distinct persons using image classifiers, gradual reflection, and or identification of shapes, anatomical landmarks, or the like. Alternatively or additionally, different swimmers may be detected by detection of emotion. In an embodiment, identities of each swimmer maybe deduced using image classification, voice classification, or the like. For instance, facial recognition may be performed to distinguish one user from another, and or other image recognition/image classification may be used to distinguish a body of one swimmer from another. Alternatively or additionally, image classifiers may be used to identify people according to larger or grosser categories, such as distinguishing a man over six feet tall from a woman five feet and four inches tall, or an adult from a child. These identifications may be compared to stored data describing one or more persons known to use end or possess the pool. Identifications of types of users may include identifications of persons using the pool floor exercise, for recreation, for relaxation, for various forms of socialization including romantic encounters, or the like. For instance, a person may be vigorously swimming from end one end of the pool to the other period in that case, apparatus may determine that the person is engaged in athletic recreation within the pool. In this case, apparatus may perform detections and other processing as described in further detail below, which are consistent with a person attempting to reach exercise and or athletic goals. As a further example a person who is floating, and/or swimming lazily, particularly in a group of people, may be detected and/or identified as a person who is socializing, or enjoying a party in the pool. Apparatus may further detect other indicia such as music, conversation, or the like. For instance, a large amount of chatter in different voices, as differentiated using a voice recognition module, may indicate that a large amount of conversation is taking place. This may be unlikely to be consistent with athletic endeavors however it may be consistent with socialization. Alternatively or additionally apparatus may identify a type of use to which one or another sectors of a pool, or an entire pool, it are being subjected. For instance, apparatus may identify that lanes one through three of a pool are being used recreationally and/or for relaxation, while lanes five through seven are being used for lap swimming, or diving. As a further example, apparatus may determine that one person is engaging in a first kind of use, and a second person is engaging in a second kind of views, such as one person swimming athletically, while another person floats on an inflatable raft drinking a cocktail. Apparatus may interact with persons differently depending on what type of use those persons are attempting to engage in, as identified by the apparatus. Alternatively, apparatus may receive voice or manually entered commands, indicating that the pool is to be used for a party, is to be used for an athletic endeavor of some sort, or the like.

Still referring to FIG. 15, apparatus may perform processing consistent with detected identities of persons, types of users, and/or types of use to which the pool is being subjected. For instance, apparatus may detect that a person is attempting to swim laps. Apparatus may provide quote virtual physical training and quote to such a person in the form of timing of laps, encouraging voice outputs, add or recordation, analysis, and recommendations regarding strokes a user is swimming. For example, a user who is swimming a freestyle or "crawl" stroke maybe identified by a behavior classifier which notes and or determines that their arms are being raised above the water add in front of their heads and a repetitive motion, perhaps combined with kicking at the surface of the water with a straight legged kick, and reading to the side. Classification may account for sufficient variation in performance of a stroke to identify that some of those attempting to perform a freestyle stroke whether or not they're doing so correctly. In an embodiment, a first classification process may be used to determine what kind of stroke a user is attempting to perform, and a second classifications process may calculate an error function to determine how closely that person is mimicking a correct or ideal form for that stroke. For instance, a person whose breathing technique causes them to modify their stroke to an unacceptable extent, as determined by deviation from a professional swimmers stroke pattern well breathing, may be identified as deviating in that respect from an ideal freestyle stroke. In this case, apparatus may provide feedback to the user. Feedback may be provided during exercise, between sets, laps, or the like, or after a session. For instance, apparatus may generate, display, or print a report indicating how a user performed when engaging in strokes, or other endeavors they were engaging in. Alternatively, a voice output device of apparatus, which may include any voice output device as described above, may generate encouragement, recommended changes to farm, reminders to maintain and or modify a given approach to a given stroke, or the like. Apparatus may generate recommendations based on a particular user. For instance, apparatus may use a classifier trained by training examples collected from a particular user to identify how the user has typically performed, and may calculate error functions to determine a difference between that performance and an ideal performance of a given stroke or other maneuver. This error function made then be calculated for current user strokes. In this case, apparatus may set goals for a user to reduce an error function historically calculated. For instance, apparatus may identify a particular kind of deviation from an ideal stroke that a user performs, and may identify one of a number of such deviations which is especially great compared to others, indicating that that is a particular facet of the stroke that the user should be attempting to improve. Feedback and/or recommendations to user provided during, before, or after exercise may include a larger quantity of feedback pertaining to that particular facet of a particular stroke that a user most needs to improve in. Alternatively or additionally, apparatus may compare a time such as a lap time that a user performs, in two previous lap times, and or two goals. Goals may be set by the user. Alternatively, goals may be set by apparatus, based on a typical improvement curve from 1 day to another during a training regimen. Such an improvement curve may be determined using classifiers, machine learning, or the like, which may be trained using training data that has recorded previous users times, or other performance parameters during previous training sessions, or sequences thereof. A user may also indicate to apparatus, through voice command, manual entry, and/or selection of one or more options in a graphical user interface, which particular kind of thing the user wants to improve on an exercise. For instance, one user may enter command indicating that that user wishes to work on a speed of swimming, and or on reducing lap time, while another user may wish to engage in improvement on one or more forms of one or more strokes, or some combination, such as lap times as performed using a particular stroke. Persons skilled in the art, upon reviewing the entirety of this disclosure, will be aware of various alternative or additional ways in which users and or apparatus may specify and are measure performance against goals.

Still referring to FIG. 15, an additional application of embodiments, apparatuses, devices, and/or methods described herein may include use thereof diagnostically to determine sensitivity of a person to different stimuli; for instance, and without limitation, apparatuses, devices, and/or methods described herein may be used to produce various strobing effects at increasing intensities to assess a predilection for seizures of a given individual, which may be used to determine fitness for likely seizure-inducing environments, as a screening tool to diagnose epilepsy and/or tendencies therefor, or the like. Apparatuses, devices, and/or methods described herein may be used to administer gradually escalating sensory stimuli in various forms to determine a degree of sensitivity of a person to particular sensory stimuli; for instance, a person on the autistic spectrum and/or with a diagnosis or potential diagnosis of autism spectrum disorder (ASD) may be subjected to a carefully administered test to assess different reactions to stimuli and aid in generation of a "sensory diet." Reactions to stimuli may be determined using behavior classifiers as described above, which may be trained using training data pertaining to persons sharing characteristics of a subject persons; such training data may be classified using a training data classifier as described above.

Further referring to FIG. 15, apparatus may be deployed in a handheld form. In handheld form, apparatus may automatically generate deterrents in response to different behavioral profiles as described above, or may produce deterrence when triggered manually, for example by setting the threat level, using a dial or the like on the device, and or pulling a trigger.

Further referring to FIG. 15, apparatus 100 may be deployed on a boat. Boat apparatus may be oriented such that sensors are oriented at an elevated angle to intersect any incoming signals from a horizon and/or focal point, wherein deterrents may be angled at a reduced angle towards a medium underneath the boat. Additionally or alternatively, apparatus 100 may be deployed on an aircraft. Aircraft apparatus may include calculating a gravity vector as a function of an accelerometer. As used in this disclosure a "gravity vector" is a data structure that represents one or more a quantitative values and/or measures of gravity with relation to the aircraft. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes.

In some embodiments, and still referring to FIG. 15, apparatus 100 may be used for one or more additional processes such as temperature checks during pandemics, or during other health emergencies, apparatus 100 may check subject 308 body temperatures using infrared camera 112, sense chemicals or indicators emitted by the subject 308, or the like, where a person having a detected body temperature above a preconfigured threshold may be warned not to proceed through subject, may be deterred using any means described above, or may be otherwise prevented from contacting people whom such a person might infect. Alternatively or additionally, a detected person having a high body temperature may result in a message being transmitted to security, or other devices, to prevent such a person from coming into contact with other people that they may in fact. Mitigation responses may include activation of electronic locks to prevent entering into further rooms near subject area, as well as transmission of messages to medical professionals nearby. In addition, past data from the remove device 140 can be used to contact trace a person who may be detected to have been infected by reviewing all people identified in imagery that were in close proximity to the subject 308.

Figure 17:
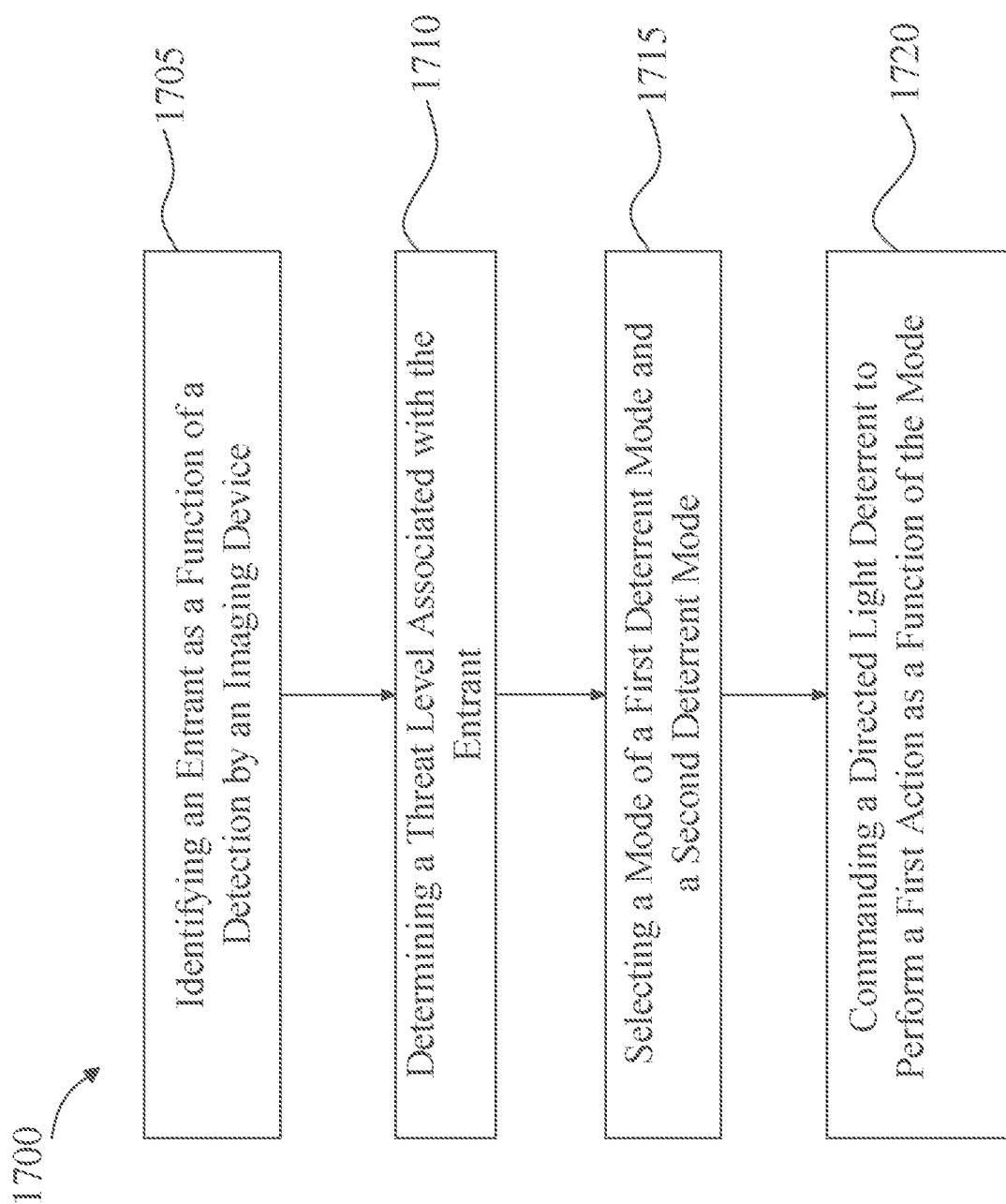
FIG. 17 is a flow diagram of a method of automated threat detection and deterrence.

Referring now to FIG. 17, an exemplary embodiment of a method 1700 of automated threat detection and deterrence is illustrated. At step 1705, identifying, by a processor 136 communicatively connected to an imaging device 104 and a deterrent component 152 including a directed light deterrent 156, a subject 308 as a function of a detection of the subject 308 by the imaging device 104; this may be implemented, without limitation, as described above in reference to FIGS. 1-12. At step 1710, determining, by the processor 136, a behavior descriptor associated with the subject 308; this may be implemented, without limitation, as described above in reference to FIGS. 1-12. At step 1715, selecting, by the processor 136, a mode of a first deterrent mode and a second deterrent mode as a function of the behavior descriptor; this may be implemented, without limitation, as described above in reference to FIGS. 1-12. At step 1720, commanding, by the processor 136, the directed light deterrent 156 to perform an action of a first deterrent action and a second deterrent action as a function of the mode, wherein the first deterrent action is distinct from the second deterrent action; this may be implemented, without limitation, as described above in reference to FIGS. 1-12.

Disclosed herein are various embodiments of a deterrent apparatus with multiple deterrent types and an incorporated watchdog system that monitors parameters of deterrents and/or other apparatus elements to ensure adherence to safety standards. Cumulative outputs may be tracked across mesh networks of multiple apparatuses. Shutdown or limiting of deterrent outputs may be performed autonomously from other elements, adding redundancy to safety protection measures.

Figure 18:
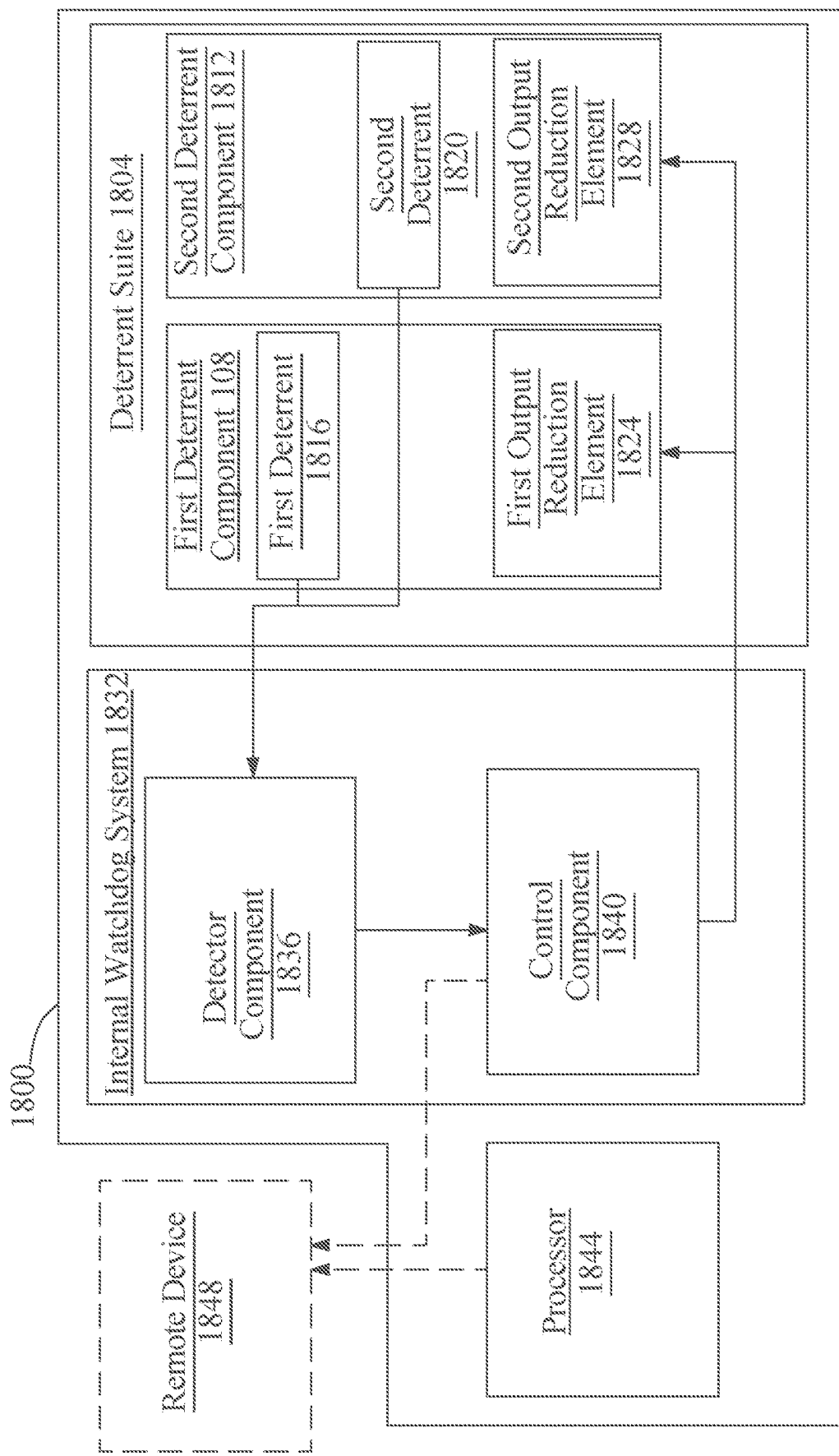
FIG. 18 is a block diagram of an exemplary embodiment of a multimodal deterrent apparatus with an internal watchdog system.

Referring now to FIG. 18, an exemplary embodiment of a multimodal deterrent apparatus 1800 with an internal watchdog system is illustrated. Apparatus 1800 includes a deterrent suite 1804. A "deterrent suite," as used in this disclosure, is a set of one or more deterrent components. A "deterrent component," as used in this disclosure, is an electronic component that includes and/or drives a deterrent, defined as an element or device that generates a deterrent output. A "deterrent output" is defined of the purposes of this disclosure as a physical or psychological interaction with an individual that discourages and/or stops the individual from performing a behavior contrary to one or more security objectives; the one or more security objectives may be determined by apparatus 1800 and/or entered thereon by a user, for instance and without limitation as described in U.S. Provisional Application No. 63/067,142. A deterrent component may include additional elements as described in further detail below.

With continued reference to FIG. 18, deterrents included in deterrent suite 1804 may include, without limitation a directed light deterrent. A "directed light deterrent," as used in this disclosure, is a deterrent that uses a high-intensity light source, such as, but not limited to, a laser, super LED, laser illuminated LED, super-luminescent LED, VCSEL, plasma discharge lamp, and/or high-intensity LED that is actively aimed at and/or focused on an individual to be deterred, to generate a deterrent effect. A directed light deterrent may include a beam steering component, which may include, without limitation, two or more reflective elements used as scanning mirrors, spatial light modulators, metamaterials/metasurfaces, liquid crystal directors, Risley prisms, micro-optical arrays, fast steering mirrors, tip/tilt optics, holographic phase modulators, and/or off-centered lens elements. In one embodiment, reflective elements, which may include any reflective elements for use in scanning mirrors as described above in reference to light radar component, may be arranged in close proximity to one another on axes that are substantially orthogonal causing one mirror to act as a vertical scanning mirror and another mirror to act as a horizontal scanning mirror. Such an arrangement may enable rapid scanning of laser and or other light beams across objects in subject area. Directed light deterrent may include any additional optics suitable for use in optical instruments such as lasers or other high intensity light sources, including additional amplifiers, beam expanders, or the like. In an embodiment, a beam may be collimated, or may not be collimated at one or more different stages in its processing by optical instruments within directed light deterrent. Light from directed light deterrent may be coherent or may not be coherent, depending on desired applications. In some embodiments, optical elements through which a beam may pass in directed light deterrent may have an effect of dissipating, polarizing, wavelength shifting, filtering, modifying, homogenizing, interrupting, or spreading power of the beam. As a result, a beam incident on objects in subject area, including without limitation a face or eyes of an individual, may have substantially lower intensity than at initial production of beam.

Still referring to FIG. 18, deterrent suite 1804 may include a microwave or MMW source. Microwave or MMW source. Microwave source may emit light and/or radiation at a wavelength that causes non-lethal pain and/or burning sensations; for instance, and without limitation, microwave and MMW source may generate radiation having a frequency of approximately 95 GHz.

Further referring to FIG. 18, deterrent suite 1804 may include an audio deterrent, for instance and without limitation as defined above; audio deterrent may include a directed sound source and/or a directed audio deterrent.

With continued reference to FIG. 18, deterrent suite 1804 may include an electric shock or Human Electro-Muscular Incapacitation (HEMI) device. Electric shock or HEMI device may include a "stun gun" and/or taser, which may, for instance be able to fire two or more cartridges up to 25 feet, as in a taser area denial system (TADS). Alternatively or additionally, shock device may be used to electrify one or more objects or surfaces to generate a shock upon contact or near approach by a user. Alternatively or additionally, shock and HEMI device may use generated plasmas, electric fields, ionization, and/or other methods to convey a neurostimulation to an individual from a distance.

With further reference to FIG. 18, deterrent suite 1804 may include one or more sources of noxious smells and/or other chemical deterrents, such as pepper spray, "skunk" or malodorant weapons, tear gas, pacifying agent, or the like, which may be squirted out of nozzles in liquid, vapor, and/or gaseous form, or fired as projectiles that break open and/or otherwise disperse such irritants. Chemical deterrents may further take a form of a sticky and/or slippery substance released onto a walking surface to make proceeding and/or aggressive motions more difficult.

Still referring to FIG. 18, deterrent component may include one or more sources of entanglement devices such as without limitation nets, bolas, and/or other entanglement or entrapment devices that are launched ballistically at an individual in order to limit or stop an individual's ability to move normally. A deterrent component may use a processor 1844 and/or imaging devices to calculate and predict, based on the distance and movement of an individual, in addition to the ballistic properties of the entanglement device, a corrected point of aim to launch the entanglement device.

With further reference to FIG. 18, deterrent suite 1804 may include one or more sources of obscurant delivery system, such as, but not limited to, devices that operate to obscure vision or other senses of an individual. For instance, and without limitation, these may include fog generators such as biodegradable fog generators, smoke generators, and/or water mist generators. An effect of obscurant deterrents may be further enhanced by illuminating obscurants with light sources, which may include any light sources of deterrent suite 1804 as described in this disclosure.

With continued reference to FIG. 18, deterrent suite 1804 may include one or more sources of blunt force or kinetics delivery devices, such as, but not limited to, bean bag round launchers, stingballs, non-lethal grenade or payload launchers, water cannons, air cannons, and/or other methods to deliver non-lethal kinetic effects to an individual.

Still referring to FIG. 18, deterrent suite 1804 may include one or more sources of marking delivery devices, including without limitation paintball launchers, dye sprayers, paint sprayers, malodorant launchers, and/or other methods that will optically, odorant, or other senses tag an individual for later identification. Marking delivery devices may include dyes that are visible or non-visible to the human eye that require special lighting or other methods to detect at a future time. Dyes, paints, and/or markers may be formulated to make removal extremely difficult.

In an embodiment, and further referring to FIG. 1, deterrent suite 1804 may be configured to combine one or more types of deterrent simultaneously and/or sequentially, for instance to create a flanking effect, or as dictated by power, resource limitation, and/or safety determinations. For instance, optical deterrent actions may be combined with startling noises and/or commands to vacate subject area and/or cease one or more activities. Alternatively, if an individual has recently had vision temporarily impaired, directional audio outputs may be used to urge an individual toward an exit and/or to increase disorientation of an individual. Which sequence and/or combination of deterrents is used may be determined using an input from watchdog elements as described in further detail below.

Further referring to FIG. 18, deterrent suite 1804 may include a plurality of deterrent components, each of which may include a different deterrent; for instance, in a non-limiting embodiment, deterrent suite 1804 includes a first deterrent 1816 component 1808 and a second deterrent 1820 component 1812. First deterrent 1816 component 1808 and second deterrent 1820 component 1812 include, respectively, a first deterrent 1816, and a second deterrent 1820, each of which may include any deterrent as described above. Second deterrent 1820 may be distinct from first deterrent 1816. For instance, and without limitation, first deterrent 1816 may include a directed light deterrent while second deterrent 1820 may include an audio deterrent.

Further referring to FIG. 18, first deterrent 1816 component 1808 and second deterrent 1820 component 1812 include, respectively, a first output reduction element 1824 and a second output reduction element 1828. An "output reduction element," as used in this disclosure, is a component and/or element of a deterrent component that, when activated, attenuates, interrupts, and/or terminates output by a deterrent of the deterrent component. An output reduction element may provide enhanced safety characteristics for deterrent suite 1804 and/or apparatus 1800 as a backup and/or failsafe deterrent interruption based on operating parameters of the apparatus 1800. For instance, and without limitation, where a deterrent of a deterrent component is a directed light deterrent, an output reduction element may include a shutter or similar device that interrupts the outputted light source. For instance, and without limitation, a shutter may include an LST400 from NM Laser Products; in an embodiment, a shutter may be able to completely prevent all or substantially all light output within 20 milliseconds of command. A shutter may prevent passage of a beam of light such as a laser beam in the absence of a command signal directing the shutter to remain open, such that a fault and/or interruption in communication with shutter may cause an automatic closure thereof. As a further example, where first deterrent 1816 component 1808 includes a directed light deterrent, first output reduction element 1824 may include an optical modulator, such as without limitation an Acousto-optic modulator or electro-optic modulator such as those used in q-switching or the like. For instance, and without limitation, an optical modulator may include a polychromatic acousto-optic modulator. Additional non-limiting examples of output reduction elements that may be used with a directed light deterrent include filters, attenuators, physical interruptions, or the like As a further non-limiting example, and continuing to refer to FIG. 18, at least one of first output reduction element 1824 and second output reduction element 1828 may include a power regulation control element. A "power regulation control element," as used in this disclosure, is an element activation of which restricts electrical power to a component such as a deterrent as described above. A power regulation control element may include one or more power switches, current and/or voltage limiters, or the like. Power regulation control elements may be implanted using physically actuated relays, transistors such as bipolar junction transistors (BJTs), insulated gate bipolar transistors (IGBTs), field effect transistors such as metal oxide field effect transistors (MOSFETs), thyristors such as integrated gate-commutated thyristors (IGCTs) or triodes for alternating current (TRIACs), variable resistors such as photoresistors, thermistors, potentiometers, or the like, and/or any other device that may be used to switch on or off or otherwise regulate electric current.

Further referring to FIG. 18, where one of first deterrent 1816 and second deterrent 1820 includes an audio deterrent, at least one of first output reduction element 1824 and second output reduction element 1828 may include a sound-attenuating element. A "sound-attenuating element," as used in this disclosure, is an element that physically interferes with emission of sound by an audio output device. A sound-attenuating element may include, without limitation, a door, blanket, or pad that can be closed over a speaker or other audio output device, and/or an object that can be brought into contact with a membrane and/or piezoelectric element of a speaker, and/or a mechanical mechanism that can move a piezoelectric element out of contact with a membrane or other amplifying medium.

Still referring to FIG. 18, apparatus 1800 includes an internal watchdog system 1832. Internal watchdog system 1832 and/or one or more elements thereof as described in further detail below may be incorporated in apparatus 1800 by inclusion within a housing containing other elements of apparatus 1800. Internal watchdog system 1832 and/or one or more elements thereof may draw on a power source of apparatus 1800. Internal watchdog system 1832 may include one or more elements sharing and/or electrically connected to one or more electrical circuit elements of apparatus 1800. Internal watchdog system 1832 may include one or more elements communicatively connected to elements of apparatus 1800. As used herein, "communicative connecting" is a process whereby one device, component, or circuit is able to receive data from and/or transmit data to another device, component, or circuit. In an embodiment, communicative connecting includes electrically coupling at least an output of one device, component, or circuit to at least an input of another device, component, or circuit. Communicative connection may be wired, wireless, effected using magnetic and/or optical couplings, or the like; communicative connection may be performed according to any process and/or protocol for communication between devices and/or units as described in this disclosure.

With continued reference to FIG. 18, internal watchdog system 1832 includes a detector component 1800 configured to detect a first parameter of the first deterrent 1816 component 1808 and a second parameter of the second deterrent 1820 component 1812. Detector component 1800 may include one or more sensors or other elements configured to measure parameters of performance of one or more elements, components, outputs, and/or inputs of apparatus 1800. Detector component 1800 may include a single interconnected component and/or two or more disconnected components; alternatively or additionally, internal watchdog system 1832 may include multiple instances of detector component 1800. As a non-limiting example, where first deterrent 1816 includes a directed light deterrent, first parameter may include irradiance generated by the directed light deterrent. For instance, and without limitation, where measuring a directed light deterrent, an optical power meter may include a measuring head such as model number SEL033 and an optical amplifier board such as model A430, both from the company International Light. An optical power meter may be used to constantly monitor the power of a laser beam or other beam being emitted from a directed light deterrent. Optical power meter may detect power of a mean using a pick-off and/or beam splitter-based optical power meter or may include a pass-through optical power meter.

As a further example, and continuing to refer to FIG. 18, where second deterrent 1820 includes an audio deterrent, second parameter may include a measure of acoustic intensity, such as a level of acoustic intensity represented using decibels safety with regard to human hearing.

Still referring to FIG. 18, where a deterrent of first deterrent 1816 component 1808 and second deterrent 1820 component 1812, and/or deterrent suite 1804, includes a scanning mechanism, such as galvanometric mirrors, FSM mirrors, or the like, a parameter related to safety may include a scanning velocity. A detection component may be configured to act as a velocity monitor, which may monitor X-Y scanning action. As a non-limiting example, X and Y position signals from X-Y galvanometric and/or scanner servo drivers may be input to analog-to-digital conversion circuitry connected to logic circuits, and/or to operational amplifiers which are configured to take a first derivative of each position signal, thus providing signals which are equivalent to the X and Y beam velocity. X and Y beam velocity signals may then be aggregated to produce a number representing overall scanning velocity; aggregation may include addition of absolute values of X and Y velocity, for instance by finding twos complements of negative values, and/or by storing X and Y velocities in unsigned number fields as directionless "speed" variables. Alternatively or additionally, X and Y beam velocity signals may be squared by multipliers. Aggregate signal may be formed by adding together absolute value and/or squared velocity values. This signal may then be compared with a constant voltage which represents a preferred minimum acceptable beam velocity, as described in further detail below. An aggregate value representing X and Y position may alternatively or additionally be monitored.

With continued reference to FIG. 18, at least one of the first parameter and the second parameter may include an electrical parameter. An "electrical parameter," as used in this disclosure, is any parameter that may be directly or indirectly measured with regard to an electrical circuit. For instance, and without limitation, an electrical parameter may include a voltage level. As a further non-limiting example, an electrical parameter may include a current. Other electrical parameters may include, without limitation, capacitance, inductance, resistance, or the like. Electrical parameters may include voltage, current, and/or power to particular deterrents. For instance, voltage, current, and/or electrical power to a deterrent that converts electrical power to a proportionally related output, such as a directed light deterrent, an audio deterrent, an electrical deterrent, or the like, may be used to represent power being output by such deterrents; values so derived may be used as substitutes for and/or in addition to devices that directly measure output such as meters of light intensity, sound intensity, or the like.

Still referring to FIG. 18, a detector component 1800 measuring an electrical parameter may include a power supply detection component. A power supply detection component may monitor the power supply voltages that feed one or more deterrents and/or an output from a power supply component such as a connection to alternating current mains power, an energy storage device such as a battery or fuel cell, a photovoltaic power source, or the like; power drawn from a power source may be compared to power drawn by components, for instance and without limitation to detect faults in apparatus 1800 and/or detector element circuitry.

With continue reference to FIG. 18, a detector component 1800 may measure an electrical parameter of another detector component 1800. For example, and without limitation, where a first detector component 1800 measures intensity of a deterrent output, a second detector component 1800 may measure one or more electrical parameters of the first detector component 1800 to determine whether the first detector component 1800 is functioning effectively; if first detector component 1800 is not functioning correctly, an output reduction element corresponding to the deterrent may be activated to prevent potential safety issues. As a non-limiting example, a beam power meter monitor may measure an output of a beam power meter as described above, and make sure that it is functioning properly.

Still referring to FIG. 18, at least one of first parameter and second parameter may include a temperature. Temperature may be measured, without limitation, using an electrical component for which at least one electrical parameter changes as a result of a change in temperature, such as without limitation a thermistor or the like. In an embodiment, a temperature of a circuit element may be used to indicate likely performance of that element; for instance, semiconductor elements such as transistors, diodes, LEDs, or the like may function differently when overheated then when operating at ordinary temperatures. As a further non-limiting example, a temperature of a deterrent may indicate power output and/or may be compared to electrical power input to the deterrent calculate power output by measuring waste heat generated by the deterrent. As an additional non-limiting example, a temperature of a particular component above a preconfigured threshold may indicate that the component is about to fail or is likely to behave in an unpredictable or inefficient manner.

With continued reference to FIG. 18, at least one of first parameter and second parameter may include a cumulative energy value. A "cumulative energy value," as used in this disclosure, is a value representing a total amount of energy delivered by a deterrent over a given time period. For instance, and without limitation, maximum permissible exposure for a directed light deterrent as described in further detail below may specify a maximum instantaneous intensity, irradiance, and/or power delivery, and/or may specify a maximum total energy which may be delivered to the eyes of an individual, where the latter may be compared to a cumulative energy value representing a total quantity of energy delivered by a directed light deterrent. As an additional non-limiting example, electrical deterrents may have both instantaneous limits on voltage and/or current as well as overall electrical power delivery limits, the latter of which may correspond to a cumulative energy value representing a total electrical energy delivered. As a further non-limiting example, an acoustic deterrent may be subject to a maximum instantaneous measure of intensity such as a decibel level, as well as a cumulative limit of decibels above a threshold level that are delivered over a given time period. A cumulative energy value may depend both on time and intensity of exposure; that is, exposure beneath a threshold of power or intensity may not be added to the cumulative energy value.

In an embodiment, and still referring to FIG. 18, a cumulative energy value may include a per-engagement value. A per-engagement value, as used in this disclosure, is a cumulative energy value that accumulates over the course of an engagement. An "engagement," as used herein, is a single interaction or sequence of interactions of a particular individual with apparatus 1800 or a network or system containing apparatus 1800. For instance, an engagement may include a period of time during which an individual is attempting to access a forbidden or protected zone, is trespassing on a premises being protected by apparatus 1800, and/or is otherwise engaging in behaviors that cause apparatus 1800 to use deterrents against the individual. An engagement may include an uninterrupted period in which an individual is in a subject area protected by apparatus 1800 and/or a system including apparatus 1800 and/or may include a series of such uninterrupted periods that are temporally proximate. For instance, apparatus 1800 and/or a component thereof may include a variable that is set when interaction with individuals and/or a particular individual begin, indicating initiation of an engagement, and may be cleared and/or reset, indicating the end of an engagement, when interaction generally or with a specific individual has ceased for a threshold period of time. For instance, termination of an engagement may be recorded when a given person has been absent from and/or not interacting with apparatus 1800 for one hour, one day, or any other suitable period. In an embodiment, each variable may receive initiation and reset signals, and/or signals identifying a particular individual as currently interacting, from apparatus 1800, permitting use of facial recognition and/or other data determined by apparatus 1800 to be used in determining whether a given individual is currently interacting with is currently adding to a cumulative energy value while a corresponding deterrent is outputting. In such an exemplary embodiment, where apparatus 1800 is not identifying particular individuals, all interactions may be treated as corresponding to a single individual; that is, cumulative energy values may depend solely on outputs generated during an engagement as delimited by cessation of all interaction for a threshold period of time. Individual-agnostic cumulative energy values and/or per-engagement energy values may alternatively or additionally be used as a fail-safe limit to prevent accidentally exceeding cumulative energy values due to faulty recognition of distinct individuals.

With further reference to FIG. 18, cumulative values may be tracked and recorded across a mesh network. Mesh networks may be used to coordinate responses between two or more apparatuses 1800. For instance, two apparatuses 1800 in the same subject area may coordinate transmission of directed light deterrent actions, or other actions based upon detected individual behavior, postures, or the like. For instance, and without limitation, two or more apparatuses 1800 may have two or more deterrent light wavelengths which may be deployed concurrently or sequentially in order to add to confusion and/or resistance to eyewear protection as described above. Alternatively or additionally, two or more apparatuses 1800 deployed in two or more separate security zones and/or subject areas may coordinate by communicating actions and/or determinations concerning entrance and/or intrusions in such security areas. This may be used, for instance, to determine what ambient light exposure an individual has experienced, which direction an individual has come from, and/or what activity an individual may be expected to perform. For instance, where one apparatus 1800 has detected aggressive behavior by an individual, this may be used as an immediate blacklist by other apparatuses 1800, where an individual identified as the same individual entering a new subject area may be immediately responded to with more aggressive responses such as saturation, strobing, electric shock or other responses, on the basis that this individual has been identified as a threat that must be neutralized. Such data may also be transmitted remotely, and sent as updates to security teams, law enforcement, or other users attempting to respond to an ongoing or developing security threat. Such user may use such information to determine a likely current location of a perpetrator and or other individual as well as to formulate or plan a strategy for counteracting the actions of an individual and neutralizing any threat. Two or more apparatuses 1800 deployed in the same area may be used to create one or more additional coordinated actions, such as creation of light curtains, to indicate divisions between authorized and unauthorized areas, guide crowd movement, or the light. As a further example, a series of apparatus 1800 is may provide directional indicators such as directional images or the like which made direct entrance and our users in Direction Evacuation, or the like.

In an embodiment, and still referring to FIG. 18, each internal watchdog system 1832 may transmit cumulative values to other apparatuses 1800 in mesh networks. Internal watchdog system 1832 may receive initial and/or updated cumulative energy values from other apparatuses 1800. In an embodiment, internal watchdog system 1832 may add such updated cumulative values to corresponding individual and/or individual-agnostic cumulative values maintained by internal watchdog system 1832; alternatively or additionally, updated values received from one or more additional apparatuses 1800 in a mesh network may overwrite current cumulative values of internal watchdog system 1832, optionally only where the former is greater than the latter. In an embodiment, tracking and incrementing of cumulative energy values across mesh networks may help to ensure that apparatuses 1800 across a mesh network do not combine to exceed cumulative safety limits.

With continued reference to FIG. 18, at least one of first parameter and second parameter may include a location-dependent parameter. A "location-dependent parameter," as used in this disclosure, is a cumulative parameter that applies for some region of an area or volume that may be scanned by a deterrent such as without limitation first deterrent 1816 or second deterrent 1820. For instance, a region across which a deterrent may scan may be divided into sectors, identifiable by internal watchdog system 1832 by measurement of scanning x and y values, for instance as described above; a total plane and/or volume of scanning may be divided into sectors, and cumulative values may be taken per-sector. Alternatively or additionally, apparatus 1800 may provide a current sector containing an individual to internal watchdog system 1832, and cumulative energy values for that individual may be recorded per the indicated sector.

Still referring to FIG. 18, at least one of first parameter and second parameter may include a distance-dependent parameter. A "distance-dependent parameter," as used in this disclosure, is a parameter that depends on a distance from an individual to apparatus 1800. For instance, and without limitation, an individual 10 feet (3 m) away from a directed light deterrent may receive a higher amount of optical energy than individual 20 feet (6 m) away from the directed light deterrent, per output irradiance, owing to beam dispersal, diffraction, and the like. Apparatus 1800 may provide internal watchdog system 1832 with a value indicating a current distance from apparatus 1800 of an individual. Internal watchdog system 1832 may weight measurements taken for cumulative and/or instantaneous values according to value.

With continued reference to FIG. 18, at least one of first parameter and second parameter may include an aggregate parameter. An "aggregate parameter," as used in this disclosure, is a parameter calculated as a function of two or more parameters as described above. Aggregation may include addition, averaging, or any other form of combination of values. As a non-limiting example, a plurality of parameters regarding one deterrent may be aggregated together to generate an aggregate parameter which may be used as an alternative or additional parameter to the individual parameters. For instance, scanning velocity, output intensity, and/or other parameters corresponding to a directed light deterrent may be combined to generate an aggregate parameter which may be measured in its own right.

Continuing to refer to FIG. 18, internal watchdog system 1832 includes a control component 1840. Control component 1840 may include analog circuit such as a circuit that performs computations and/or comparisons using operational amplifiers and/or comparators. Control component 1840 may include a logic circuit, such as a field-programmable gate array (FPGA), (ASIC), processor 1844, microcontroller, or the like. Control component 1840 may receive reference values, cumulative values, initiation signals, reset signals, firmware updates, and/or software updates from remote devices 1848 and/or elements of apparatus 1800, for instance and without limitation as described below. Control component 1840 is configured to compare each of the first parameter and the second parameter to a reference value and activate at least one of the first output reduction element 1824 and the second output reduction element 1828 as a function of the comparing. A "reference value," as used in this disclosure, is a value representing a safety limit to which a parameter may be compared to determine whether a safety limit corresponding to one or more deterrents has been reached. A reference value may be stored in local hardware and/or software memory of internal watchdog system 1832, for instance during manufacture, installation, and/or calibration of internal watchdog system 1832 and/or apparatus

1800. Alternatively or additionally, control component 1840 may be configured to receive reference value from a remote device 1848. Control component 1840 may be configured to receive reference value from one or more elements of apparatus 1800. Control component 1840 may include a single interconnected component and/or two or more disconnected components; alternatively or additionally, internal watchdog system 1832 may include multiple instances of control component 1840, each of which, for instance, may be associated with a corresponding detector component 1800.

In an embodiment, and still referring to FIG. 18, control component 1840 may determine, as a result of comparison to a reference value, that one or more fault conditions has occurred, and/or that one or more safety limits has been reached. For instance, and without limitation, control component 1840 may compare parameters monitoring one or more power supplies to reference values representing sufficient power levels for proper operation of deterrents and/or one or more elements thereof; where power supplies are not sufficient to ensure proper operation of scanning or other output elements, a fault condition may be raised and an output limiting element may be activated. As a non-limiting example, where a parameter measuring scanning velocity of a directed light deterrent is below some threshold limit such as without limitation 1 radian per second, for more than a threshold period of time, an output-limiting element of the directed light deterrent may be activated due to an unacceptably long dwell time of directed light deterrent on one spot. As a further non-limiting example, an instantaneous and/or cumulative measure of intensity, energy, and/or power of a deterrent such as a directed light deterrent, acoustic deterrent, and/or electrical deterrent may be compared to threshold values representing maximal safe limits for such values.

Further referring to FIG. 18, and as a non-limiting example, intensity and/or power levels of a directed light deterrent may be set according to one or more safety limitations. For instance, and without limitation, intensity and/or duration of light output may be limited to less than maximum permissible exposure (MPE) and/or some percentage less than of MPE, as determined as a function of beam intensity, beam divergence, and distance from light source of an individual. For instance, where light source is non-collimated and diverging, MPE for an individual at an opposite side of subject area may permit a substantially higher intensity than MPE for an individual who is near to light source. As noted above, intensity of light source may be varied according to which an individual is being exposed to light. In an embodiment, a visible light source may be configured to shut off automatically where distance to an individual is less than a preconfigured threshold amount. Distance to an individual may be determined, without limitation, using time of flight calculation, object inference, stereoscopic vision, and/or other 3D measuring techniques. MPE may be calculated, without limitation, according to ANSI4 power exposure safety limitations. MPE levels from directed light source may be measured at various power output levels using a power meter, to determine how MPE depends on output intensity, distance to an individual, and/or any other parameters, permitting accurate safety determinations and/or computation of preconfigured distance threshold for shutoff. Power provided to an individual may alternatively or additionally be determined using real-time feedback. For instance, power density in a target area such as a vision band of an individual may be measured using chroma and/or luma values captured at a wavelength of directed light deterrent; such feedback may be used to adjust intensity in real time and/or provided to remote device 1848 for updated safety thresholds and/or firmware updates.

As a further non-limiting example, and continuing to refer to FIG. 18, a directed light deterrent may be evaluated for a plurality of criteria, each having a different reference value, for instance as described in safety standards such as without limitation the IEC 60825-1 and the ANSI Z1636.1. Such criteria may include, without limitation, single pulse MPE, multiple pulse MPE, and average power MPE. The terms "single pulse" and "multiple pulse," as used in this disclosure refer to phenomena that a human eye may perceive due to a scanning action. When a laser beam scans across the pupil of the viewer's eye, it may deliver a pulse of light to an individual's eye. This is because as the beam scans past the individual's eye, it will only enter the eye for a brief time, depending on beam diameter and the scan rate. This perceived pulse of light may be created by a scanned beam may be similar to a pulse that is created by a beam which is not scanning but is turned on for only a brief instant. An amount of time that a beam is on within the viewer's pupil may be referred to as the pulse width. Safety standards may prescribe a maximum amount of light, that is, a maximum permissible exposure (MPE) that an individual can be receive for a single pulse, and for multiple pulses.

Still referring to FIG. 18, reference values may be set according to one or more efficacy and/or safety considerations. For instance, a threshold for power emitted by light source may be increased for an individual detected as having eyewear, a threshold for power emitted by an acoustic deterrent may be increased for an individual wearing ear protection may be increased, or the like. Determination that an individual is wearing protective equipment may be performed by apparatus 1800 and/or by a local and/or remote computing device, for instance and without limitation as described in U.S. Provisional Application No. 63/067,142, and may be provided to internal watchdog system 1832 according to any form of electronic communication as described above.

Further referring to FIG. 18, where a parameter of first parameter and second parameter is a cumulative parameter, control component 1840 may be configured to reset cumulative parameter upon occurrence of a specified event. For instance, and without limitation, where a parameter of first parameter and second parameter includes a per-engagement value, control component 1840 may be configured to determine that an engagement has terminated and reset the per-engagement value. Control component 1840 may compare aggregate parameters and/or individual parameters to respective thresholds; in an embodiment, failure of any threshold comparison may result in activation of output limiting element.

With continued reference to FIG. 18, internal watchdog system 1832 may be configured to transmit at least a sensor output to a processor 1844. Processor 1844 may be included in apparatus 1800 and/or may be included in and/or include a remote device 1848. Processor 1844 may include any computing device as described in this disclosure, including without limitation a microcontroller, microprocessor 1844, digital signal processor 1844 (DSP) and/or system on a chip (SoC) as described in this disclosure. Processor 1844 may include, be included in, and/or communicate with a mobile device such as a mobile telephone or smartphone. Processor 1844 may include a single computing device operating independently, or may include two or more computing device operating in concert, in parallel, sequentially or the like; two or more computing devices may be included together in a single computing device or in two or more computing devices. Processor 1844 may interface or communicate with one or more additional devices as described below in further detail via a network interface device. Network interface device may be utilized for connecting processor 1844 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 1844 may include but is not limited to, for example, a computing device or cluster of computing devices in a first location and a second computing device or cluster of computing devices in a second location. Processor 1844 may include one or more computing devices dedicated to data storage, security, distribution of traffic for load balancing, and the like. Processor 1844 may distribute one or more computing tasks as described below across a plurality of computing devices of computing device, which may operate in parallel, in series, redundantly, or in any other manner used for distribution of tasks or memory between computing devices. Processor 1844 may be implemented using a "shared nothing" architecture in which data is cached at the worker, in an embodiment, this may enable scalability of system and/or computing device.

With continued reference to FIG. 18, processor 1844 may be designed and/or configured to perform any method, method step, or sequence of method steps in any embodiment described in this disclosure and/or that may occur to a person skilled in the art having the benefit of this disclosure, in any order and with any degree of repetition. For instance, processor 1844 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 1844 may perform any step or sequence of steps as described in this disclosure in parallel, such as simultaneously and/or substantially simultaneously performing a step two or more times using two or more parallel threads, processor 1844 cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing. In an embodiment, processor 1844 may operate deterrent components and/or determine deterrent output selections, for instance and without limitation as described in U.S. Provisional Application No. 63/067,142.

In an embodiment, and still referring to FIG. 18, receiving a reference value may include receiving the reference value as a function of a transmitted sensor output. For instance, control component 1840, apparatus 1800, and/or any element of apparatus 1800 and/or internal watchdog system 1832 may transmit one or more detected parameters, as described above, to a processor 1844 as described above. Transmission may be performed continuously and/or periodically, and/or may be performed in response to events such as interactions with an individual. As a non-limiting example, apparatus 1800 and/or components thereof may receive cumulative values from other devices such as apparatuses 1800 and/or processors 1844, may add to and/or otherwise modify such cumulative values, and/or may transmit cumulative values to other devices. Apparatus 1800 and/or one or more components thereof may transmit and/or receive notifications that an interaction with an individual has occurred; such notifications may, e.g., be used in initiation and/or reset of cumulative parameters, in updates to cumulative parameters, or the like. Control component 1840 may be configured to transmit an indication of output reduction element activation to a processor 1844 or other device. Control component 1840 may be configured to receive an indication of output reduction element activation from another device; control component 1840 may activate one or more output reduction elements in turn. As non-limiting example, control component 1840 may receive an identification of an output reduction element activated on another device and activate a corresponding output reduction element on apparatus 1800; as non-limiting example, where the other device indicates that a directed light deterrent output reduction element such as an optical modulator and/or shutter has been activated, control component 1840 may activate a corresponding output reduction element, such as an optical modulator and/or shutter, of apparatus 1800.

Figure 19:
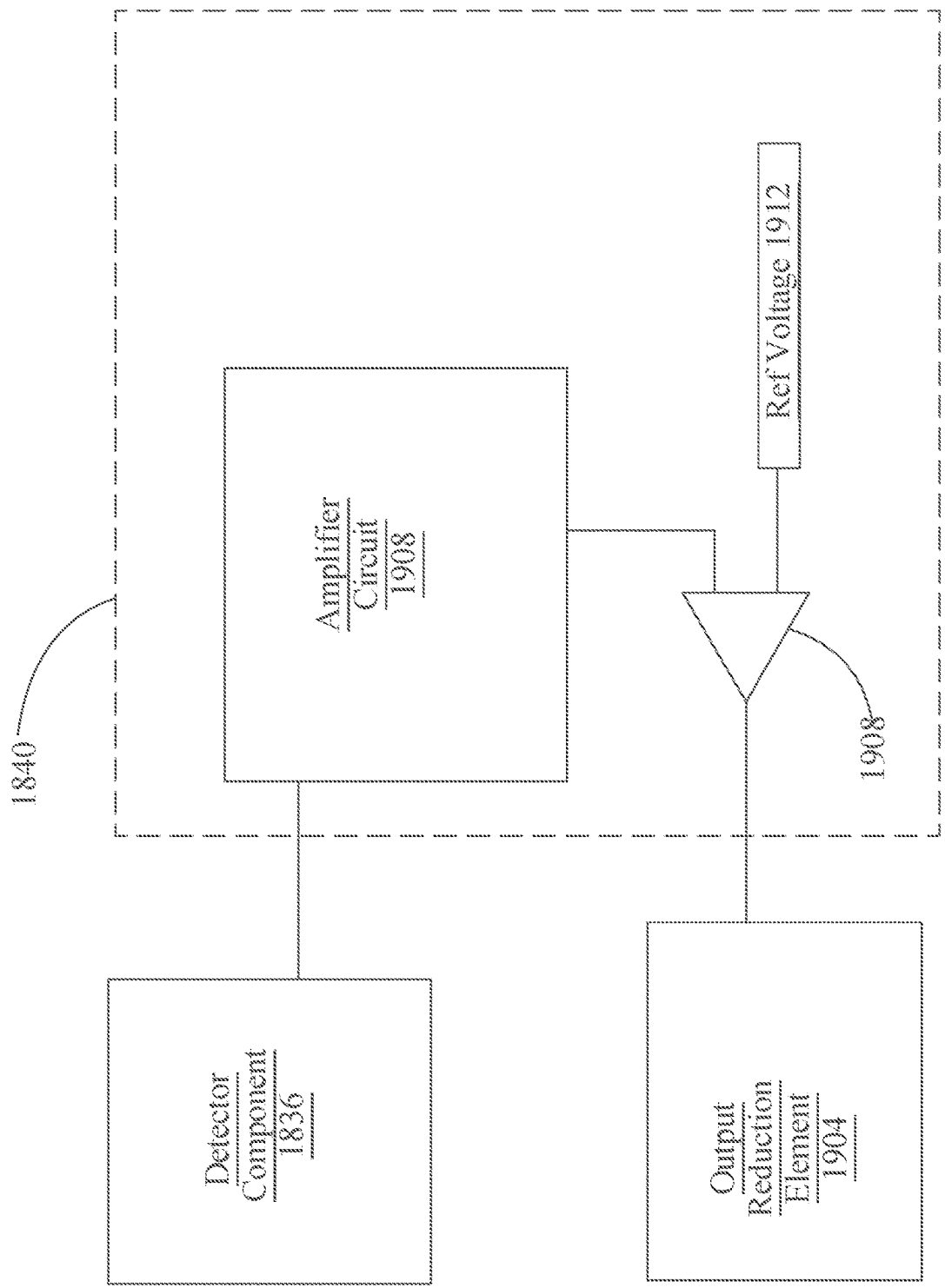
FIG. 19 is a block diagram illustrating an exemplary embodiment of an analog control component.

Referring now to FIG. 19, a block diagram of an exemplary embodiment of a control component 1840 including one or more elements of analog circuitry is illustrated. A control signal controlling activation of an output reduction element 1904, which may include any element or component suitable for use as first output reduction element 1824 and/or second output reduction element 1828 as described above, may be output by an analog element or circuit configured to compare at least a reference parameter to a parameter received from detector component 1800. For instance, and without limitation, a comparison between a detector component 1800 parameter and a reference parameter may be performed, at least in part, using a comparator 1908. Alternative or additional elements in a comparison circuit may include diodes, transistors, or other elements; for instance, a difference between reference parameter and detector parameter may be used directly as an activation signal for an output reduction element 1904. Reference parameter may include any electrical parameter and may include the same type of electrical parameter as detector parameter or may include a distinct parameter therefrom. For instance, and without limitation, reference parameter may include a reference voltage, for instance as generated across a resistor, resistive divider, transistor, any variable resistor as described above, or the like. Reference parameter may be received and/or generated in any manner described above in reference to FIG. 18, including without limitation from digital components as described in further detail below. Any detector parameter may similarly include or be converted to voltage for use with a comparator 1908 or other comparison circuit. Persons skilled in the art, upon reviewing the entirety of this disclosure, will be aware of various alternative or additional analog circuits, elements, and/or components that may be used to implement a comparison circuit as defined above, each of which is contemplated as within the scope of this application.

Still referring to FIG. 19, there may be various comparison circuits used to compare multiple parameters to multiple thresholds. For instance, and without limitation, where a plurality of parameters are combined to control a single output reduction component 1904, comparison circuits may be stacked and/or nested so that the output of one comparison circuit functions as a detector parameter and/or reference parameter for a subsequent or downstream comparison circuit. Multiple detector parameters may alternatively or additionally be combined using upstream circuit elements prior to input to comparison circuits, and/or outputs of multiple comparison circuits may be combined using any combination of analog elements, including without limitation any analog elements for aggregation or other mathematical operations as described below. Alternatively or additionally, outputs of comparison circuits may be fed to digital elements, for instance as described below, for combination or additional analysis.

With continued reference to FIG. 19, analog elements of control component 1840 may include elements used for calculation using, combination of, and/or processing of reference parameters and/or detector parameters. Such elements may include, without limitation, one or more amplifier circuits 1908. For instance, and without limitation, aggregate parameters may be generated in amplifier circuit 1908 using operational amplifier-based adders and/or multipliers. As a further non-limiting example, cumulative parameters may be calculated and/or generated using capacitors, inductors, and/or cumulative amplifier circuit elements such as without limitation integrators. Scanning velocities and/or other rates of change of measurable quantities may be determined, without limitation, using operational amplifier differentiators. Persons skilled in the art, upon reviewing the entirety of this disclosure, will be aware of various analog and/or amplifier-based circuit elements and/or combinations thereof that may be used to generate detector parameters, reference parameters, or the like. Such calculation elements may alternatively or additionally be used between and/or within stages of comparison circuits.

Figure 20:
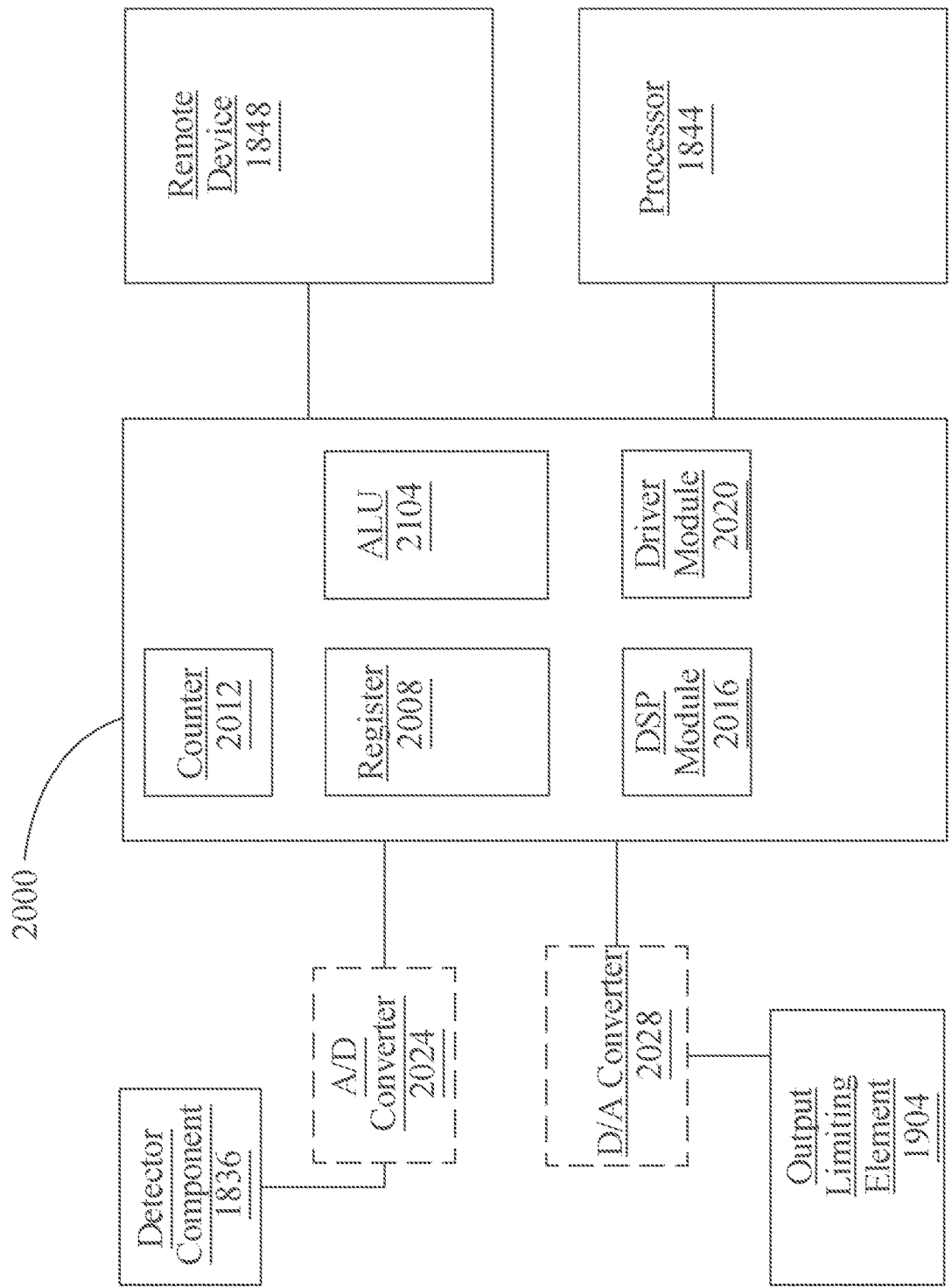
FIG. 20 is a block diagram illustrating an exemplary embodiment of a digital control component.

Referring now to FIG. 20, a block diagram of exemplary embodiments of digital circuit elements 2000 of a control component 1840 is illustrated. Digital circuit elements 2000 may be implemented as an ASIC, FPGA, microprocessor 1844, microcontroller, or the like. In some embodiments, digital circuit elements 2000 may be reprogrammed and/or updated using one or more software and/or firmware updates, which may be received without limitation, from a remote device 1848 and/or processor 1844. Digital circuit elements 2000 may include, without limitation, one or more logic gates and/or modules to compare, calculate, aggregate, and/or arrive at logical determinations concerning detector parameters, reference parameters and the like. One or more calculations and/or determinations may be performed using an arithmetic and logic unit (ALU) 2004, and/or any component and/or components suitable for use therein, such as without limitation adders, multipliers, logical OR, AND, NOR, NAND, XOR, or NOT operators, shift operators, comparison and/or subtraction operators, or the like, which may be augmented with zero flags, overflow bits, or the like. Digital circuit elements may include one or more registers 2008 and/or other elements used to store and retrieve data such as binary data. Digital circuit elements may include one or more counters 2012 for incrementing values, counting clock cycles to work out timing signals, or the like. Digital circuit elements 2000 may include at least a digital signal processing (DSP) module 2016, which may perform signal analysis tasks such as convolution, Fast Fourier Transform (FFT), digital filtering, and/or other processes for signal processing and/or manipulation, for instance and without limitation with regard to detector parameter signals and/or reference parameter signals. Digital circuit elements 2000 may include one or more driver elements 2020, which may generate signals to drive elements to be operated by digital circuit elements 2000, such as without limitation output limiting elements 1904.

Still referring to FIG. 20, detector parameters may be input directly to digital circuit elements 2000 where detector components 1800 are digital and/or output a signal matching a '1' or '0' voltage level, either directly or by way of an amplifier, voltage divider, Zener diode, or other circuit element driving or limiting outputs to particular voltages, and which is capable of conveying meaning by way of its voltage level, such as an "on/off" detection signal, a pulse width modulated (PMW) signal, or the like. Alternatively or additionally, a signal from a detector component 1800 may be converted to a digital signal using an analog to digital (A/D) converter 2024, which may encode, for instance, voltage levels of an incoming voltage signal as digitally encoded binary numerical numbers or the like. Digital circuit elements 2000 may have one or more hardware and/or software modules configured to interpret inputs from an A/D converter 2024 and/or detector component 1800 and perform comparisons, analysis, aggregation, accumulation, or the like of such signals.

With further reference to FIG. 20, digital circuit elements 2000 may perform output of signals, for instance and without limitation for, controlling and/or driving output limiting elements 1904. In some embodiments, such as when output limiting elements are digitally controlled and/or controllable by patterns of '0' and '1' digital values, such as via PWM signals or the like, digital outputs may be used directly or via one or more circuit elements such as amplifiers or the like to control and/or communicate with downstream components. Alternatively or additionally, a signal output by digital circuit elements 2000 may be converted to an appropriate control signal by one or more analog elements such as a low-pass filter, which may convert PWM signals to voltage control levels or the like. In a further alternative or additional embodiment, digital signals may be converted to analog control signals using a digital to analog (D/A) converter 2028.

Still referring to FIG. 20, digital circuit elements 2000 may be configured to communicate with processor 1844 and/or a remote device 1848. For instance, and as described in further detail above in reference to FIG. 18, reference values may be received from processor 1844 and/or remote device 1848. As a further non-limiting example, data such as an indication that an output reduction element 1904 has been activated, data indicating a current value of a cumulative parameter, and/or interaction data regarding an individual may be transmitted to processor 1844 and/or to a remote device 1848.

Continuing to refer to FIG. 20, some elements of control component 1840 may be implemented using analog circuitry while other elements may be implanted using digital circuitry, for instance, as dictated without limitation by performance, reliability, complexity, efficient use of power, and/or any other design considerations. Similarly, and as illustrated in part in FIGS. 2 and 3, analog elements may input to and/or receive outputs from digital elements, and digital elements may input to and/or receive output from analog elements.

In some embodiments, internal watchdog system 1832 may function as an interlock safety system as described in U.S. Provisional Application No. 63/067,142, acting to provide a redundant and fail-safe protective measure in combination with other processes performed in a deterrent apparatus.

Figure 21:
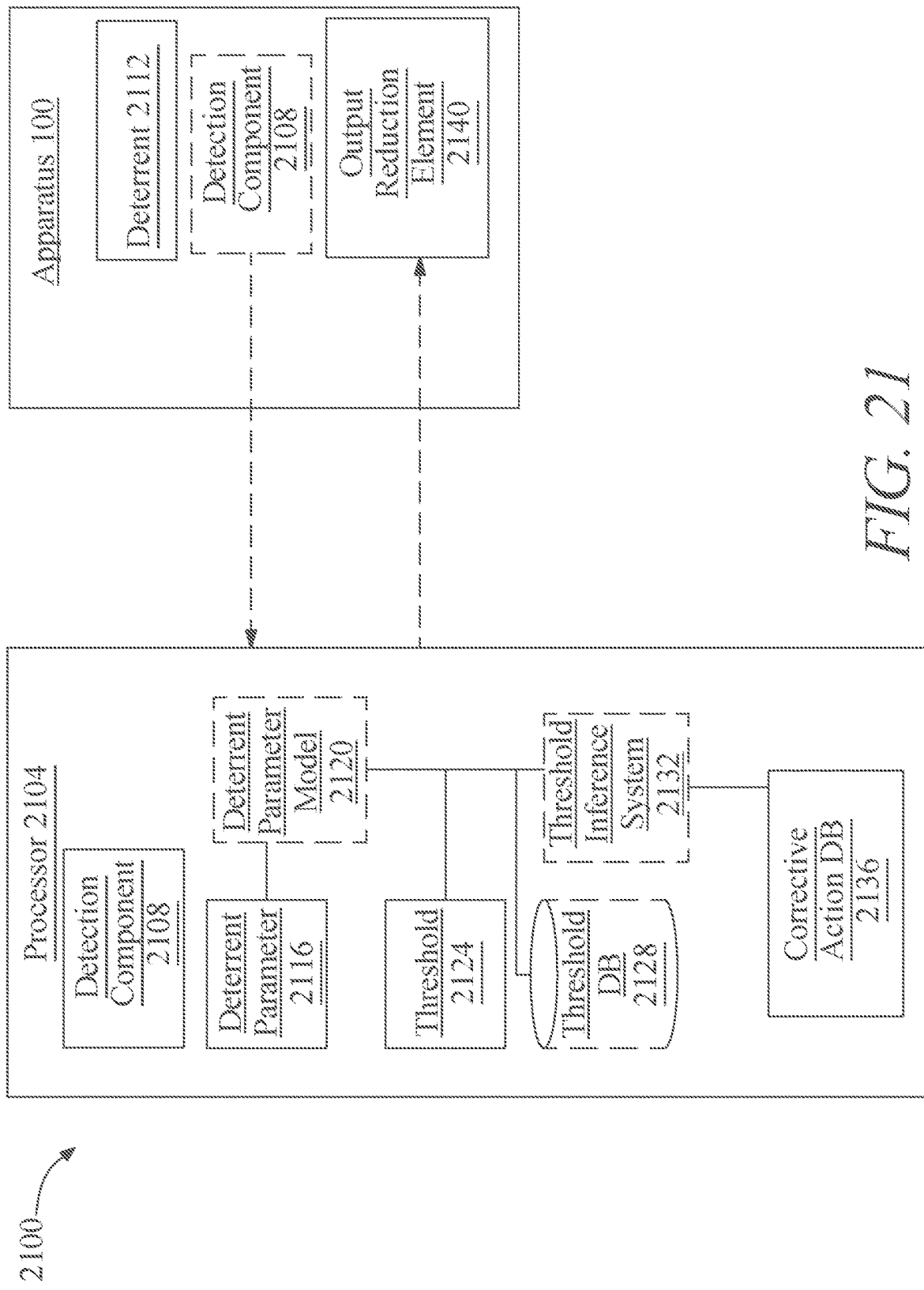
FIG. 21 is a block diagram of an exemplary embodiment of an autonomous safety system.

Referring now to FIG. 21, an exemplary embodiment of an autonomous safety system 2100 for a deterrent 2112 apparatus is illustrated. System 2100 includes a processor 2104, which may include any processor 2104 as described in this disclosure. Processor 2104 may be incorporated in an apparatus and/or may be incorporated in a separately housed device which may be a part of a mesh network, communicatively connected to one or more elements of an apparatus as described above, or the like.

With continued reference to FIG. 21, processor 2104 may be designed and/or configured to perform any method, method step, or sequence of method steps in any embodiment described in this disclosure, in any order and with any degree of repetition. For instance, processor 2104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 2104 may perform any step or sequence of steps as described in this disclosure in parallel, such as simultaneously and/or substantially simultaneously performing a step two or more times using two or more parallel threads, processor 2104 cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

In an embodiment, and still referring to FIG. 21, processor 2104 is configured to detect, using at least a detection component 2108 communicatively connected to at least a deterrent 2112 of a deterrent 2112 apparatus 100, at least a deterrent parameter 2116. A "detection component 2108," as used herein, is a sensor, meter, or other device that can detect a deterrent parameter 2116. At least a detection component 2108 may include one or more sensors or other components for measuring parameters 2116 as described in further detail below; alternatively or additionally, such sensors and/or components may be integrated in an apparatus 100. A "deterrent parameter 2116," as used in this disclosure, is any measurable electrical, energy, or other aspect of a deterrent output. A "deterrent output" is defined of the purposes of this disclosure as a physical or psychological interaction with an individual that discourages and/or stops the individual from performing a behavior contrary to one or more security objectives; the one or more security objectives may be determined by apparatus and/or entered thereon by a user, for instance and without limitation as described above. A "deterrent" for purposes of this disclosure, is a component or element of an apparatus that outputs a deterrent output. A deterrent 2112 may include additional elements as described in further detail below.

Further referring to FIG. 21, detection component 2108 may include a component configured to detect parameters 2116 of a particular form of deterrent 2112. For instance, and without limitation, where a deterrent 2112 includes a directed light deterrent 2112, a detected parameter 2116 may include irradiance generated by the directed light deterrent 2112. A "directed light deterrent 2112," as used in this disclosure, is a deterrent 2112 that uses a high-intensity light source, such as, but not limited to, a laser, super LED, laser illuminated LED, super-luminescent LED, EELD, VCSEL, plasma discharge lamp, and/or high-intensity LED that is actively aimed at and/or focused on an individual to be deterred, to generate a deterrent 2112 effect. A directed light deterrent 2112 may include a beam steering component, which may include, without limitation, two or more reflective elements used as scanning mirrors, spatial light modulators, metamaterials/metasurfaces, liquid crystal directors, Risley prisms, microoptical arrays, fast steering mirrors, tip/tilt optics, holographic phase modulators, and/or off-centered lens elements. In one embodiment, reflective elements, which may include any reflective elements for use in scanning mirrors as described above in reference to light radar component, may be arranged in close proximity to one another on axes that are substantially orthogonal causing one mirror to act as a vertical scanning mirror and another mirror to act as a horizontal scanning mirror. Such an arrangement may enable rapid scanning of laser and or other light beams across objects in subject area. Directed light deterrent 2112 may include any additional optics suitable for use in optical instruments such as lasers or other high intensity light sources, including additional amplifiers, beam expanders, or the like. In an embodiment, a beam may be collimated, or may not be collimated at one or more different stages in its processing by optical instruments within directed light deterrent 2112. Light from directed light deterrent 2112 may be coherent or may not be coherent, depending on desired applications. In some embodiments, optical elements through which a beam may pass in directed light deterrent 2112 may have an effect of dissipating, polarizing, wavelength shifting, filtering, modifying, homogenizing, interrupting, or spreading power of the beam. As a result, a beam incident on objects in subject area, including without limitation a face or eyes of an individual, may have substantially lower intensity than at initial production of beam.

With continued reference to FIG. 21, detection component 2108 may include an optical power meter for measuring a degree of light intensity. Optical power meter may include, without limitation, a measuring head such as model number SEL033 and an optical amplifier board such as model A430, both from the company International Light. An optical power meter may be used to constantly monitor the power of a laser beam or other beam being emitted from a directed light deterrent 2112. Optical power meter may detect power of a mean using a pick-off and/or beam splitter-based optical power meter or may include a pass-through optical power meter. Alternatively or additionally, a detection component 2108 measuring power and/or irradiance of light from a directed light deterrent 2112 may include a camera configured to capture light incident on an individual and/or object, which captured data may be used to calculate and/or estimate incident intensity. A "camera," as used in this disclosure, is an imaging device, which may include any imaging device or combination of imaging devices as described above.

As a further example, and continuing to refer to FIG. 21, where second deterrent 2112 includes an audio deterrent 2112, second parameter 2116 may include a measure of acoustic intensity, such as a level of acoustic intensity represented using decibels safety with regard to human hearing. An audio deterrent 2112 may include, without limitation, any audio deterrent 2112 as described above. For instance, and without limitation, audio deterrent 2112 may broadcast sound or may aim sound in a given direction using, for instance, a sound reflecting device such as a parabolic reflector or the like. An audio deterrent 2112 may include a directed sound source, for instance as defined above.

With continued reference to FIG. 21, at least one of the first parameter 2116 and the second parameter 2116 may include an electrical parameter 2116. An "electrical parameter 2116," as used in this disclosure, is any parameter 2116 that may be directly or indirectly measured with regard to an electrical circuit. For instance, and without limitation, an electrical parameter 2116 may include a voltage level. As a further non-limiting example, an electrical parameter 2116 may include a current. Other electrical parameters 2116 may include, without limitation, capacitance, inductance, resistance, or the like. Electrical parameters 2116 may include voltage, current, and/or power to particular deterrents 2112. For instance, voltage, current, and/or electrical power to a deterrent 2112 that converts electrical power to a proportionally related output, such as a directed light deterrent 2112, an audio deterrent 2112, an electrical deterrent 2112, or the like, may be used to represent power being output by such deterrents 2112; values so derived may be used as substitutes for and/or in addition to devices that directly measure output such as meters of light intensity, sound intensity, or the like.

Still referring to FIG. 21, a detection component 2108 measuring an electrical parameter 2116 may include a power supply detection component 2108. A power supply detection component 2108 may monitor the power supply voltages that feed one or more deterrents 2112 and/or an output from a power supply component such as a connection to alternating current mains power, an energy storage device such as a battery or fuel cell, a photovoltaic power source, or the like; power drawn from a power source may be compared to power drawn by components, for instance and without limitation to detect faults in apparatus and/or detector element circuitry.

With continue reference to FIG. 21, a detection component 2108 may measure an electrical parameter 2116 of another detection component 2108. For example, and without limitation, where a first detection component 2108 measures intensity of a deterrent output, a second detection component 2108 may measure one or more electrical parameters 2116 of the first detection component 2108 to determine whether the first detection component 2108 is functioning effectively; if first detection component 2108 is not functioning correctly, an output reduction element 2140 corresponding to the deterrent 2112 may be activated to prevent potential safety issues. As a non-limiting example, a beam power meter monitor may measure an output of a beam power meter as described above, and make sure that it is functioning properly.

Still referring to FIG. 21, a parameter 2116 may include a temperature. Temperature may be measured, without limitation, using an electrical component for which at least one electrical parameter 2116 changes as a result of a change in temperature, such as without limitation a thermistor or the like. Where detection component 2108 is remote from apparatus, temperature may be measured indirectly using, without limitation, an infrared camera, or the like. In an embodiment, a temperature of a circuit element may be used to indicate likely performance of that element; for instance, semiconductor elements such as transistors, diodes, LEDs, or the like may function differently when overheated then when operating at ordinary temperatures. As a further non-limiting example, a temperature of a deterrent 2112 may indicate power output and/or may be compared to electrical power input to the deterrent 2112 calculate power output by measuring waste heat generated by the deterrent 2112. As an additional non-limiting example, a temperature of a particular component above a preconfigured threshold may indicate that the component is about to fail or is likely to behave in an unpredictable or inefficient manner.

With continued reference to FIG. 21, a deterrent parameter 2116 may include a cumulative energy value. A "cumulative energy value," as used in this disclosure, is a value representing a total amount of energy delivered by a deterrent 2112 over a given time period. For instance, and without limitation, maximum permissible exposure for a directed light deterrent 2112 as described in further detail below may specify a maximum instantaneous intensity, irradiance, and/or power delivery, and/or may specify a maximum total energy which may be delivered to the eyes of an individual, where the latter may be compared to a cumulative energy value representing a total quantity of energy delivered by a directed light deterrent 2112. As an additional non-limiting example, electrical deterrents 2112 may have both instantaneous limits on voltage and/or current as well as overall electrical power delivery limits, the latter of which may correspond to a cumulative energy value representing a total electrical energy delivered. As a further non-limiting example, an acoustic deterrent 2112 may be subject to a maximum instantaneous measure of intensity such as a decibel level, as well as a cumulative limit of decibels above a threshold level that are delivered over a given time period. A cumulative energy value may depend both on time and intensity of exposure; that is, exposure beneath a threshold of power or intensity may not be added to the cumulative energy value.

In an embodiment, and still referring to FIG. 21, a cumulative energy value may include a per-engagement value. A per-engagement value, as used in this disclosure, is a cumulative energy value that accumulates over the course of an engagement. An "engagement," as used herein, is a single interaction or sequence of interactions of a particular individual with apparatus or a network or system containing apparatus. For instance, an engagement may include a period of time during which an individual is attempting to access a forbidden or protected zone, is trespassing on a premises being protected by apparatus, and/or is otherwise engaging in behaviors that cause apparatus to use deterrents 2112 against the individual. An engagement may include an uninterrupted period in which an individual is in a subject area protected by apparatus and/or a system including apparatus and/or may include a series of such uninterrupted periods that are temporally proximate. For instance, apparatus and/or a component thereof may include a variable that is set when interaction with individuals and/or a particular individual begin, indicating initiation of an engagement, and may be cleared and/or reset, indicating the end of an engagement, when interaction generally or with a specific individual has ceased for a threshold period of time. For instance, termination of an engagement may be recorded when a given person has been absent from and/or not interacting with apparatus for one hour, one day, or any other suitable period. In an embodiment, each variable may receive initiation and reset signals, and/or signals identifying a particular individual as currently interacting, from apparatus, permitting use of facial recognition and/or other data determined by apparatus to be used in determining whether a given individual is currently interacting with is currently adding to a cumulative energy value while a corresponding deterrent 2112 is outputting. In such an exemplary embodiment, where apparatus is not identifying particular individuals, all interactions may be treated as corresponding to a single individual; that is, cumulative energy values may depend solely on outputs generated during an engagement as delimited by cessation of all interaction for a threshold period of time. Individual-agnostic cumulative energy values and/or per-engagement energy values may alternatively or additionally be used as a fail-safe limit to prevent accidentally exceeding cumulative energy values due to faulty recognition of distinct individuals.

With further reference to FIG. 21, cumulative values may be tracked and recorded across a mesh network. Mesh networks may be used to coordinate responses between two or more apparatuses. For instance, two apparatuses in the same subject area may coordinate transmission of directed light deterrent 2112 actions, or other actions based upon detected user an individual behavior, postures, or the like. For instance, and without limitation, two or more apparatuses may have two or more deterrent 2112 light wavelengths which may be deployed concurrently or sequentially in order to add to confusion and/or resistance to eyewear protection as described above. Alternatively or additionally, two or more apparatuses deployed in two or more separate security zones and/or subject areas may coordinate by communicating actions and/or determinations concerning entrance and/or intrusions in such security areas. This may be used, for instance, to determine what ambient light exposure an individual has experienced, which direction an individual has come from, and/or what activity an individual may be expected to perform. For instance, where one apparatus has detected aggressive behavior by an individual, this may be used as an immediate blacklist by other apparatuses, where an individual identified as the same an individual entering a new subject area may be immediately responded to with more aggressive responses such as saturation, strobing, electric shock or other responses, on the basis that this an individual has been identified as a threat that must be neutralized. Such data may also be transmitted remotely, and sent as updates to security teams, law enforcement, or other users attempting to respond to an ongoing or developing security threat. Such user may use such information to determine a likely current location of a perpetrator and or other an individual as well as to formulate or plan a strategy for counteracting the actions of an individual and neutralizing any threat. Two or more apparatuses deployed in the same area may be used to create one or more additional coordinated actions, such as creation of light curtains, to indicate divisions between authorized and unauthorized areas, guide crowd movement, or the light. As a further example, a series of apparatus is may provide directional indicators such as directional images or the like which made direct entrance and our users in Direction Evacuation, or the like. In an embodiment, tracking and incrementing of cumulative energy values across mesh networks may help to ensure that apparatuses across a mesh network do not combine to exceed cumulative safety limits.

With continued reference to FIG. 21, at least one of first parameter 2116 and second parameter 2116 may include a location-dependent parameter 2116. A "location-dependent parameter 2116," as used in this disclosure, is a cumulative parameter 2116 that applies for some region of an area or volume that may be scanned by a deterrent 2112 such as without limitation first deterrent 2112 or second deterrent 2112. For instance, a region across which a deterrent 2112 may scan may be divided into sectors, identifiable by processor 2104 by measurement of scanning x and y values, for instance as described above; a total plane and/or volume of scanning may be divided into sectors, and cumulative values may be taken per-sector. Alternatively or additionally, a deterrent 2112 apparatus may provide a current sector containing an individual to processor 2104, and cumulative energy values for that individual may be recorded per the indicated sector.

Still referring to FIG. 21, at least one of first parameter 2116 and second parameter 2116 may include a distance-dependent parameter 2116. A "distance-dependent parameter," as used in this disclosure, is a parameter 2116 that depends on a distance from an individual to apparatus. For instance, and without limitation, an individual 10 feet (3 m) away from a directed light deterrent 2112 may receive a higher amount of optical energy than individual 20 feet (6 m) away from the directed light deterrent 2112, per output irradiance, owing to beam dispersal, diffraction, and the like. Apparatus may provide processor 2104 with a value indicating a current distance from apparatus of an individual. Processor 2104 may alternatively or additionally measure and/or estimate such distances using any distance measurement techniques and/or technologies as described above, including ToF and/or image analysis. Processor 2104 may weight measurements taken for cumulative and/or instantaneous values according to value.

With continued reference to FIG. 21, at least one of first parameter 2116 and second parameter 2116 may include an aggregate parameter 2116. An "aggregate parameter," as used in this disclosure, is a parameter 2116 calculated as a function of two or more parameters 2116 as described above. Aggregation may include addition, averaging, or any other form of combination of values. As a non-limiting example, a plurality of parameters 2116 regarding one deterrent 2112 may be aggregated together to generate an aggregate parameter 2116 which may be used as an alternative or additional parameter 2116 to the individual parameters 2116. For instance, scanning velocity, output intensity, and/or other parameters 2116 corresponding to a directed light deterrent 2112 may be combined to generate an aggregate parameter 2116 which may be measured in its own right.

Still referring to FIG. 21, at least a deterrent parameter 2116 may be received directly from detection component 2108. Alternatively or additionally, at least a deterrent parameter 2116 may be derived using one or more machine-learning methods and/or models. For instance, and without limitation, a deterrent parameter 2116 machine-learning model 2120 may input one or more elements of data and/or parameters 2116 from one or more detection components 2108 and output a parameter 2116, aggregate parameter 2116, or the like. As a further example, deterrent parameter 2116 machine-learning model 2120 may input one or more measures of distance, location, or the like to determine a distance-related or location-based parameter 2116 as described above. For instance, and without limitation a machine-learning model may input one or more elements of data and/or parameters 2116 from one or more detection components 2108 and output a parameter 2116, aggregate parameter 2116, or the like. As a further example, a machine-learning model may input one or more measures of distance, location, or the like to determine a distance-related or location-based parameter 2116 as described above. Machine-learning model may be trained, without limitation, using any machine-learning process and/or algorithm as described above, and using any training data, as described above, correlating desired inputs of deterrent parameter 2116 machine-learning model 2120 to desired outputs thereof. Deterrent parameter 2116 machine-learning model 2120 may be trained by processor 2104, and/or on a remote device which may provide deterrent parameter 2116 machine-learning model 2120

Still referring to FIG. 21, processor 2104 is configured to compare the at least a deterrent parameter 2116 to a safety threshold 2124. A "safety threshold 2124," as described herein, is a quantitative datum or collection of data representing a maximal or minimal value consistent with safe operation of an apparatus and/or a deterrent 2112 included in an apparatus, for one or more parameters 2116. Safety threshold 2124 may include a single numerical value, a vector or n-tuple of numerical values, and/or any other suitable representation.

With continued reference to FIG. 21, safety threshold 2124 may be retrieved from a threshold database 2128. Threshold database 2128 may be implemented, without limitation, as a relational threshold database 2128, a key-value retrieval threshold database 2128 such as a NOSQL threshold database 2128, or any other format or structure for use as a threshold database 2128 that a person skilled in the art would recognize as suitable upon review of the entirety of this disclosure. Threshold database 2128 may alternatively or additionally be implemented using a distributed data storage protocol and/or data structure, such as a distributed hash table or the like. Threshold database 2128 may include a plurality of data entries and/or records as described above. Data entries in a threshold database 2128 may be flagged with or linked to one or more additional elements of information, which may be reflected in data entry cells and/or in linked tables such as tables related by one or more indices in a relational threshold database 2128. Persons skilled in the art, upon reviewing the entirety of this disclosure, will be aware of various ways in which data entries in a threshold database 2128 may store, retrieve, organize, and/or reflect data and/or records as used herein, as well as categories and/or populations of data consistently with this disclosure. Retrieval from threshold database 2128 may be performed, without limitation, by constructing a query, and using the query-to-query threshold database 2128. Query may include, without limitation, a type of deterrent 2112, a type of parameter 2116, one or more elements of data describing individual, or any other data that may be available to processor 2104 using any apparatus and/or component, and/or communication therewith, as described in this disclosure.

Alternatively or additionally, and still referring to FIG. 21, threshold comparison may be performed using threshold machine-learning model and/or threshold inference system 2132. Inference system may include a fuzzy inference system, which may include any system matching parameters 2116 to membership functions, where "membership functions" describe one or more values for a linguistic variable such as "intensity" or "power"; one or more membership functions may be centered around numerical values along a spectrum, and may include a calculation establishing a probability of matching a given value of an input falling along the spectrum. Fuzzy inference system may further include one or more output functions, parameters 2116, and/or membership functions. Output parameters 2116 functions, parameters 2116, and/or membership functions may include coefficients and/or other parametric values which may be calculated, trained, and/or tuned using any machine-learning method and/or process as described above. Training examples used to tune threshold inference system 2132 may include any form of training data as described above and may be recorded using, as a non-limiting example, sensors mounted to an individual, other sensors having greater accuracy, and/or taken under one or more controlled circumstances, relating at least a deterrent parameter 2116 to one or more values associated with safety standards, for instance as described above.

As a non-limiting example, and further referring to FIG. 21 intensity and/or duration of light output may be limited to MPE and/or some percentage less than of MPE, as determined as a function of beam intensity, beam divergence, and distance from light source of an individual. For instance, where light source is non-collimated and diverging, MPE for an individual at an opposite side of subject area may permit a substantially higher intensity than MPE for an individual who is near to light source. As noted above, intensity of light source may be varied according to which an individual is being exposed to light. In an embodiment, a visible light source may be configured to shut off automatically where distance to an individual is less than a preconfigured threshold amount. Distance to an individual may be determined, without limitation, using time of flight calculation, object inference, stereoscopic vision, and/or other 3D measuring techniques. MPE may be calculated, without limitation, according to ANSI4 power exposure safety limitations. MPE levels from directed light source may be measured at various power output levels using a power meter, to determine how MPE depends on output intensity, distance to an individual, and/or any other parameters 2116, permitting accurate safety determinations and/or computation of preconfigured distance threshold for shutoff. Power provided to an individual may alternatively or additionally be determined using real-time feedback. For instance, power density in a target area such as a vision band of an individual may be measured using chroma and/or luma values captured at a wavelength of directed light deterrent 2112; such feedback may be used to adjust intensity in real time and/or provided to a remote device for updated safety thresholds 2124 and/or firmware updates.

As a further non-limiting example, and continuing to refer to FIG. 21, a directed light deterrent 2112 may be evaluated for a plurality of criteria, each having a different threshold, for instance as described in safety standards such as without limitation the IEC 60825-1 and the ANSI Z136.1. Such criteria may include, without limitation, single pulse MPE, multiple pulse MPE, and average power MPE. The terms "single pulse" and "multiple pulse," as used in this disclosure refer to phenomena that a human eye may perceive due to a scanning action. When a laser beam scans across the pupil of the viewer's eye, it may deliver a pulse of light to an individual's eye. This is because as the beam scans past the individual's eye, it will only enter the eye for a brief time, depending on beam diameter and the scan rate. This perceived pulse of light may be created by a scanned beam may be similar to a pulse that is created by a beam which is not scanning but is turned on for only a brief instant. An amount of time that a beam is on within the viewer's pupil may be referred to as the pulse width. Safety standards may prescribe a maximum amount of light, that is, a maximum permissible exposure (MPE) that an individual can be receive for a single pulse, and for multiple pulses.

Still referring to FIG. 21, thresholds may be set according to one or more efficacy and/or safety considerations. For instance, a threshold for power emitted by light source may be increased for an individual detected as having eyewear, a threshold for power emitted by an acoustic deterrent 2112 may be increased for an individual wearing ear protection may be increased, or the like. Determination that an individual is wearing protective equipment may be performed by apparatus 100 and/or by a local and/or remote computing device, for instance and without limitation as described above.

Further referring to FIG. 21, where a parameter 2116 of first parameter 2116 and second parameter 2116 is a cumulative parameter 2116, processor 2104 may be configured to reset cumulative parameter 2116 upon occurrence of a specified event. For instance, and without limitation, where a parameter 2116 of first parameter 2116 and second parameter 2116 includes a per-engagement value, processor 2104 may be configured to determine that an engagement has terminated and reset the per-engagement value. Processor 2104 may compare aggregate parameters 2116 and/or individual parameters 2116 to respective thresholds; in an embodiment, failure of any threshold comparison may result in activation of output limiting element.

Still referring to FIG. 21, processor 2104 is configured to determine a corrective action as a function of the comparison. Corrective action may be programmed using hardware or software programming, retrieved from a database, may be determined using one or more machine-learning models, fuzzy inference systems as described above, or the like. For instance, and without limitation, corrective action may be retrieved from a corrective action database 2136, which may include any database suitable for use as threshold database 2128. Alternatively or additionally, corrective action may be generated using an inference system as described above; for instance, and without limitation, threshold inference system 2132 may directly output corrective actions and/or data indicating corrective actions to be performed. Training examples may combine any training example data described above, correlated with corrective actions to be performed for achievement of results considered optimal by, for instance, an expert, a user deploying apparatus 100, or the like. Optimal results may include results that reduce and/or modify one or more deterrent outputs to cease safety violations.

With further reference to FIG. 21, a corrective action may include transmission of a message and/or signal to a user, such as a user having control of one or more apparatuses and/or a "human in the loop" of any system as described in this disclosure. Corrective action may include transmitting a report such as a "bug report" and/or any data concerning failure to a server and/or other computing device, which may generate new parameters 2116, software updates, firmware updates, or the like governing deterrents 2112 to prevent future safety violations; updates may update circuitry and/or computing device elements of apparatus for setting deterrent 2112 levels based on behavior and/or threat level, and/or may modify thresholds or other comparison parameters 2116 used by one or more internal watchdog systems of apparatus 100 to disable deterrents 2112 when safety limits are reached.

Alternatively or additionally, and still referring to FIG. 21, corrective action may include activation of an output reduction element 2140 within apparatus. An "output reduction element," as used in this disclosure, is a component and/or element of a deterrent 2112 component that, when activated, attenuates, interrupts, and/or terminates output by a deterrent 2112 of the deterrent 2112 component. An output reduction element 2140 may provide enhanced safety characteristics for deterrent 2112 suite and/or apparatus as a backup and/or failsafe deterrent 2112 interruption based on operating parameters 2116 of the apparatus. For instance, and without limitation, where a deterrent 2112 of a deterrent 2112 component is a directed light deterrent 2112, an output reduction element 2140 may include a shutter or similar device that interrupts the outputted light source. For instance, and without limitation, a shutter may include an LST400 from NM Laser Products; in an embodiment, a shutter may be able to completely prevent all or substantially all light output within 20 milliseconds of command. A shutter may prevents passage of a beam of light such as a laser beam in the absence of a command signal directing the shutter to remain open, such that a fault and/or interruption in communication with shutter may cause an automatic closure thereof. As a further example, where first deterrent 2112 component includes a directed light deterrent 2112, first output reduction element 2140 may include an optical modulator, such as without limitation an Acousto-optic modulator or electro-optic modulator such as those used in q-switching or the like. For instance, and without limitation, an optical modulator may include a polychromatic acousto-optic modulator. Additional non-limiting examples of output reduction elements 2140 that may be used with a directed light deterrent 2112 include filters, attenuators, physical interruptions, or the like As a further non-limiting example, and continuing to refer to FIG. 21, at least one of first output reduction element 2140 and second output reduction element 2140 may include a power regulation control element. A "power regulation control element," as used in this disclosure, is an element activation of which restricts electrical power to a component such as a deterrent 2112 as described above. A power regulation control element may include one or more power switches, current and/or voltage limiters, or the like. Power regulation control elements may be implanted using physically actuated relays, transistors such as bipolar junction transistors (BJTs), insulated gate bipolar transistors (IGBTs), field effect transistors such as metal oxide field effect transistors (MOSFETs), thyristors such as integrated gate-commutated thyristors (IGCTs) or triodes for alternating current (TRIACs), variable resistors such as photoresistors, thermistors, potentiometers, or the like, and/or any other device that may be used to switch on or off or otherwise regulate electric current.

Further referring to FIG. 21, where one of first deterrent 2112 and second deterrent 2112 includes an audio deterrent 2112, at least one of first output reduction element 2140 and second output reduction element 2140 may include a sound-attenuating element. A "sound-attenuating element," as used in this disclosure, is an element that physically interferes with emission of sound by an audio output device. A sound-attenuating element may include, without limitation, a door, blanket, or pad that can be closed over a speaker or other audio output device, and/or an object that can be brought into contact with a membrane and/or piezoelectric element of a speaker, and/or a mechanical mechanism that can move a piezoelectric element out of contact with a membrane or other amplifying medium.

Still referring to FIG. 21, corrective action may include deactivation of apparatus and/or a deterrent 2112 until a firmware, software update, replacement part, or the like has gone through to fix the issue. In an embodiment, deterrents 2112 that have not been deactivated may still be used by apparatus 100 in the interim.

Further referring to FIG. 21, processor 2104 is configured to initiate corrective action. As used herein, "initiating"

corrective action includes transmitting a signal to perform corrective action, such as a message, alert, activation signal for an output reduction element 2140, or the like. For instance, and without limitation, processor 2104 may be configured to transmit corrective action to apparatus, an output reduction element 2140, a computing device and/or remote device, and/or to a user.

Still referring to FIG. 21, processor 2104 and/or detection components 2108 may be deployed in subject area according to any suitable configuration, including incorporation in one or more apparatuses 100, incorporation in a separate housing, which may be mounted some distance from an apparatus 100 to be analyzed or the like. Alternatively or additionally, processor 2104 and/or one or more detection components 2108 may be mounted to and/or on an individual, who may enter subject area and interact with one or more apparatuses 100, receiving deterrent outputs. In an embodiment, intensity, energy, impact levels or other parameters 2116 to be compared to thresholds may be detected using such individual-mounted components, permitting comparison of internally measured parameters 2116 to parameters 2116 measuring impact at the individual. This may be used for calibration or the like.

Figure 22:
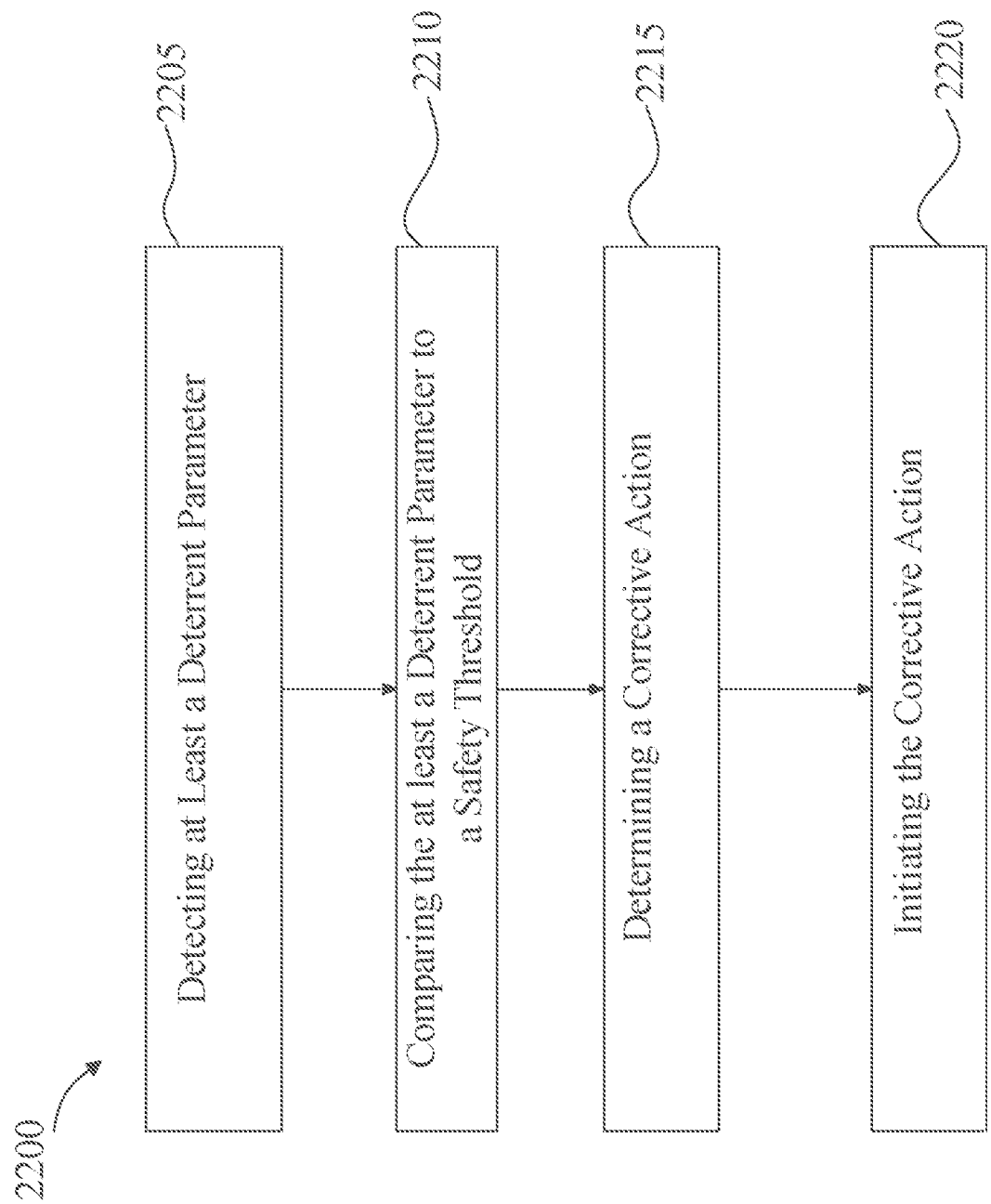
FIG. 22 is a flow diagram illustrating an exemplary method of operating an autonomous safety system for a deterrent apparatus.

Referring now to FIG. 22, an exemplary embodiment of a method 2200 of operating an autonomous safety system for a deterrent 2112 apparatus, is illustrated. At step 2205, a processor 2104 detects at least a deterrent parameter 2116 using at least a detection component 2108 communicatively connected to at least a deterrent 2112 of a deterrent 2112 apparatus; this may be implemented without limitation as described above in reference to FIGS. 1-11.

At step 2210, and continuing to refer to FIG. 22, processor 2104 compares at least a deterrent parameter 2116 to a safety threshold 2124; this may be implemented without limitation as described above in reference to FIGS. 1-11. For instance, and without limitation, parameter 2116 may include irradiance generated by a directed light deterrent 2112. As a further non-limiting example, parameter 2116 may include a measure of acoustic intensity. In an additional non-limiting example, parameter 2116 may include an electrical parameter 2116, such as without limitation a voltage level, a current, or the like. Parameter 2116 may, as a further non-limiting example, include a temperature.

Still referring to FIG. 22, at least one of the first parameter 2116 and the second parameter 2116 may include a cumulative energy value, as defined above in reference to FIGS. 1-11. Cumulative energy value may include a per-engagement value.

At step 2215, processor 2104 determines a corrective action as a function of the comparison; this may be implemented without limitation as described above in reference to FIGS. 1-11.

At step 2220, processor 2104 initiates the corrective action; this may be implemented without limitation as described above in reference to FIGS. 1-11. For instance, and without limitation, processor 2104 may transmit a corrective action to apparatus. Processor 2104 may transmit corrective action to an internal watchdog system within apparatus. Processor 2104 may provide corrective action and/or other data to one or more remote devices.

Figure 23:
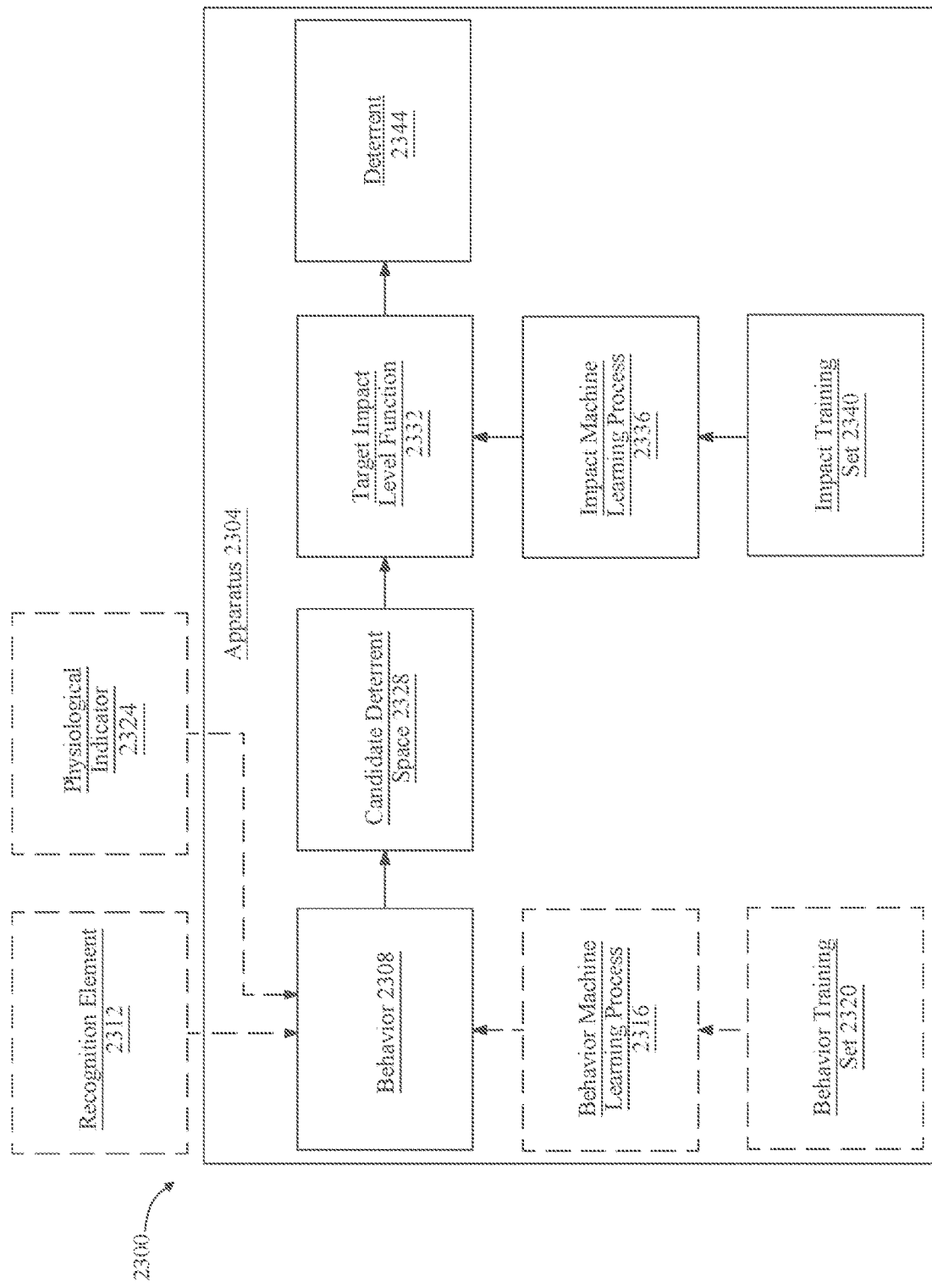
FIG. 23 is block diagram of an exemplary embodiment of a deterrent apparatus.

Referring now to FIG. 23, an exemplary embodiment of a system 2300 for initiating a deterrent is illustrated. System 2300 includes an automated threat detection and deterrence apparatus 2304. Apparatus 2304 may include any computing device as described in this disclosure, including without limitation a microcontroller, microprocessor, digital signal processor (DSP) and/or system on a chip (SoC) as described in this disclosure. Apparatus may include, be included in, and/or communicate with a mobile device such as a mobile telephone or smartphone. Apparatus 2304 may include a single computing device operating independently, or may include two or more apparatus operating in concert, in parallel, sequentially or the like; two or more computing devices may be included together in a single apparatus or in two or more apparatuses. Apparatus 2304 may interface or communicate with one or more additional devices as described below in further detail via a network interface device. Network interface device may be utilized for connecting apparatus 2304 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two apparatuses, and any combinations thereof. A network may employ a wired and/or a wireless mode of communication. In general, any network topology may be used. Information (e.g., data, software etc.) may be communicated to and/or from a computer and/or computing device. Apparatus 2304 may include but is not limited to, for example, a computing device or cluster of computing devices in a first location and a second apparatus or cluster of apparatuses in a second location. Apparatus 2304 may include one or more apparatuses dedicated to data storage, security, distribution of traffic for load balancing, and the like. Apparatus 2304 may distribute one or more computing tasks as described below across a plurality of apparatuses of apparatus, which may operate in parallel, in series, redundantly, or in any other manner used for distribution of tasks or memory between apparatuses. Apparatus 2304 may be implemented using a "shared nothing" architecture in which data is cached at the worker, in an embodiment, this may enable scalability of system 2300 and/or apparatus. Apparatus 2304 may be configured to communicate with deterrent components remotely, such that a computing device may receive sensor data and transmit commands to deterrent components, wherein a deterrent is an output of an external stimulus, and a deterrent component generates the output of the external stimulus. Apparatus 2304 may include one or more computing devices in addition to one or more deterrents and/or sensors.

Further referring to FIG. 23, apparatus 2304 may be designed and/or configured to perform any method, method step, or sequence of method steps in any embodiment described in this disclosure, in any order and with any degree of repetition. For instance, apparatus 2304 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Apparatus 2304 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 23, apparatus 2304 is configured to identify a behavior 2308 of an individual. As used in this disclosure a "behavior" is an action and mannerism made by an individual, organism, system, or artificial entities in conjunction with themselves or their environment, which includes the other systems or organisms around as well as the physical environment. As used in this disclosure an "individual" is a person. Behavior 2308 may include, without limitation, overt behavior, wherein overt behavior is a visible type of behavior that can occur outside of a human being. Overt behavior may include, without limitation, eating food, riding a bicycle, playing football, walking in a secure area, or the like thereof. Behavior 2308 may include, without limitation, covert behavior, wherein covert behavior is not visible to another individual. Covert behavior may include, without limitation, thoughts, emotions, feelings, or the like thereof. Behavior 2308 may include, without limitation, molecular behavior, wherein molecular behavior includes unexpected behavior that occurs without thinking, which can be broken down into atomistic parts or molecules. Molecular behavior may include, without limitation, an individual that closes their eyes when something is about to interact with that individual's eyes. Behavior 2308 may include, without limitation, molar behavior, wherein molar behavior is a behavior that is identified in terms of the ultimate cause of history. Molar Behavior may include, without limitation, a person that loves someone is merely exhibiting a pattern of loving behavior over time, as love would be considered atomistic and must be looked in more wholistic terms. Behavior 2308 may include, without limitation, voluntary behavior, wherein voluntary behavior is a type of behavior that depends on a human want, desire, wish, yearning, or the like thereof. Voluntary behavior may include, without limitation, walking, speaking, writing, striking, and the like thereof. Behavior 2308 may include, without limitation, involuntary behavior, wherein involuntary behavior is a behavior that naturally occurs without thinking. Voluntary behavior may include, without limitation, breathing, blinking, swallowing, digestion, or the like thereof. Behavior 2308 may include behavior that is considered to be positive, negative, and/or neutral behavior. As used in this disclosure "positive behavior" is behavior that is perceived by another individual, organism, artificial intelligence, or entity as a good act. As a non-limiting example positive behavior may include altruistic behavior, caring behavior, compassionate behavior, considerate behavior, faithful behavior, impartial behavior, kind behavior, pleasant behavior, polite behavior, sincere behavior, and the like thereof. As used in this closure a "negative behavior" is behavior that is perceived by another individual, organism, artificial intelligence, or entity as a bad act; negative behavior may include behavior associated with a threat level warranting a deterrent response for instance as described in U.S. Provisional App. Ser. No. 63/067,142. As a non-limiting example, a negative behavior may include aggressive behavior, argumentative behavior, bossy behavior, deceitful behavior, domineering behavior, flaky behavior, inconsiderate behavior, manipulative behavior, rude behavior, spiteful behavior, and the like thereof. As used in this disclosure "neutral behavior" is behavior that is perceived by another individual, organism, artificial intelligence, or entity as a behavior that does not attempt to display any positive or negative intentions. As a non-limiting example, a neutral behavior may include apathetic behavior, indifferent behavior, behavior indicative of a lack of conviction, or the like.

Still referring to FIG. 23, behavior 2308 may be identified as a function of a recognition element 2312. As used in this disclosure a "recognition element" is datum obtained from one or more sensors that provide information relating to a behavior. As a non-limiting example, a recognition element may be obtained from one or more sensors relating to a voluntary behavior of an individual entering a secure room, which may indicate a negative behavior of trespassing. As a further non-limiting example a recognition element may be obtained from one or more sensors relating to an involuntary behavior of swallowing, which may indicate a negative behavior of anxiety and/or nervousness. As used in this disclosure "sensor" is a device that detects or measures a physical property and records, indicates, or otherwise responds to the detected or measured physical property. Sensors may be comprised of one or more of imaging and other sensors, such as optical cameras, infrared cameras, 3D cameras, multispectral cameras, hyperspectral cameras, polarized cameras, chemical sensors, motion sensors, ranging sensors, light radar component, such as lidar, detection or imaging using radio frequencies component, such as radar, terahertz or millimeter wave imagers, seismic sensors, magnetic sensors, weight/mass sensors, ionizing radiation sensors, and/or acoustical sensors. Sensors may alternatively or additionally include any device used as a sensor as described in U.S. Provisional App. Ser. No. 63/067,142.

Still referring to FIG. 23, identifying behavior 2308 may be identified as a function of a behavior machine learning process 2316. As used in this disclosure "behavior machine-learning process" is a machine-learning process that uses training data and/or training set to generate an algorithm that will be performed by an apparatus and/or one or more remote devices to produce outputs given data provided as inputs; this is in contrast to a non-machine learning software program where the commands to be executed are determined in advance by a user and written in a programming language. Behavior machine-learning process 2316 may include any supervised, unsupervised, or reinforcement machine-learning process that apparatus 2304 may or may not use in the determination of the behavior. Behavior machine-learning process 2316 may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof. Behavior machine-learning process 2316 may be trained as a function of a behavior training set 2320. As used in this disclosure "behavior training set" is a training set that correlates at least a user action to at least a behavioral datum. As used in this disclosure a "user action" is a physical, psychological, and/or spiritual decision that is acted upon, wherein that action at least impacts one or more surrounding individuals. For example, and without limitation a user action may include striking an individual, walking into a secure area, coughing on an individual, assaulting an individual, verbally abusing an individual, verbally discriminating against another individual's religious beliefs, sitting on a chair, complimenting an individual, opening a door for an individual and the like thereof. As used in this disclosure a "behavioral datum" is information that at least relates to a user's intended behavior decision. Behavioral data may include, without limitation, microexpression, macroexpressions, language, tone, word selection, physiological actions, and the like thereof. As a non-limiting example, behavioral data may relate a microexpression of a nose wrinkled with a negative behavior of disgust.

Still referring to FIG. 23, behavior machine-learning process 2316 may be generated as a function of a classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Apparatus 2304 and/or another device may generate a classifier using a classification algorithm, defined as a process whereby apparatus 2304 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 23, apparatus 2304 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Apparatus 2304 may then calculate a likelihood table by calculating probabilities of different data entries and classification labels. Apparatus 2304 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 23, apparatus 2304 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the impact, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 23, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Further referring to FIG. 23, behavior classifier may include any behavior classifier as described in as described in U.S. Provisional App. Ser. No. 63/067,142.

Still referring to FIG. 23, identifying a behavior may include receiving a psychological indicator 2324. As used in this disclosure a "psychological indicator" is an indicator of cognitive decisions and/or actions related to a user's intended behavior. Psychological indicators may include, without limitation cognitive abilities, emotional abilities, social and networking abilities, and extraneous aptitudes. As used in this disclosure "cognitive abilities" are psychological characteristics a user may perform that relates to at least a user behavior. For example, and without limitation, clarity of thought, concentration capacity, lucidity, attention, linguistic ability, decision-making, memory, visual-spatial ability, cognitive flexibility, mental agility, mathematical ability, and the like thereof. As used in this disclosure "emotional abilities" are emotional elements that relate to at least a user behavior. For example, and without limitation emotional abilities may include empathy, emotional stabilities, relaxation, adaptation to stress, emotional comfort, impulsivity, impulse control, emotionality, and the like thereof. As used in this disclosure "social and networking abilities" include psychological elements that relate to a user behavior in relation to other individuals. For example, and without limitation, social and networking abilities may include authority, assertiveness, sense of belonging to a group, respect for others, leadership, sociability, tolerance to opposing views, conformity, interpersonal trust, and the like thereof. As used in this disclosure "extraneous aptitudes" are psychological elements that relate a user's psychological history and/or tendencies to a user behavior. For example, and without limitation extraneous aptitudes may include vitality, self-preservation, vigilance, ambition, dynamism, courage, selflessness, righteous attitude, responsibility, perseverance, patience, realism, creativity, force of character, generosity, oratorical ability, curiosity, diligence, trustworthiness, honesty, thrift, adaptability, objectivity, self-assertion, willpower, ego indicator, self-control, intuition, inventiveness, autonomy, optimism, self-confidence, mental calmness, and the like thereof.

Still referring to FIG. 23, apparatus 2304 is configured to determine a candidate deterrent space 2328 as a function of behavior 2308. As used in this disclosure "candidate deterrent space" is a set of all possible combinations of deterrents, at all possible intensity, energy level, frequency, or other measures of degree, such that any such combination that may be selected by selecting a possible value of a deterrent variable, or of a plurality of deterrent variables, is represented in the candidate deterrent space, where "possible values" may include all physically or practically feasible values, all values as dictated by one or more constraints, or the like. As used in this disclosure a "deterrent" is a thing, entity, object, and/or action that intends to discourage and/or prevent an individual from continuing an action, behavior, and/or conduct. Deterrent 2344 may include without limitation, directed light, sounds, electrical deterrents, neurostimulators, chemicals, entanglement devices, and the like thereof. As used in this disclosure a "directed light deterrent" is a deterrent that uses a high-intensity light source such as, but not limited to, a laser, super LED, laser illuminated LED, super-luminescent LED, VCSEL, plasma discharge lamp, and/or high-intensity LED that is actively aimed at and/or focused on an individual, to generate a deterrent effect. As used in this disclosure a "directed sound deterrent" is a sound source that is aimed at a specific individual in a manner analogous to a directed light source. A directed sound deterrent may include, without limitation a long-range acoustic device (LRAD), a laser generating localized plasmas in the atmosphere to create modulating plasmas near the individual such that audible sound is produced, an ultrasonic carrier wave, and the like thereof. As used in this disclosure "neurostimulation deterrents" is an electrical source that is projected at an individual such that an electrical contact is achieved between an individual and the deterrent. As a non-limiting example, an electrical shock deterrent may include a Human Electro-Muscular Incapacitation (HEMI) device, a stun gun, a taser, Taser Area Denial System (TADS), a plasma, an electric field, an ionizer, and the like thereof. As used in this disclosure a "chemical deterrent" is a chemical and/or molecule that at least provide a noxious and/or discomforting experience for an individual. For example, and without limitation, a chemical deterrent may include pepper spray, malodorant weapons, tear gas, pacifying agent, white phosphorous, aerosolized opioids, and the like thereof. As used in this disclosure "entanglement devices" are deterrents wherein an individual becomes physically trapped in a device and prevents escape of that individual. For example, an entanglement device may include, without limitation nets, bolas, and/or other entanglement or entrapment devices that are launched ballistically at the individual in order to limit or stop the individual's ability to move normally. As used in this disclosure a "deterrent variable" is a parameter according to which commands to a deterrent component and/or parameters of a deterrent produced thereby can be altered and/or modified. As used in this disclosure a "deterrent component" is the source that generates a deterrent output. As a non-limiting example a deterrent component a directed light deterrent component such as a laser or the like, which may output directed light such as a laser beam or other directional light output, in a pattern or at an intensity level that produces an aversive effect when shone in the eyes of an individual. As a non-limiting example, a deterrent variable may include energy output, energy intensity, energy duty cycle, energy on/off cycle, energy limiter, audio quality, audio intensity, audio duration, audio pulse, audio location, light intensity, light duty cycle, light pulse, light location, light color, laser intensity, laser duty cycle, laser pulse, laser wavelength, current, voltage, wattage, and the like thereof. Deterrent space may incorporate one or more deterrent variables in relation to one or more deterrents and/or deterrent components. For example and without limitation a super-luminescent LED may include deterrent variables of intensity, wavelength, duty cycle, power, current, voltage, emission rate, and/or wattage, which may all be altered and/or controlled in the same candidate deterrent space. As a further non-limiting example, deterrent variables of phenacyl chloride may include concentration, distance exposed, duration of exposure, location of exposure, diffusivity, diffusion, evaporation, chemical cross-reactivity, and the like thereof. Additionally or alternatively, an audible output may have deterrent variables associated with audible quality, decibel intensity, wavelength, amplitude, time-period, frequency, velocity of wave, audio duty cycle, audio location, and the like thereof.

Still referring to FIG. 23, apparatus 2304 is configured to determine at least a deterrent impact 2336. As used in this disclosure a "deterrent impact" is an effect an external stimulus has on a user. For example, and without limitation, deterrent impact 2336 may include covering of ears to attempt to block out an audio signal as a result of an external stimulus of a 10,000 Hz audio signal. Deterrent impact 2336 may be comprised of a measurable element associated with an effect the deterrent has on a user. Deterrent Impact 2336 may provide an overall value associated with the likelihood that an individual may or may not be harmed or otherwise negatively impacted. As a non-limiting example a deterrent impact may be comprised of a value of 10 indicating a strong propensity for causing dermal burns on an individual. For example, and without limitation, a deterrent impact may be identified as a value of 40 for a laser pulse, indicating a strong possibility for temporary blindness, and a value of 20 for an auditory output, indicating a weak possibility for auditory discomfort for a behavior response of exiting the room. Additionally or alternatively, a deterrent impact may identify one or more impacts associated with an external stimulus. As a non-limiting example a deterrent impact may include temporary blindness, damage to vision, temporary incapacitation, nausea, seizures, post-traumatic stress disorder and/or retinal burning associated with an external stimulus of a laser or other directed light deterrent. As a further non-limiting example a deterrent impact may include temporary permanent hearing loss, tinnitus, sensorineural hearing loss, conductive hearing loss, post-traumatic stress disorder, auditory nerve damage, pain or other deleterious sensory experiences in the ears, and/or ruptured eardrums associated with an external stimulus of an audio signal. As a further non-limiting example, a deterrent impact may include loss of consciousness, muscle spasms, numbness, tingling, breathing disorders, headache, electrical burns, heart arrythmias, and/or tetanus associated with an external stimulus of an electrical shock. As a further non-limiting example, a deterrent impact may include incapacitation, nerve damage, muscle contraction, nausea, headache, stomachache, and/or seizures associated with an external stimulus of a neurostimulant. As a further non-limiting example, a deterrent impact may include incapacitation, cross-reactivity, burning sensation, permanent nerve damage, nausea, vomiting, and/or blindness associated with an external stimulus of a chemical. As a further non-limiting example, a deterrent impact may include muscle contraction, blunt force trauma, loss of limb, and/or puncture wound associated with an external stimulus of an entanglement device. A deterrent impact may include any degree of severity of any of the above-described deterrent impacts. As a non-limiting example blunt force trauma may exist within a degree of severity including, but not limited to, contusions, abrasions, lacerations, internal hemorrhages, and/or bone fractures.

Still referring to FIG. 23, apparatus 2304 is configured to determine at least a behavior response 2340. As used in this disclosure a "behavior response" is an action and/or response that an individual may complete as an effect of the deterrent impact. Behavior response 2340 may include, without limitation, exiting a room, ceasing verbal communication, moving away from the external stimulus, covering one's ears or eyes, removing their body from the contact of the external stimulus, or the like thereof. As a non-limiting example a behavior response may include an individual that exits a secure area as a result of an audio output. As a further non-limiting example a behavior response of muscular contraction may occur as a result of an electrical shock. As a further non-limiting example, a behavior response of sneezing may occur as a result of a chemical deterrent. Behavior response data may be identified as a function of one or more sensors, wherein a sensor is described in detail above. For example, and without limitation, a sensor may indicate an individual seized after receiving an electrical shock deterrent at an output of 40 mW. Behavior response may be determined as a function of one or more behavior storage memories. As used in this disclosure a "behavior storage memory" is a memory device that may or may not exist within apparatus 2304 that stores previously identified behavior responses. Behavior response may relate a previous behavior response of muscular contraction due to an electrical response and identify a current behavior response of tinnitus due to an electrical response.

Still referring to FIG. 23, apparatus 2304 may receive a target level function 2332 of candidate deterrent space 2328. As used in this disclosure a "target level function" is an algorithm associated with the candidate deterrent space that identifies the at least deterrent variables possible modifications thereto and outputs a deterrent impact as a function of such variables and possible modifications. Target level function 2332 may use a linear function that inputs the candidate deterrent space including the at least deterrent variables possible and outputs a deterrent impact using the linear function. Target level function 2332 may utilize a neural net that receives the plurality of deterrent variables from the candidate deterrent space and generates the deterrent impact as a function of the neural net algorithm. Target level function 2332 may be received as a function of one or more remote devices transmitting the target level function to apparatus 2304. Target level function 2332 may be generated as a function of an impact machine learning process 2336. As used in this disclosure "impact machine learning process" is a machine-learning process that uses training data and/or training set to generate an algorithm that will be performed by an apparatus and/or one or more remote devices to produce outputs given data provided as inputs; this is in contrast to a non-machine learning software program where the commands to be executed are determined in advance by a user and written in a programming language. The impact machine-learning process may include any supervised, unsupervised, or reinforcement machine-learning process that apparatus 2304 may or may not use in the determination of the user condition. The impact machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof. The impact machine-learning process is generated as a function of an impact training set. The impact training set relates a deterrent impact to at least a behavior response, wherein a deterrent impact and behavior response is described in detail above. Target impact level function 2332 may be generated to at least identify a value associated with a deterrent impact in relation to a behavior response. For example, and without limitation, a deterrent impact may be identified as a value of 40 for a laser pulse, indicating a strong possibility for temporary blindness, and a value of 20 for an auditory output, indicating a weak possibility for auditory discomfort for a behavior response of exiting the room.

Still referring to FIG. 23, apparatus 2304 may receive target level impact function 2332 from one or more remote devices. As used in this disclosure a "remote device" is a computing system external to the apparatus that obtains and/or sends information relating to the target level impact function. The remote devices may provide target level impact function using one or more impact machine-learning processes, wherein an impact machine-learning process is described above in detail. The remote device may perform the impact machine-learning process, using an impact training set, wherein an impact training set is described above in detail. The remote device may transmit a signal, bit, datum, or parameter to apparatus 2304 that at least relates to target level impact function 2332. Additionally or alternatively, the remote devices may provide modifications to the generated target level impact functions. For example, and without limitation, a modification may be comprised of a firmware update, a software update, an impact machine-learning model correction, and the like thereof. As a non-limiting example a software update may incorporate a new target level impact function that relates to a modified candidate deterrent space that alters or otherwise changes the deterrent variables. As a further non-limiting example a remote device may transmit a modified impact machine-learning process, wherein the modified impact machine-learning model may relate new behavior responses to previously identified deterrent impacts. Additionally or alternatively, target level impact function 2332 may be transmitted to the remote device, wherein the remote device may update the impact training data and transmit an updated impact machine-learning process back to apparatus 2304. The updated impact machine-learning process may be transmitted by the remote device and received by apparatus 2304 as a software update, firmware update, or corrected impact machine-learning process.

Still referring to FIG. 23, apparatus 2304 is configured to select a deterrent 2344 from candidate deterrent space 2328 that minimizes target impact level function 2332. Target level function 2332 may be minimized by determining a behavior modification of the candidate deterrent space related to a behavior modification function. As used in this disclosure a "behavior modification" is a modified action and mannerism made by an individual, organism, system, or artificial entities in conjunction with themselves or their environment, which includes the other systems or organisms around as well as the physical environment, such that action has been modified to eliminate the first action. For example, and without limitation a behavior modification may include a first behavior of angry and/or violent to a modified behavior to content and/or satisfied. As used in this disclosure a "behavior modification function" is the intended behavior modification that a deterrent is meant to perform. For example, and without limitation a behavior modification function may identify an intended deterrent function of eliminating a verbally abusive behavior of an individual. As a further non-limiting example a behavior modification function may identify an intended deterrent function of an individual halting and retreating. As a further non-limiting example a behavior modification function may identify an intended deterrent function of cessation of violent and/or damaging actions. As a further non-limiting example a behavior modification function may identify an intended deterrent function of altering a behavior from a negative behavior to a positive behavior. As a further non-limiting example a behavior modification function may identify an intended deterrent function of incapacitation. As a further non-limiting example a behavior modification function may identify an intended deterrent function of entanglement. Minimizing the target level impact function may include minimizing the deterrent impact, while maximizing the behavior modification function such that the individual receives the least invasive deterrent that generates a maximum behavior modification. Target level function 2332 may be minimized using an optimization and/or linear optimization function to at least reduce the deterrent impact and enhance the behavior modification. A linear objective function may be used to minimized target level function 2332, wherein apparatus 2304 may use a linear program such as, without limitation, a mixed-integer program. A "linear program," as used in this disclosure, is a program that optimizes a linear objective function, given at least a constraint. As a non-limiting example, apparatus 2304 may calculate variables of set of deterrent impacts of such parameters from goal parameters calculate an output of behavioral modifications using the variables, and select a deterrent with a deterrent output having the lowest size, according to a given definition of "size," of the set of deterrent outputs representing the selected deterrents; size may, for instance, include absolute value, numerical size, or the like.

With continued reference to FIG. 23, optimizing target level function 2332 may include minimizing a loss function, where a "loss function" is an expression an output of which an optimization algorithm minimizes to generate an optimal result. As a non-limiting example, apparatus 2304 may assign variables relating to a set of parameters, which may correspond to deterrent impacts as described above, calculate an output of mathematical expression using the variables, and select a deterrent that produces an output having the lowest size, according to a given definition of "size," of the set of outputs representing each of the selected deterrents; size may, for instance, included absolute value, numerical size, or the like. Selection of different loss functions may result in selection of different deterrents as generating minimal outputs.

Still referring to FIG. 23, the behavior modification function may be generated as a function of a modification machine-learning process. As used in this disclosure a "modification machine-learning process" is a machine-learning process that uses training data and/or training set to generate an algorithm that will be performed by an apparatus and/or one or more remote devices to produce outputs given data provided as inputs; this is in contrast to a non-machine learning software program where the commands to be executed are determined in advance by a user and written in a programming language. The behavior machine-learning process may include any supervised, unsupervised, or reinforcement machine-learning process that apparatus 2304 may or may not use in the determination of the user condition. The behavior machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof. The behavior machine-learning process may be generated as a function of a behavior training set. As used in this disclosure a "behavior training set" relates at least a behavior modifier with at least an expected vector. As used in this disclosure a "behavior modifier" is an element in which a behavior may be altered or otherwise changed according to at least an environment factor, categorical factor, and/or individual history. For example, and without limitation, a behavior modifier may include categorical information of an individual that has a predisposition to anxiety when a certain audio input is received by the individual. As used in this disclosure an "expected vector" is a predicted outcome according to the behavior modifier. For example, and without limitation, an expected outcome may include loss of attention to a previous situation when a behavior modifier associated with attention deficit disorder.

Still referring to FIG. 23, target level impact function 2332 may be minimized with respect to at least a deterrent output constraint. As used in this disclosure a "deterrent output constraint" is a limit that is established for a deterrent output such that the deterrent output cannot operate outside of the limit. A limit may include an upper constraint, wherein the upper constraint is a maximum value established for a deterrent variable in candidate deterrent space 2328. For example, and without limitation a deterrent output constraint may include a limit with an upper constraint of 100 mW for a 732 nm wavelength laser. As a further non-limiting example a deterrent output constraint may include a limit with an upper constraint of 20 m/z ballistic velocity for an entanglement device. A limit may include a lower constraint, wherein the lower constraint is a minimum value established for a deterrent variable in candidate deterrent space 2328. For example, and without limitation, a deterrent output constraint may include a limit with a lower constraint of 5 ppb phenacyl chloride for a chemical release deterrent. As a further non-limiting example, a deterrent output constraint may include a limit with a lower constraint of 5 mA of current for a neurostimulation deterrent.

Still referring to FIG. 23, apparatus 2304 may be configured to initiate deterrent 2344 and receive at least a feedback input using at least a sensor. As used in this disclosure a "feedback input" is information received that at least relates to a behavioral response of an individual. As used in this disclosure a "behavioral response" is a reaction by an individual such that an altered behavior is at least detected using a sensor, wherein a sensor is defined in detail above. For example, and without limitation a feedback input may include detecting a behavioral response of incapacitation as a result of a first deterrent of a chemical release. The feedback input may be received by obtaining a first behavioral response associated with a first deterrent and determining a corrected impact level function as a function of the first behavioral response. As used in this disclosure, a "corrected impact level function" is an algorithm that at least relates the intended behavioral modification to the first behavioral response received by the feedback input. For example, and without limitation a corrected impact level function may relate an intended behavior modification of entanglement of an individual to an actual behavioral response of blunt force trauma to an individual from a deterrent. The corrected level function may be completed by one or more correction machine-learning processes. As used in this disclosure a "correction machine-learning process" is a machine-learning process that uses training data and/or training set to generate an algorithm that will be performed by an apparatus and/or one or more remote device to produce outputs given data provided as inputs; this is in contrast to a non-machine learning software program where the commands to be executed are determined in advance by a user and written in a programming language. The correction machine-learning process may include any supervised, unsupervised, or reinforcement machine-learning process that apparatus 2304 may or may not use in the determination of the user condition. The correction machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof. The correction machine-learning process may be generated as a function of a correction training set. As used in this disclosure a "correction training set" relates at least a behavioral response to a deterrent applied, wherein a behavioral response is discussed in detail above. As used in this disclosure a "deterrent applied" is a deterrent that was selected and utilized on an individual, wherein a deterrent applied may include all of the deterrent stated above. For example and without limitation the correction training set may include relating a behavioral response of quieting an individual to a deterrent applied of an audio output.

Figure 24:
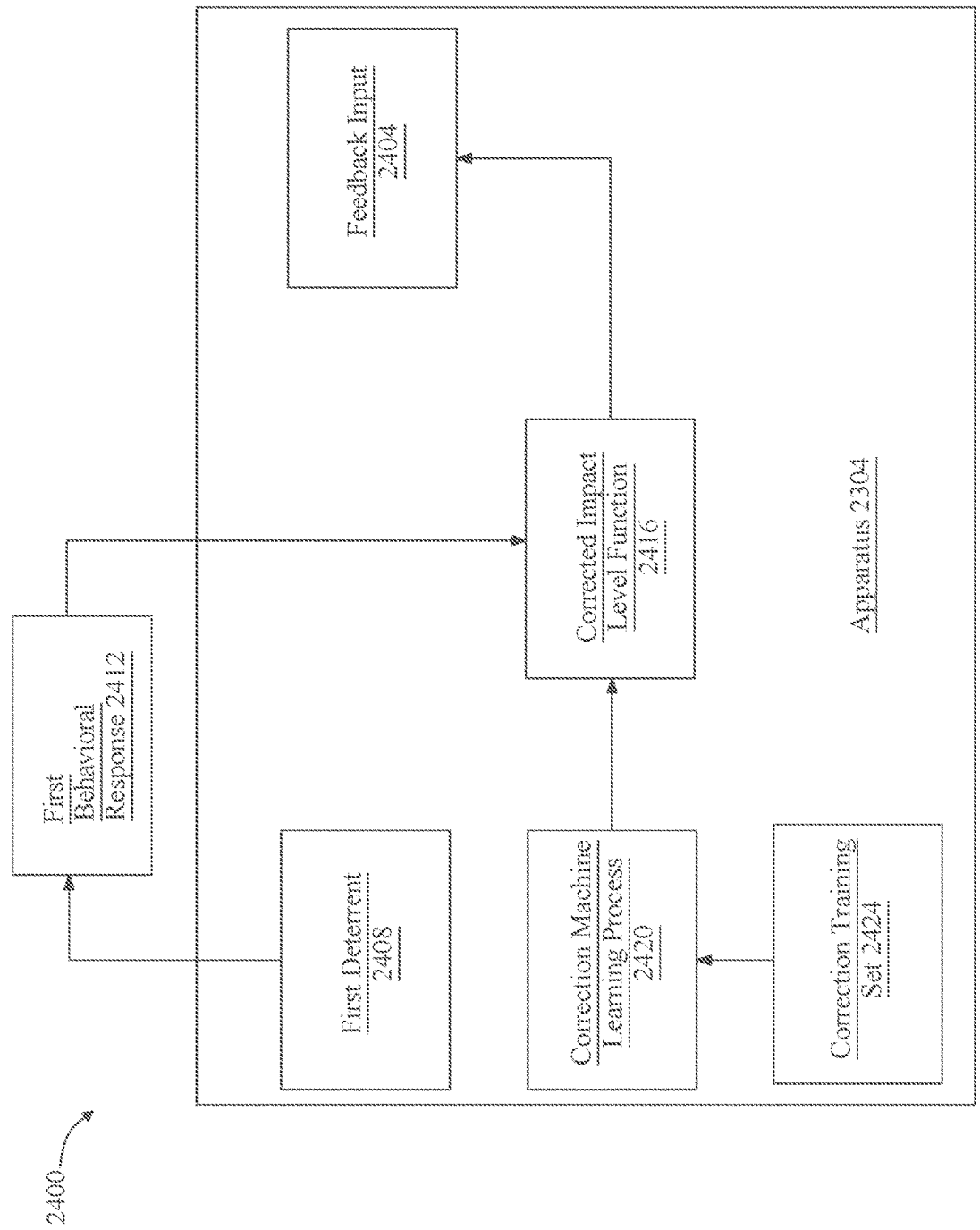
FIG. 24 is a block diagram of an exemplary embodiment of a system for receiving feedback input.

Referring now to FIG. 24, an exemplary embodiment of a system 2400 for receiving feedback input 2404 is illustrated. Apparatus 2304 may select a deterrent output and initiate a first deterrent 2408 to an individual. As used in this disclosure a "first deterrent" is one or more deterrents that are identified according to a target impact level function, as described above, in reference to FIG. 23. First deterrent 2408 may elicit a first behavioral response 2412. As used in this disclosure a "first behavioral response" is a first reaction by an individual such that an altered behavior is at least detected using a sensor, wherein a sensor is defined in detail above, in reference to FIG. 23. Apparatus 2304 may obtain first behavioral response 2412 and determine a corrected impact level function 2416 according to a correction machine-learning process 2420, wherein a corrected impact level function is an algorithm that at least relates the intended behavioral modification to first behavioral response 2412. As used in this disclosure a "correction machine-learning process" is a machine-learning process as described above. For instance, and without limitation, a correction machine-learning process may include any supervised, unsupervised, or reinforcement machine-learning process that apparatus 2304 may or may not use in the determination of the user condition. The correction machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof. The correction machine-learning process may be generated as a function of a correction training set 2424. As used in this disclosure a "correction training set" relates at least a behavioral response to a deterrent applied, wherein a behavioral response is discussed in detail above, in reference to FIG. 23. As used in this disclosure a "deterrent applied" is a deterrent that was utilized on an individual, wherein a deterrent applied may include all of the deterrent stated above. For example and without limitation the correction training set may include relating a behavioral response of quieting an individual to a deterrent applied of an audio output.

Figure 25:
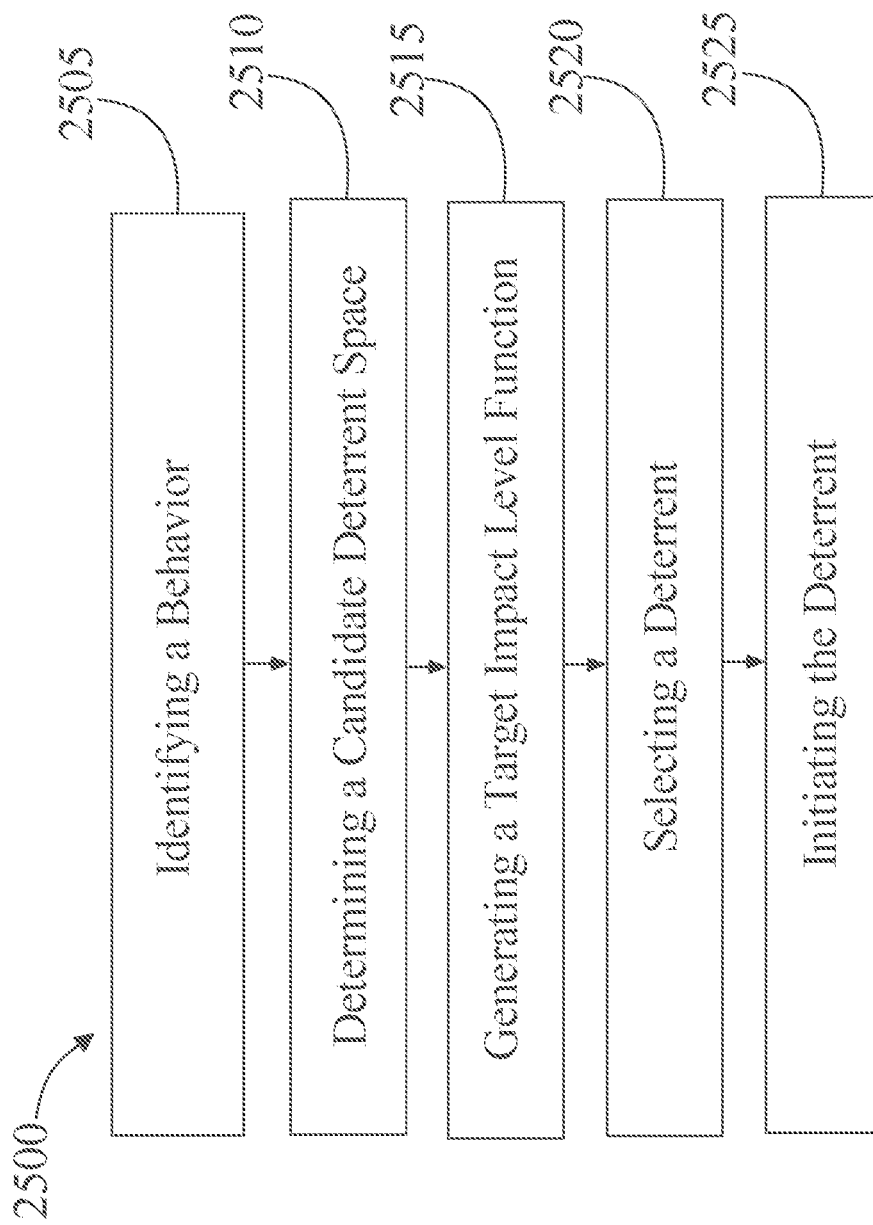
FIG. 25 is a process flow diagram illustrating an exemplary embodiment of a method of selecting a deterrent.

Now referring to FIG. 25, an exemplary embodiment of a method 2500 for selecting a deterrent is illustrated. At step 2505, an apparatus 2304 identifies a behavior 2308 of an individual. Behavior 2308 includes any of the behavior 2308 as described above. Behavior 2308 may include overt behavior, covert behavior, moral behavior, molecular behavior, voluntary behavior, involuntary behavior, and the like thereof. Behavior 2308 may be comprised of positive behavior, negative behavior, and/or neutral behavior. Behavior 2308 may be identified as a function of a recognition element 2312. Recognition element 2312 includes any of the recognition element 2312 as described above, in reference to FIGS. 1-3. Recognition element 2312 may include, without limitation, datum obtained from one or more sensors, such as temperature, movement, intention, distance, and the like thereof. Behavior 2308 may be identified as a function of a behavior machine-learning process 2316 that is performed by apparatus 2304 and/or one or more remote devices. Behavior machine-learning process 2316 includes any of the behavior machine-learning process 2316 as described above, in reference to FIGS. 1-3. For instance, and without limitation, behavior machine-learning process 2316 may include a supervised machine-learning process or an unsupervised machine-learning process. Behavior machine learning process 2316 may include a classification process, such as for example naïve Bayes, k-nearest neighbor, decision tree, and/or random forest. Classification processes include any of the classification processes as described above in reference to FIGS. 1-3. Behavior machine-learning process 2316 may be configured using a behavior training set 2320. Behavior training set 2320 includes any of the behavior training set 2320 as described above in reference to FIGS. 1-3. Behavior training set 2320 may include, without limitation, user actions, such as movements, language, intentions, and the like thereof that correlate to behavioral datum, such as intended behavior decisions. For example, and without limitation a behavior training set may relate a user action assault to a behavior datum of aggression and/or anger. Behavior 2308 may be identified as a function of a psychological indicator 2324. Psychological indicator 2324 includes all of the psychological indicator 2324 as described above, in reference to FIGS. 1-3. For instance, and without limitation, psychological indicator 2324 may include cognitive abilities, emotional abilities, social and networking abilities, and/or extraneous aptitudes.

Still referring to FIG. 25, at step 2510, apparatus 2304 determines a candidate deterrent space 2328 as a function behavior 2308. Candidate deterrent space 2328 includes any of the candidate deterrent space 2328 as described above in reference to FIGS. 1-3. For instance and without limitation candidate deterrence space 2328 may include a deterrent variable of a plurality of deterrent variables, wherein a deterrent variable relates to one or more elements that control the function of one or more deterrent outputs. As a non-limiting example, a candidate deterrent space may encompass deterrent variables of energy output, energy intensity, energy duty cycle, energy on/off cycle, energy limiter, audio quality, audio intensity, audio duration, audio pulse, audio location, light intensity, light duty cycle, light pulse, light location, light color, laser intensity, laser duty cycle, laser pulse, laser wavelength, current, voltage, wattage, and the like thereof.

Still referring to FIG. 25, at step 2515, apparatus 2304 receives a target impact level function 2332 of candidate deterrent space 2328. Target impact level function 2332 includes any of the target impact level function 2332 as described above, in reference to FIGS. 1-3. Target impact level function 2332 may include, without limitation, an algorithm associated with the candidate deterrent space that relates a behavior of theft to a candidate deterrent space of laser intensity, energy, and wavelength required. Target level function 2332 is received by determining a deterrent impact 2336. Deterrent Impact 2336 includes any of the deterrent impact 2336 as described above, in reference to FIGS. 1-3. For example, and without limitation, deterrent impact 2336 may include covering of ears to attempt to block out an audio signal as a result of an external stimulus of a 10,000 Hz audio signal. Target impact level function is generated by determining at least a behavior response 2340. Behavior response 2340 includes any of the behavior response as described above, in reference to FIGS. 1-3. For example, and without limitation, behavior response 2340 may include, exiting a room, ceasing verbal communication, moving away from the external stimulus, covering one's ears or eyes, removing their body from the contact of the external stimulus, or the like thereof. Target impact level function 2332 may be generated to at least identify a value associated with deterrent impact 2336 in relation to behavior response 2340. Target impact level function 2332 may be received as a function of an impact machine-learning process 2336. Impact machine-learning process 2336 includes any of the impact machine-learning process 2336 as described above, in reference to FIGS. 1-3. For instance, and without limitation, impact machine-learning process may include a supervised machine-learning process or an unsupervised machine-learning process. The impact machine learning process may include a classification process, such as for example naïve Bayes, k-nearest neighbor, decision tree, and/or random forest. Classification processes include any of the classification processes as described above in reference to FIGS. 1-3. Impact machine-learning process 2336 may be configured using an impact training set 2340. Impact training set 2340 includes any of impact training set 2340 as described above in reference to FIGS. 1-3. Impact training set 2340 may include, without limitation, deterrent impacts that relate to at least a behavior response. For example, and without limitation an impact training set may relate a deterrent impact of severe discomfort or pain to a behavior response of escaping, moving away from the deterrent, and/or fleeing.

Still referring to FIG. 25, at step 2520, apparatus 2304 selects a deterrent 2344 from candidate deterrent space 2328 that minimizes target impact level function 2332. Deterrent 2344 includes any of the deterrent 2344 as described above, in reference to FIGS. 1-3. In an embodiment, deterrent 2344 may include, directed light, sounds, electrical signals, neurostimulators, chemicals, entanglement devices, and the like thereof. For example, and without limitation, a deterrent consisting of a taser may be utilized as both an electrical signal and neurostimulator.

Still referring to FIG. 25, at step 2525, apparatus 2304 initiates deterrent 2344. Initiation of deterrent 2344 may include performance of a first step in the application of a deterrent; first step may include a particular deterrent or signal, such as an infrared laser and/or light output, a first entanglement device, or the like. First step may include location of a deterrent device; location may include placement in an apparatus 2304. First step may include generation of a deterrent control; generation of a deterrent control system may include transmission of a signal to initiate deterrent and/or transmission of any deterrent controls generated as described above, including without limitation transmission of information for localized and/or remote deterrent control. Transmission may be direct or indirect; for instance, transmission may involve transmission to a remote device that relays transmission to a deterrent or computing device coupled thereto, or transmission to an auxiliary computing device or computer memory for transport to the deterrent and/or computing device coupled thereto.

Figure 26:
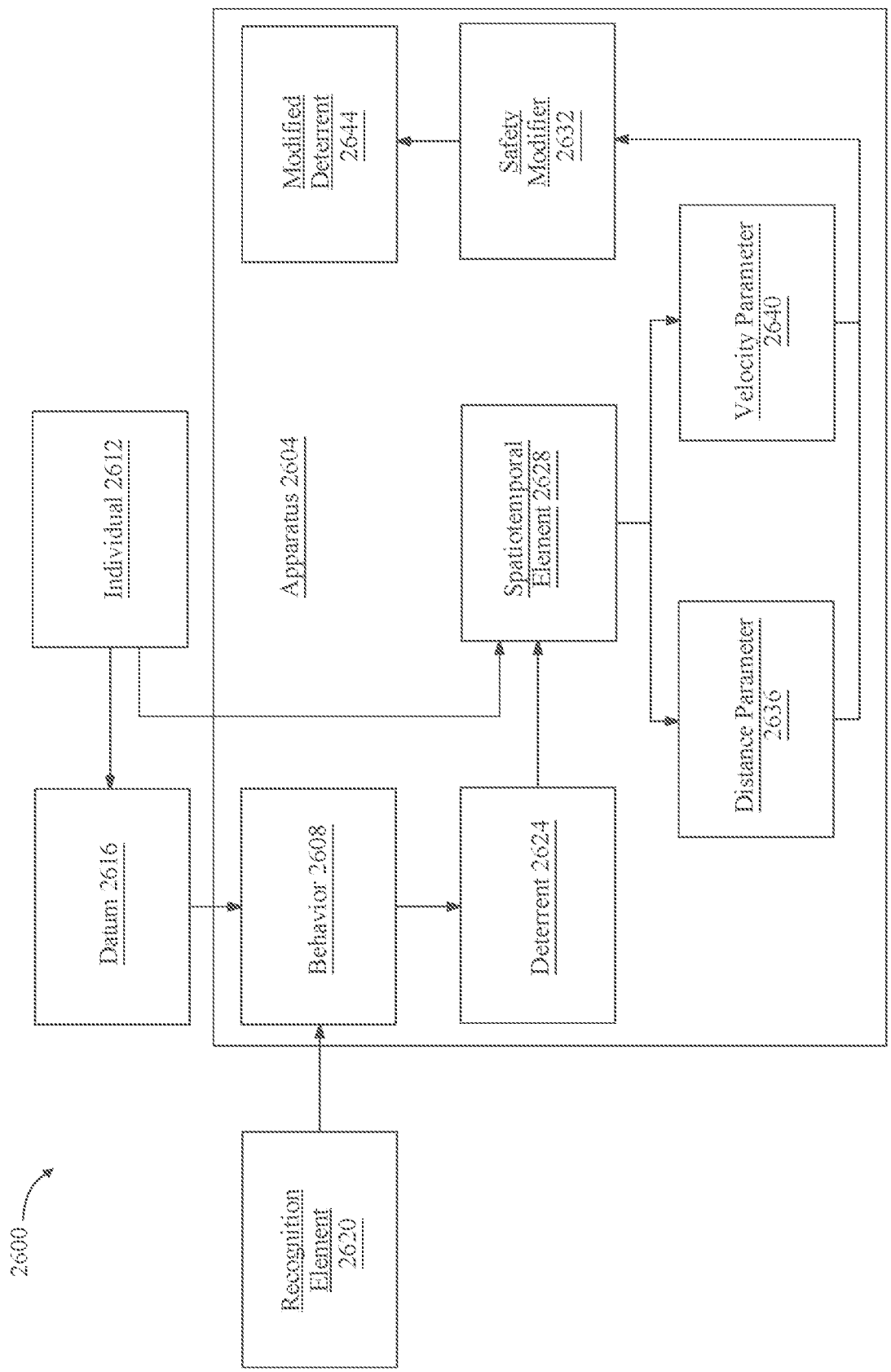
FIG. 26 is a block diagram of an exemplary embodiment of a deterrent apparatus.

Referring now to FIG. 26, an exemplary embodiment of a system 2600 for modifying a deterrent is illustrated. System 2600 includes an automated threat detection and deterrence apparatus 2604. Apparatus 2604 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Apparatus 2604 may include a single computing device operating independently, or may include two or more computing device operating in concert, in parallel, sequentially or the like; two or more computing devices may be included together in a single computing device or in two or more computing devices. Apparatus 2604 may interface or communicate with one or more additional devices as described below in further detail via a network interface device. Network interface device may be utilized for connecting apparatus 2604 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Apparatus 2604 may include but is not limited to, for example, a computing device or cluster of computing devices in a first location and a second computing device or cluster of computing devices in a second location. Apparatus 2604 may include one or more computing devices dedicated to data storage, security, distribution of traffic for load balancing, and the like. Apparatus 2604 may distribute one or more computing tasks as described below across a plurality of computing devices of computing device, which may operate in parallel, in series, redundantly, or in any other manner used for distribution of tasks or memory between computing devices. Apparatus 2604 may be implemented using a "shared nothing" architecture in which data is cached at the worker, in an embodiment, this may enable scalability of system 2600 and/or computing device.

Further referring to FIG. 26, apparatus 2604 may be designed and/or configured to perform any method, method step, or sequence of method steps in any embodiment described in this disclosure, in any order and with any degree of repetition. For instance, apparatus 2604 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Apparatus 2604 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 26, apparatus 2604 is configured to identify a behavior 2608 of an individual. As used in this disclosure a "behavior" is an action and mannerism made by an individual, organism, system, or artificial entities in conjunction with themselves or their environment, which includes the other systems or organisms around as well as the physical environment. As used in this disclosure an "individual" is a person that exists as a distinct entity, wherein that person possesses their own behaviors, goals, objectives, and responsibilities. As a non-limiting example, individual 2612 may consist of a 30-year-old male. As a further non-limiting example, individual 2612 may include a 48-year-old female. Behavior 2608 may include, without limitation, overt behavior, wherein overt behavior is a visible type of behavior that can occur outside of a human being. Overt behavior may include, without limitation, eating food, riding a bicycle, playing football, walking in a secure area, or the like thereof. Behavior 2608 may include, without limitation, covert behavior, wherein covert behavior is not visible to another individual. Covert behavior may include, without limitation, thoughts, emotions, feelings, or the like thereof. Behavior 2608 may include, without limitation, molecular behavior, wherein molecular behavior includes unexpected behavior that occurs without thinking, which can be broken down into atomistic parts or molecules. Molecular behavior may include, without limitation, an individual that closes their eyes when something is about to interact with that individual's eyes. Behavior 2608 may include, without limitation, molar behavior, wherein molar behavior is a behavior that is identified in terms of the ultimate cause of history. Molar Behavior may include, without limitation, a person that loves someone is merely exhibiting a pattern of loving behavior over time, as love would be considered atomistic and must be looked in more wholistic terms. Behavior 2608 may include, without limitation, voluntary behavior, wherein voluntary behavior is a type of behavior that depends on a human want, desire, wish, yearning, or the like thereof. Voluntary behavior may include, without limitation, walking, speaking, writing, striking, and the like thereof. Behavior 2608 may include, without limitation, involuntary behavior, wherein involuntary behavior is a behavior that naturally occurs without thinking. Voluntary behavior may include, without limitation, breathing, blinking, swallowing, digestion, or the like thereof. Behavior 2608 may include behavior that is considered to be positive, negative, and/or neutral behavior. As used in this disclosure "positive behavior" is behavior that is perceived by another individual, organism, artificial intelligence, or entity as a good act. As a non-limiting example positive behavior may include altruistic behavior, caring behavior, compassionate behavior, considerate behavior, faithful behavior, impartial behavior, kind behavior, pleasant behavior, polite behavior, sincere behavior, and the like thereof. As used in this closure a "negative behavior" is behavior that is perceived by another individual, organism, artificial intelligence, or entity as a bad act; negative behavior may include behavior associated with a threat level warranting a deterrent response for instance as described in U.S. Provisional App. Ser. No. 63/067,142. As a non-limiting example, a negative behavior may include aggressive behavior, argumentative behavior, bossy behavior, deceitful behavior, domineering behavior, flaky behavior, inconsiderate behavior, manipulative behavior, rude behavior, spiteful behavior, and the like thereof. As used in this disclosure "neutral behavior" is behavior that is perceived by another individual, organism, artificial intelligence, or entity as a behavior that does not attempt to display any positive or negative intentions. As a non-limiting example, a neutral behavior may include apathetic behavior, indifferent behavior, behavior indicative of a lack of conviction, or the like.

Still referring to FIG. 26, behavior 2608 is identified as a function of at least a datum 2616 that relates to individual. As used in this disclosure a "datum" is a piece of information that at least provides a unique quality, trait, and or characteristics about an individual. For example, and without limitation datum 2616 may be received by one or more biometric elements. As used in this disclosure a "biometric element" is a distinctive, measurable characteristic that at least labels and/or identifies an individual. A biometric element may include a physiologic or behavioral characteristic. A physiological characteristic may relate to the shape and/or structure of the individual's body. For example, and without limitation a physiological characteristic may include fingerprint, palm veins, face recognition, DNA, palmprint, hand geometry, iris recognition, retina structure, odor, scent, dental patterns, weight, height, dermal viability, and the like thereof. A behavioral characteristic may relate to the pattern of behavior of an individual. A behavioral characteristic may relate to, without limitation, rhythm, gait, voice, typing pattern, typing speed, device use patterns and the like thereof, wherein device use patterns include cursor movements, finger pressure, finger contact duration, finger contact volume, finger contact angle, device angle when operating and the like thereof.

Still referring to FIG. 26, behavior 2608 may be identified as a function of a recognition element 2620. As used in this disclosure a "recognition element" is information obtained from one or more sensors that relate to a behavior. As a non-limiting example, recognition element 2620 may be obtained from one or more sensors relating to a voluntary behavior of an individual entering a secure room, which may indicate a negative behavior of trespassing. As a further non-limiting example recognition element 2620 may be obtained from one or more sensors relating to an involuntary behavior of swallowing, which may indicate a negative behavior of anxiety and/or nervousness. As used in this disclosure "sensor" is a device that detects or measures a physical property and records, indicates, or otherwise responds to the detected or measured physical property. Sensors may be comprised of one or more of imaging and other sensors, such as optical cameras, infrared cameras, 3D cameras, multispectral cameras, hyperspectral cameras, polarized cameras, chemical sensors, motion sensors, ranging sensors, light radar component, such as lidar, detection or imaging using radio frequencies component, such as radar, terahertz or millimeter wave imagers, seismic sensors, magnetic sensors, weight/mass sensors, ionizing radiation sensors, and/or acoustical sensors. Sensors may alternatively or additionally include any device used as a sensor as described in U.S. Provisional App. Ser. No. 63/067,142.

Still referring to FIG. 26, behavior 2608 may be identified by one or more behavior models. Behavior models may include, without limitation, one or more behavior machine learning processes. As used in this disclosure "behavior machine-learning process" is a machine-learning process that uses training data and/or training set to generate an algorithm that will be performed by an apparatus and/or one or more remote devices to produce outputs given data provided as inputs; this is in contrast to a non-machine learning software program where the commands to be executed are determined in advance by a user and written in a programming language. A behavior machine-learning process may include any supervised, unsupervised, or reinforcement machine-learning process that apparatus 2604 and/or a remote device may or may not use in the determination of the behavior. A behavior machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

Still referring to FIG. 26, a behavior machine-learning process may be trained as a function of a behavior training set. As used in this disclosure "behavior training set" is a training set that correlates at least a user action from the plurality of sensors to at least an accepted standard, wherein a sensor is a device that detects and/or measures a physical property of an external surrounding, as described above in detail. As used in this disclosure a "user action" is a physical, psychological, and/or spiritual decision that is acted upon, wherein that action at least impacts one or more surrounding individuals. For example, and without limitation a user action may include striking an individual, walking into a secure area, coughing on an individual, assaulting an individual, verbally abusing an individual, verbally discriminating against another individuals religious beliefs, sitting on a chair, complimenting an individual, opening a door for an individual and the like thereof. As used in this disclosure an "accepted standard" is one or more ethical standards that are established by society to promote trust, fairness and or kindness among a society. An accepted standard may include, without limitation, a utilitarian approach, a rights approach, a justice approach, a common good approach, and/or a virtue approach, as described in detail below in reference to FIG. 27.

Still referring to FIG. 26, apparatus 2604 may utilize behavior model and/or receive the behavior model from a remote device. As used in this disclosure a "remote device" is a computing system external to the apparatus that obtains and/or sends information relating to a machine-learning process. Additionally or alternatively, apparatus 2604 may receive the behavior model from the remote device. Additionally or alternatively the behavior model may be operated on the remote device, wherein the remote device may determine the behavior and apparatus 2604 receives behavior 2608 from the remote device that utilizes one or more behavior machine learning models. For example, and without limitation, a remote device may provide a behavior to apparatus 2604 using one or more behavior machine-learning processes, wherein a behavior machine-learning process is described above in detail. The remote device may perform the behavior machine-learning process, using the behavior training set, wherein the behavior training set is described above in detail. The remote device may transmit a signal, bit, datum, or parameter to apparatus 2604 that at least relates to behavior 2608. Additionally or alternatively, the remote devices may provide modifications to the behavior machine-learning process. For example, and without limitation, a modification may be comprised of a firmware update, a software update, a behavior machine-learning model correction, and the like thereof. As a non-limiting example a software update may incorporate a new accepted standard that relates to a modified user action. Additionally or alternatively, the behavior machine learning process may be transmitted to the remote device, wherein the remote device may update the behavior training data and transmit an updated behavior machine-learning process back to apparatus 2604. The updated behavior machine-learning process may be transmitted by the remote device and received by apparatus 2604 as a software update, firmware update, or corrected behavior machine-learning process.

Still referring to FIG. 26, a behavior machine-learning process may be generated as a function of a behavior classifier. A "behavior classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A behavior classifier may be configured to output at least a datum that labels or otherwise identifies a set of data that are clustered together, found to be close under a distance metric as described below, or the like. Apparatus 2604 and/or another device may generate a classifier using a classification algorithm, defined as a processes whereby apparatus 2604 derives a behavior classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 26, apparatus 2604 may be configured to generate a behavior classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Apparatus 2604 may then calculate a likelihood table by calculating probabilities of different data entries and classification labels. Apparatus 2604 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 26, apparatus 2604 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 26, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Further referring to FIG. 26, behavior classifier may include any behavior classifier as described in as described in U.S. Provisional App. Ser. No. 63/067,142.

Still referring to FIG. 26, apparatus 2604 is configured to determine at least a deterrent 2624 that impacts behavior 2608. As used in this disclosure a "deterrent" is a thing, entity, object, and/or action that intends to discourage and/or prevent an individual from continuing an action, behavior, and/or conduct. Deterrent 2624 may include without limitation, directed light, sounds, electrical deterrents, neurostimulators, chemicals, entanglement devices, and the like thereof. As used in this disclosure a "directed light deterrent" is a deterrent that uses a high-intensity light source such as, but not limited to, a laser, super LED, laser illuminated LED, super-luminescent LED, VCSEL, plasma discharge lamp, and/or high-intensity LED that is actively aimed at and/or focused on individual 2612, to generate a deterrent effect. As used in this disclosure a "directed sound deterrent" is a sound source that is aimed at individual 2612 in a manner analogous to a directed light source. A directed sound deterrent may include, without limitation a long-range acoustic device (LRAD), a laser generating localized plasmas in the atmosphere to create modulating plasmas near the individual such that audible sound is produced, an ultrasonic carrier wave, and the like thereof. As used in this disclosure "neurostimulation deterrents" is an electrical source that is projected at individual 2612 such that an electrical contact is achieved between an individual and the deterrent. As a non-limiting example, an electrical shock deterrent may include a Human Electro-Muscular Incapacitation (HEMI) device, a stun gun, a taser, Taser Area Denial System (TADS), a plasma, an electric field, an ionizer, and the like thereof. As used in this disclosure a "chemical deterrent" is a chemical and/or molecule that at least provide a noxious and/or discomforting experience for individual 2612. For example, and without limitation, a chemical deterrent may include pepper spray, malodorant weapons, tear gas, pacifying agent, white phosphorous, aerosolized opioids, and the like thereof. As used in this disclosure "entanglement devices" are deterrents wherein individual 2612 becomes physically trapped in a device and prevents escape of that individual. For example, an entanglement device may include, without limitation nets, bolas, and/or other entanglement or entrapment devices that are launched ballistically at the individual in order to limit or stop the individual's ability to move normally.

Still referring to FIG. 26, apparatus 2604 may determine deterrent 2624 by identifying candidate deterrents from a deterrent database. As used in this disclosure "candidate deterrents" are a list and/or group of deterrents that at least satisfy the requirements to alter a behavior. For example, and without limitation, candidate deterrents of laser, directed white light, and strobe light pulses may be identified as candidate deterrents for a behavior of theft. As used in this disclosure a "deterrent database" is a datastore relating to the plurality of deterrents an apparatus may or may not have access to utilize. As a non-limiting example candidate deterrents may include a laser, super LED, laser illuminated LED, super-luminescent LED, VCSEL, plasma discharge lamp, and/or high-intensity LED from an optical deterrent database. Apparatus 2604 may determine a behavior impact value associated with the candidate deterrents. As used in this disclosure a "behavior impact value" is a measurable value associated with an intended behavior modification that a deterrent is meant to perform. For example, and without limitation a behavior impact value of 20 may be determined for a chemical deterrent that has an intended behavior modification of eliminating a verbally abusive behavior of an individual. As a further non-limiting example a behavior impact value of 2600 may be determined for an entanglement deterrent that has an intended behavior modification of entrapping and ensnaring. As a further non-limiting example a behavior impact value of 5 may be determined for an audio output that has an intended behavior modification of cessation of violent and/or damaging actions. As a further non-limiting example a behavior impact value of 72 may be determined for a neurostimulant deterrent that has an intended behavior modification for altering negative behavior to a positive behavior. As a further non-limiting example a behavior impact value of 92 may be determined for a chemical deterrent that has an intended behavior modification for incapacitation. Apparatus may select deterrent 2624 from the candidate deterrents that at least improves the behavior impact value using a linear programming algorithm. A linear programming algorithm may be used to improve the behavior impact value, wherein apparatus 2604 may use a linear program such as, without limitation, a mixed-integer program. A "linear program," as used in this disclosure, is a program that optimizes a linear objective function, given at least a constraint. As a non-limiting example, apparatus 2604 may calculate variables of set of behavior impact values of such parameters from goal parameters calculate an output of candidate deterrents using the variables, and select a deterrent having the largest size, according to a given definition of "size," of the set of deterrent outputs representing the selected deterrents; size may, for instance, include absolute value, numerical size, or the like.

Still referring to FIG. 26, apparatus 2604 is configured to identify at least a spatiotemporal element 2628 related to individual 2612 and deterrent 2616. As used in this disclosure a "spatiotemporal element" is datum relating to position, velocity, and/or or acceleration of an individual's physical being. Spatiotemporal element 2628 may be identified from a sensor of a plurality of sensors, wherein sensors may be comprised of one or more of imaging and other sensors, chemical sensors, motion sensors, ranging sensors, light radar component, such as lidar, detection or imaging using radio frequencies component, such as radar, terahertz or millimeter wave imagers, seismic sensors, magnetic sensors, weight/mass sensors, ionizing radiation sensors, and/or acoustical sensors, as described above in detail. Spatiotemporal element 2628 may include at least a movement of the individual at a specific time that relates to a deterrent location. As a non-limiting example a spatiotemporal element may include a movement of an individual walking from one non-secure area to another secure area. Spatiotemporal element 2628 may be calculated using one or more sensors related to one another. For instance and without limitation, a motion sensor of an individual entering a lobby may be noted, wherein another motion sensor may indicate that the individual has exited the lobby merely 30 second later, indicating a spatiotemporal element of an individual sprinting through the lobby and raising the threat level in apparatus 2604. As a further non-limiting example a plurality of lasers may be utilized to determine a distance of an individual with respect to time by measuring the distance the laser emits and calculating the time that is required to reflect back to the source. As a further non-limiting example, a light radar component may be utilized to at least determine a distance of an individual by using one or more Time of Flight (ToF) analyzers, wherein a ToF analyzer transmits a light toward an object or field of interest and detects backscattered and/or reflected light, measuring the total time that is required to transmit and reflect back to generate a distance. As a Spatiotemporal element 2628 may relate to at least a velocity of the individual at a specific time that relates to a deterrent location. The velocity of an individual may be determined by rapid repeated samples of position and/or doppler effect measurements using one or more light radar components and/or audio components. As used in this disclosure a "deterrent location" is the place and position of deterrent with respect to an individual. For example, and without limitation a deterrent location may consist of a corner of a room opposite to an entryway at an elevation of 10 feet. As a further non-limiting example a deterrent location may include a deterrent on the handle of the door that provides entry into a secure location. For example, and without limitation, a spatiotemporal element may determine that individual 2612 is 10 feet from the chemical deterrent location, while 5 feet away from the entanglement deterrent location. As a further non-limiting example, a spatiotemporal element may determine that individual 2612 is 15 feet from a directed light deterrent location and moving at an angle of 5 degrees perpendicular to the deterrent light source with a velocity of 5 feet per second.

Still referring to FIG. 26, apparatus 2604 is configured to generate a safety modifier 2632 as a function of spatiotemporal element 2628. As used in this disclosure a "safety modifier" is a function that establishes one or more constraints for deterrent elements. As used in this disclosure "constraints" are limits that a deterrent element may not exceed or otherwise violate, such that the deterrent element operates safely. As used in this disclosure "deterrent elements" are parameters according to which the deterrents can be altered and/or modified. For example, and without limitation deterrent elements may include energy output, energy intensity, energy duty cycle, energy on/off cycle, energy limiter, audio quality, audio intensity, audio duration, audio pulse, audio location, light intensity, light duty cycle, light pulse, light location, light color, laser intensity, laser duty cycle, laser pulse, laser wavelength, current, voltage, wattage, and the like thereof. As a non-limiting example a constraint may include an upper limit of 5 volts for an electrical deterrent and a lower limit of 2 volts for an electrical deterrent. Additionally or alternatively, a safety modifier may indicate that a deterrent element of energy output may be 200 joules, while the energy on/off cycle may only be 1 millisecond. As a further non-limiting example, a safety modifier may indicate that a deterrent element of ballistic speed must be within the range of 5-10 m/s.

Still referring to FIG. 26, apparatus 2604 generates safety modifier 2632 by identifying a distance parameter 2636 as a function of spatiotemporal element 2632. As used in this disclosure a "distance parameter" is a set length that exists amongst the individual and the deterrent location. For example, and without limitation, a distance parameter of 10 feet may be identified of ran individual that has entered a secure location, wherein the deterrent location exists 10 feet away from the individual at the entryway. Distance parameter 2636 may be altered as the individual moves towards or away from the deterrent location. Apparatus 2604 determines a velocity parameter 2640 as a function of spatiotemporal element 2628. As used in this disclosure a "velocity parameter" is a calculated speed and vector that exists amongst the individual and the deterrent location. For example, and without limitation, a velocity parameter may be identified as a speed of 10 m/s in the direction 30 degrees northwest. As a further non-limiting example, a velocity parameter may indicate that an individual is moving at a speed of 8 m/s towards the deterrent location. As a further non-limiting example a velocity parameter may indicate that an individual is fleeing from a secure area at a speed of 15 m/s, indicating theft from the secure area. Safety modifier 2632 is generated as a function of distance parameter 2636 and the velocity parameter 2640. For example, and without limitation, an individual may be trespassing in a secure area wherein the distance parameter indicates that the individual is 5 feet from the deterrent location and the velocity parameter indicates that the individual is moving away from the deterrent location at a speed of 1 m/s, wherein the safety modifier may indicate that an audio output be limited to an intensity of 25-50%. As a further non-limiting example, an individual may be fleeing from a theft wherein the distance parameter indicates that the individual is 20 feet from the deterrent location and the velocity parameter indicates that the individual is moving away from the deterrent location at a speed of 10 m/s, wherein the safety modifier may indicate that directed light source be enhanced to a laser power of 2,000 joules with an intensity of 95%.

Still referring to FIG. 26, safety modifier 2632 may be generated by determining at least a deterrent impact. As used in this disclosure a "deterrent impact" is an effect an external stimulus has on a user. For example, and without limitation, a deterrent impact may include covering of ears to attempt to block out an audio signal as a result of an external stimulus of a 10,000 Hz audio signal. A deterrent impact may be comprised of a measurable element associated with an effect the deterrent has on a user. A deterrent impact may provide an overall value associated with the likelihood that an individual may or may not be harmed or otherwise negatively impacted. As a non-limiting example a deterrent impact may be comprised of a value of 10 indicating a strong propensity for causing dermal burns on an individual. Additionally or alternatively, a deterrent impact may identify one or more impacts associated with an external stimulus. As a non-limiting example a deterrent impact may identify an impact of temporary blindness, damage to vision, temporary incapacitation, nausea, seizures, post-traumatic stress disorder and/or retinal burning associated with an external stimulus of a laser. As a further non-limiting example a deterrent impact may identify an impact of hearing loss, tinnitus, sensorineural hearing loss, conductive hearing loss, post-traumatic stress disorder, auditory nerve damage, and/or ruptured eardrums associated with an external stimulus of an audio signal. As a further non-limiting example a deterrent impact may identify an impact of loss of consciousness, muscle spasms, numbness, tingling, breathing disorders, headache, electrical burns, heart arrythmias, and/or tetanus associated with an external stimulus of an electrical shock. As a further non-limiting example a deterrent impact may identify an impact of incapacitation, nerve damage, muscle contraction, nausea, headache, stomachache, and/or seizures associated with an external stimulus of a neurostimulant. As a further non-limiting example a deterrent impact may identify an impact of incapacitation, cross-reactivity, burning sensation, permanent nerve damage, nausea, vomiting, and/or blindness associated with an external stimulus of a chemical. As a further non-limiting example a deterrent impact may identify an impact of muscle contraction, blunt force trauma, loss of limb, and/or puncture wound associated with an external stimulus of an entanglement device.

Still referring to FIG. 26, apparatus 2604 may determine deterrent impact as a function of deterrent location. The deterrent impact may be decrease as a function of a deterrent location that is far away, wherein a deterrent impact may increase as a function of a deterrent location that is close. As a non-limiting example a directed light deterrent may result in a beam spread, wherein beam spread is may include decreasing intensity per area of light as distance increase and/or an inverse-square law for point sources. As a further non-limiting example audio signals and/or chemicals may follow an inverse-square law, wherein as the deterrent location increases the deterrent impact will decrease. Additionally or alternatively, a deterrent impact may be avoided due to a threshold limit that at least identifies a deterrent that is deemed to invasive due to a short deterrent location, wherein a threshold is a given limit that a deterrent impact may not exceed as a function of a deterrent location. For example, and without limitation, a deterrent location of 3 cm, which may result in a deterrent impact of permanent retinal damage, may violate a threshold of 1 m for a directed light deterrent. As a further non-limiting example a deterrent location of 1 mm, which may result in a deterrent impact of death, may violate a threshold of 10 m for a chemical deterrent. Additionally or alternatively, deterrents may be selected due to the reduced deterrent location, as the deterrent impact may decrease due to a deterrent location being larger. As a non-limiting example an electrical shock deterrent may require a deterrent location to be less than 5 cm or the deterrent impact may result in no impact, or limited impact.

Still referring to FIG. 26, apparatus 2604 may determine deterrent impact as a function of one or more future positions of an individual. As used in this disclosure "future positions" are locations of an individual that are calculated using one or more spatiotemporal elements, to at least determine the position of the individual at the time of the deterrent impact. The future positions may be calculated using one or more kinematic equations for constant acceleration using integral calculus, the integral formulation of the kinematics equations in analyzing motion, the functional form of velocity verses time given the acceleration function, and/or the functional form of position versus time given the velocity function. Apparatus 2604 may identify an individual's future position using one or more heuristic algorithms. As used in this disclosure "heuristic algorithms" are algorithms that enhance speed, and/or decrease complexity, of calculations while sacrificing relatively little accuracy, such that an output such as a future position may be rapidly determined with prior to an individual movement. In an embodiment, using at least a heuristic algorithms to determine a future position may drastically reduce the time needed to perform the determination, while reducing a miniscule amount of accuracy; for example heuristic determination of future positions may be several factors of ten faster than brute force approaches. In other embodiments, heuristic algorithms may include a heuristic algorithm based on a single variable or a small set of variables, such as a single velocity and/or location.

Still referring to FIG. 26, apparatus 2604 may determine deterrent identify using one or more position machine-learning models. As used in this disclosure a "position machine-learning model" is a machine-learning model to produce a deterrent impact output given deterrent locations provided as inputs; this is in contrast to a non-machine learning software program where the commands to be executed are determined in advance by a user and written in a programming language. Position machine-learning model may include one or more position machine-learning processes such as supervised, unsupervised, or reinforcement machine-learning processes that apparatus 2604 and/or a remote device may or may not use in the determination of the deterrent impact. A position machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

Still referring to FIG. 26, a position machine-learning process may be trained as a function of a position training set. As used in this disclosure a "position training set" is a training set that correlates at least a deterrent location to at least an invasive parameter, wherein a deterrent impact includes all of deterrent impact as described above. As used in this disclosure an "invasive parameter" is a variable associated with the magnitude of invasiveness that a deterrent exerts on an individual. For example, and without limitation, a position training set may relate a deterrent location of 5 mm with an invasive parameter of 40 for incapacitation using a ballistic deterrent. As a further non-limiting example, a position training set may relate a deterrent location of 10 m with an invasive parameter of 2 for incapacitation using an audio output deterrent. The position training set may be received from one or more remote devices, wherein apparatus 2604 may receive one or more position training set updates. A position training set update may include one or more software updates, firmware updates, signals, bits, data, and/or parameters that at least relates a deterrent location to an at least invasive parameter. The position training set may be generated as a function of apparatus 2604 previous experiences, wherein the deterrent location may be related to the invasive parameter and stored as a position training set.

Still referring to FIG. 26, apparatus 2604 may generate safety modifier 2632 using the deterrent impact, spatiotemporal element 2628, and at least a safety machine model. As used in this disclosure a "safety machine-learning model" is a machine-learning model to produce a safety modifier output given distance parameters, velocity parameters, acceleration parameters, and/or additional spatiotemporal elements provided as inputs; this is in contrast to a non-machine learning software program where the commands to be executed are determined in advance by a user and written in a programming language. Safety machine-learning model may include one or more safety machine-learning processes such as supervised, unsupervised, or reinforcement machine-learning processes that apparatus 2604 and/or a remote device may or may not use in the determination of the behavior. A safety machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

Still referring to FIG. 26, a safety machine-learning process may be trained as a function of a safety training set. As used in this disclosure a "safety training set" is a training set that correlates at least a deterrent impact to at least a spatiotemporal element, wherein a deterrent impact and spatiotemporal element includes all of deterrent impact and spatiotemporal element as described above. For example, and without limitation, a safety training set may relate a deterrent impact of incapacitation with a spatiotemporal element of 5 feet from a deterrent location, wherein the individual is walking away from the deterrent location at a speed of 1 m/s. As a further non-limiting example, a safety training set may relate a deterrent impact of blunt force trauma to a spatiotemporal element of 20 feet from a deterrent location, wherein the individual is sprinting towards the deterrent location at a speed of 15 m/s. As a further non-limiting example, a safety training set may relate a deterrent impact of temporary discomfort to a spatiotemporal element of an individual 50 feet from a deterrent location walking away from the deterrent location at a speed of 10 m/s.

Still referring to FIG. 26, apparatus 2604 may receive the safety machine-learning process from a remote device that utilizes one or more safety machine learning processes, wherein a remote device is described above in detail. For example, and without limitation, a remote device may include a computing device, external device, processor, and the like thereof. The remote device may perform the safety machine-learning process using safety training set to generate safety modifier 2632 and transmit the output to apparatus 2604. The remote device may transmit a signal, bit, datum, or parameter to apparatus 2604 that at least relates to safety modifier 2632. Additionally or alternatively, the remote device may provide an updated machine-learning process. For example, and without limitation, an updated machine-learning process may be comprised of a firmware update, a software update, a safety machine-learning model correction, and the like thereof. As a non-limiting example a software update may incorporate a new deterrent impact that relates to a modified spatiotemporal element. Additionally or alternatively, the updated machine learning process may be transmitted to the remote device, wherein the remote device may replace the safety machine-learning process with the updated machine-learning process and determine the safety modifier as a function of the spatiotemporal element using the updated machine-learning process. The updated machine-learning process may be transmitted by the remote device and received by apparatus 2604 as a software update, firmware update, or corrected safety machine-learning process. For example, and without limitation a safety machine-learning process may utilize neural net algorithms, wherein the updated machine-learning process may incorporate polynomial regression algorithms.

Still referring to FIG. 26, apparatus 2604 may modify deterrent 2624 by determining at least a deterrent element of a plurality of deterrent elements. Deterrent elements include parameters according to which the deterrent component can be altered and/or modified, as described above in detail. Apparatus 2604 may determine a deterrent element that at least differs from safety modifier 2632 using a modifying algorithm. As used in this disclosure a "modifying algorithm" is a mathematical formula that at least relates a value to another value and/or range of values. As a non-limiting example, a modifying algorithm may include addition formulas, subtraction formulas, lattice formulas, scratch formulas, and the like thereof. The deterrent element may control one or more deterrent outputs. As used in this disclosure a "deterrent output" is the object, and or matter that is emitted from the deterrent component. For example, a deterrent output may include, without limitation, a laser, light, net, bola, chemical, current, and the like thereof. As a non-limiting example a deterrent element may include the power, duty cycle, intensity, pulse time, current, wattage, voltage, concentration, wavelength, ballistic force, ballistic velocity, ballistic acceleration, and the like thereof. Deterrent output may be halted due to one or more thresholds, wherein a threshold is a given limit that a deterrent output may not exceed. As a non-limiting example a deterrent output of 80% may exceed the threshold of 70%, wherein the deterrent output may be stopped due to exceeding the threshold.

Still referring to FIG. 26, apparatus 2604 is configured to initiate a modified deterrent 2644. Apparatus may initiate modified deterrent 2644 including a deterrent of an infrared laser and/or light output, a first entanglement device, or the like. Apparatus 2604 may locate modified deterrent 2644; location may include placement in an apparatus 2604, placement in proximity to apparatus 2604, and/or placement external to apparatus 2604. Apparatus 2604 may generate deterrent control; generation of a deterrent control system may include transmission of a signal to initiate deterrent and/or transmission of any deterrent controls generated as described above, including without limitation transmission of information for localized and/or remote deterrent control. Transmission may be direct or indirect; for instance, transmission may involve transmission to a remote device that relays transmission to a deterrent or computing device coupled thereto, or transmission to an auxiliary computing device or computer memory for transport to the deterrent and/or computing device coupled thereto.

Figure 27:
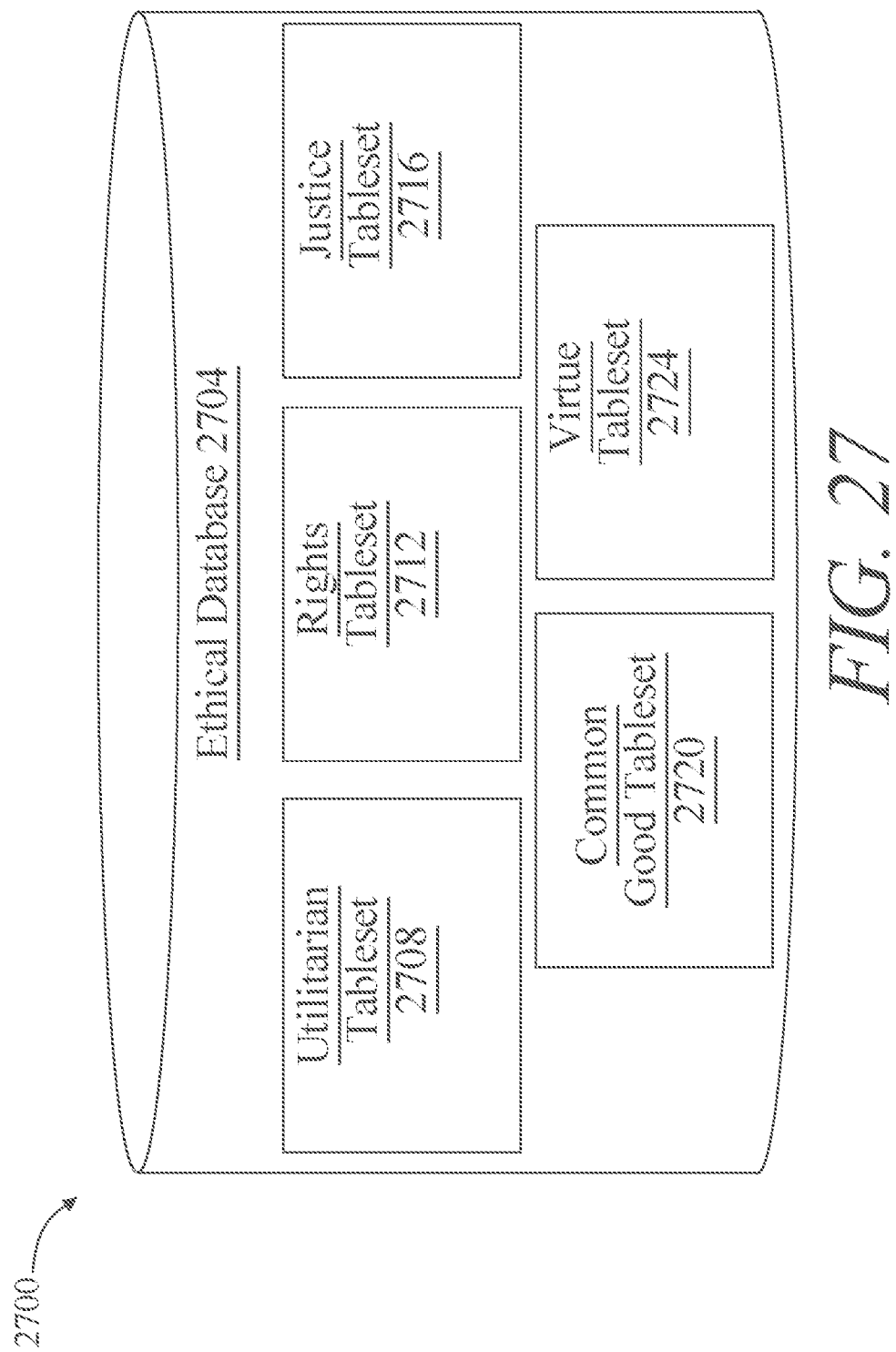
FIG. 27 is a block diagram of an exemplary embodiment for an ethical database according to an embodiment of the apparatus.

Referring now to FIG. 27, an exemplary embodiment of 2700 an ethical database 2704 according to an embodiment of the invention is illustrated. Ethical database 2704 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. Ethical database 2704 may include one or more tables, including without limitation, a utilitarian tableset 2708; utilitarian tableset 2708 may include actions that are assessed in terms of its consequences and/or outcomes and strives. As a non-limiting example an individual that is displaying behavior that is selfish, wherein the outcome is personal gain, may be identified as a negative accepted standard. Ethical database 2704 may include one or more tables, including without limitation, a rights tableset 2712; rights tableset 2712 may include actions that best protect and respect the moral rights of individuals. As a non-limiting example moral rights may include, without limitation, rights to make one's own choices, to be told the truth, not to be injured, a degree of privacy, and the like thereof. Ethical database 2704 may include one or more tables, including without limitation, a justice tableset 2716; justice tableset 2716 may include actions that relate to equality and/or justice. As a non-limiting example actions such as discrimination and/or favoritism may not be considered equality behaviors, whilst actions of impartiality and/or considerate may be considered justice behaviors. Ethical database may 2704 may include one or more tables, including without limitation, a common good tableset 2720; common good tableset 2720 may include actions that are taken in order to benefit not only a certain group of individuals, but the society as a whole. As a non-limiting example actions of an individual tampering with a building may denote a negative behavior, while actions of cleaning a public hallway or removing litter from a secure area may consist of a positive behavior. Ethical database 2704 may include one or more tables, including without limitation, a virtue tableset 2724; virtue tableset 2724 may include actions that are taken in order to achieve a full development of our humanity. As a non-limiting example actions relating to honesty, courage, compassion, generosity, tolerance, love, fidelity, integrity, fairness, self-control, and prudence may all be considered virtues that may aid in achieving full development of an individual's humanity.

Figure 28:
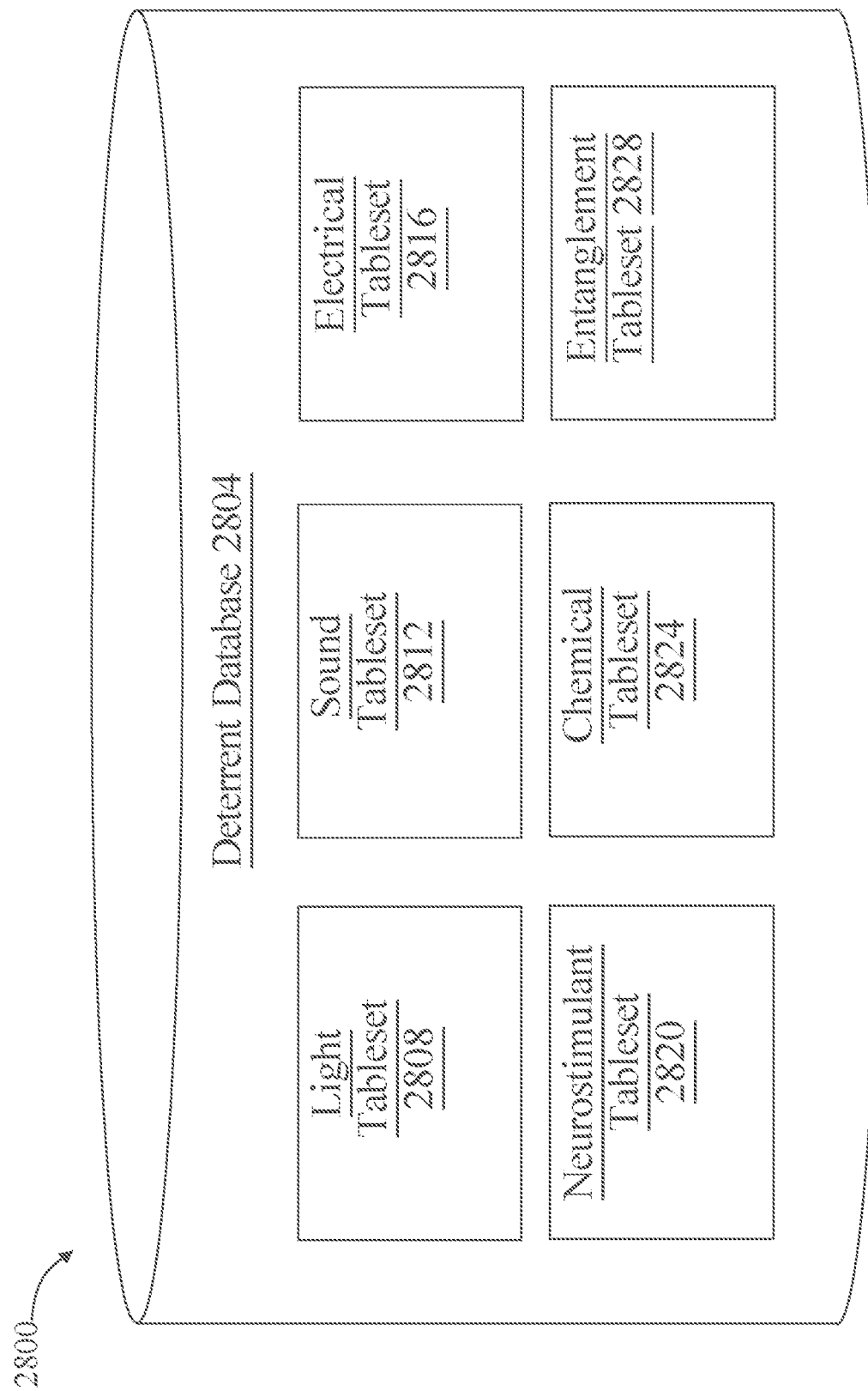
FIG. 28 is a block diagram of an exemplary embodiment for a deterrent database according to an embodiment of the apparatus.

Referring now to FIG. 28, an exemplary embodiment of 2800 a deterrent database 2804 according to an embodiment of the invention is illustrated. Deterrent database 2804 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. Deterrent database may 2804 may include one or more tables, including without limitation, a light tableset 2808; light tableset 2808 may include deterrents that use a high-intensity light source that is actively aimed at and/or focused on an individual. As a non-limiting example light tableset may include, without limitation, one or more elements of a laser, a high intensity Eli D, a beam expander, a free bream spreader, a focusing optic, microwave source, and the like thereof. Deterrent database 2804 may include one or more tables, including without limitation, a sound tableset 2812; sound tableset 2812 may include deterrents that direct sound sources to individuals in a manner analogous to a directed light source. As a non-limiting example, sound tableset 2812 may include, without limitation, a long-range acoustic device (LRAD), an ultrasonic carrier, multiple LRAD speakers, and the like thereof. Deterrent database 2804 may include one or more tables, including without limitation, an electrical tableset 2816; electrical tableset 2816 may include deterrents that apply at least an electrical current, voltage, and/or wattage to an individual. As a non-limiting example, electrical tableset 2816 may include a "stun gun", taser, and or shock device that generates a shock upon contact. Deterrent database may 2804 may include one or more tables, including without limitation, a neurostimulant tableset 2820; neurostimulant tableset 2820 may include deterrents that apply at least a stimulus that causes discomfort and/or neurological impairment, such as pre-epileptic effects. As a non-limiting example, neurostimulant tableset 2820 may include microelectrodes, transcranial electric stimulators, magnetic fields, strobe effect lights, and or electromagnetic neuromodulators. Deterrent database 2804 may include one or more tables, including without limitation, a chemical tableset 2824; chemical tableset 2824 may include deterrents that release one or more chemicals to at least alter a behavior of an individual. As a non-limiting example, chemical tableset 2824 may include pepper spray, "skunk" weapons, tear gas, irritants, noxious gas, and the like thereof. Deterrent database 2804 may include one or more tables, including without limitation, an entanglement tableset 2828; entanglement tableset 2828 may include deterrents that fire ballistics at an individual such that the individual's ability to move is stopped and/or limited. As a non-limiting example, entanglement tableset 2828 may include, without limitation, nets, bolas, and the like thereof.

Figure 29:
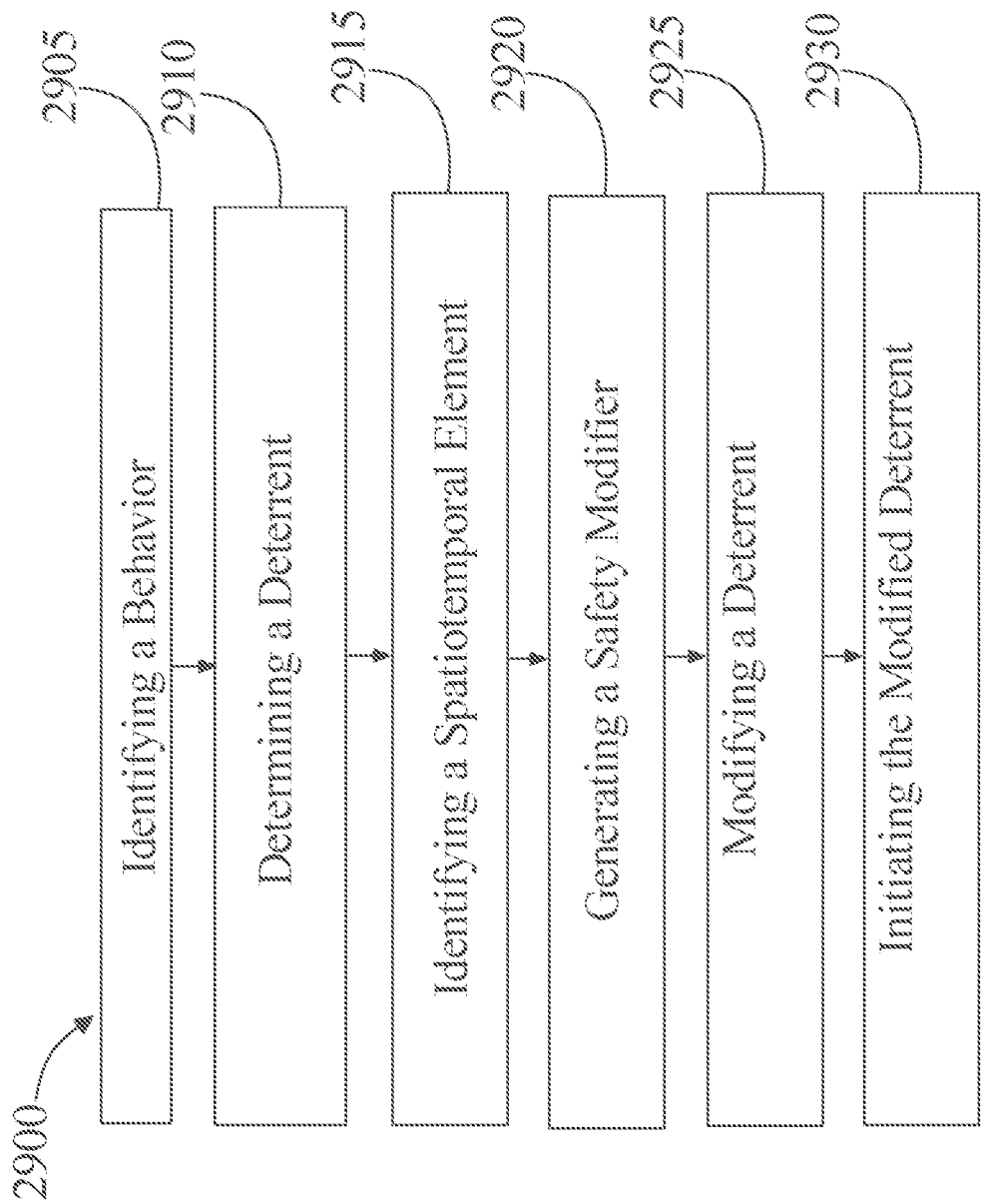
FIG. 29 is a process flow diagram illustrating an exemplary embodiment of a method of modifying a deterrent.

Now referring to FIG. 29, an exemplary embodiment of a method 2900 for modifying a deterrent is illustrated. At step 2905, an apparatus 2404 identifies a behavior 2608 of an individual 2612. Behavior 2608 may be implemented, without limitation, as described above in reference to FIGS. 1-4. Individual 2612 may be implemented, without limitation, as described above in reference to FIGS. 1-4. Behavior 2608 is identified as a function of one or more datum 2616 relating to individual 2612. Datum 2616 may be implemented, without limitation, as described above in reference to FIGS. 1-4. Behavior 2608 may be identified as a function of a recognition element 2620. Recognition element 2620 may be implemented, without limitation, as described above in reference to FIGS. 1-4. Behavior 2608 may be identified as a function of a behavior machine-learning model that is performed by apparatus 2604 and/or one or more remote devices. The behavior machine-learning model may be implemented, without limitation, as described above in reference to FIGS. 1-4. The behavior machine-learning model may be configured using a behavior training set. The behavior training set may be implemented, without limitation, as described above in reference to FIGS. 1-4.

Still referring to FIG. 29, at step 2910, apparatus 2604 determines a deterrent 2624 that at least impacts behavior 2608. Deterrent 2624 may be implemented, without limitation, as described above in reference to FIGS. 1-4. Deterrent 2624 may be identified by identifying one or more candidate deterrents from a deterrent database 2804. Candidate deterrents may be implemented, without limitation, as described above in reference to FIGS. 1-4. Deterrent database may be implemented, without limitation, as described above in reference to FIGS. 1-4.

Still referring to FIG. 29, at step 2915, apparatus 2604 identifies at least a spatiotemporal element 2628 related to individual 2612 and deterrent 2624. Spatiotemporal element 2628 may be implemented, without limitation, as described above in reference to FIGS. 1-4. Spatiotemporal element may be identified from a sensor of a plurality of sensors, wherein sensors may be implemented, without limitation, as described above in reference to FIGS. 1-4.

Still referring to FIG. 29, at step 2920, apparatus 2604 generates a safety modifier 2632 as a function of spatiotemporal element 2628. Safety modifier 2632 may be implemented, without limitation, as described above in reference to FIGS. 1-4. Safety modifier 2632 may indicate one or more constraints for deterrent elements. Deterrent elements may be implemented, without limitation, as described above in reference to FIGS. 1-4. Safety modifier 2632 is generated by identifying a distance parameter 2636 as a function of spatiotemporal element 2628. Distance parameter may be implemented, without limitation, as described above in reference to FIGS. 1-4. Safety modifier 2632 is generated by determining a velocity parameter 2640 as a function of spatiotemporal element 2628. Velocity parameter 2640 may be implemented, without limitation, as described above in reference to FIGS. 1-4. Safety modifier 2632 may be generated by determining at least a deterrent impact, wherein a deterrent impact may be implemented, without limitation, as described above in reference to FIGS. 1-4. Safety modifier 2632 may be generated using the deterrent impact, spatiotemporal element 2628, and at least a safety machine-learning model that is performed by apparatus 2604 and/or one or more remote devices. The safety machine-learning model may be implemented, without limitation, as described above in reference to FIGS. 1-4. The safety machine-learning model may be configured using a safety training set. The safety training set may be implemented, without limitation, as described above in reference to FIGS. 1-4.

Still referring to FIG. 29, at step 2925, apparatus 2604 modifies deterrent 2624 as a function of safety modifier 2632. Deterrent 2624 may be modified by receiving a deterrent space relating to the plurality of deterrent elements associated with deterrent 2624, wherein deterrent space may be implemented, without limitation, as described above in reference to FIGS. 1-4. Apparatus 2604 may modify the deterrent element that at least differs from safety modifier 2632 using a modifying algorithm, wherein a modifying algorithm may be implemented, without limitation, as described above in reference to FIGS. 1-4. Apparatus may modify the deterrent using the deterrent element to at least alter the deterrent output, wherein the deterrent output may be implemented, without limitation, as described above in reference to FIGS. 1-4.

Still referring to FIG. 29, at step 2930, apparatus 2604 initiates a modified deterrent 2644. Modified deterrent 2644 may be implemented, without limitation, as described above in reference to FIGS. 1-4. Initiation of modified deterrent 2644 may include performance of a first step in the initiation of a modified deterrent; first step may include a particular modified deterrent or signal, such as an infrared laser and/or light output, a first entanglement device, or the like. First step may include location of a modified deterrent device; location may include placement in an apparatus 2604. First step may include generation of a modified deterrent control; generation of a modified deterrent control system may include transmission of a signal to initiate deterrent and/or transmission of any modified deterrent controls generated as described above, including without limitation transmission of information for localized and/or remote deterrent control. Transmission may be direct or indirect; for instance, transmission may involve transmission to a remote device that relays transmission to a deterrent or computing device coupled thereto, or transmission to an auxiliary computing device or computer memory for transport to the deterrent and/or computing device coupled thereto.

Figure 30:
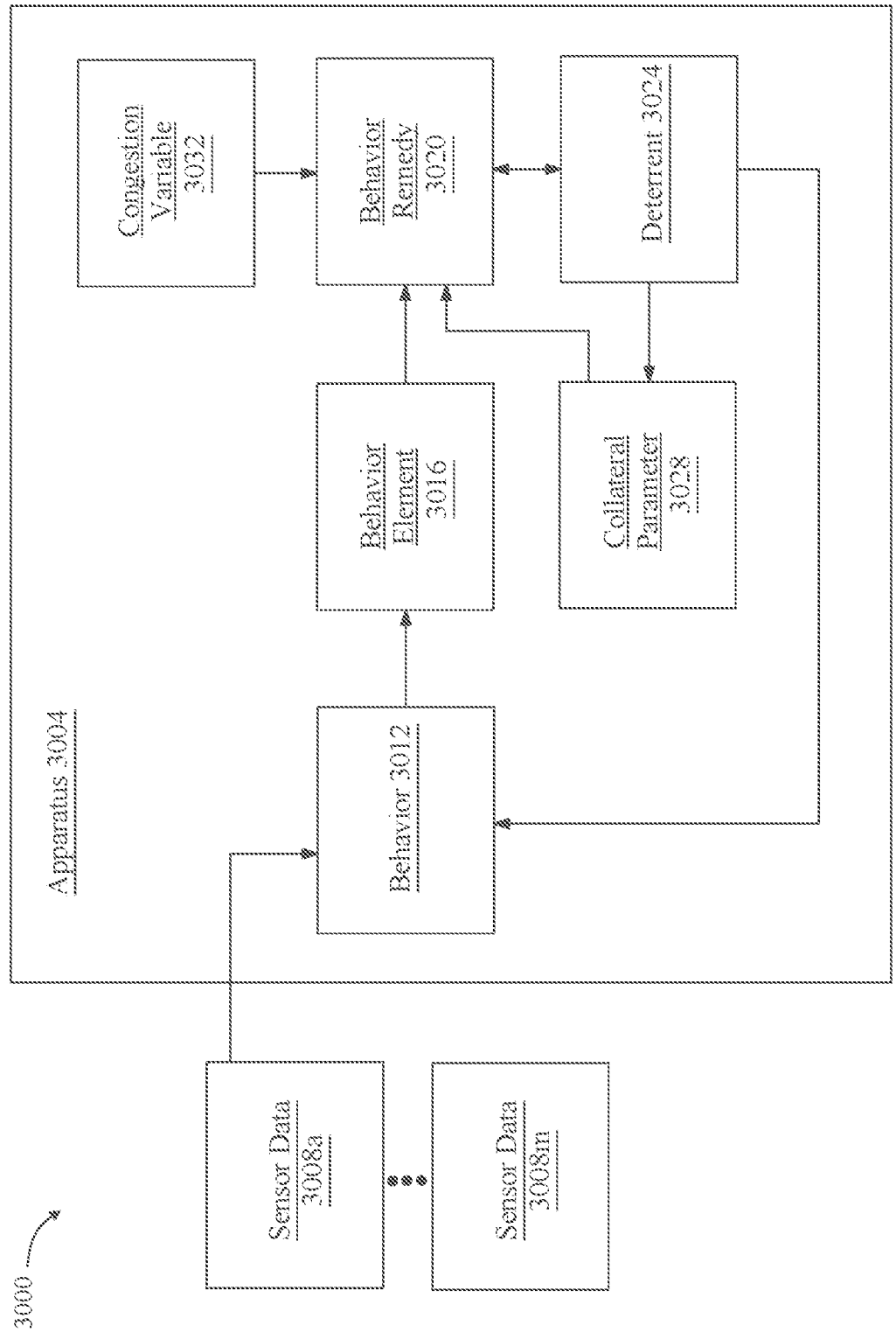
FIG. 30 is a block diagram of an exemplary embodiment of a deterrent apparatus.

Referring now to FIG. 30, an exemplary embodiment of a system 3000 for altering an individual behavior is illustrated. System includes an apparatus 3004. Apparatus 3004 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Apparatus 3004 may include a single computing device operating independently, or may include two or more computing device operating in concert, in parallel, sequentially or the like; two or more computing devices may be included together in a single computing device or in two or more computing devices. Apparatus 3004 may interface or communicate with one or more additional devices as described below in further detail via a network interface device. Network interface device may be utilized for connecting apparatus 3004 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Apparatus 3004 may include but is not limited to, for example, a computing device or cluster of computing devices in a first location and a second computing device or cluster of computing devices in a second location. Apparatus 3004 may include one or more computing devices dedicated to data storage, security, distribution of traffic for load balancing, and the like. Apparatus 3004 may distribute one or more computing tasks as described below across a plurality of computing devices of computing device, which may operate in parallel, in series, redundantly, or in any other manner used for distribution of tasks or memory between computing devices. Apparatus 3004 may be implemented using a "shared nothing" architecture in which data is cached at the worker, in an embodiment, this may enable scalability of system 3000 and/or computing device.

Apparatus 3004 may be designed and/or configured to perform any method, method step, or sequence of method steps in any embodiment described in this disclosure, in any order and with any degree of repetition. For instance, apparatus 3004 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Apparatus 3004 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 30, apparatus 3004 is configured to receive a plurality of sensor data 3008. As used in this disclosure "sensor data" is information that relates to one or more external physical elements as captured by one or more sensors; one or more sensors may include a device that detects a physical property such as a light sensor, acoustic sensor, chemical sensor, force sensor, pressure sensor, temperature sensor, humidity sensor, gyroscopic sensor, proximity sensor, flow sensor, image sensor, magnetic sensor, and the like thereof. As used in this disclosure a "physical element" is a physical property that represents at least an entity, matter, and/or object. For example, and without limitation a physical element may include, without limitation, a light, voltage, current, sound, chemical, pressure, humidity, and the like thereof. For example, and without limitation, sensory data 3008 may be comprised of a pressure datum of 0.9821 atm. As a further non-limiting example, sensor data 3008 may be comprised of a chemical datum of 3100 ppb of N-Phenethyl-4-piperidone. As a further non-limiting example sensor data 3008 may include an image of a secure area, which may include an individual that is present in the secure area. As used in this disclosure "sensor" is a device that detects or measures a physical property and records, indicates, or otherwise responds to the detected or measured physical property. Sensors may be comprised of one or more of imaging and other sensors, such as optical cameras, infrared cameras, 3D cameras, multispectral cameras, hyperspectral cameras, polarized cameras, chemical sensors, motion sensors, ranging sensors, light radar component, such as lidar, detection or imaging using radio frequencies component, such as radar, terahertz or millimeter wave imagers, seismic sensors, magnetic sensors, weight/mass sensors, ionizing radiation sensors, and/or acoustical sensors. Sensors may alternatively or additionally include any device used as a sensor as described in U.S. Provisional App. Ser. No. 63/067,142.

Still referring to FIG. 30, apparatus 3004 may receive a recognition element from a plurality of sensors. As used in this disclosure a "recognition element" is information obtained from one or more sensors that relate to an individual. As a non-limiting example, recognition element may consist of a facial feature such as eyes, nose, mouth, cheek bones, smile, and the like thereof. As a further non-limiting example, a recognition element may include a biometric element relating to the individual. As used in this disclosure a "biometric element" is a distinctive, measurable characteristic that at least labels and/or identifies an individual. A biometric element may include a physiologic characteristic. A physiological characteristic may relate to the shape and/or structure of the individual's body. For example, and without limitation a physiological characteristic may include fingerprint, palm veins, face recognition, DNA, palmprint, hand geometry, iris recognition, retina structure, odor, scent, dental patterns, weight, height, dermal viability, and the like thereof. As a further non-limiting example a recognition element may relate to an individual's rhythm, gait, voice, typing pattern, typing speed, device use patterns and the like thereof, wherein device use patterns include cursor movements, finger pressure, finger contact duration, finger contact volume, finger contact angle, device angle when operating and the like thereof. As used in this disclosure an "individual" is. As used in this disclosure an "individual" is a person that exists as a distinct entity, wherein that person possesses their own behaviors, goals, objectives, and responsibilities. As a non-limiting example, an individual may consist of a 30-year-old male. As a further non-limiting example, an individual may include a 48-year-old female.

Still referring to FIG. 30, apparatus 3004 may obtain an identification element of an individual from an identification database. As used in this disclosure an identification element is datum and/or quality that at least uniquely defines an individual. For example, and without limitation an identification element may include a security clearance, a name, an identification number, and the like thereof. As used in this disclosure a "security clearance" is a status granted to individuals allowing them access to classified information or to restricted areas, after completion of a thorough background check. For example, and without limitation a security clearance may include access to a level 5 secure area, wherein there a total of 10 levels of security. As used in this disclosure a "name" is a word or set of words by which an individual is known, addressed, or referred to. For example, and without limitation a name may include common names, such as John, James, Robert, Michael, William, David, Richard, Mary, Patricia, Linda, Barbara. Elizabeth, Jennifer, and the like thereof. As used in this disclosure an identification number is any number or set of numbers by which an individual may be identified. For example, and without limitation, a set of numbers may include social security number, telephone number, date of birth, residence zip code, and the like thereof. As used in this disclosure an "identification database" is a databank that at least stores, retains, and/or maintains identification elements of individuals. For example, and without limitation, identification databases may include a National ID card, passport, social security death index, mail isolation control and tracking, integrated automated fingerprint identification system, combined DNA index system, investigate data warehouse, project MINARET watch lists, NSA call database, TALON, Homeless Management Information Systems, Case Management and Electronic Case Files, and the like thereof.

Still referring to FIG. 30, apparatus 3004 may relate the recognition element to the identification element using a recognition model. As used in this disclosure "recognition model" is a machine-learning model that uses training data and/or training set to generate an algorithm that will be performed by an apparatus and/or one or more remote devices to produce outputs given data provided as inputs; this is in contrast to a non-machine learning software program where the commands to be executed are determined in advance by a user and written in a programming language. A recognition model may include any supervised, unsupervised, or reinforcement machine-learning process that apparatus 3004 and/or one or more remotes devices may or may not use in the identification of an individual. A recognition model may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof. The recognition model may be trained as a function of a recognition training set. As used in this disclosure "recognition training set" is a training set that correlates at least a recognition element to at least an identification element. As a non-limiting example, the recognition training set may relate a recognition element of a facial pattern of an individual to an identification element of an identification badge. As a further non-limiting example, the recognition training set may relate a recognition element of a retinal scan to an identification element of a security clearance.

Still referring to FIG. 30, apparatus 3004 may receive the recognition model from a remote device. As used in this disclosure a "remote device" is a computing system external to the apparatus that obtains and/or sends information relating to the recognition model. The remote device may provide modifications to the recognition model. For example, and without limitation, a modification may be comprised of a firmware update, a software update, a recognition model correction, and the like thereof. As a non-limiting example a software update may incorporate a new recognition model that relates to a recognition element to a modified identification element. As a further non-limiting example a remote device may transmit a modified recognition model, wherein the modified recognition model may relate new identification elements to previously identified recognition elements of a plurality of recognition elements. Additionally or alternatively, the recognition model may be transmitted to the remote device, wherein the remote device may update the recognition training data and transmit an updated recognition model back to apparatus 3004. The updated recognition model may be transmitted by the remote device and may be received by apparatus 3004 as a software update, firmware update, or corrected recognition machine-learning model. Additionally or alternatively, the remote device may include the recognition model, wherein apparatus 3004 transmits a signal, bit, datum, or parameter to the remote device and receives the outputted identified individual from the recognition model on the remote device.

Still referring to FIG. 30, the recognition model may be generated as a function of a classifier. A "classifier," as used in this disclosure is a machine-learning model, such as a mathematical model, neural net, or program generated by a machine-learning algorithm known as a "classification algorithm," that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Apparatus 3004 and/or another device may generate a classifier using a classification algorithm, defined as a process whereby apparatus 3004 derives a classifier from training data. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 30, apparatus 3004 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Apparatus 3004 may then calculate a likelihood table by calculating probabilities of different data entries and classification labels. Apparatus 3004 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 30, apparatus 3004 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 30, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l = \sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 30, apparatus 3004 identifies a behavior 3012 of a first individual of a plurality of individuals as a function of sensor data 3008. As used in this disclosure a "behavior" is an action and mannerism made by an individual, organism, system, or artificial entities in conjunction with themselves or their environment, which includes the other systems or organisms around as well as the physical environment. Behavior 3012 may include, without limitation, overt behavior, wherein overt behavior is a visible type of behavior that can occur outside of a human being. Overt behavior may include, without limitation, eating food, riding a bicycle, playing football, walking in a secure area, or the like thereof. Behavior 3012 may include, without limitation, covert behavior, wherein covert behavior is not visible to another individual. Covert behavior may include, without limitation, thoughts, emotions, feelings, or the like thereof. Behavior 3012 may include, without limitation, molecular behavior, wherein molecular behavior includes unexpected behavior that occurs without thinking, which can be broken down into atomistic parts or molecules. Molecular behavior may include, without limitation, an individual that closes their eyes when something is about to interact with that individual's eyes. Behavior 3012 may include, without limitation, molar behavior, wherein molar behavior is a behavior that is identified in terms of the ultimate cause of history. Molar Behavior may include, without limitation, a person that loves someone is merely exhibiting a pattern of loving behavior over time, as love would be considered atomistic and must be looked in more wholistic terms. Behavior 3012 may include, without limitation, voluntary behavior, wherein voluntary behavior is a type of behavior that depends on a human want, desire, wish, yearning, or the like thereof. Voluntary behavior may include, without limitation, walking, speaking, writing, striking, and the like thereof. Behavior 3012 may include, without limitation, involuntary behavior, wherein involuntary behavior is a behavior that naturally occurs without thinking. Voluntary behavior may include, without limitation, breathing, blinking, swallowing, digestion, or the like thereof. Behavior 3012 may include behavior that is considered to be positive, negative, and/or neutral behavior. As used in this disclosure "positive behavior" is behavior that is perceived by another individual, organism, artificial intelligence, or entity as a good act. As a non-limiting example positive behavior may include altruistic behavior, caring behavior, compassionate behavior, considerate behavior, faithful behavior, impartial behavior, kind behavior, pleasant behavior, polite behavior, sincere behavior, and the like thereof. As used in this closure a "negative behavior" is behavior that is perceived by another individual, organism, artificial intelligence, or entity as a bad act. As a non-limiting example, a negative behavior may include aggressive behavior, argumentative behavior, bossy behavior, deceitful behavior, domineering behavior, flaky behavior, inconsiderate behavior, manipulative behavior, rude behavior, spiteful behavior, and the like thereof. As used in this disclosure "neutral behavior" is behavior that is perceived by another individual, organism, artificial intelligence, or entity as a behavior that does not attempt to display any positive or negative intentions. As a non-limiting example, a neutral behavior may include apathetic behavior, indifferent behavior, behavior indicative of a lack of conviction, or the like.

Still referring to FIG. 30, As used in this disclosure a "first individual" is first person that is identified among a crowd of individuals. For example and without limitation, a single person may be identified out of a crowd of 50 people. Apparatus 3004 may identify a first individual as a function of identifying a crowd. As used in this disclosure a "crowd" is a group of people gathered together in a disorganized and/or organized manner. For example, and without limitation a crowd may include a large group of individuals that surround a government facility, gather in a public street, or the like. As a further non-limiting example, a crowd may include a small group of individuals that penetrate a government building. As a further non-limiting example, a crowd may include 5 individuals that enter a secured area. As a further non-limiting example a crowd may include a gathering of more than 100,000 protestors in an area. A crowd may be classified according to a degree of definiteness and constancy of consciousness of a group of people comprising the crowd. For example, and without limitation a crowd containing people having a very similar set of goals or performing a very similar set of actions may be classified as a homogeneous crowd. As a further non-limiting example, a crowd containing people who are seeking goals unrelated to one another and/or engaging in two or more unrelated activities may be classified as a heterogeneous crowd. Crowds may include a multitude of individuals and small groups that have temporarily assembled. As used in this disclosure a "small group" is one or more individuals that share similar thoughts and/or beliefs for entering the crowd. For example, and without limitation small groups may include friends, family members, and/or acquaintances. Apparatus may use retroreflection to count people in a concert and/or crowd. An apparatus may use retroreflection to detect location of persons in a space for entertainment purposes, such as light shows.

In an embodiment and still referring to FIG. 30, small groups may consist of one or more influencers. As used in this disclosure a "influencer" is one or more individuals that work tougher to achieve a greater result than they would individually. Influencers may include, without limitation, one or more orators, musicians, athletes, and/or some other individual who moves a crowd to a point of agreement before making a specific call to action. Small groups may include one or more supporters. For example, and without limitation a crowd influencer may include an individual speaking at a seminar. As a further non-limiting example, an influencer may include one or more political figures and/or persons of influence. Additionally or alternatively, an influencer may possess a prestigiousness, wherein a "prestigiousness", as described here in, is a domination exercised on our mind by an individual, a work, or an idea. For example, and without limitation an individual may possess a prestigiousness as a function of a job title, uniform, judge's robe, mental acuity, physical strength, and the like thereof. In an embodiment, and without limitation, small groups may include one or more supporters. As used in this disclosure a "supporter" is an individual that agrees and/or believes the influencer's call to action. For example, a support may perform an action and/or behavior as a function of an influencer's verbal statements. As a further non-limiting example, a supporter may include an individual that attempts to encourage other individuals to actively listen to and/or believe the influencers statements.

Still referring to FIG. 30, crowds may include any number of individuals that perform an assembling process. As used in this disclosure an "assembling process" is a process wherein individuals temporarily assembly for a specific amount of time, wherein a specific amount of time may include seconds, minutes, hours, days, weeks, months, and the like thereof. Crowds may perform an assembling process as a function of an organized mobilization method and/or an impromptu process, such as word of mouth by a support and/or third party. In an embodiment and without limitation, crowds may include any number of individuals that perform a temporary gathering. As used in this disclosure a "temporary gathering" is a gathering and/or assemblage of individuals to participate in both individual and/or collective actions. For example, and without limitation crowds may perform a temporary gathering by participating in the activities of the crowd as a collective group. As a further non-limiting example a temporary gathering may include individuals that gather to riot, loot, deface, and/or perform some other activity collectively. In another embodiment, and without limitation, crowds may include performing a dispersing process. As used in this disclosure a "dispersing process" is a process wherein the crowd's individuals disperse from the location of the gathering. As a non-limiting example, a crowd may perform a dispersing process by leaving a first location and traveling to an alternate location. As a further non-limiting example, a crowd may perform a dispersing process by leaving a first location and dividing into smaller crowd's to one or more subsequent locations.

Still referring to FIG. 30, crowds may be determined according to one or more small group classifiers. A "small group classifier," as used in this disclosure is a machine-learning model, such as a mathematical model, neural net, or program generated by a machine learning algorithm known as a "classification algorithm," as described in further detail above, that sorts inputs into categories or bins of data, outputting the categories or bins of data and/or labels associated therewith. A small group classifier may include any of the classifier as described in detail above. A small classifier may be configured to output at least a datum that labels or otherwise identifies a set of data that are clustered together, found to be close under a distance metric as described below, or the like. Apparatus 3004 and/or another device may generate a classifier using a classification algorithm, defined as a processes whereby an apparatus 3004 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 30, apparatus 3004 may identify behavior 3012 of the first individual by identifying at least a physiological action as a function of sensor data 3008. As used in this disclosure a "physiological action" is a physical, psychological, and/or spiritual decision that is acted upon, wherein that action at least impacts one or more surrounding individuals. For example, and without limitation a physiological action may include striking an individual, walking into a secure area, coughing on an individual, assaulting an individual, verbally abusing an individual, verbally discriminating against another individuals religious beliefs, sitting on a chair, complimenting an individual, opening a door for an individual and the like thereof.

Still referring to FIG. 30, apparatus 3004 may identify behavior 3012 using the physiological action, an at least accepted standard, and a behavior model. As used in this disclosure an "accepted standard" is one or more ethical constructs that are established by society to promote trust, fairness and or kindness among a society. An accepted standard may include, without limitation, a utilitarian approach, wherein the utilitarian approach may include actions that are assessed in terms of its consequences and/or outcomes and strives. As a non-limiting example an individual that is displaying behavior for a selfish, wherein the outcome is personal gain may be identified as a negative accepted standard. An accepted standard may include, without limitation, a rights approach, wherein the rights approach may include actions that best protect and respect the moral rights of individuals. As a non-limiting example moral rights may include, without limitation, rights to make one's own choices, to be told the truth, not to be injured, a degree of privacy, and the like thereof. An accepted standard may include, without limitation, a justice approach, the justice approach may include actions that relate to equality and/or justice. As a non-limiting example actions such as discrimination and/or favoritism may not be considered equality behaviors, whilst actions of impartiality and/or considerate may be considered justice behaviors. An accepted standard may include, without limitation, a common good approach; common good approach may include actions that are taken in order to benefit not only a certain group of individuals, but the society as a whole. As a non-limiting example actions of an individual tampering with a building may denote a negative behavior, while actions of cleaning a public hallway or removing litter from a secure area may consist of a positive behavior. An accepted standard may include, without limitation, a virtue approach; the virtue approach may include actions that are taken in order to achieve a full development of our humanity. As a non-limiting example actions relating to honesty, courage, compassion, generosity, tolerance, love, fidelity, integrity, fairness, self-control, and prudence may all be considered virtues that may aid in achieving full development of an individual's humanity.

As used in this disclosure, and with further reference to FIG. 30, a "behavior model" is a machine-learning model to produce outputs of behaviors given sensor data provided as inputs; this is in contrast to a non-machine learning software program where the commands to be executed are determined in advance by a user and written in a programming language. A behavior model may include any supervised, unsupervised, or reinforcement machine-learning process that apparatus 3004 and/or a remote server may or may not use in the determination of the behavior. A behavior model may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

Still referring to FIG. 30, apparatus 3004 may generate behavior model using behavior training data. As used in this disclosure "behavior training data" is training data that correlates at least a physiological action and/or accepted standards from the plurality of sensors to at least a behavior, wherein a sensor is a device that detects and/or measures a physical property of an external surrounding, as described above in detail. For example, and without limitation a physiological action of assault may relate to an accepted standard of a negative behavior under the ethical construct of a justice approach. The behavior training data may be received as a function of user-entered valuations of behavior. The behavior training data may be received by one or more past iterations of the previous behavior identifications. Behavior training data may be received by one or more remote devices that at least correlate a physiological action and/or accepted standard to a behavior.

Further referring to FIG. 30, apparatus 3004 may alternatively or additionally receive the behavior model from a remote device, wherein a remote device includes a secondary external computing device and or apparatus, as discussed in detail above. The remote device may provide modifications to the behavior model. For example, and without limitation, a modification may be comprised of a firmware update, a software update, a behavior model correction, and the like thereof. As a non-limiting example a software update may incorporate a new behavior model that relates to a physiological action to a modified accepted standard. As a further non-limiting example a remote device may transmit a modified behavior model, wherein the modified behavior model may relate new accepted standards to previously identified physiological actions of a plurality of physiological actions. Additionally or alternatively, the behavior model may be transmitted to the remote device, wherein the remote device may update the behavior training data and transmit an updated behavior model back to apparatus 3004. The updated behavior model may be transmitted by the remote device and may be received by apparatus 3004 as a software update, firmware update, or corrected behavior machine-learning model. Additionally or alternatively, the remote device may include the behavior model, wherein apparatus 3004 transmits a signal, bit, datum, or parameter to the remote device and receives the outputted behavior from the behavior model on the remote device.

In an embodiment and still referring to FIG. 30, apparatus 3004 may identify a behavior 3012 as a function of crowds and/or small groups. For example, and without limitation, a physiological action of looting, rioting, and/or damaging federal property may be determined as a function of a crowd and/or small group. As a further non-limiting example, apparatus 3004 may identify a behavior associated with a submergence. As used in this disclosure a "submergence" is a disappearance of a conscious personality and the appearance of an unconscious personality. For example, and without limitation a behavior of submergence may include behaviors such as increased violence and/or aggression as a function of a mental unity in a riot. As a further non-limiting example, apparatus 3004 may identify a behavior associated with a contagion. As used in this disclosure a "contagion" is an act that is contagious and/or transcends to multiple individuals. For example, and without limitation a contagion behavior may include a behavior of rioting as a function of sacrificing personal interest of a protest towards a collective interest of harming other individuals and/or enhancing the riots message. As a further non-limiting example, apparatus 3004 may identify a behavior associated with a suggestibility as a result of a hypnotic state. As used in this disclosure a "suggestibility as a result of a hypnotic state" is an act that is bent and/or controlled towards the direction determined by the influencer. For example, and without limitation a suggestibility as a result of a hypnotic state behavior may include a behavior of performing actions and/or behaviors that the crowd is performing without thinking as an individual.

In an embodiment, and still referring to FIG. 30, apparatus 3004 may identify a behavior 3012 of crowds as a function of a crowd behavior. As used in this disclosure a "crowd behavior" is a behavior and/or action conducted by a crowd. Crowd behavior may include a casual crowd, wherein a "casual behavior", as described herein, is a behavior of a collection of individuals who happen to be in the same place at the same time. Casual crowds may have no real common bond, long-term purpose, or identity. Crowd behavior may include a conventional behavior. As used in this disclosure a "conventional behavior" is a behavior of a collection of individuals who gather for a purpose. For example, and without limitation a conventional behavior may include an attending a movie, a play, a concert, and/or a lecture. Crowd behavior may include an expressive behavior. As used in this disclosure an "expressive behavior" is a behavior of a collection of individuals that gather primarily to be excited and to express one or more emotions. Expressive behavior may include, without limitation, one or more behaviors such as religious revivals, political rallies, holiday events, such as Mardi Gras, and the like thereof. Crowd behavior may include an acting behavior. As used in this disclosure an "acting behavior" is a behavior of a collection of individuals that display violent and/or destructive actions. For example, acting behavior may include looting, and/or behaviors associated with violence such as property damage, theft, trespassing, and the like thereof. For example and without limitation, apparatus 3004 may identify a small group exhibiting acting behavior in a crowd such as attempting to overturn a car and/or break car windows. As a further non-limiting example, apparatus 3004 may identify a crowd exhibiting expressive behavior such as displaying support signs for a political leader. As a further non-limiting example, apparatus 3004 may identify an expressive crowd for a political rally, wherein apparatus 3004 identifies a small group within the crowd that is exhibiting acting behavior by throwing rocks and/or storming a government building.

Still referring to FIG. 30, apparatus 3004 is configured to determine as a function of the individual behavior 3012 at least a behavior element 3016. As used in this disclosure a "behavioral element" is information that at least relates to an individual's actions as a function of the individual's behavior. As a non-limiting example, a behavioral element may include language, tone, word selection, physiological actions, and the like thereof. For example, and without limitation, a behavioral element of assault may be identified as a function a behavior of aggression. As a further non-limiting example a behavioral element of demeaning tone may be identified from a behavior of frustrated. As a further non-limiting example a behavior element may include a microexpression that at least relates to a behavior, such as when an individual has an anxious microexpression for a behavior of trespassing. Apparatus 3004 may determine behavior element 3016 by receiving an assemblage comparator. As used in this disclosure an "assemblage comparator" is a measurable value that at least relates surrounding individual's behaviors to the first individual's behavior. For example, and without limitation, an assemblage comparator may be a value of 90 for a first individual that presents a behavior of aggression, wherein the surrounding individual's behaviors indicate a positive behavior such as kindness. As a further non-limiting example, an assemblage comparator may be a value of 20 for a first individual's behavior of aggression, wherein the surrounding individual's behaviors are also aggression. Behavior element 3016 may be determined as a function of the assemblage comparator and an assemblage model. As used in this disclosure an "assemblage model" is a machine-learning model to produce outputs of behavioral elements given an individual's behavior provided as inputs; this is in contrast to a non-machine learning software program where the commands to be executed are determined in advance by a user and written in a programming language. An assemblage model may include any supervised, unsupervised, or reinforcement machine-learning process that apparatus 3004 and/or a remote server may or may not use in the determination of the behavior element. An assemblage model may include, without limitation, machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof. An assemblage model may be trained as a function of an assemblage training set.

Still referring to FIG. 30, apparatus 3004 may generate assemblage model using assemblage training data. As used in this disclosure "assemblage training data" is training data that correlates at least a relative behavior of an individual and a behavioral element, wherein a relative behavior is an individual's behavior in relation to the assemblage's behavior. For example, and without limitation a relative behavior may include a relative behavior of dishonesty, wherein the behavioral element may include trespassing. As a further non-limiting example, a relative behavior of theft may correlate to a behavioral element of illegal action. The assemblage training data may be received as a function of user-entered valuations of behavioral elements. The assemblage training data may be received by one or more past iterations of the previous behavior elements correlating to relative behaviors. Assemblage training data may be received by one or more remote devices that at least correlate relative behavior to a behavioral element.

Still referring to FIG. 30, apparatus 3004 may receive the assemblage model from a remote device, wherein a remote device includes a secondary external computing device and or apparatus, as discussed in detail above. The remote device may provide modifications to the assemblage model. For example, and without limitation, a modification may be comprised of a firmware update, a software update, an assemblage model correction, and the like thereof. As a non-limiting example a software update may incorporate a new assemblage model that relates an assemblage behavior to a modified individual behavior. As a further non-limiting example a remote device may transmit a modified assemblage model, wherein the modified assemblage model may relate new individual behaviors to previously identified assemblage behaviors. Additionally or alternatively, the assemblage model may be transmitted to the remote device, wherein the remote device may update the assemblage training data and transmit an updated assemblage model and/or updated assemblage training data back to apparatus 3004. The updated assemblage model may be transmitted by the remote device and may be received by apparatus 3004 as a software update, firmware update, corrected assemblage training data, and/or corrected assemblage machine-learning model. The updated assemblage training data may change and/or modify the weights and/or coefficients, which a hardware implementation may obtain as a result of an online database. Additionally or alternatively, the remote device may include the assemblage model, wherein apparatus 3004 transmits a signal, bit, datum, or parameter to the remote device and receives the outputted behavior element from the assemblage model on the remote device.

Still referring to FIG. 30, apparatus 3004 is configured to generate a behavioral remedy 3020 that alters at least behavioral element 3016. As used in this disclosure a "behavioral remedy" is a variable associated with at least altering and/or changing an individual behavior. Behavioral remedy 3020 may include at least an external stimulus and/or output that may interact with an individual, such that a behavior is altered. For example, and without limitation a behavioral remedy may include a loud noise that at least stops an individual from conducting the identified behavior. Behavioral remedy 3020 is generated by identifying at least a deterrent 3024 of a plurality of deterrents. As used in this disclosure a "deterrent" is a thing, entity, object, and/or action that intends to discourage and/or prevent an individual from continuing an action, behavior, and/or conduct. Deterrent 3024 may include without limitation, directed light, sounds, electrical deterrents, neurostimulators, chemicals, entanglement devices, and the like thereof. As used in this disclosure a "directed light deterrent" is a deterrent that uses a high-intensity light source such as, but not limited to, a laser, super LED, laser illuminated LED, super-luminescent LED, VCSEL, plasma discharge lamp, and/or high-intensity LED that is actively aimed at and/or focused on an individual, to generate a deterrent effect. As used in this disclosure a "directed sound deterrent" is a sound source that is aimed at a specific individual in a manner analogous to a directed light source. A directed sound deterrent may include, without limitation a long-range acoustic device (LRAD), a laser generating localized plasmas in the atmosphere to create modulating plasmas near the individual such that audible sound is produced, an ultrasonic carrier wave, and the like thereof. As used in this disclosure "neurostimulation deterrents" is an electrical source that is projected at an individual such that an electrical contact is achieved between an individual and the deterrent. As a non-limiting example, an electrical shock deterrent may include a Human Electro-Muscular Incapacitation (HEMI) device, a stun gun, a taser, Taser Area Denial System (TADS), a plasma, an electric field, an ionizer, and the like thereof. As used in this disclosure a "chemical deterrent" is a chemical and/or molecule that at least provide a noxious and/or discomforting experience for an individual. For example, and without limitation, a chemical deterrent may include pepper spray, malodorant weapons, tear gas, pacifying agent, white phosphorous, aerosolized opioids and the like. As used in this disclosure "entanglement devices" are deterrents wherein an individual becomes physically trapped in a device and prevents escape of that individual. For example, an entanglement device may include, without limitation nets, bolas, and/or other entanglement or entrapment devices that are launched ballistically at the individual in order to limit or stop the individual's ability to move normally. Behavioral remedy may include spray-painting noise over crowd to prevent communication. Noise, such as white noise, that exceeds the 95 DB decibel level of scream by 25 dB 125-130 dB may effectively prevent communication between people in the crowd.

Still referring to FIG. 30, apparatus 3004 generates behavioral remedy 3020 by determining a collateral parameter 3028 related to the deterrent. As used in this disclosure a "collateral parameter" is a value that at least relates to the amount of death, injury, and/or damage inflicted to an assemblage that is an incidental result of a deterrent being applied to a first individual. For example and without limitation, collateral parameter 3028 may indicate a value of 50 for a deterrent of an audio output that is administered as a result of an individual in an assemblage that is trespassing in a secure area. As a further non-limiting example collateral parameter 3028 may have a value of 10 for a deterrent of a directed laser output directed towards an individual in an assemblage exhibiting a behavior of theft. As a further non-limiting example collateral parameter 3028 may include a value of 3000 for a chemical deterrent that is administered due to an individual behavior of assault. Apparatus 3004 generates behavioral remedy 3020 as a function of collateral parameter 3028 and a congestion variable 3032. As used in this disclosure a "congestion variable" is a parameter that relates to the concentration of the assemblage with respect to the number of individuals in a given area. Congestion variable 3032 may include the number of individuals in a given area, wherein the are related to a specific volume of space. As a non-limiting example congestion variable 3032 may indicate that a total of 10 individuals are in a secure area of 50 ft$^2$ and/or 4.65 m$^2$. As a further non-limiting example, congestion variable 3032 may indicate that a total of 15 individuals are in an area of 10 ft×22 ft×10 ft and/or 3.048 m×6.7056 m×3.048 m. Congestion variable 3032 may indicate a maximum number of individuals that may enter a specific area. For example, and without limitation congestion variable 3032 may indicate that an assemblage is never to exceed a maximum of 23 individuals in a secure area that is 32 ft$^2$ and/or 2.97 m$^2$. As a further non-limiting example, congestion variable 3032 may indicate that an assemblage exceeds the maximum number of 45 individuals in an area of 150 ft$^2$ and/or 13.94 m$^2$.

Still referring to FIG. 30, apparatus 3004 may generate congestion variable 3032 by receiving at least a spatiotemporal element of an individual of a plurality of individuals in the assemblage. As used in this disclosure a "spatiotemporal element" is datum relating to both space and time of an individual's physical being. As a non-limiting example a spatiotemporal element may include a movement of an individual walking within an assemblage. As a further non-limiting example, a spatiotemporal element may identify a location of an individual within an assemblage. Additionally or alternatively, apparatus 3004 may identify a social distance metric as a function of the spatiotemporal element, which relates to the at least an individual. As used in this disclosure a "social distance metric" is the total distance that exists between individuals, wherein distance denotes a measurable value of a length between two individuals including, but not limited to a thou, line, inch, foot, yard, mile, league, fathom, nautical mile, millimeter, centimeter, meter, decameter, hectometer, and the like thereof. As a non-limiting example a social distance metric may include identifying a distance of 6 feet between individuals in an assemblage. As a further non-limiting example a social distance metric may include identifying a distance of 10 meters between individuals in an assemblage. As a further non-limiting example, a social distance metric may include identifying a distance of 10 centimeters between individuals in an assemblage. Apparatus 3004 may generate congestion variable 3032 as a function of the social distance metric.

In an embodiment and still referring to FIG. 30, apparatus 3004 may generate a behavioral remedy as a function of an individual, crowd, and/or small group. As a non-limiting example a behavioral remedy may generate a directed light deterrent, such as a laser, for an individual that is displaying aggressive and/or violent behaviors. As a further non-limiting example, a behavioral remedy may generate a directed sound source as a function of a crowd, such as a loud and/or incapacitating noise to at least mitigate and/or prevent the crowd's negative behaviors. As a further non-limiting example, apparatus 3004 may generate a behavioral remedy of a chemical deterrent applied to a small group of influencers to at least prevent the assembly and/or temporary gathering process. As a further non-limiting example, a directed sound deterrent may be generated as a function of a small group of supporters that are attempting to gather and/or coordinate external individuals to join the crowd, wherein the directed sound deterrent may only affect the small group of supporters.

Still referring to FIG. 30, apparatus 3004 administers deterrent as a function of behavioral remedy 3020 that alters behavior 3012 of the first individual. Apparatus 3004 may administer deterrent by identifying the at least a deterrent as a function of the plurality of deterrents. Apparatus 3004 may administer deterrent 3020 by identifying a stored previous deterrent action according to previously generated behavioral remedies. Apparatus 3004 may administer deterrent 3020 using a linear programming algorithm. A linear programming algorithm may be used to identify a deterrent as a function of the behavioral remedy and the behavior of the first individual and determine the deterrent that at least minimizes a distance metric, wherein apparatus 3004 may use a linear program such as, without limitation, a mixed-integer program. A "linear program," as used in this disclosure, is a program that optimizes a linear objective function, given at least a constraint. As a non-limiting example, apparatus 3004 may calculate variables of set of behavioral remedies of such parameters from goal parameters, including but not limited to altering the behavior of the first individual, reducing a collateral parameter, reducing a congestion variable, and/or identifying a subsequent deterrent; calculate an output of a deterrent using the variables; and select the deterrent having the largest size, according to a given definition of "size," of the set of deterrent outputs representing the selected deterrents; size may, for instance, include absolute value, numerical size, or the like. Additionally or alternatively, apparatus 3004 may administer deterrent 3020 as a function of one or more scoring processes, conic programming algorithms, geometric programming algorithms, integer programming algorithms, fractional programming algorithms, non-linear programing algorithms, and/or mathematical optimization programming algorithms.

Figure 31:
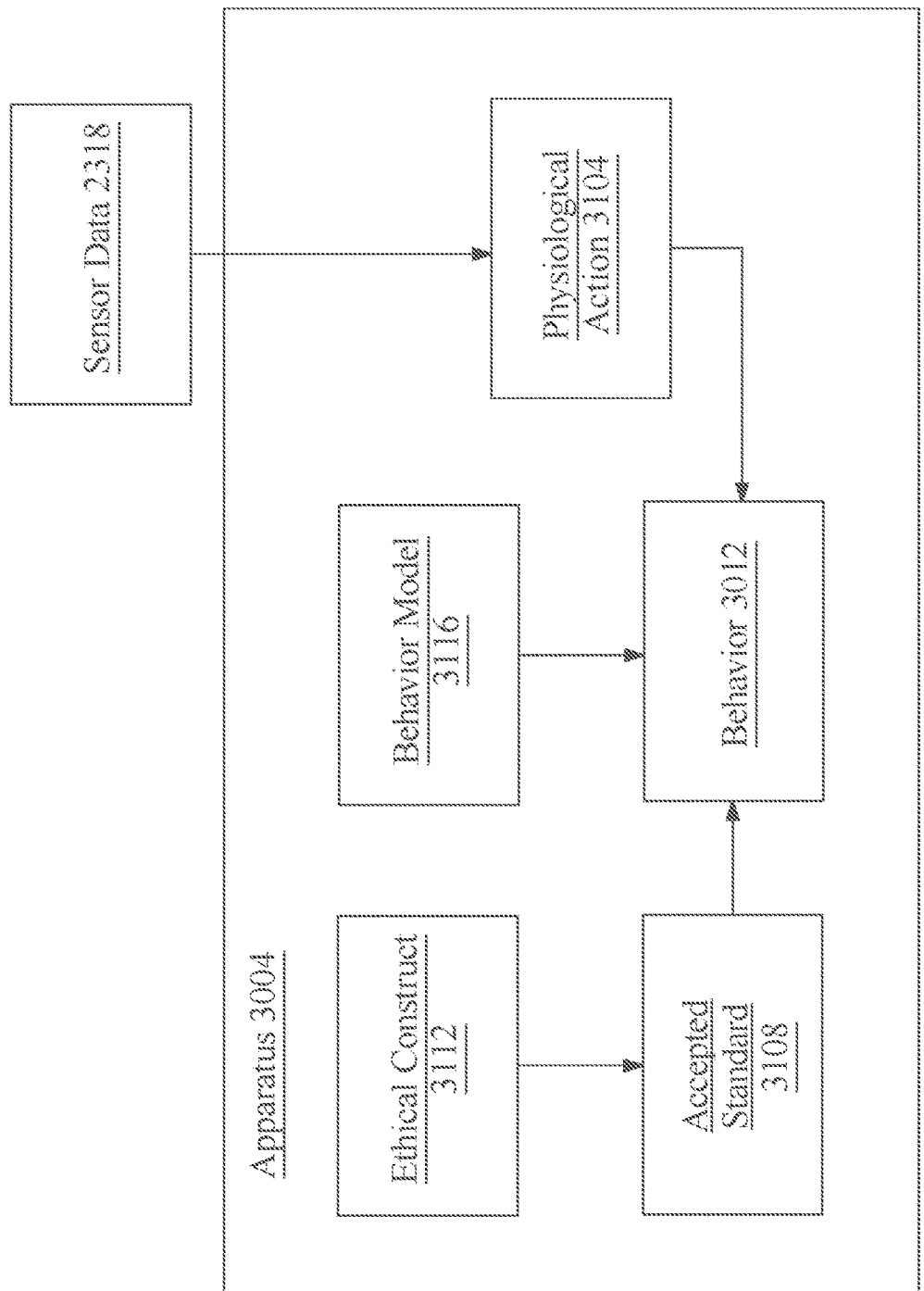
FIG. 31 is a block diagram of an exemplary embodiment for a behavior according to an embodiment of the apparatus.

Now referring to FIG. 31, an exemplary embodiment of a system 3100 for identifying a behavior is illustrated. Apparatus 3004 may identify behavior 3012 of the first individual by identifying at least a physiological action 3104 as a function of sensor data 3008, wherein physiological data is described in detail above. Physiological action 3104 may include striking an individual, entering an assemblage, coughing in an assemblage, verbally abusing an individual in an assemblage, discriminating against another individuals religious beliefs, sitting on a chair, complimenting an individual, opening a door for an individual and the like thereof. Behavior 3012 may include receiving at least an accepted standard 3108, wherein an accepted standard is one or more ethical constructs that are established by society to promote trust, fairness and or kindness among a society as discussed above in detail. An accepted standard may be generated from one or more ethical constructs 3112. As used in this disclosure an "ethical construct" is one or more beliefs and/or principles held by a person or group about how to determine which human interactions are right or wrong. Ethical constructs 3112 may include a utilitarian approach, a rights approach, a justice approach, a common good approach, and or a virtue approach, as described in detail above. As a non-limiting example a utilitarian approach may include an individual that is displaying behavior for a selfish, wherein the outcome is personal gain may be identified as a negative accepted standard. As a non-limiting example a rights approach may include, without limitation, rights to make one's own choices, to be told the truth, not to be injured, a degree of privacy, and the like thereof. As a non-limiting example a justice approach may include actions such as discrimination and/or favoritism may not be considered equality behaviors, whilst actions of impartiality and/or considerate may be considered justice behaviors. As a non-limiting example a common good approach may include actions of an individual tampering with a building may denote a negative behavior, while actions of cleaning a public hallway or removing litter from a secure area may consist of a positive behavior. As a non-limiting example, a virtue approach may include actions relating to honesty, courage, compassion, generosity, tolerance, love, fidelity, integrity, fairness, self-control, and prudence which may all be considered virtues that may aid in achieving full development of an individual's humanity. Behavior 3012 may include receiving at least a behavior model 3116, wherein a behavior model is a machine-learning process that uses training data and/or training set to generate an algorithm that will be performed by an apparatus and/or one or more remote servers to produce outputs given data provided as inputs; this is in contrast to a non-machine learning software program where the commands to be executed are determined in advance by a user and written in a programming language, as described above in detail. As a non-limiting example, behavior model 3116 may include any supervised, unsupervised, or reinforcement machine-learning process that apparatus 3004 and/or a remote server may or may not use in the determination of the behavior. Behavior model 3116 may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof. Behavior model 3116 may be trained as a function of a behavior training set, wherein a behavior training set is a training set that correlates at least a physiological action from the plurality of sensors to at least an accepted standard, as described above in detail. Apparatus 3004 may receive behavior model 3116 from a remote device, wherein a remote device includes a secondary external computing device and or apparatus, as discussed in detail above. The remote device may provide modifications to behavior model 3116 through process of a firmware update, a software update, a behavior model correction, and the like thereof. As a non-limiting example a software update may incorporate a new behavior model that relates to a physiological action to a modified accepted standard. Additionally or alternatively, behavior model 3116 may be transmitted to the remote device, wherein the remote device may update the behavior training data and transmit an updated behavior model back to apparatus 3004. The updated behavior model may be transmitted by the remote device and may be received by apparatus 3004 as a software update, firmware update, or corrected behavior machine-learning model. Additionally or alternatively, the remote device may include behavior model 3116, wherein apparatus 3004 transmits a signal, bit, datum, or parameter to the remote device and receives the outputted behavior from behavior model 3116 on the remote device.

Figure 32:
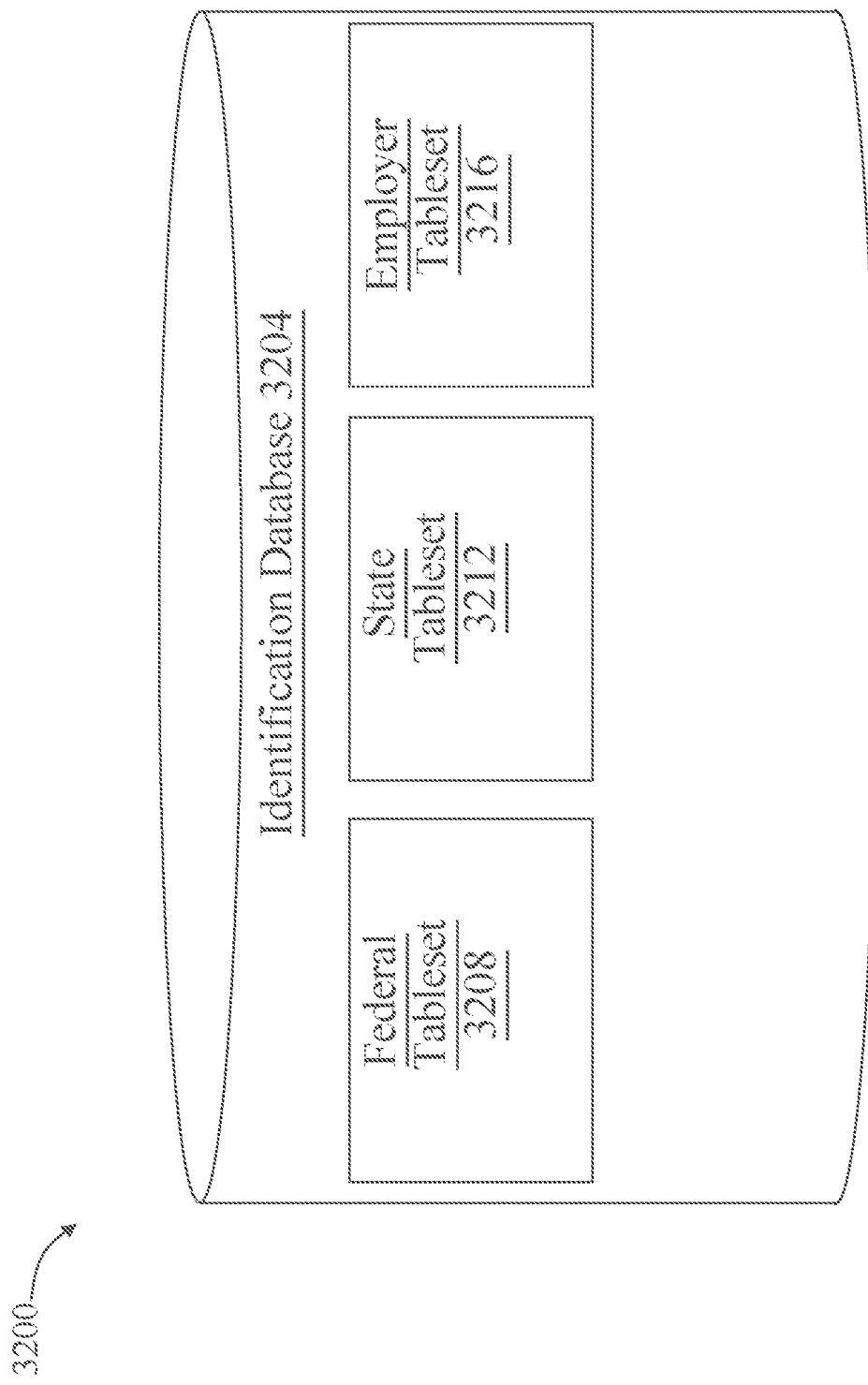
FIG. 32 is a block diagram of an exemplary embodiment for an identification database according to an embodiment of the apparatus.

Now referring to FIG. 32, an exemplary embodiment of an identification database 3204 is illustrated. Identification database 3204 may be implemented, without limitation, as a relational database, a key-value retrieval database such as a NOSQL database, or any other format or structure for use as a database that a person skilled in the art would recognize as suitable upon review of the entirety of this disclosure. Identification database 3204 may alternatively or additionally be implemented using a distributed data storage protocol and/or data structure, such as a distributed hash table or the like. Identification database 3204 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. Identification database 3204 may include one or more tables, including without limitation, a federal tableset 3208; federal tableset 3208 may include identification that relates an individual to a federal datastore. As a non-limiting example federal tableset 3208 may include, without limitation, a national ID card, social security card, mail isolation control, integrated automated fingerprint identification system, NSA call database, TALON, homeless management information systems and the like thereof. Identification database 3204 may include one or more tables, including without limitation, a state tableset 3212; federal tableset 3212 may include identification that relates an individual to a state datastore. As a non-limiting example state tableset 3212 may include, without limitation, state ID card, state driver's license, state voter information, state hunting license, library card, marriage certificate, baptismal certificate, school record, automobile insurance, and the like thereof. Identification database 3204 may include one or more tables, including without limitation, an employer tableset 3216; employer tableset 3216 may include identification that relates an individual to an employer datastore. As a non-limiting example employer tableset 3216 may include, without limitation, a W-2 wage and tax statement, a security clearance identification, salary identifiers, work permits, medical information, and the like thereof.

Figure 33:
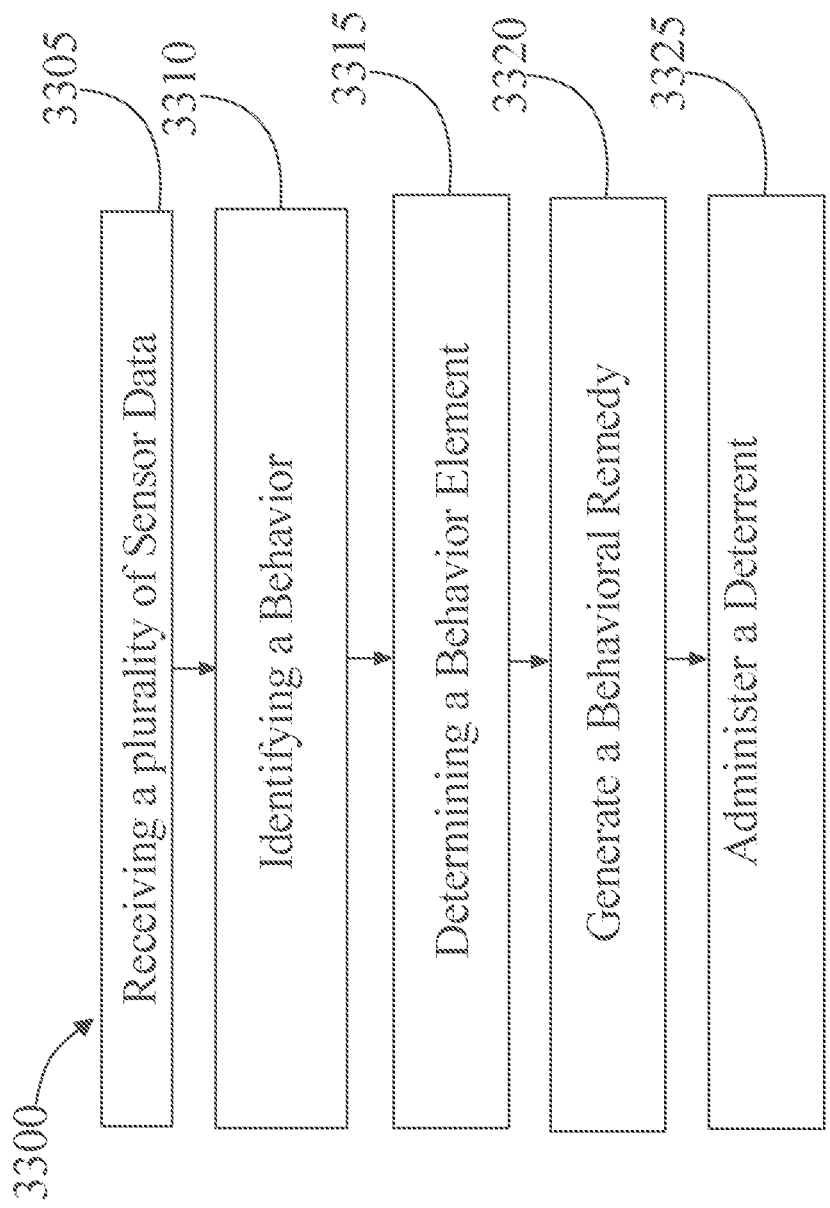
FIG. 33 is a process flow diagram illustrating an exemplary embodiment of a method of altering an individual behavior.

Now referring to FIG. 33, an exemplary embodiment of a method 3300 of altering an individual behavior is illustrated. At step 3305, an apparatus 3004 receives a plurality of sensor data 3008. Sensor data 3008 may be implemented, without limitation, as described above in reference to FIGS. 1-4.

Still referring to FIG. 33, at step 3310, apparatus 3004 identifies a behavior of a first individual of a plurality of individuals as a function of the plurality of sensor data. Behavior 3012 may be implemented, without limitation, as described above in reference to FIGS. 1-4. An individual may be implemented, as described above in reference to FIGS. 1-4. Behavior 3012 is identified as a function of one or more physiological actions 3104, accepted standards 3108, and/or behavior models 3116. Physiological action 3104 may be implemented, without limitation, as described above in reference to FIGS. 1-4. Accepted standards 3108 may be implemented, without limitation, as described above in reference to FIGS. 1-4. Accepted standards 3108 may include ethical constructs 3112. Ethical constructs 3112 may be implemented, without limitation, as described above in reference to FIGS. 1-4. Behavior 3012 may be identified by behavior model 3116. Behavior model 3116 may be implemented, without limitation, as described above in reference to FIGS. 1-4. Behavior model 3116 may be configured using a behavior training data. The behavior training data may be implemented, without limitation, as described above in reference to FIGS. 1-4.

Still referring to FIG. 33, at step 3315, apparatus 3004 determines as a function of the individual behavior at least a behavior element 3016. Behavior element 3016 may be implemented, without limitation, as described above in reference to FIGS. 1-4. Behavior element 3016 may be identified from an assemblage comparator, wherein an assemblage comparator may be implemented, without limitation, as described above in reference to FIGS. 1-4. Behavior element 3016 may be determined as a function of an assemblage model, wherein an assemblage model may be implemented, without limitation, as described above in reference to FIGS. 1-4. The assemblage model may be configured using an assemblage training data. The assemblage training data may be implemented, without limitation, as described above in reference to FIGS. 1-4.

Still referring to FIG. 33, at step 3320, apparatus 3004 generates a behavior remedy 3020 that alters behavior element 3016. Behavior remedy 3020 may be implemented, without limitation, as described above in reference to FIGS. 1-4. Behavioral remedy 3020 is generated by identifying at least a deterrent 3024 of a plurality of deterrents. Deterrent 3024 may be implemented, without limitation, as described above in reference to FIGS. 1-4. Behavior remedy 3020 is generated by determining a collateral parameter 3028 related to deterrent 3024. Collateral parameter 3028 may be implemented, without limitation, as described above in reference to FIGS. 1-4. Behavioral remedy 3020 is generated as a function of the collateral parameter and a congestion variable 3032. Congestion variable 3032 may be implemented, without limitation, as described above in reference to FIGS. 1-4.

Still referring to FIG. 33, at step 3325 apparatus 3004 administers as a function of behavioral remedy 3020 deterrent 3024 that at least alters behavior 3012 of the first individual. Administration of deterrent 3024 may include performance of a first step in the initiation of a deterrent; first step may include a particular deterrent or signal, such as an infrared laser and/or light output, a first entanglement device, or the like. First step may include location of a deterrent; location may include placement in an apparatus 3004. First step may include generation of a deterrent control; generation of a deterrent control system may include transmission of a signal to initiate deterrent and/or transmission of any deterrent controls generated as described above, including without limitation transmission of information for localized and/or remote deterrent control. Transmission may be direct or indirect; for instance, transmission may involve transmission to a remote device that relays transmission to a deterrent or computing device coupled thereto, or transmission to an auxiliary computing device or computer memory for transport to the deterrent and/or computing device coupled thereto.

Referring Now to FIG. 32, an exemplary embodiment 3200 of an apparatus 3204 for determining an importance level 3208 is illustrated. Apparatus 3204 is configured to identify an object to be protected. As used in this disclosure an "object" is a material thing and/or person that has a dimensional form and can be seen and/or touched. As a non-limiting example and object to be protected may include a painting, jewel, heirloom, antiquity, valuable item, person, literary work, musical work, sculpture, royalty, government official, and the like thereof. An object may be identified by receiving at least a user input 3212 of a plurality of user inputs. As used in this disclosure a "user input" includes an entry by an individual that is received by apparatus 3204 that at least pertains to an object of interest. User input 3212 may include a selection from one or more graphical user interfaces and/or remote device 140, wherein remote device 140 includes all of remote device 140 as described above, in reference to FIGS. 1-10. As a non-limiting example user input 3212 may include a security guard input a painting to be protected. As a further non-limiting example user input 3212 may include a secret service agent input of a dignitary such as a president or other head of state to be protected.

Figure 34:
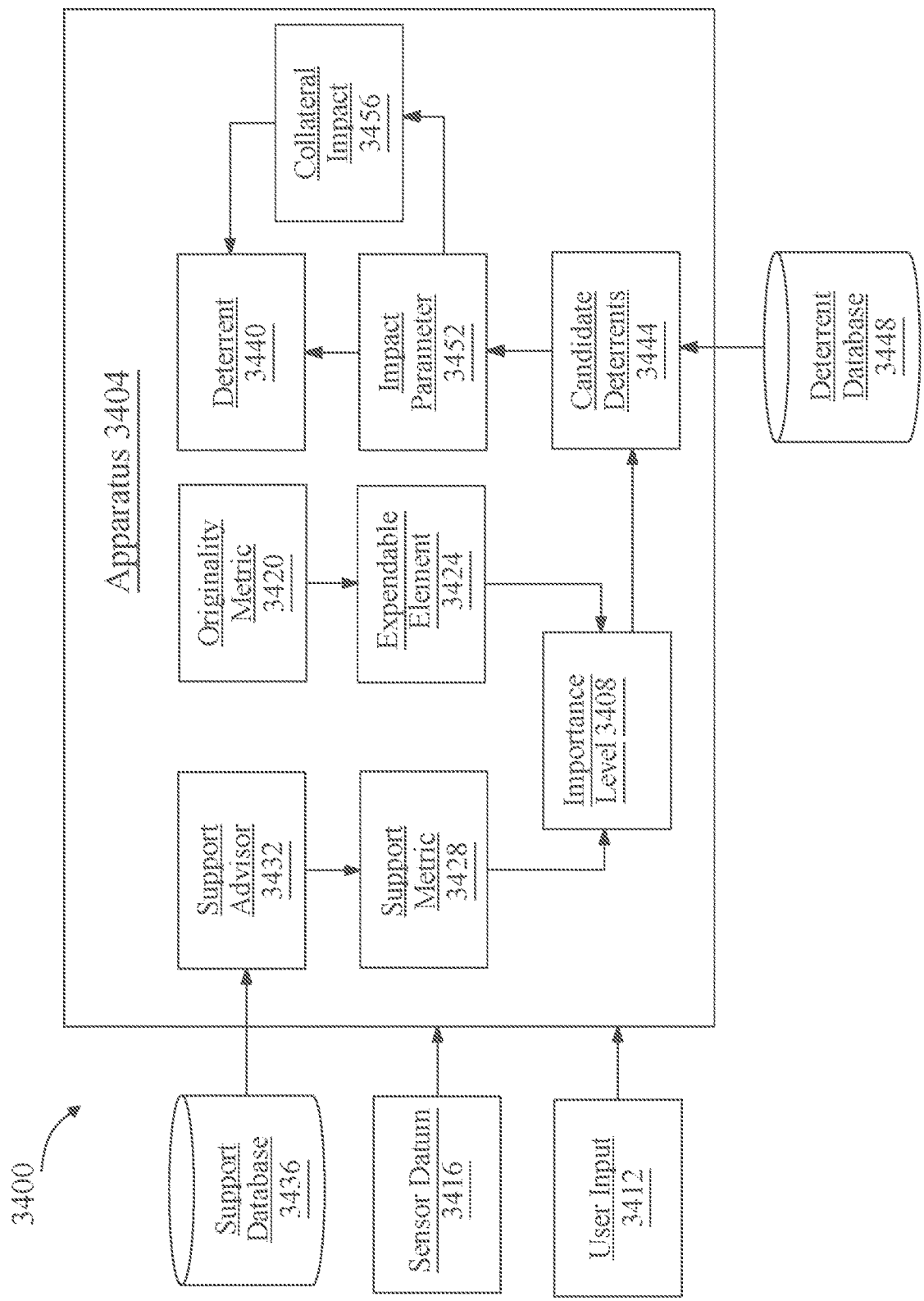
FIG. 34 is a block diagram of an exemplary embodiment of an apparatus importance level.

Further referring to FIG. 34, apparatus 3404 may identify an object to be protected as a function of obtaining at least a sensor datum 3416. As used in this disclosure "sensor datum" comprises datum that relates to one or more external physical elements as captured by one or more sensors; one or more sensors may include a device that detects a physical property such as a light sensor, an acoustic sensor, a chemical sensor, and the like thereof. Sensor datum 3416 may include light, voltage, current, sound, chemical, pressure, humidity, and the like thereof. For example, and without limitation, sensor datum 3416 may be comprised of a pressure datum of 0.9821 atm. As a further non-limiting example, sensor datum 3416 may include a chemical datum of 500 ppb of N-Phenethyl-4-piperidone. Apparatus 3404 may identify an object by determining at least a recognition element from sensor datum 3416. As used in this disclosure a "recognition element" is information obtained from one or more sensor datum that relates to a discerning factor regarding an object and/or individual. As used in this disclosure a "discerning factor" is a unique quality, characteristic, and/or trait that at least relates to an object and/or individual, such as a facial feature, wherein a facial feature may include, without limitation eyes, nose, mouth, cheek bones, smile, and the like thereof. As a non-limiting example, a recognition element may include defining features of an objects and/or individuals such as color, brush stroke pattern, refractive index, style, and the like thereof. As a further non-limiting example, a recognition element may include a biometric element relating to the object and/or individual to be protected. As used in this disclosure a "biometric element" is a distinctive, measurable characteristic that at least labels and/or identifies an object to be protected. A biometric element may include a physiologic characteristic. A physiological characteristic may relate to the shape and/or structure of the object and/or individual to be protected. For example, and without limitation a physiological characteristic may include fingerprint, palm veins, face recognition, DNA, palmprint, hand geometry, iris recognition, retina structure, odor, scent, dental patterns, weight, height, dermal viability, and the like thereof. As a further non-limiting example a recognition element may relate to an object's and/or individual's rhythm, gait, voice, typing pattern, typing speed, device use patterns and the like thereof, wherein device use patterns include cursor movements, finger pressure, finger contact duration, finger contact volume, finger contact angle, device angle when operating and the like thereof.

Still referring to FIG. 34, recognition element may relate to one or more identification elements. As used in this disclosure an "identification element" is datum and/or quality that at least uniquely defines an individual. For example, and without limitation an identification element may include a security clearance, a name, an identification number, and the like thereof. As used in this disclosure a "security clearance" is a status granted to an individual allowing the individual access to an otherwise restricted location, datum, or the like, such as classified information or to restricted areas. For example, and without limitation a security clearance may include access to a level 5 secure area, where there a total of 10 levels of security. As used in this disclosure a "name" is a word or set of words by which an object may be known known, addressed, or referred to. For example, and without limitation a name may include common names, such as John, James, Robert, Michael, William, David, Richard, Mary, Patricia, Linda, Barbara. Elizabeth, Jennifer, and the like thereof. As used in this disclosure an identification number is any number or set of numbers by which an object may be identified. For example, and without limitation, a set of numbers may include social security number, telephone number, date of birth, residence zip code, and the like thereof. As used in this disclosure an "identification database" is a database, which may be implemented in any manner suitable for implementation of a database as described above, that at least stores, retains, and/or maintains identification elements of individuals. For example, and without limitation, identification databases may include a National ID card, passport, social security death index, mail isolation control and tracking, integrated automated fingerprint identification system, combined DNA index system, investigate data warehouse, project MINARET watch lists, NSA call database, TALON, Homeless Management Information Systems, Case Management and Electronic Case Files, and the like thereof.

Still referring to FIG. 34, apparatus 3404 may determine an importance level 3408 that relates to object to be protected. As used in this disclosure an "importance level" is a measurable value that relates to the state and/or fact of an object's significance. As a non-limiting example an importance level may determine a value of 20 for a vintage clock, wherein an importance level may determine a value of 95 for a unique piece of artwork, such as the Mona Lisa. As a further non-limiting example an importance level of 15 may be determined for a security guard in an area, wherein an importance level of 65 may be determined for the president of the United States. Importance level 3408 may be determined by receiving an originality metric 3420 as a function of the object being protected. As used in this disclosure an "originality metric" is a value of the uniqueness of the object to eh be protected. For example an originality metric may be identified as a value of 97 for a unique piece of artwork, wherein only one original piece exists in the world, wherein an originality metric may be identified as a value of 2 for a vehicle, of which 200,000 vehicles were produced a year. Importance level 3408 may be determined by generating an expendable element 3424 as a function of originality metric 3420. As used in this disclosure an "expendable element" is a parameter that relates to the significance of the object compared to the overall purpose of the object, wherein the object may or may not be required. As a non-limiting example expendable element 3424 may denote an object that is replaceable, such as a cake and/or utensils. As a further non-limiting example expendable element 3424 may denote an object that is irreplaceable, such as a family member and/or friend.

Still referring to FIG. 34, importance level 3408 may be determined as a function of expendable element 3424 and at least an importance model. As used in this disclosure an "importance model" is a machine-learning model that will be performed by an apparatus and/or one or more remote devices 140. The importance model may generate importance level outputs given data provided expendable elements inputs. The importance model may be generated by one or more importance machine-learning processes that apparatus 3404 and/or remote devices 140 may utilize. The importance machine-learning processes include any supervised, unsupervised, or reinforcement machine-learning process that apparatus 3404 and/or one or more remotes device 140 may or may not use in the determination of the importance model. An importance machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof. The importance machine-learning process may be trained as a function of an importance training set. As used in this disclosure "importance training set" is a training set that correlates at least an expendable element to at least an originality metric. As a non-limiting example, the importance training set may relate an expendable element of replaceable for a mass-produced telecommunications device to an originality metric of 10. As a further non-limiting example, the importance training set may relate an expendable element of irreplaceable for the Hope Diamond to an originality metric of 99.

Still referring to FIG. 34, apparatus 3404 may receive the importance model from remote device 140. Remove device 140 may include any remote device 140 as described above in reference to FIGS. 1-10. Remote device 140 may provide modifications to importance model. For example, and without limitation, a modification may include a firmware update, a software update, an importance model correction, and the like thereof. As a non-limiting example a software update may incorporate a new importance model that relates an expendable element to a modified originality metric. As a further non-limiting example remote device 140 may transmit a modified importance model, wherein the modified importance model may relate new originality metrics to previously identified expandable elements. Additionally or alternatively, the importance model may be transmitted to remote device 140, wherein remote device 140 may update the importance training data and transmit an updated importance model back to apparatus 3404. The updated importance model may be transmitted by remote device 140 and may be received by apparatus 3404 as a software update, firmware update, or corrected importance machine-learning model. Additionally or alternatively, remote device 140 may provide importance model, wherein apparatus 3404 transmits a signal, bit, datum, or parameter to remote device 140 and receives the outputted determined importance level from the importance model on remote device 140.

Still referring to FIG. 34, importance level 3408 may be determined by determining an at least support metric 3428.

As used in this disclosure "support metric" is a parameter that at least relates to the availability of supporting individuals to at least reach and/or provide aid in protecting the object as a function of time and/or distance. As a non-limiting example support metric 3428 may include a parameter such as back up is available in 15 minutes or back up is unavailable for 35 minutes. Support metric 3428 may be determined as a function of receiving a support advisor 3432 from a support database 3436. As used in this disclosure a "support advisor" is at least an individual and/or entity that provides assistance to apparatus 3404. As a nonlimiting example support advisor 3432 may include a local authority, such as a park ranger, a police officer, a security guard, and the like thereof. As used in this disclosure "support database" is a datastore of potential support advisors that may or may not aid in protecting the identified object. As a non-limiting example support database 3436 may include local authorities, lifestyle coaches, psychologists, physicians, spiritual advisors, familial members, state authorities, federal authorities, social workers, and the like thereof. Support metric 3428 may be determined by identifying at least a geolocation of the at least support advisor. As used in this disclosure "geolocation" is a particular place and or position of a support advisor that is able to be received remotely via a remote communication. For example, and without limitation the geolocation of a psychologist may indicate that the psychologist is exactly 10.23 miles away from the secure area. As a further non-limiting example a geolocation may indicate a specific town and or city that the support advisor may be located. As a further non-limiting example a geolocation may indicate that state police officers are 2 miles away from the secure location.

Still referring to FIG. 34 apparatus 3404 may be configured to determine at least a deterrent 3440, wherein deterrent 3440 is described above, in reference to FIGS. 1-10. Deterrent 3440 may include without limitation a directed light, sound, electrical deterrent, neurostimulator, chemical, entanglement device, and the like thereof. Deterrent 3440 may be determined by receiving a candidate deterrent 3444 of a plurality of candidate deterrents from a deterrent database 3448. As used in this disclosure "candidate deterrents" are a list and/or group of deterrents that at least fulfill the importance level. For example, and without limitation, candidate deterrent 3444 may include a laser, directed white light, and strobe light pulses for an importance level of 90. As used in this disclosure a "deterrent database" is a datastore relating to the plurality of deterrents an apparatus may or may not have access to utilize. As a non-limiting example a deterrent database 3448 may include deterrents that at least utilize a light, sound, electric shock, neurostimulant, chemical, and/or entanglement deterrent. Apparatus 3404 may identify an impact parameter 3452 that relates to importance level 3408. As used in this disclosure "impact parameter" is an element that relates to the magnitude of invasiveness that a deterrent has on subject 308 and/or surrounding individuals. For example, and without limitation impact parameter 3452 may identify a very invasive deterrent of entanglement device for a large importance level such as a jewel. As a further non-limiting example, impact parameter 3452 may identify a non-invasive deterrent of audio signal for a low importance level such as a pencil. Impact parameter 3452 may include at least a collateral impact 3456. As used in this disclosure "collateral impact" is a value associated with the effects of the deterrent on the surrounding individuals. As a non-limiting example collateral impact 3452 may denote a value of 7 for a laser pulse, wherein a value of 82 may exist for an audio output.

Figure 35:
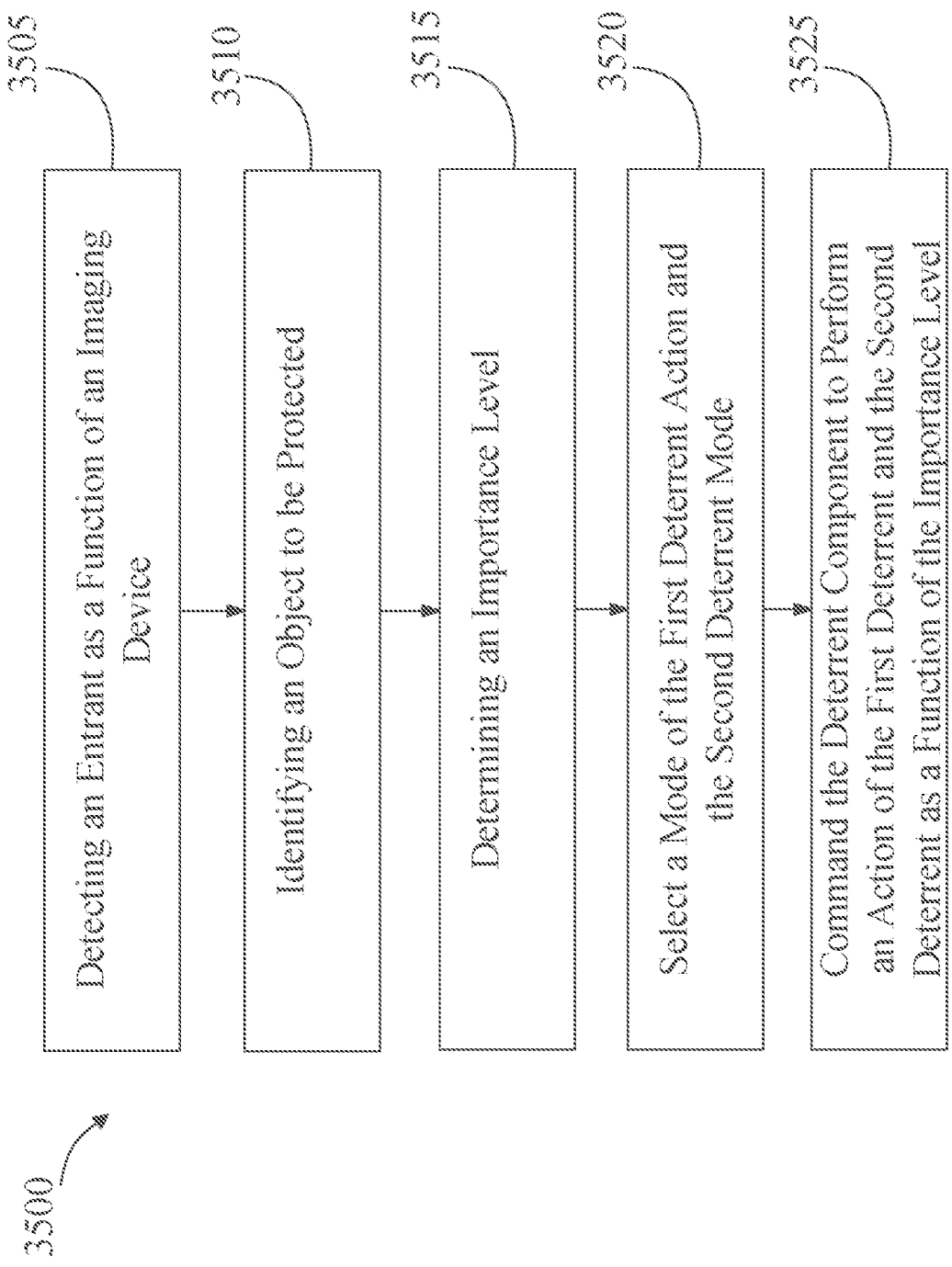
FIG. 35 is a flow diagram of a method of an apparatus importance level.

Referring now to FIG. 35, an exemplary embodiment of a method 3500 of determining an importance level is illustrated. At step 3505, a processor 136 communicatively connected to an imaging device 104 and a deterrent component 152 including a directed light deterrent 156 detects a subject 308 as a function of a detection of the subject 308 by the imaging device 104; this may be implemented, without limitation, as described above in reference to FIGS. 1-11. At step 3510, the processor 136 identifies an object to be protected; this may be implemented, without limitation, as described above in reference to FIGS. 1-11. At step 3515, the processor determines an importance level 3408; this may be implemented, without limitation, as described above in reference to FIGS. 1-11. At step 3520, the processor 136 selects a mode of a first deterrent mode and a second deterrent mode as a function of importance level 3408; this may be implemented, without limitation, as described above in reference to FIGS. 1-11. At step 3525, the processor 136 commands deterrent component 152 to perform an action of a first deterrent action and a second deterrent action as a function of importance level 3408, wherein the first deterrent action is distinct from the second deterrent action; this may be implemented, without limitation, as described above in reference to FIGS. 1-11.

Figure 36:
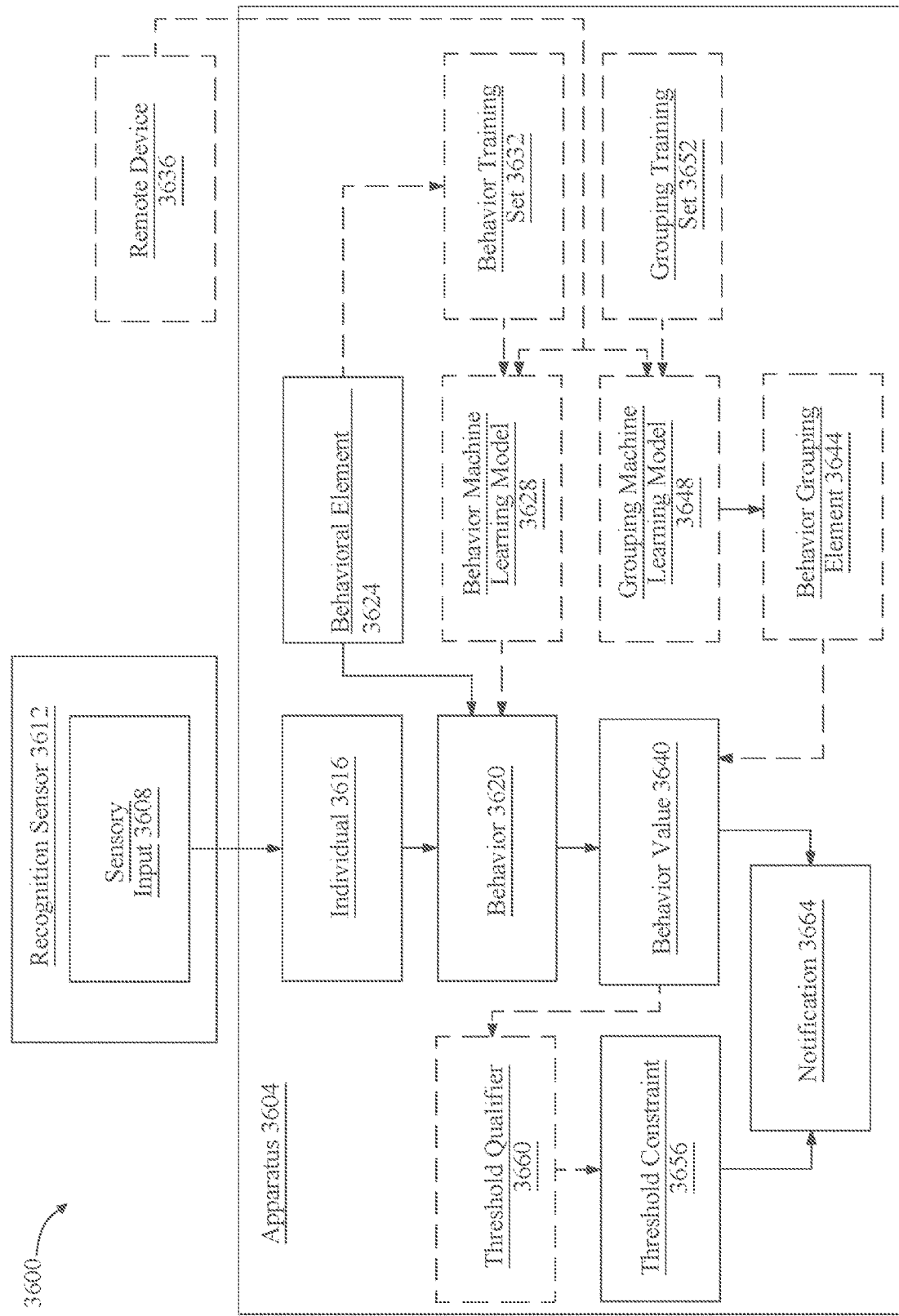
FIG. 36 is a block diagram of an exemplary embodiment of a system for transmitting a notification.

Referring now to FIG. 36, an exemplary embodiment of a system 3600 of transmitting a notification is illustrated. System includes an apparatus 3604. Apparatus 3604 may include any apparatus as described in this disclosure, including without limitation a microcontroller, microprocessor, digital signal processor (DSP) and/or system on a chip (SoC) as described in this disclosure. Apparatus may include, be included in, and/or communicate with a mobile device such as a mobile telephone or smartphone. Apparatus 3604 may include a single apparatus operating independently, or may include two or more apparatus operating in concert, in parallel, sequentially or the like; two or more apparatus may be included together in a single apparatus or in two or more apparatus. Apparatus 3604 may interface or communicate with one or more additional devices as described below in further detail via a network interface device. Network interface device may be utilized for connecting apparatus 3604 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two apparatus, and any combinations thereof. A network may employ a wired and/or a wireless mode of communication. In general, any network topology may be used. Information (e.g., data, software etc.) may be communicated to and/or from a computer and/or an apparatus. Apparatus 3604 may include but is not limited to, for example, an apparatus or cluster of apparatus in a first location and a second apparatus or cluster of apparatus in a second location. Apparatus 3604 may include one or more apparatus dedicated to data storage, security, distribution of traffic for load balancing, and the like. Apparatus 3604 may distribute one or more computing tasks as described below across a plurality of apparatus of apparatus, which may operate in parallel, in series, redundantly, or in any other manner used for distribution of tasks or memory between apparatus. Apparatus 3604 may be implemented using a "shared nothing" architecture in which data is cached at the worker, in an embodiment, this may enable scalability of system 3600 and/or apparatus.

Apparatus 3604 may be designed and/or configured to perform any method, method step, or sequence of method steps in any embodiment described in this disclosure, in any order and with any degree of repetition. For instance, apparatus 3604 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Apparatus 3604 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 36, apparatus 3604 is configured to obtain a sensory input of a plurality of sensory inputs 3608. As used in this disclosure, a "sensory input" comprises is datum that relates to one or more external physical elements as captured by one or more sensors; one or more sensors may include a device that detects a physical property such as a light sensor, an acoustic sensor, a chemical sensor, and the like thereof. A physical element may comprise light, voltage, current, sound, chemical, pressure, humidity, and the like thereof. For example, and without limitation, a sensory input may be comprised of a pressure datum of 0.9821 atm. As a further non-limiting example, a sensory input may be comprised of a chemical datum of 3700 ppb of N-Phenethyl-4-piperidone. Sensory input 3608 is obtained from a recognition sensor 3612. As used in this disclosure a "recognition sensor" is a sensor that recognizes actions and goals of one or more agents and/or persons from a series of observations on the agents and/or persons actions and the environmental conditions. Recognition sensory 3612 may include, without limitation imaging sensors, such as optical cameras, infrared cameras, 3D cameras, multispectral cameras, hyperspectral cameras, polarized cameras. is a device that detects or measures a physical property and records, indicates, or otherwise responds to the detected or measured physical property. Recognitions sensor 3612 may be comprised of one or more of imaging and other sensors, such as optical cameras, infrared cameras, 3D cameras, multispectral cameras, hyperspectral cameras, polarized cameras, chemical sensors, motion sensors, ranging sensors, light radar component, such as lidar, detection or imaging using radio frequencies component, such as radar, terahertz or millimeter wave imagers, seismic sensors, magnetic sensors, weight/mass sensors, ionizing radiation sensors, and/or acoustical sensors. Sensors may alternatively or additionally include any device used as a sensor as described in U.S. Provisional App. Ser. No. 63/067,142.

Still referring to FIG. 36, apparatus 3604 is configured to identify an individual 3616 of a plurality of individuals as a function of the plurality of sensory inputs. As used in this disclosure an "individual" is a person. As a non-limiting example, individual 3616 may be a 30-year-old male. As a further non-limiting example, individual 3616 may include a 48-year-old female. Individual 3616 may be identified as a function of one or more biometric elements. As used in this disclosure a "biometric element" is a distinctive, measurable characteristic that at least labels and/or identifies an individual. A biometric element may include a physiologic or behavioral characteristic. A physiological characteristic may relate to the shape and/or structure of the individual's body. For example, and without limitation a physiological characteristic may include fingerprint, palm veins, face recognition, DNA, palmprint, hand geometry, iris recognition, retina structure, odor, scent, dental patterns, weight, height, dermal viability, and the like thereof. A behavioral characteristic may relate to the pattern of behavior of an individual. A behavioral characteristic may relate to, without limitation, rhythm, gait, voice, typing pattern, typing speed, device use patterns and the like thereof, wherein device use patterns include cursor movements, finger pressure, finger contact duration, finger contact volume, finger contact angle, device angle when operating and the like thereof.

Still referring to FIG. 36, apparatus 3604 is configured to determine a behavior 3620 of individual 3616 as a function of sensory input 3608. As used in this disclosure a "behavior" is an action and mannerism performed by an individual, organism, system, or artificial entities in conjunction with themselves or their environment, which includes the other systems or organisms around as well as the physical environment. Behavior 3620 may include, without limitation, overt behavior, wherein overt behavior is a visible type of behavior that can occur outside of a human being. Overt behavior may include, without limitation, eating food, riding a bicycle, playing football, walking in a secure area, or the like thereof. Behavior 3620 may include, without limitation, covert behavior, wherein covert behavior is not visible to another individual. Covert behavior may include, without limitation, thoughts, emotions, feelings, or the like thereof. Behavior 3620 may include, without limitation, molecular behavior, wherein molecular behavior includes unexpected behavior that occurs without thinking. Molecular behavior may include, without limitation, an individual that closes their eyes when something is about to interact with that individual's eyes. Behavior 3620 may include, without limitation, molar behavior, wherein molar behavior is a behavior that is identified in terms of the ultimate cause of history. Molar Behavior may include, without limitation, a person that loves someone is merely exhibiting a pattern of loving behavior over time, as love would be considered atomistic and must be looked in more wholistic terms. Behavior 3620 may include, without limitation, voluntary behavior, wherein voluntary behavior is a type of behavior that depends on a human want, desire, wish, yearning, or the like thereof. Voluntary behavior may include, without limitation, walking, speaking, writing, striking, and the like thereof. Behavior 3620 may include, without limitation, involuntary behavior, wherein involuntary behavior is a behavior that naturally occurs without thinking. Voluntary behavior may include, without limitation, breathing, blinking, swallowing, digestion, or the like thereof. Behavior 3620 may include behavior that is considered to be positive, negative, and/or neutral behavior. As used in this disclosure "positive behavior" is behavior that is perceived by another individual, organism, artificial intelligence, or entity as a good act. As a non-limiting example positive behavior may include altruistic behavior, caring behavior, compassionate behavior, considerate behavior, faithful behavior, impartial behavior, kind behavior, pleasant behavior, polite behavior, sincere behavior, and the like thereof. As used in this closure a "negative behavior" is behavior that is perceived by another individual, organism, artificial intelligence, or entity as a bad act. As a non-limiting example a negative behavior may include aggressive behavior, argumentative behavior, bossy behavior, deceitful behavior, domineering behavior, flaky behavior, inconsiderate behavior, manipulative behavior, rude behavior, spiteful behavior, and the like thereof. As used in this disclosure "neutral behavior" is behavior that is perceived by another individual, organism, artificial intelligence, or entity as a behavior that does not attempt to display any positive or negative intentions. As a non-limiting example a neutral behavior may include apathy behavior, indifference behavior, lack of conviction behavior, and the like thereof.

Still referring to FIG. 36, determining behavior 3620 further comprises identifying at least a behavioral element 3624. As used in this disclosure a "behavioral element" is information that at least relates to a user's intended behavior decision. Behavioral element 3624 may include, without limitation, microexpression, macroexpressions, language, tone, word selection, physiological actions, and the like thereof. As a non-limiting example, behavioral element 3624 may relate a microexpression of a nose wrinkled with a negative behavior of disgust. Behavior 3620 is then determined as a function of behavior element 3624 and sensory inputs 3608. Behavior 3620 may be determined as a function of a behavior machine-learning model 3628. As used in this disclosure a "behavior machine-learning model" is a machine-learning model that uses training data and/or training set to generate an algorithm that will be performed by an apparatus and/or remote device to produce outputs given data provided as inputs; this is in contrast to a non-machine-learning software program where the commands to be executed are determined in advance by a user and written in a programming language. Behavior machine-learning model 3628 may consist of any supervised, unsupervised, or reinforcement machine-learning model that apparatus 3604 may or may not use in the determination of the behavior. Behavior machine-learning model 3628 may include, without limitation machine-learning models such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof. Behavior machine-learning model 3628 may be trained as a function of a behavior training set 3632. As used in this disclosure "behavior training set" is a training set that correlates at least a sensory input to at least a behavioral element, wherein a sensory element comprises at least datum that relates to one or more external physical elements, as described above in detail, and a behavioral element further comprises a datum that relates to a person's intended action, as described above in detail.

Still referring to FIG. 36, apparatus 3604 may receive behavior machine-learning model 3628 from a remote device 3636. As used in this disclosure a "remote device" is a computing system external to the apparatus that obtains and/or sends information relating to the behavior machine-learning model. Remote device 3636 may provide modifications to the behavior machine-learning model. For example, and without limitation, a modification may be comprised of a firmware update, a software update, a behavior machine-learning correction, and the like thereof. As a non-limiting example a software update may incorporate a new behavior machine-learning model that relates to a sensory input of a plurality of sensory inputs to a modified behavioral element. As a further non-limiting example a remote device may transmit a modified behavior machine-learning model, wherein the modified behavior machine-learning model may relate new behavioral elements to previously identified sensory inputs of a plurality of sensory inputs. Additionally or alternatively, behavior machine-learning model 3628 may be transmitted to remote device 3636, wherein remote device 3636 may update the behavior training data and transmit an updated behavior machine-learning model back to apparatus 3604. The updated behavior machine-learning model may be transmitted by remote device 3636 and received by apparatus 3604 as a software update, firmware update, or corrected behavior machine-learning model. Additionally or alternatively, remote device 3636 may include the behavior machine-learning model, wherein apparatus 3604 transmits a signal, bit, datum, or parameter to the remote device and receives the outputted behavior from the behavior machine-learning model on remote device 3636.

Still referring to FIG. 36, behavior machine-learning model 3628 may be generated as a function of a classifier. A "classifier," as used in this disclosure is a machine-learning model, such as a mathematical model, neural net, or program generated by a machine-learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Apparatus 3604 and/or another device may generate a classifier using a classification algorithm, defined as a process whereby apparatus 3604 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 36, apparatus 3604 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(AB)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Apparatus 3604 may then calculate a likelihood table by calculating probabilities of different data entries and classification labels. Apparatus 3604 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 36, apparatus 3604 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 36, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 36, apparatus 3604 is configured to generate a behavior value 3640 as a function of behavior 3620. As used in this disclosure a "behavior value" is a measurable enumeration that quantitates an impact of the behavior. As used in this disclosure an "impact" of a behavior is an effect the behavior has on the individual as well as surrounding individuals that are at least within a proximal distance. As a non-limiting example a behavior value of 3600 may be generated for a behavior of murder, while a behavior value of 10 may be identified for a behavior of verbal abuse. Behavior value 3640 may be generated as a function of a behavior grouping element 3644. As used in this disclosure a "behavior grouping element" relates a type of action and/or goal of a behavior to related actions and or goals of similar behavior types. For example, and without limitation a behavior of attempted suicide may be related to a behavior of murder. As a further non-limiting example a behavior of compliments may relate to kindness. Behavior grouping element 3644 identifies categories of behaviors such that a measurable value may be accomplished. Apparatus 3604 may arrange the datum from behavior 3620 according to behavior grouping element 3644.

Still referring to FIG. 36, behavior grouping element 3644 may be determined as a function of a grouping machine-learning model 3648. As used in this disclosure a "grouping machine-learning model" is a machine-learning model that uses training data and/or training set to generate an algorithm that will be performed by an apparatus and/or remote device to produce outputs given data provided as inputs; this is in contrast to a non-machine-learning software program where the commands to be executed are determined in advance by a user and written in a programming language. Grouping machine-learning model 3648 may consist of any supervised, unsupervised, or reinforcement machine-learning model that apparatus 3604 may or may not use in the determination of the behavioral grouping element. Behavior machine-learning model 3628 may include, without limitation machine-learning models such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof. Grouping machine-learning model 3648 may be trained as a function of a grouping training set 3652. As used in this disclosure "grouping training set" is a training set that correlates at least a behavior to a behavior rating scale, wherein a behavior is an action and/or goal of a person, as described in detail above. As used in this disclosure a "behavior rating scale" is a measurable index of each negative, positive, and/or neutral behavior. A behavioral rating scale may be further comprised of Observer/Informant scales, self-report scales, single domain scales, multidomain scales, Achenbach scales, CBCL, TRF, C-TRF/1-5, YSR, ABCL, ASR, BASC-2, PRS, TRS, SRP, Conners Scale, BRP-2, BBRS, SEDS-2, and the like thereof. As a non-limiting example grouping training set 3652 may relate a CBCL value of 2 to a behavior of oppositional defiance.

Still referring to FIG. 36, apparatus 3604 may receive grouping machine-learning model from a remote device 3636. Remote device 3636 may provide grouping machine-learning model using one or more grouping machine-learning models, wherein a grouping machine-learning model is described above in detail. Remote device 3636 may perform grouping machine-learning model 3648, using a grouping training set 3652, wherein a grouping training set 3652 is described above in detail. The remote device may transmit a signal, bit, datum, or parameter to apparatus 3604 that at least relates to grouping machine-learning model 3648. Remote device 3636 may provide modifications to the grouping machine-learning model. For example, and without limitation, a modification may be comprised of a firmware update, a software update, a grouping machine-learning correction, and the like thereof. As a non-limiting example a software update may incorporate a new grouping machine-learning model that relates to a behavior and a modified behavior rating scale. As a further non-limiting example a remote device may transmit a modified grouping machine-learning model, wherein the modified grouping machine-learning model may relate new behaviors to previously identified behavioral rating scales. Additionally or alternatively, grouping machine-learning model 3648 may be transmitted to remote device 3636, wherein remote device 3636 may update the grouping training data and transmit an updated grouping machine-learning model back to apparatus 3604. The updated grouping machine-learning model may be transmitted by remote device 3636 and received by apparatus 3604 as a software update, firmware update, or corrected grouping machine-learning model. Additionally or alternatively, remote device 3636 may include the grouping machine-learning model, wherein apparatus 3604 transmits a signal, bit, datum, or parameter to the remote device and receives the outputted behavior grouping element from the grouping machine-learning model on remote device 3636.

Still referring to FIG. 36, apparatus 3604 may generate behavior value 3640 by identifying a vector outcome. As used in this disclosure a "vector outcome" is an action and/or response that an individual may complete as an effect of the identified behavior. For example, and without limitation, a vector outcome of opening a door for an individual may be predicted as a function of an identified behavior of kindness. As a further non-limiting example a vector outcome of assault may be predicted as a function of the behavior of verbal discourse among an individual. A vector outcome may be identified as a function of a vector model. As used in this disclosure a "vector model" is a logical algorithm consisting of a many-valued logic function. A many-valued logic function may include, without limitation, a propositional calculus function, wherein there are more than two truth values that may exist for a given input. For example, and without limitation, functions may include two-valued logic, n-valued logic, three-valued Lukasiewicz's and Kleene's logic, finite-valued logic, infinite-valued logic, fuzzy logic, and probability logic.

Still referring to FIG. 36, a vector outcome may be identified by receiving an actual outcome of individual 3616 from recognition sensor 3612. As used in this disclosure an "actual outcome" a true response from an individual that occurs in real-time. For example, an actual outcome may include an individual that at least commits theft as a result of a behavior of suspiciousness. As a further non-limiting example an actual outcome may include a handshake as a behavior of respect for an individual. Apparatus 3604 may correlate the actual outcome to a psyche databank. As used in this disclosure a "psyche databank" is an online datastore of psychological status's that an individual may or may not represent. As a non-limiting example a psyche databank may include a list of personalities, wherein an individual may have a personality of cheery. Apparatus 3604 may generate the vector outcome using statistical inference. As used in this disclosure a "statistical inference" is a process that uses data analysis to deduce properties of an underlying distribution probability. As a non-limiting example a statistical inference may include fully parametric, non-parametric, semi-parametric, approximate distributions, randomization-based models, model-based analysis of randomized experiments, model-free randomization inference, frequentist inference, Bayesian inference, Likelihood-based inference, AIC-based inference, minimum description length, fiducial inference, structural inference, and the like thereof.

Still referring to FIG. 36, apparatus 3604 is configured to determine a threshold constraint 3656. As used in this disclosure a "threshold constraint" is a value and/or set of values that that may not be exceeded for a given behavior value such that a signal is transmitted if a behavior value exceeds the value of the threshold limit. Threshold constraint may be reached by a behavior value for example and without limitation when a behavior value exceeds what the apparatus can handle, either because of a higher level of threat to whatever is being protected or to the apparatus itself, or because the situation requires a trained professional that may be more qualified to handle the situation than the apparatus is equipped to provide. For example, and without limitation, a threshold constraint may identify that a behavior value should not exceed a value of 30 for a behavior associated with aggression. As a further non-limiting example a threshold constraint may identify that a behavior value should not be inferior to the value of 20 for a behavior associated with goodwill. Additionally or alternatively, a person on the Autistic spectrum may be exhibiting a behavior value that exceeds the threshold constraint, wherein no threat is presented, wherein a trained professional would need to be notified of the behavior value that exceeds the threshold constraint to at least intervene and safely subdue the elevated behavior classifier. Threshold constraint 3656 may be determined using a threshold qualifier 3660. As used in this disclosure a "threshold qualifier" is an algorithm and/or classifier that at least relates a behavior value, wherein a behavior value is a measurable enumeration relating to a behavior, as described in detail above, to a socially approved limit. As used in this disclosure a "societal behavior" is a behavior limit that is decided by a society as a function of customs, laws, regulations, or other social constructs and/or conditioning. For example, and without limitation a threshold qualifier may relate a behavior value of 20 to a societal behavior of verbal abuse. As a further non-limiting example, a threshold qualifier may relate a behavior value of 40 to suspicious behavior. Additionally or alternatively, a threshold qualifier may relate a behavior value of 200 for an individual that has improper security clearance to a secure area. Threshold qualifier 3660 may be comprised of one or more algorithms that at least aid in identifying threshold constraint 3656. For example, and without limitation, threshold qualifier 3660 may include heuristic algorithms. As used in this disclosure "heuristic algorithms" are algorithms that enhance speed of calculations by while sacrificing relatively little accuracy, such that a threshold constraint may be rapidly determined with prior to another behavior being conducted by the individual. In an embodiment, using at least a heuristic algorithms to determine a threshold constraint may drastically reduce the time needed to perform the determination, while reducing a miniscule amount of accuracy; for example heuristic determination of threshold constraints may be several factors of ten faster than brute force approaches. In other embodiments, heuristic algorithms may include a heuristic algorithm based on a single variable or a small set of variables, such as a single behavior of theft or trespass. Threshold qualifier 3660 may include fuzzy logic algorithms. As used in this disclosure "fuzzy logic algorithms" are processes that identify truth values within a specified range of true and false values. For instance and without limitation, fuzzy logic algorithm may identify a truth value of 0.14 for a set range of 0 and 1 for respective truth and false values.

Still referring to FIG. 36, apparatus 3604 is configured to transmit a notification 3664 as a function of behavior value 3640 and threshold constraint 3656. As used in this disclosure a "notification" is an indicator that an event has occurred. Notification 3664 may include, without limitation an electrical signal, bit, noise, light, flash, siren, ballistic, and the like thereof. Notification 3664 may transmit a signal to an external remote device such as local authorities, such that the local authorities may respond to the notification and mitigate the behavior value that is exceeding the threshold constraint. For example, and without limitation, an individual may be trespassing in a secure area, wherein a notification consisting of a text and/or phone call may be transmitted to the local, state, and federal authorities. As a further non-limiting example, a video of the comprising the behavior may be recorded and transmitted to the local authorities to at least provide the local authorities a preview of the behavior being presented to apparatus 3604. Additionally or alternatively, a notification consisting of a text message with a description of the system may be identified allowing the local authorities to select the notification and watch a live-video feed displaying the situation at hand. Notification 3664 may be transmitted to a specific entity, device, remote device, individual, and the like thereof. Notification 3664 may indicate specific instructions or recommendations as a function of the behavior value. For instance, and without limitation, a notification may state that a trained negotiator needs to response such that the trained professional can provide cognitive bias mitigation and/or de-escalation techniques. Notification 3664 may include the individual's current behavior and current objects and/or weapons that the individual possess. For example, a notification may indicate to the local authorities that an individual that at least violates the threshold constraint due to trespass has bolt cutters, a firearm, and a knife. Notification 3664 may relate to a behavior that at least violates a threshold constraint. As used in this disclosure a "violation" is a behavior value that at least exceeds or falls below the range of values established by the threshold constraint. A violation may further comprise receiving behavior value 3640 of behavior 3620, receiving threshold constraint 3656 relating to behavior 3620, and determining a violation relating behavior 3620 and threshold constraint 3656 as a function of a behavior algorithm. As used in this disclosure a "behavior algorithm" is a mathematical formula that at least relates a value to another value and/or range of values. As a non-limiting example, a behavior algorithm may include addition formulas, subtraction formulas, lattice formulas, scratch formulas, and the like thereof.

Figure 37:
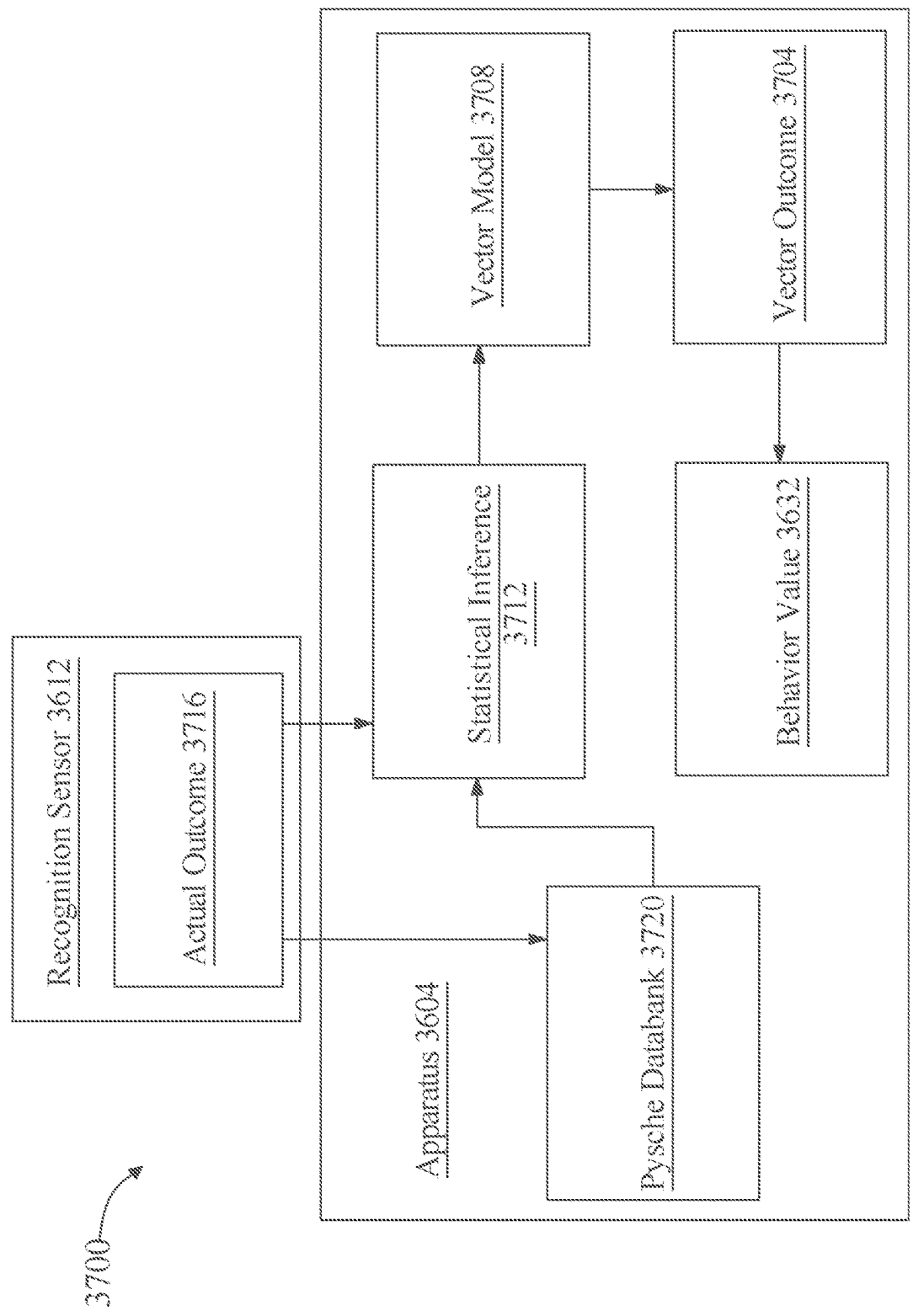
FIG. 37 is a block diagram of an exemplary embodiment of generating a behavior value.

Now referring to FIG. 37, an exemplary embodiment of a system 3700 for generating a behavior value 3640 as a function of vector outcome 3704, wherein vector outcome 3704 is an action that an individual may complete as an effect of the identified behavior, described in detail above. For example, and without limitation, vector outcome 3704 may be comprised of a predicted smile as a function of an identified behavior of empathy. As a further non-limiting example vector outcome 3704 may predict verbal abuse as a function of the behavior of disgust. Vector outcome may be generated as a function of a vector model 3708, wherein a vector model is a logical algorithm consisting of a many-valued logic function, as described in detail above. As a non-limiting example, a vector model may include fuzzy logic and/or probability logic to generate vector outcome 3704. Vector model 3708 may be identified as a function of a statistical inference 3712, wherein a statistical inference is a process that uses data analysis to deduce properties of an underlying distribution probability, as described above in detail. As a non-limiting example a statistical inference may include a Likelihood-based inference relating an actual outcome 3716, received by recognition sensor 3612, and a psyche databank 3720. An actual outcome 3716 is a true response from an individual that occurs in real-time, as described above in detail. For example, and without limitation actual outcome 3716 may include assault as a function of a behavior of aggression. Psyche databank 3720 is an online datastore of psychological status's that an individual may or may not represent, as described above in detail. As a non-limiting example a psyche databank may relate an actual outcome to a psyche type such as thinker.

Figure 38:
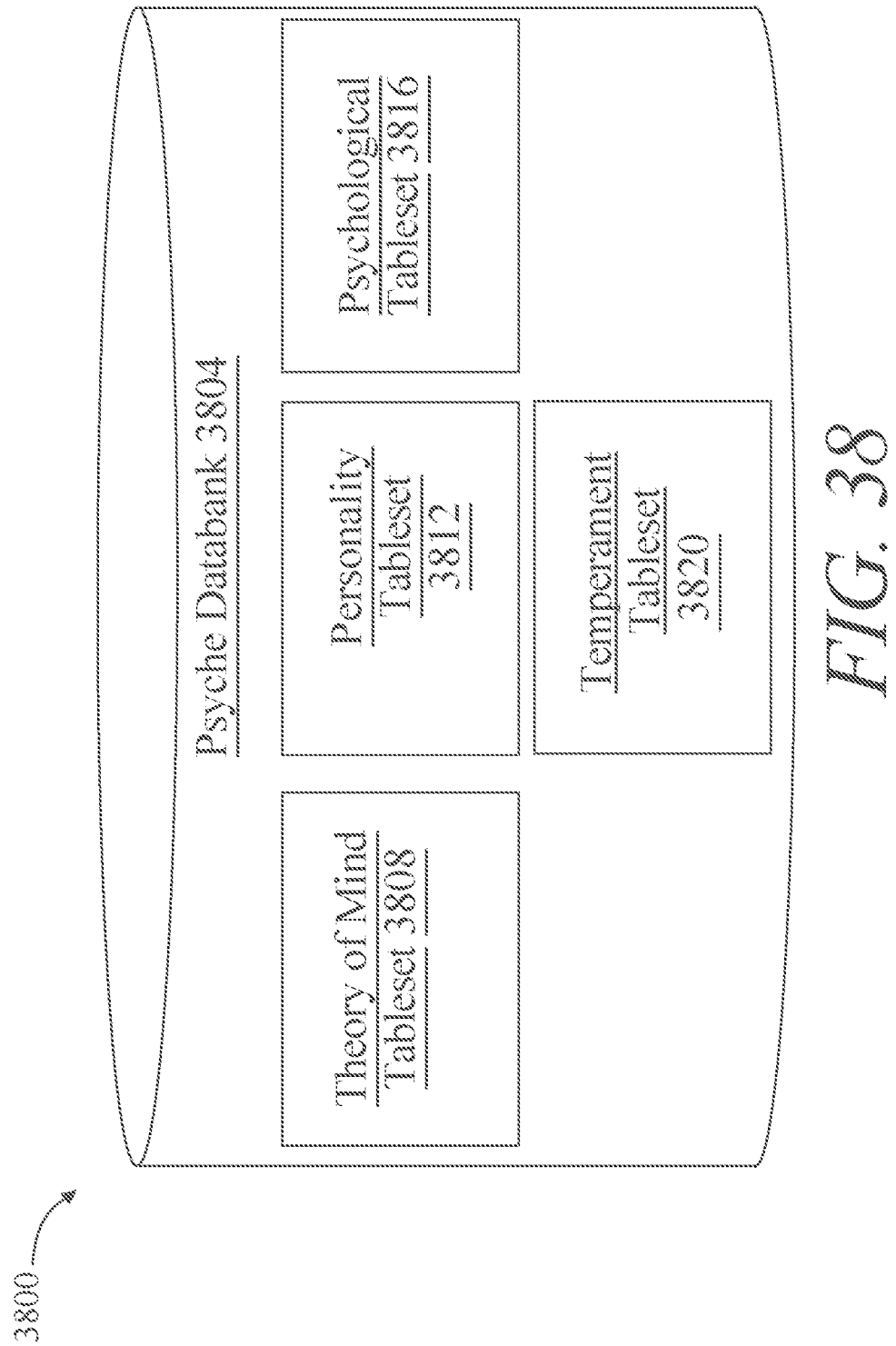
FIG. 38 is a block diagram of an exemplary embodiment of a psyche databank.

Now referring to FIG. 38, an exemplary embodiment 3800 of a psyche databank 3804 is illustrated. Databank may be implemented, without limitation, as a relational databank, a key-value retrieval databank such as a NOSQL databank, or any other format or structure for use as a databank that a person skilled in the art would recognize as suitable upon review of the entirety of this disclosure. Databank may alternatively or additionally be implemented using a distributed data storage protocol and/or data structure, such as a distributed hash table or the like. Databank may include a plurality of data entries and/or records as described above. Data entries in a databank may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a databank may store, retrieve, organize, and/or reflect data and/or records as used herein, as well as categories and/or populations of data consistently with this disclosure. Psyche databank 3804 may include a Theory of Mind tableset 3808, which may indicate an individual's psyche as a function of mental states. This may include, without limitation a beliefs, intent, desire, emotion, knowledge, and the like thereof. Theory of Mind tableset 3808 may include perspectives that relate to everyday human social interactions, for analyzing, judging, and inferring behaviors. For example, and without limitation, Freudian tableset 3808 may relate a behavior of verbal abuse to a psyche of aggressive id dominant. Psyche databank 3804 may include a personality tableset 3812, which may indicate an individual's psyche as a function of five types of personalities, being a Type A, Type B, Type C, Type D, and/or Type X. This may include, without limitation a director psyche, a socializer psyche, a thinker psyche, and a support psyche. For example, and without limitation, personality tableset 3812 may relate a behavior of enthusiasm to a psyche a socializer. Psyche databank 3804 may include a personality tableset 3816, which may indicate an individual's psyche as a function of two perceiving functions and two judging functions. This may include, without limitation a sensation psyche, intuition psyche, thinking psyche, and/or feeling psyche. For example, and without limitation, psychological tableset 3816 may relate a behavior of lack of attention to a thinking psyche. Psyche databank 3804 may include a temperament tableset 3820, which may indicate an individual's psyche as a function of four temperament types. This may include, without limitation a sanguine type, choleric type, melancholic type, and/or phlegmatic type. For example, and without limitation, temperament tableset 3820 may relate a behavior of lack of individual movement to an active and/or sanguine temperament.

Figure 39:
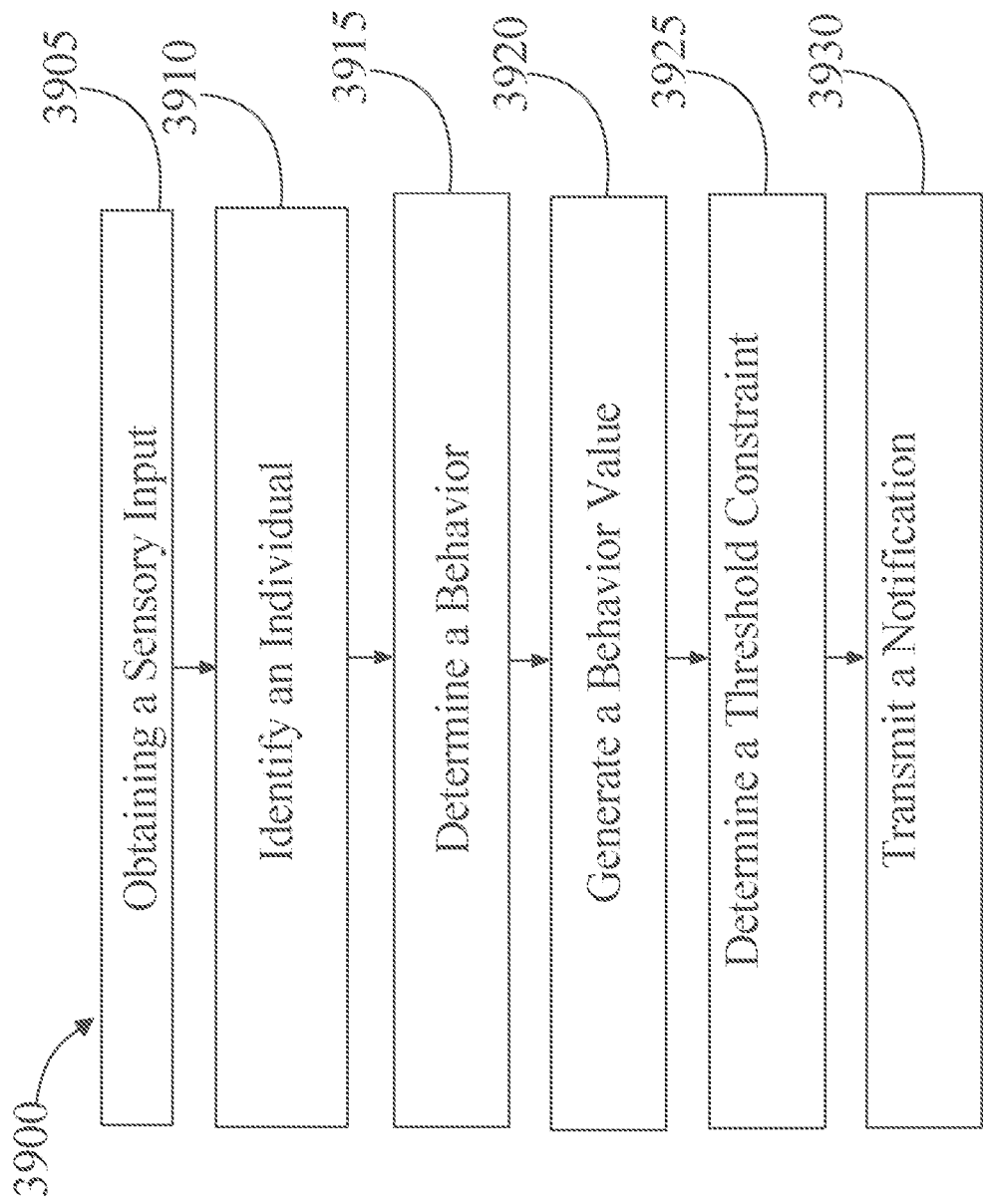
FIG. 39 is a process flow diagram illustrating an exemplary embodiment of a method of transmitting a notification.

Now Referring to FIG. 39, an exemplary embodiment of a method 3900 for transmitting a notification. At step 3905, an apparatus 3604 obtains a sensory input 3608. Sensory input 3608 includes any of the sensory input 3608 as described above, in reference to FIGS. 1-4. For instance, and without limitation, sensory input 3608 may include a light, voltage, current, sound, chemical, pressure, humidity, and the like thereof. Sensory input is obtained from a recognition sensor 3612. Recognition sensor 3612 includes any of the recognition sensor 3612 as described above, in reference to FIGS. 1-4. Recognition sensor 3612 may include one or more of imaging and other sensors, such as optical cameras, infrared cameras, 3D cameras, multispectral cameras, hyperspectral cameras, polarized cameras, chemical sensors, motion sensors, ranging sensors, light radar component, such as lidar, detection or imaging using radio frequencies component, such as radar, terahertz or millimeter wave imagers, seismic sensors, magnetic sensors, weight/mass sensors, ionizing radiation sensors, and/or acoustical sensors.

Still referring to FIG. 39, at step 3910 apparatus 3604 identifies an individual 3616 as a function of sensory input 3608. Individual 3616 includes any of the individual 3616 as described above, in reference to FIGS. 1-4. Individual 3616 may include a person, entity, organism, and the like thereof. Individual may be identified as a function of a biometric element, wherein a biometric element is a distinctive, measurable characteristic that at least labels and/or identifies an individual. As a non-limiting example a biometric element may consist of datum obtained from a fingerprint, palm veins, face recognition, DNA, palmprint, hand geometry, iris recognition, retina structure, odor, scent, dental patterns, weight, height, dermal viability, rhythm, gait, voice, typing pattern, typing speed, device use patterns and the like thereof.

Still referring to FIG. 39, at step 3915 apparatus 3604 determines a behavior 3620. Behavior 3620 includes any of the behavior 3620 as described above, in reference to FIGS. 1-4. For instance Behavior 3620 may include overt behavior, covert behavior, molar behavior, molecular behavior, voluntary behavior, involuntary behavior, and the like thereof. Behavior 3620 may be comprised of positive behavior, negative behavior, and/or neutral behavior. Behavior 3620 is determined by identifying at least a behavioral element 3624. Behavioral element 3624 includes any of the behavioral element 3624 as described above in detail. For example, and without limitation a physiological action of trespassing may relate to a behavioral element of negative behavior. Behavior 3620 is then determined as a function of behavior element 3624 and sensory inputs 3608. Behavior 3620 may be identified as a function of a behavior machine-learning model 3628. Behavior machine-learning model 3628 includes any of the behavior machine-learning model 3616 as described above, in reference to FIGS. 1-4. For instance, and without limitation, behavior machine-learning model 3628 may include a supervised machine-learning model or an unsupervised machine-learning model. Behavior machine-learning model 3628 may include a classification process, such as for example naïve Bayes, k-nearest neighbor, decision tree, and/or random forest. Classification processes include any of the classification processes as described above in reference to FIGS. 1-4. Behavior machine-learning model 3628 may be configured using a behavior training set 3632. Behavior training set 3632 includes any of the behavior training set 3632 as described above in reference to FIGS. 1-4. Behavior training set 3632 may include, without limitation, sensory inputs, such as movements, language, intentions, and the like thereof that correlate to behavioral elements, such as intended behavior decisions. For example, and without limitation a behavior training set may relate a sensory input of perceived microexpression to a negative behavior of disgust.

Still referring to FIG. 39, at step 3920 apparatus 3604 generates a behavior value as a function of behavior 3620. Behavior value 3640 includes any of the behavior value 3640 as described above, in reference to FIGS. 1-4. As a non-limiting example a behavior value of 40 may be generated for a behavior of derogatory behavior, while a behavior value of 5 may be identified for a behavior of ignorance. Behavior value 3640 may be generated as a function of a behavior grouping element 3644. Behavior grouping element 3644 Includes any of the behavior grouping element 3644 As described above, in reference to FIGS. 1-4. For instance and without limitation, behavior grouping 3644 may include a type of action and/or goal of a behavior to related actions and or goals of similar behavior types. As a non-limiting example, a behavior grouping element may relate a behavior of attempted suicide may be related to a behavior of murder. Behavior grouping element 3644 may be generated as a function of a grouping machine-learning model 3648. Grouping machine-learning model 3648 includes any of the grouping machine-learning model 3648 as described above in reference to FIGS. 1-4. For instance, and without limitation, grouping machine-learning model 3648 may include a supervised machine-learning model or an unsupervised machine-learning model. Grouping machine-learning model 3648 may include a classification process, such as for example naïve Bayes, k-nearest neighbor, decision tree, and/or random forest. Classification processes include any of the classification processes as described above in reference to FIGS. 1-4. Grouping machine-learning model 3648 may be configured using a grouping training set 3652. Grouping training set 3652 includes any of the grouping training set 3652 as described above in reference to FIGS. 1-4. Grouping training set 3652 may include, without limitation, a behavior of a plurality of behaviors related to a behavior rating scale, wherein a behavior rating scale is a measurable index of each negative, positive, and/or neutral behavior. For example, and without limitation a grouping training set may relate an Achenbach scale value of 3 to a behavior of somatic complaints.

Still referring to FIG. 39, at step 3925 apparatus 3604 determines a threshold constraint 3656. Threshold constraint 3656 includes any of the threshold constraint 3656 as described above, in reference to FIGS. 1-4. As a non-limiting example threshold constraint 3656 may include a value range of 1-30 for a behavior associated with depression. Threshold constraint 3656 may be determined as a function of a threshold qualifier 3660. Threshold qualifier 3660 includes any of the threshold constraint 3660 as described above in reference to FIGS. 1-4. Threshold qualifier 3660 may include, without limitation one or more algorithms that at least aid in identifying threshold constraint 3656. For example, and without limitation, threshold qualifiers may include heuristic algorithms and/or fuzzy logic algorithms. As a further non-limiting example, a threshold qualifier may identify a truth value of 0.12 for a set range of 0 and 1 for a probability using a heuristic algorithm.

Still referring to FIG. 39, at step 3930 transmits a notification 3664. Notification 3664 includes any of the notification 3664 as described above, in reference to FIGS. 1-4. Notification 3664 may include an indicator that is emitted as result of an event that occurred. Notification 3664 may include, without limitation an electrical signal, bit, noise, light, flash, siren, ballistic, and the like thereof. Notification 3664 may relate to a behavior that at least violates a threshold constraint, wherein a violation relates to any violation as described above, in reference to FIGS. 1-4. As a non-limiting example, a violation may result from a behavior value of 30 and a threshold constraint of 1-25. A violation may be determined as a function of a behavior algorithm, wherein a behavior algorithm includes any of the behavior algorithm as described above, in reference to FIGS. 1-4. As a non-limiting example a behavior algorithm may include addition formulas, subtraction formulas, lattice formulas, scratch formulas, and the like thereof.

Figure 40:
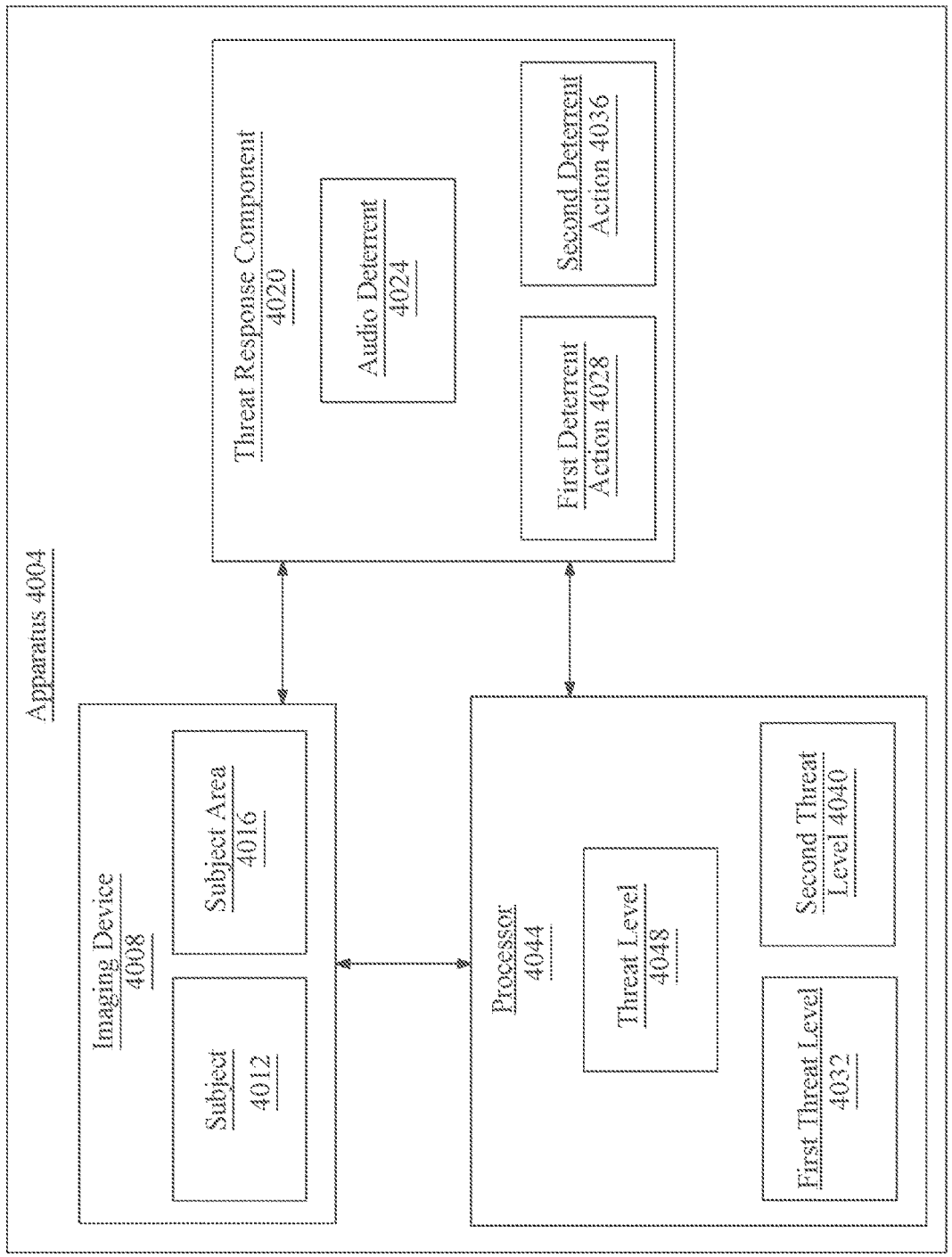
FIG. 40 is a block diagram of an embodiment of an automated threat detection and deterrence apparatus.

Referring now to FIG. 40, an exemplary embodiment of a system 4000 for an automated threat detection and deterrence apparatus is illustrated. System includes an automated threat detection and deterrence apparatus 4004. Apparatus 4004 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Apparatus 4004 may include a single computing device operating independently, or may include two or more computing device operating in concert, in parallel, sequentially or the like; two or more computing devices may be included together in a single computing device or in two or more computing devices. Apparatus 4004 may interface or communicate with one or more additional devices as described below in further detail via a network interface device. Network interface device may be utilized for connecting apparatus 4004 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Apparatus 4004 may include but is not limited to, for example, a computing device or cluster of computing devices in a first location and a second computing device or cluster of computing devices in a second location. Apparatus 4004 may include one or more computing devices dedicated to data storage, security, distribution of traffic for load balancing, and the like. Apparatus 4004 may distribute one or more computing tasks as described below across a plurality of computing devices of computing device, which may operate in parallel, in series, redundantly, or in any other manner used for distribution of tasks or memory between computing devices. Apparatus 4004 may be implemented using a "shared nothing" architecture in which data is cached at the worker, in an embodiment, this may enable scalability of system 4000 and/or computing device.

With continued reference to FIG. 40, apparatus 4004 may be designed and/or configured to perform any method, method step, or sequence of method steps in any embodiment described in this disclosure, in any order and with any degree of repetition. For instance, apparatus 4004 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Apparatus 4004 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 40, apparatus 4004 includes an imaging device 4008. As used in this disclosure an "imaging device" is an instrument capable of recording, storing, viewing, and/or transmitting visual images. As a non-limiting example, imaging device 4008 may include an optical camera. As used in this disclosure an "optical camera" is a device that generates still and/or video images by capturing senses electromagnetic radiation in the visible spectrum, having wavelengths between approximately 380 nm and 740 nm, which radiation in this range may be referred to for the purposes of this disclosure as "visible light," wavelengths approximately between 740 nm and 1,100 nm, which radiation in this range may be referred to for the purposes of this disclosure as "near-infrared light" or "NIR," and wavelengths approximately between 200 nm and 380 nm, which radiation in this range may be referred to for the purposes of this disclosure as "ultraviolet light" or "UV". Optical camera may include a plurality of optical detectors, visible photodetectors, or photodetectors, where an "optical detector," "visible photodetector," or "photodetector" is defined as an electronic device that alters any parameter of an electronic circuit when contacted by visible or NIR light. Optical detectors may include, without limitation, charge-coupled devices (CCD), photodiodes, avalanche photodiodes (APDs), silicon photo-multipliers (SiPMs), complementary metal-oxide-semiconductor (CMOS), scientific CMOS (sC-MOS), micro-channel plates (MCPs), micro-channel plate photomultiplier tubes (MCP-PMTs), single photon avalanche diode (SPAD), Electron Bombarded Active Pixel Sensor (EBAPS), quanta image sensor (QIS), spatial phase imagers (SPI), quantum dot cameras, image intensification tubes, photovoltaic imagers, optical flow sensors and/or imagers, photoresistors and/or photosensitive or photon-detecting circuit elements, semiconductors and/or transducers. APDs, as used herein, are diodes (e.g. without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. APDs may provide a built-in stage of gain through avalanche multiplication. When a reverse bias is less than breakdown voltage, a gain of an APD may be approximately linear. For silicon APDs this gain may be on the order of 10-100. The material of the APD may contribute to gains.

Still referring to FIG. 40, individual photodetectors in optical camera may be sensitive to specific wavelengths of light, for instance by use of optical filters to exclude such wavelengths; for instance, and without limitation, some photodetectors may be sensitive to blue light, defined as light having a wavelength of approximately 420 nm to 480 nm, some may be sensitive to green light, defined as light having a wavelength of approximately 534 nm to 545 nm, and some may be sensitive to red light, defined as light having a wavelength of approximately 564 nm to 580 nm. Combinations of photodetectors specifically sensitive to red, green, and blue wavelengths may correspond to wavelength sensitivity of human retinal cone cells, which detect light in similar frequency ranges. Photodetectors may be grouped into a three-dimensional array of pixels, each pixel including a red photodetector, a blue photodetector, and a green photodetector. Pixels may be small enough to fit millions into a rectangular array less than an inch across. Optical camera may include one or more reflective, diffractive, refractive, and/or adaptive components that focus incident light onto photodetectors.

Still referring to FIG. 40, imaging device 4008 may include an infrared camera. As used in this disclosure an "infrared camera" is a camera that detects electromagnetic radiation in the infrared spectrum, defined as a spectrum of electromagnetic radiation having wavelengths between approximately 740 nm and 14.0 which radiation in this range may be generally referred to for the purposes of this disclosure as "infrared light,". As non-limiting examples, infrared camera may detect light in the 1.0 to 3.0 μm range, which radiation in this range may be referred to for the purposes of this disclosure as "shortwave infrared light" or "SWIR," may detect light in the 3.0 to 5.0 µm range, which radiation in this range may be referred to for the purposes of this disclosure as "midwave infrared light" or "MWIR," or may detect light in the 8.0 to 14.0 µm range, which radiation in this range may be referred to for the purposes of this disclosure as "longwave infrared light" or "LWIR." Infrared camera may include a plurality of infrared detectors or infrared photodetectors, where an "infrared detector" or "infrared photodetector" is defined as an electronic device that device that alters any parameter of an electronic circuit when contacted by infrared light. Infrared detectors may include, without limitation, silicon photodiodes doped to detect infrared light, strained-layer super lattice (SLS) photodetectors, quantum well infrared photodetectors (QWIP), amorphous silicon (αSi) photodetectors, Vanadium Oxide (VOx) microbolometers, Barium Strontium Titanate (BST), thermopile array detector, pyroelectric infrared detectors, detectors constructed from narrow bandgap detector materials from the III-V elemental group, and/or other infrared photoelectric, photovoltaic and/or microbolometer based detectors. A "microbolometer" is defined for the purposes of this disclosure as a specific type of bolometer used as a detector in a LWIR camera, also known as a "thermal camera." Microbolometer may detect infrared light when infrared radiation with wavelengths between 7.5-14 µm strikes detector material, heating it, and thus changing its electrical resistance. Alternatively or additionally, an infrared camera may consist of a single, sensitive large pixel, such as a passive infrared (PIR) sensor or other single element infrared sensitive detector.

Continuing to refer to FIG. 40, infrared camera may use a separate aperture and/or focal plane from optical camera, and/or may be integrated together with optical camera. There may be a plurality of optical cameras and/or a plurality of infrared cameras, for instance with different angles, magnifications, and/or fields-of-view of perspective on a subject area. Alternatively or additionally, two or more apparatuses coordinated using a communication network, as described in further detail below, may be combined to generate two or more images from varying perspectives to aid in multi-dimensional imaging and/or analysis.

Still referring to FIG. 40, imaging device 4008 may include a light radar component. As used in this disclosure a "light radar component" is an active imaging source that transmits light toward an object or field of interest and detects back-scattered or reflected light, measuring time of flight (ToF), interferometry, and/or phase of such back-scattered and/or reflected light to compute distances to, velocities, and/or accelerations of objects at points from which back-scatter and/or reflection occurred. In some embodiments, active light source may include a high-intensity light source, which may be focused, collimated, and/or coherent, enabling fine placement within a coordinate system, for instance as described below, of points in a field of view and/or at an object of interests at which transmitted light is scattered and/or reflected; active light source may include without limitation a laser, a high-intensity light-emitting diode, a high-intensity "super" light-emitting diode consisting of a single or plurality of lasers and/or phosphor material, super-luminescent light-emitting diode, and/or vertical-cavity surface-emitting laser (VCSEL). A laser may include a laser diode, which may be electrically pumped; alternatively or additionally, laser may be pumped optically. Active light source may transmit light in a narrow band of wavelengths; for instance, active light source may transmit light that is substantially monochromatic. In embodiment, light transmitted by active light source may pass through a dichroic filter, polarizing filter, diffractive optical element, meta-material, spatial light modulator (SLM), or similar optical element, which may further narrow a transmitted wavelength range, modify the shape or pattern, modify the polarization, modify the wavefront, or affect other properties of the active light source. Wavelength of light may be outside the range of visible light; for instance, and without limitation, wavelength may be in the infrared range as described above. Light radar component may include a "flash lidar" component, mechanical or non-mechanical beam steering, light patterns, and/or computational imaging methods, such as plenoptic or other multi-aperture embodiments.

Still referring to FIG. 40, light radar component may include one or more optical elements for focusing, collimating, and/or transmitting light emitted by light source. One or more optical elements may include a focal optical suite, which may bend light to converge to a real and/or virtual focal point. Focal optical suite may be reflective, diffractive, adaptive, and/or refractive; for instance, and without limitation, focal optical suite may include two or more lenses spaced apart, where spacing between lenses may be varied to modify a focal length of transmitted light. Dispersal and/or focus of transmitted light may be controlled using electronically focused lens assembly, where adjustment of distances or alignment between lenses may be electrically or mechanically actuated. Intensity or temporal composition of transmitted light may be variable as well, where variation may be modified using varied voltage levels, electrical current levels, waveforms, multiple pulses, duty cycles, pulse widths, passive or active optical elements, such as Q-switches, acoustical optical tunable filters (AOTF), and/or spatial light modulators (SLM). Electrical voltage and current levels, and durations to light source may be regulated analog or digitally by output of a logic circuit and/or processor to a digital to analog converter, an on/off cycle to a transistor such as a power field-effect transistor, pulse width modulation provided natively by a processor, or the like. In an embodiment, intensity and/or focus may default to minimally harmful settings, permitting allowing ToF ranging or the like to determine a distance to a nearest object and/or entity in a subject space, after which focal length and intensity may be set as permitted by standards of safe exposure. Alternatively or additionally, where a wavelength of light source is invisible and non-ionizing, intensity levels may be intrinsically safe across an operational range of light source.

With continued reference to FIG. 40, light radar component may include one or more optical elements may include one or more reflective, diffractive, refractive, and/or meta-material scanning elements for directing a beam from light source across a space to be scanned. As a non-limiting example, one or more optical elements may make use of a mirror galvanometer to direct a beam in scanning pattern. Scanning may be performed across two dimensions, using one or more optical elements and methods of directing individually or in combination for "beam steering," including but not limited to, two flat or polygonal mirrors that may be driven by a galvanometer, electric motors, micro-electro machined systems (MEMS) or micro-optical electro machined systems (MOEMS) microscanner devices, piezoelectric actuated devices, magnetostrictive actuated devices, liquid, polymer, or other mechanically deformable devices, fast steering mirrors (FSM), Risley prisms, decentered macro-optical elements and micro-lens arrays, blazed grating optical elements, MOEMS or MEMS combined with macro-optical elements, phased arrays, electronically steered arrays, spatial light modulators (SLM), holographic optical elements, laser intra-cavity beam steering, and/or metamaterial surfaces or structures. A beam may alternatively or additionally be aimed and/or focused in three or more dimensions, for instance by using a servo-controlled lens system, which may be referred to without limitation as a "focus shifter," "beam expander," or "z-shifter." Intensity of emitted light may alternatively or additionally be used. Mirrors perform a periodic motion using, for instance, rotating polygonal mirrors and/or a freely addressable motion, as in servo-controlled galvanometer scanners. Control of scanning motion may be effected via a rotary encoder and/or control electronics providing electric current to a motor or galvanometer controlling mirror angle. Electrical current may be varied using a servo controller digital to analog converter such as a DAC81416 as produced by Texas Instruments, Inc. of Dallas, Tex. Alternatively or additionally, the beam may be aimed and/or focused using a "non-mechanical" beam steering method, such as spatial light modulators (SLM) by adjusting the liquid crystal matrix that makes up the pixels of such device using digital or analog drive controllers to modify the angles of alignment of the liquid crystals as to make dynamic diffractive patterns to provide beam shaping and aiming. A laser's wavefront passing through the liquid crystal matrix is affected by the calculated diffractive patterns to provide both deflection of the beam for aiming, and an optical function for focusing or shaping the profile of the beam.

Still referring to FIG. 40, light radar component may include at least a visible or infrared photodetector, which may be implemented using any suitable visible or infrared photodetector and/or plurality of visible or infrared photodetectors as described above. For instance, and without limitation, at least a photodetector may include a detector array, such as a detector array suitable for use in an optical or infrared camera as described above. Detectors in detector array may be sensitive specifically to a narrow band of wavelengths transmitted by light source, and/or may be sensitive to a range of wavelengths that includes the band transmitted by the light source. Detectors may be designed to react quickly to initial detection of photons, for instance through use of APDs or other highly sensitive detectors. Light radar component may include one or more receptive optical elements, which may include collimating and/or focusing mirrors and/or lenses. One or more receptive optical elements may include filters such as without limitation dichroic, polarization, bandpass, notch, and/or other optical filters, which may act to screen out light that is not transmitted by light source; this may drastically increase signal to noise ratio and may further act to prevent disruption of light radar component by a directed light deterrent as described in further detail below. Alternatively or additionally, signal to noise ratio can be increased for the light radar component by modulating the signal such that the timing or frequency shifting of the transmitted beam is recognized by the detection circuit over the constant background ambient signal by subtracting the background from the signal.

In an embodiment, and further referring to FIG. 40, light radar component may perform ToF calculation, by firing pulses of light and measuring time required for a backscattered and/or reflected pulse to return. Time may be measured using an oscillator-based clock, where a faster clock signal may enable more accurate measure of the time a pulse takes to return to detector. ToF may alternatively or additionally be measured using an amplitude modulated continuous wave (AMCW) technique, whereby light is emitted continuously from light source with a varying amplitude, and a phase of returning detected light is compared to a phase of transmitted light. For instance, light source may cast a modulated illumination in a near-infrared (NIR) or short-wave infrared (SWIR) spectrum onto a scene, and then record an indirect measurement of the time it takes the light to travel from the light source to a portion of the scene and back using phase and/or interferometric comparison; phase comparison may, without limitation, be performed by comparing a phase of returning light to a phase of a reference beam separated from transmitted light using a beam splitter.

Still referring to FIG. 40, imaging device 4044 is configured to detect a subject 4012 in a subject area 4016. As used in this disclosure an "subject" is a person, animal, object and/or substance introduced into subject area 4016 after baseline has been established. Subject 4012 may include one or more persons who are authorized to enter subject area 4016 and/or one or more persons who are not authorized to enter subject area 4016. Subjects 4012 may be identified, tracked, imaged, recorded, analyzed, hailed and/or subjected to deterrent actions by apparatus 4004 while within subject area 4016. Subject area 4016 may include a subspace within a facility, with boundaries defined by either a simple radius from the center of subject area 4016 and/or by complex three-dimensional boundaries. Boundaries of subject area 4016 may correspond to and coincide with boundaries of an object or physically defined space. For example, and without limitation, boundaries of subject area 4016 may be the same as aside of a physical box and/or enclosure. Boundaries of subject area 4016 may be defined manually via a user interface and/or automatically by apparatus 4004. Boundaries may be imported from a computer vision system and/or imaging device 4008. For example, and without limitation, imaging device 4008 may identify a specific piece of artwork in a room and identify the boundaries as a function of the size of the frame of the artwork. Additionally or alternatively, boundaries may be manually configured as a function of a graphical user interface and/or a speech user interface. For example, and without limitation, a user may verbally communicate the boundaries of subject area 4016 to apparatus 4004.

Still referring to FIG. 40, subject area 4016 may include one or more buffer zones. As used in this disclosure a "buffer zone" is a region of space that exists outside of the protected space. Buffer zones may be sub-categorized into specific zones. For example, and without limitation a buffer zone closest to a protected space may be Zone 1, while another region of the protected space may be Zone 2; specific zones may include a number n of zones, where n may be any number equal to or greater than 1. Buffer zones may be identified manually via a user interface and/or automatically by apparatus 4004, similarly to identification of boundaries. Buffer zones may range with a degree of buffer as a function of requirements of protected area. For example, a monument may include a buffer zone that has a minimum 4000 m requirement for each buffer zone, whereas a painting may include a buffer zone that has a minimum 2 m requirement for each buffer zone. Additionally or alternatively, subject area 4016 may identify buffer zone as a function of a database of previously configured and/or established protected spaces in a facility. For example, and without limitation, a database that identifies a facility with protected zones in particular areas may identify a buffer zone that allows a subject to navigate the facility without entering the protected zones without authorization.

Still referring to FIG. 40, subject area 4016 may automatically adjust boundaries as a function of changes in a facility and/or changes in buffer zones. For example, and without limitation, imaging device 4008 may implement a lidar device that determines that an object in subject area 4016 has moved, wherein that object was required to be protected. Apparatus 4004 may adjust subject area 4016 to ensure that object remains in the protected zone with the required buffer zone distances. As a further non-limiting example apparatus 4004 may adjust subject area 4004 if an object is removed from the subject area that no longer requires protection, such as a wristwatch is removed and worn by an individual, wherein the wristwatch is allowed to exit the subject area, reducing the subject area for a specific period of time.

Still referring to FIG. 40, apparatus 4004 includes a threat response component 4020. As used in this disclosure a "threat response component" is a component and/or device configured to generate a non-lethal deterrent. A deterrent may include any physical or psychological interaction that discourages and/or stops an object and/or entity from performing a behavior contrary to objectives of apparatus 4004. Threat response component 4020 includes an audio deterrent 4024, for instance as defined above. Audio deterrent 4024 may output verbal messages such as instructions and/or recommendations. Audio deterrent 4024 may output warning sounds and/or louder noises that may act as a direct deterrent, such as a noise and/or sound that is capable of producing a nociceptive and/or disruptive response in subject 4012. Audio deterrent 4024 may broadcast the message, signal and/or waveform to a particular individual and/or a group of individuals. Audio deterrent 4024 may output a verbal message relating to a particular subject's behavior and/or appearance. Audio deterrent 4024 may output a verbal message relating to a group of subject's behavior and/or appearance. Audio deterrent 4024 may include a generation, transmission and/or detection of vibrational energy. As a non-limiting example, vibrational energy may include any energy that may be transmitted through any available substance and/or medium, including but not limited to air, water, building materials, body tissues, and the like thereof. Audio deterrent 4024 may include a generation, transmission, and/or detection of ultrasound energy. Audio deterrent 4024 may include a generation, transmission, and/or detection of infrasound energies.

Still referring to FIG. 40, audio deterrent 4024 may employ an active policy of incremental intervention to provide effective intervention results. As used in this disclosure an "incremental intervention" is an intervention that is dynamically adjusted to maximize the likelihood of a successful resolution of a threat, with a minimal intervention. As a non-limiting example, an incremental intervention may include determining that a verbal output of "Cease and Desist!" would be as effective as an ultrasonic emission for a behavior of encroachment. Incremental intervention may escalate in intensity, quality, duration, location, and the like thereof as a result of the threat failing to be neutralized. Additionally or alternatively, audio deterrent 4024 may output a ding and/or chirp sound to at least alert surrounding individuals of an event that is developing. For example, and without limitation, a subject area of a particular room in a house may be employed to prevent children from entering, wherein if a child does enter a chirp sound is emitted to notify adults of the situation and be aware of the situation.

In an embodiment and still referring to FIG. 40, audio deterrent 4024 may include one or more multiple-focused energy weapons. As used in this disclosure a "multiple-focused energy weapon" is an energy and/or audio signal that may be directed at a target or location from one or more source locations. Multiple-focused energy weapons may include deploying a coordinated multi-source audio intervention. For example, multiple-focused energy weapons may enable a "triangulation" type of effect of audio signals and/or outputs similar to the manner in which a "gamma-knife" medical system focuses gamma energy at a particular spot in the body; there may be limited impact of any one audio signal and/or output coming from a single direction, but the cumulative impact of all the audio signals and/or outputs coinciding at one location, or for one target, may be extreme. Multiple-focused energy weapons may also increase the resistance of apparatus 4004 to defensive strategies on the part of a threating subject 4012. For example, and without limitation it may be less possible for subject 4012 to simply turn away from the source of the audio signal and/or output and/or hide behind furniture in subject area 4016 as the audio signal and/or output may be coinciding from more than one source and/or origination.

Still referring to FIG. 40, audio deterrent 4024 may include a class of audio interventions. As used in this disclosure a "class" is a group and/or style of audio signals. As a non-limiting example, a class of audio interventions may include non-speech and spoken audio classes. Non-speech audio classes may include organic signals, engineered signals, algorithmic signals, composed signals, random signals, and/or any other type of non-human speech signals. Non-speech audio classes may be simple and/or complex with one or more frequency components. Frequency components may be audible, sub-audible, and/or super-audible perceptible signals. Non-speech audio classes may include noises such as white noise, pink noise, brown noise, and the like thereof. Non-speech audio classes may include a single pulse and/or burst of signal as well as a pattern of noises with any tempo, pattern, rhythm, and/or repetition. Spoken audio classes may include natural and/or artificially generated speech such as words, phrases, sentences, and the like thereof. Spoken audio classes may include grunts, yells, coughs, sneezes, and/or other bodily noises. Spoken audio classes may include both male, female, and/or any other sex and/or gender audio signals. Spoken audio classes may relate to a particular identify of an individual such as a mother, a father, and/or any other identifiable information in the spoken audio.

In an embodiment and still referring to FIG. 40, audio deterrent 4024 may include a directional audio deterrent, for instance and without limitation as described above.

Still referring to FIG. 40, directed sound source may include one or more parabolic reflectors. As used in this disclosure a "parabolic reflector" is one or more speaker drivers mounted at the focal point of a parabola, toward the parabolic surface. Parabolic reflectors may emit a sound that may be bounced off of a parabolic dish and leave the dish focused in plane waves. Parabolic reflectors may have a diameter twice that of the wavelength of the lowest desired frequency. For example, and without limitation, parabolic reflectors may obtain directional control of a 20 Hz signal when utilizing a dish that is more than 15.24 m and/or 50 ft wide. Additionally or alternatively, directed sound source may include a sonic emitter. As used in this disclosure a "sonic emitter" is a directed sound source that emits extremely high-power sound waves. Sonic emitters may disrupt and/or destroy the eardrums of subject to render the subject incapacitated. Sonic emitters may cause severe pain and/or disorientation to subjects. As a non-limiting example, sonic emitters may produce frequencies that cause vibrations of the eyeballs that disorient and/or distort the vision of the subject. As a further non-limiting example, sonic emitters may include, sonic bullets, sonic grenades, sonic mines, sonic cannons, and the like thereof.

Still referring to FIG. 40, audio deterrent 4024 may include a composite wave front. As used in this disclosure a "composite wave front" is a set of points that has the same phase of the sinusoid such that the set of points are affected in the same way by the given sinusoid at a given time. Compositive wave front may be generated as a function of a wave field synthesis in three dimensions, wherein three dimensions are composed of the x, y, and z directions. As used in this disclosure a "wave field synthesis" is the synthesis of a composite wave front as a function of a superposition of numerous smaller wavefronts. In an embodiment, and without limitation, wave field synthesis may generate composite wave front as a function of overlapping wavefronts originating from actual sources at other positions. As a non-limiting example, a wave front may be generated due to loudspeaker arrays that are arranged in a line, plane, and/or circle around a listener that at least overlap wave fronts at a specified points, and/or location. Wave field synthesis may generate composite wave front by emitted numerous smaller wavefronts using measured delays to produce the desired compositive wave front shape.

Still referring to FIG. 40, wave front synthesis may generate composite wave front as a function of a virtual source. As used in this disclosure a "virtual source" is a wave front that results in a source at a specified location. Virtual source may include a plane wave source. As used herein, a "plane wave source" is a source positioned at an infinite distance beyond the array of wave fronts. For example, and without limitation plane wave source may emit wave fronts that are driven at a linear delay based on the angle of incidence of the plane wave relative to the array. Plane wave source may propagate directly perpendicular to the array, wherein there is no delay, and the wave fronts are driven with the source signal uniformly, wherein the plane wave source may be simulated according to $$\vartheta_{NH} = \sin^{-1}\frac{c}{c_s} = \sin^{-1}\frac{\lambda}{\lambda_s}$$

where $\theta_{NH}$ is the beam direction corresponding to the direction of plane wave propagation, $\lambda$ indicates the wavelength of the signal in the direction of propagation, $\lambda_s$ indicates the wavelength of the signal along the secondary source array, and $c_s$ is the "sweeping speed" that describes how fast the signal is shifted across the line array. Additionally or alternatively, virtual source may include a spherical source. As used in this disclosure a "spherical source" is a source that emits wavefronts as a species of spherical waves. As a non-limiting example spherical source may encompass a crowd of insurgents to at least incapacitate the crowd using audio deterrent 4024. Virtual source may include a focused source. As used in this disclosure a "focused source" is a source that comprises a location between audio deterrent 4024 and an individual, and/or group of individuals. In an embodiment, and without limitation, a focused source may include a composite wave front that originates at a location differing from subject 4012 and audio deterrent 4024. As a non-limiting example, focused source may include a point at which composite wave front occurs in an area, such that an individual perceives that sound to be originating at that location. For example, and without limitation, a virtual source may be generated 20 m directly to the right of an individual to sound as though law enforcement have fired a bullet from a firearm. As a further non-limiting example, a virtual source may be generated 200 m in the sky to sound as though a helicopter is hovering above an individual.

In an embodiment, and without limitation, apparatus 4004 may emit a first voice command to subject 4012 as a function of a composite wave front that at least overlaps at a location that is audible to subject 4012. For example, and without limitation, a composite wavefront of a verbal command to cease and desist may be transmitted such that the composite wavefront originates at a location 1 m from subject 4012 within a crowd. Audio deterrent 4024 may emit a spherical source surrounding subject 4012 that results in wave fronts that mitigate and/or prevent surrounding crowd noises from interacting with subject 4012. In an embodiment, and without limitation, a spherical source may prevent surrounding individuals from talking over and/or masking noise emitted from audio deterrent 4024. Audio deterrent 4024 may emit a high Sound Pressure Level (SPL) to subject 4012 as a function of a spherical focused wavefront. As used in this disclosure a "sound pressure level" is an acoustic pressure level comprising a logarithmic measure of the effective pressure of a sound relative to a reference value. As a non-limiting example, audio deterrent 4024 may emit a high SPL, 160 dB, noise for a subject that is wearing hearing protection, wherein audio deterrent 4024 may emit a regular SPL, 140 dB, noise for a subject that is not wearing hearing protection.

Still referring to FIG. 40, audio deterrent 4024 may couple and/or sync audio deterrent 4024 with imaging device 4008 to create fear in the subject and/or the surrounding crowd. In an embodiment, audio deterrent 4024 may emit holographic effects. As used in this disclosure "holographic effects" are audio effects that result in spatial reconstruction of direct and reflected wave fields with desired wavefront properties at each moment of time. Holographic effects may be reconstructed such that sound fields from holographic effects are indistinguishable from natural sounds. For example, and without limitation, holographic effects may include helicopter sounds flying overhead, gun fire by law enforcement, smoke grenades by law enforcement, hand grenades by military and/or law enforcement, screams of individuals and/or crowds, and the like thereof. Holographic effects may include one or more perceptions of distance. As used in this disclosure a "perception of distance" is a measurable distance at which the individual perceives the audio signal is originating from. Perception of distance may be developed as a function of loudness, interaural difference, direct-to-reverberant energy ratio, initial time delay group, frequency spectrum, reflection pattern, motion parallax, and the like thereof. For example, and without limitation a source less that is 0.5 m away will produce different interaural cues than a source at the same direction 1 m away because the distance between the ears becomes significant. As a further example, a perception of distance alters as a function of the direct reverberant energy decreasing due to a source moving away from an individual. As a further non-limiting example, perception of distance may be altered as a function of the direct source sound wave and the first reflection wave at the listeners position, wherein the delay between the direct and reflect sound is greater when the source is neared to the individual. As a further non-limiting example, perception of distance may be altered as a function of air dampening, wherein air dampening is stronger at higher frequencies. As a further non-limiting example, perception of distance may be altered due to directional qualities of the reflection patterns of the source. As a further non-limiting example, perception of distance may be altered due to the corresponding change of perspective movements wherein if one moves 2 m towards a first source perception may be altered in a different manner than when compared to moving 2 m towards a second source.

Still referring to FIG. 40, audio deterrent 4024 is configured to perform a deterrent action. As used in this disclosure a "deterrent action" is an action conducted by apparatus 4004 that relates to a behavior and/or audio output by subject 4012, wherein the action conducted mitigates and/or eliminates the behavior and/or audio output by subject 4012. Deterrent action may include an audio deterrent action as a function of the behavior and/or audio output by subject 4012. As used in this disclosure an "audio deterrent action" is a deterrent action consisting of an audio signal, wave, and/or message. As a non-limiting example an audio deterrent action may include emitting a sound and/or signal that invokes a response by subject 4012. For example, and without limitation audio deterrent action may include emitting a voice command for subject 4012 to follow. As a further non-limiting example deterrent action may include emitting a noise and/or signal that renders subject 4012 incapacitated. Deterrent action may include a first deterrent action 4028 on subject 4012. As used in this disclosure a "first deterrent action" is a first action conducted by audio deterrent 4024 that relates to a first threat level 4032. As used in this disclosure a "first threat level" is a first level that is identified as a function of an object's and/or entities threatening behaviors. As a non-limiting example a first threat level may include shouting, condescending tones, speaking loudly, and the like thereof. As a further non-limiting example, a first threat level may include entering a restricted area, and/or trespassing into a secured area. As a further non-limiting example a first threat level may include a subject's presence in a subject area, wherein the subject is not authorized to be in the subject area. As a further non-limiting example a first threat level may include behavior representing potential issues, such as loitering, and/or prowling. As a further non-limiting example, a first threat level may include noncompliance with a first audio and/or visual instruction provided by apparatus 4004. As a further non-limiting example, a first threat level may include erratic behavior and/or movement toward an object to be protected and/or secured. As a further non-limiting example, a first threat level may include obscene gestures and/or behaviors. Audio deterrent is configured to perform a second deterrent action 4036 on subject 4012. As used in this disclosure a "second deterrent action" is an action conducted by audio deterrent 4024 that relates to a second threat level 4040. As used in this disclosure a "second threat level" is a second level that is identified as a function of an object's and/or entities threatening behaviors. As a non-limiting example, second threat level may include violence, abuse, physical altercation, and the like thereof. First deterrent action 4028 is distinct from second deterrent action 4036. For example, and without limitation, first deterrent action 4028 may include a sound emitted to alter attention of the subject, wherein second deterrent action 4036 may include incapacitating the subject as a function of an ultrasonic wave. As a further non-limiting example, first deterrent action 4028 may include emitting a sentence to at least communicate with the subject, wherein second deterrent action 4036 may include emitting a loud and/or uncomfortable audio signal.

Still referring to FIG. 40, apparatus 4004 includes a processor 4044 communicatively connected to imaging device 4008 and threat response component 4020. As used in this disclosure a "processor" is a machine and/or computing device that receives inputs and generates outputs. Processor 4044 is configured to identify subject 4012 as a function of the detection of the subject. As a non-limiting example, processor may receive inputs from imaging device 4008 representing a 23-29-year-old male, wearing a green uniform, associated with janitorial services, wherein the individual may be identified as subject 4012. Additionally or alternatively, processor 4044 may be configured to determine a personal identity of subject 4012 as a function of the detection of the subject. As a non-limiting example, processor 4044 may determine the name Andrea for subject 4012 as a function of the detection of the subject. Moreover, processor 4044 may determine an authorization level of subject 4012 as a function of the personal identity. As used in this disclosure an "authorization level" is the rights and/or permissions a subject has with regards to actions, behaviors, and/or subject areas. For example, and without limitation, personal identity may be determined to be John Whitworth, wherein an authorization level of 5 may be identified for the personal identity. As a further non-limiting example, personal identity may be determined to be Lucy Steele, wherein an authorization level of "Top Secret" may be identified for the personal identity.

Still referring to FIG. 40, processor 4044 is configured to determine a threat level 4048, of first threat level 4032 and second threat level 4040 associated with subject 4012. As used in this disclosure a "threat level" is the range of threats that may or may not be exhibited by subject 4012. As a non-limiting example, threat level 4048 may include first threat level 4032, second threat level 4040, and/or n-threat levels, wherein n-threat levels are any subsequent threatening levels that may or may not be exhibited by subject 4012. For example, and without limitation, threat level 4048 may include a first threat of obnoxious behavior, wherein the range may extend to property damage and/or uncontrollable rage. Threat level 4048 may be determined as a function of determining a time of day. As used in this disclosure a "time of day" is a temporal element associated with the current day that apparatus 4004 is operating. As a non-limiting example threat level 4048 may include a range of threat levels as a function of a time of day associated with 08:00 AM, wherein a different range of threat levels may be established for similar and/or the same behaviors as a function of a time of day associated with 09:00 PM.

Still referring to FIG. 40, threat level 4048 may be determined as a function of processor 4044 measuring a distance to subject 4012. As a non-limiting example, a subject that is 2 m and/or 6.56 ft from apparatus 4004 may result in a range associated with a first threat level of shouting, wherein the range includes violence and/or damage to apparatus 4004. As a further non-limiting example, a subject that is 17 m and/or 55.77 ft from apparatus 4004 may result in a range associated with a first threat level of obnoxious behavior, wherein the range includes verbal abuse. Processor 4044 may measure a distance from light radar component to a point from which light is scattered; this may be used, without limitation, to detect distance to an object. Distance may be computed using a single reading of ToF, by averaging two or more ToF readings, and/or measuring multiple returns to reduce false readings from clutter. ToF may be used to detect edges of objects, a portion of anatomy, an object held, or the like. For instance, and without limitation, an edge may be detected by comparison of ToF at detected points to nearby and/or adjacent ToF readings, where a border separating a region of relatively smaller ToF readings from a region of relatively more distant ToF readings may identify an edge. As a non-limiting example, such a border may define an outline of a person with a wall or other object behind the person. ToF may be used to generate an image, for instance by repeatedly capturing readings of ToF to different portions of an object; a three-dimensional surface contour of the object, such as facial features, details of an object a person is holding, or the like, may be rendered using the ToF data. ToF measurements may be processed to generate a depth map or point cloud, defined for the purposes of this disclosure as a set of Z-coordinate values for every pixel of the image, which may be measured in units of millimeters, micrometers, or the like. Depth map data may be combined with other imaging data; for instance, intensity or phase values of pixels in an infrared reading may be measured as proportional to an amount of light returned from a scene.

Still referring to FIG. 40, threat level 4048 may be determined as a function of processor 4044 detecting a behavior of subject 4012. As used in this disclosure a "behavior" is an action and mannerism performed by an individual, organism, system, or artificial entities in conjunction with themselves or their environment, which includes the other systems or organisms around as well as the physical environment. Behavior may be determined as a function of a behavior descriptor. As used in this disclosure a "behavior descriptor" is information that at least relates to a user's intended behavior decision. Behavior descriptor may include, without limitation, micro expression, macro-expressions, language, tone, word selection, physiological actions, and the like thereof. As a non-limiting example, behavior descriptor may relate a microexpression of a nose wrinkled with a negative behavior of disgust. Behavior is then determined as a function of behavior descriptor. Behavior may be determined as a function of a behavior machine-learning model. As used in this disclosure a "behavior machine-learning model" is a machine-learning model that uses training data and/or training set to generate an algorithm that will be performed by apparatus 4004 and/or a remote device to produce outputs given data provided as inputs; this is in contrast to a non-machine-learning software program where the commands to be executed are determined in advance by a user and written in a programming language. As used in this disclosure a "remote device" is an external computing device and/or processor to apparatus 4004. Behavior machine-learning model may consist of any supervised, unsupervised, or reinforcement machine-learning model that apparatus 4004 may or may not use in the determination of the behavior. Behavior machine-learning model may include, without limitation machine-learning models such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof. Behavior machine-learning model may be trained as a function of a behavior training set. As used in this disclosure "behavior training set" is a training set that correlates an input to at least a behavior descriptor, wherein input comprises any datum and/or information that the imaging device and/or microphone collects, stores, and/or transmits, wherein a microphone is an instrument that collects audio information as described below in detail, in reference to FIG. 41.

Still referring to FIG. 40, remote device 4036 may provide modifications to the behavior machine-learning model. For example, and without limitation, a modification may be comprised of a firmware update, a software update, a behavior machine-learning correction, and the like thereof. As a non-limiting example a software update may incorporate a new behavior machine-learning model that relates to input of a plurality of inputs to a modified behavior descriptor. As a further non-limiting example a remote device may transmit a modified behavior machine-learning model, wherein the modified behavior machine-learning model may relate new behavior descriptors to previously identified inputs of a plurality of inputs. Additionally or alternatively, behavior machine-learning model may be transmitted to remote device, wherein remote device may update the behavior training data and transmit an updated behavior machine-learning model back to apparatus 4004. The updated behavior machine-learning model may be transmitted by remote device and received by apparatus 4004 as a software update, firmware update, or corrected behavior machine-learning model. Additionally or alternatively, remote device may include the behavior machine-learning model, wherein apparatus 4004 transmits a signal, bit, datum, or parameter to the remote device and receives the outputted behavior from the behavior machine-learning model on remote device 4036.

Still referring to FIG. 40, behavior machine-learning model may be generated as a function of a behavior classifier. A "behavior classifier," as used in this disclosure is a machine-learning model, such as a mathematical model, neural net, or program generated by a machine-learning algorithm known as a "classification algorithm," as described in further detail below, that sorts inputs of behavior information into categories or bins of data, outputting the categories or bins of data and/or labels associated therewith. Behavior classifier may be configured to output at least a datum that labels or otherwise identifies a set of behaviors that are clustered together, found to be close under a distance metric as described below, or the like. Apparatus 4004 and/or another device may generate behavior classifier using a classification algorithm, defined as a process whereby apparatus 4004 derives a classifier from training data. Classification may include mapping behaviors to a semantic meanings and/or tones. For example, and without limitation, classification may include mapping behaviors of vulgar language to semantic meanings and/or tones of aggression and/or violence. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 40, apparatus 4004 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Apparatus 4004 may then calculate a likelihood table by calculating probabilities of different data entries and classification labels. Apparatus 4004 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 40, apparatus 4004 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 40, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 40, threat level 4048 may be determined as a function of processor 4044 identifying an object in possession of subject 4012. As used in this disclosure an "object" is one or more inanimate compositions of matter that may or may not be utilized in conducting a behavior. As a non-limiting example, an object in possession of subject 4012 may include one or more cell phones, flashlights, shoes, pens, neckties, wallets, keys, water bottles, and the like thereof. As a further non-limiting example, an object in possession of subject 4012 may include one or more knives, firearms, axes, sharp objects, crowbars, tire irons, and the like thereof. Objects in possession may be associated with one or more behaviors as a function of a tool classifier. As used in this disclosure a "tool classifier" is a machine-learning model, such as a mathematical model, neural net, or program generated by a tool machine-learning algorithm known as a "tool classification algorithm," as described in further detail below, that sorts inputs of tool information into categories or bins of data, outputting the categories or bins of data and/or labels associated therewith. As a non-limiting example, tool classifier may identify a threat level for a tool associated with an axe, wherein a different threat level may be identified for a tool associated with a pen.

Still referring to FIG. 40, processor 4044 may be configured to detect a speech of the subject. As used in this disclosure "speech" is one or more audio signals and/or sound waves produced by subject 4012 that relates to a language and/or form of communication. As a non-limiting example, speech of a subject may include one or more communicative words and/or phrases from a plurality of languages such as English, German, Japanese, Chinese, Polish, Italian, Swedish, and the like thereof. Processor 4044 may detect language as a function of determining a semantic tone associated with the speech of the subject. As a non-limiting example, a semantic tone may include a unique pitch and/or key that a word and/or phrase is spoken in that alters and/or distinguishes lexical and/or grammatical meaning.

Still referring to FIG. 40, process 4044 may detect speech as a function of a language processing module. Language processing module may include any hardware and/or software module. Language processing module may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 40, language processing module may operate to produce a language processing model. Language processing model may include a program automatically generated by computing device and/or language processing module to produce associations between one or more words extracted from at least a language and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to FIG. 40, language processing module and/or diagnostic engine may generate the language processing model by any suitable method, including without limitation a natural language processing classification algorithm; language processing model may include a natural language process classification model that enumerates and/or derives statistical relationships between input term and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted word category of physiological data. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 40, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 40, processor 4044 is configured to command audio deterrent 4024 to perform an action of first deterrent action 4028 and second deterrent action 4036 as a function of the determined threat level. In an embodiment and without limitation first processor 4044 may command audio deterrent 4024 to emit first deterrent action 4028 to emit an audio signal associated with a warning, such as "alert", "caution" and/or "prevent". Processor 4044 may command audio deterrent 4024 to deploy audio alerting and/or notifying of threats, events, and/or status in subject area 4016. For example, audio or sounds that are deployed as an alert may depend on the attributes of the event, threat, or status that is being addressed. In one embodiment, the specific type of threat may determine or influence the alert. For example, one type of audio (e.g., a simple "chime") may be deployed when a person enters the building or buffer zone, whereas a different type of audio (e.g., a "ding-ding-ding") may be deployed when a specific spoken phrase is identified. In a further embodiment, the location of the threat may determine or influence the alert. As a non-limiting example, an alert audio signal may include a single 400 Hz chirp with moderate rise time of 50 ms and a duration of 200 ms, played at 75 dB SPL. As a further non-limiting example, an alert may include a pattern of sounds composed by playing a pre-recorded buzz and/or "raspberry" sound three times in rapid succession. As a further non-limiting example, when an individual enters a particular door of the facility, the alert audio may be played near that door. In another embodiment, information about the facility, its status, occupants, or activities may influence the alert sound. For example, if the system determines that the principal of a school is located in a particular office within the facility, then when an individual enters the building, the resulting alert may be played in the room in which the principal is located.

In an embodiment, and still referring to FIG. 40, processor 4044 may include a language processing component that constructs a word and/or phrase that processor 4044 may command audio deterrent 4024 to perform. Language processing component may receive inputs from imaging device 4008 and/or microphones, wherein microphones receive audio signals and/or sound waves as described below, in reference to FIG. 41. Inputs and/or outputs may be exchanged using audio signals, sound waves, and/or optical signals, including without limitation any datum outputs from an image classifier, tool classifier and/or behavior classifier. An "image classifier," as used in this disclosure is a machine-learning model, such as a mathematical model, neural net, or program generated by a machine-learning algorithm known as a "classification algorithm," as described in further detail below, that sorts inputs of image information into categories or bins of data, outputting the categories or bins of data and/or labels associated therewith. Image classifier may be configured to output at least a datum that labels or otherwise identifies a set of images that are clustered together, found to be close under a distance metric as described below, or the like. Apparatus 4004 and/or another device may generate image classifier using a classification algorithm, defined as a process whereby apparatus 4004 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. Classification may include mapping images to a semantic meanings and/or tones. For example, and without limitation, classification may include mapping images of blatant trespassing to semantic meanings and/or tones of disrespect. Persons skilled in the art, up reviewing the entirety of this disclosure, will be aware of a multiplicity of methods that may be utilized for language processing component to construct words and/or phrases as described herein. Language processing component may generate chat bots that contain meaningful messages and advice to facilitate behavioral changes. Language processing component may construct words and/or phrases that provide instructions and/or guidance to subject 4012 such as instructions for subject 118 to alter their actions, such as trespassing, obscenities, and the like thereof. Language processing component may construct words and/or phrases that may be used to communicate with subject 4012 such that subject remains in adherence and/or compliance with the guidance and/or output of apparatus 4004. Apparatus 4004 may employ speech-to-text and/or text-to-speech algorithms to at least allow audio deterrent 4024 to emit the words and/or phrases that language processing component may construct. For example, and without limitation, language processing component may construct words and/or phrases that include directions to exit a subject area. As a further non-limiting example, language processing component may construct words and/or phrases that include strategies for de-escalating a violent and/or abusive behavior exhibited by subject 4012. Additionally or alternatively, apparatus 4004 may identify speech and/or behaviors from subject 4012 as a function of the language processing component generated words and/or phrases. Apparatus 4004 may input behavior classifiers, tool classifiers, and/or image classifiers to output subject-specific messages, wherein a subject specific message are audio signals that convey a message and our direction to subject 4012, as described in detail below. Apparatus 4004 may receive one or more verbal statements outputted by the subject, wherein apparatus 4004 may process and/or respond to the verbal states as a function of the verbal response, behavior classifier, tool classifier, and/or image classifier. Apparatus 4004 may respond to the subjects responsive behaviors and repeat necessary iterations to at least maintain a communicative conversation with subject 4012 until the speech and/or behaviors exhibited by subject 4012 cease and/or subject 4012 exits subject area 4016.

Still referring to FIG. 40, language processing component may construct words and/or phrases as a function of the attributes of an event, threat and/or status of subject area 4016. For example, and without limitation, language processing component may identify a particular individual using imaging device 4008 and construct words and/or phrases as a function of the behavior classifier, image classifier, and threat level. Language processor component may emit particular words and/or phrases that alert surrounding subjects and/or individuals of a rapidly developing event. For example, and without limitation language processing component may constructs phrases such as "He's got a gun!" for an event of an active shooter in a subject area.

Still referring to FIG. 40, apparatus 4004 may be mounted and/or deployed in a subject area. Security objectives may include exclusion of unauthorized persons from subject area, prevention of unauthorized persons from entering a door in subject area, prevention of unauthorized persons from accessing an item to be protected 204, such as a valuable and/or dangerous item, protection of a person or object in subject area from harm, prevention of harm to apparatus 4004, or the like. Subject area may include, without limitation, a room, corridor, or other internal space, a fixed outdoor area such as a porch, patio, gazebo, stage, or the like, a geometrically defined area around a handheld or drone-mounted device such as a cylindrical and/or spherical area defined by a given radius, or the like. A user may use a computing device such as a control station, desktop computer, tablet, laptop, or the like to set bounds of subject area; alternatively or additionally, apparatus 4004 may use automated detection using any imaging device 4008 or the like to image and/or scan the subject area for processing to determine the locations of walls, objects, animals, features, or other boundary delineators to find potential boundaries, which a user may confirm from a user computing device.

Still referring to FIG. 40, apparatus 4004 may use one or more imaging devices 4008 to determine a baseline condition of subject area. Imaging device 4008 may map points within subject area to a coordinate system. Coordinate system may include x and y coordinates, which may correspond to axes on one or more focal planes of imaging device 4008, substantially horizontal and vertical axes, or the like, and a z coordinate corresponding to depth and/or distance from imaging device 4008. Depth may be determined using image analysis such as parallax and/or analysis of relative sizes of objects, and/or using ToF range-finding, and/or artificial intelligence inferred methods, and/or shape from motion or polarimetry, and/or computational vision methods and algorithms. Optical, infrared, light radar devices, RF sensors, radar components, THz imagers, MMW imagers, polarized cameras, multispectral cameras, and/or hyperspectral cameras may each be used to register boundaries of subject area and/or a geometric center thereof to coordinate system. Objects within subject area may then be located within coordinate system to establish a baseline condition.

In an embodiment, and with continued reference to FIG. 40, each separate camera, motion detector, or other component and/or device in apparatus 4008 may have an associated Cartesian and/or polar coordinate system. Apparatus 4008 may relate each such separate coordinate system to a master coordinate system used by apparatus 4008, using without limitation, one or more affine transformations, rotational transformations, perspective transformations, perspective transformations, and/or scaling operations, sometimes collectively referred to as a "homography transformation" or "homography."

With further reference to FIG. 40, one or more subjects 4012 may be detected via detection of changes to a baseline condition. Baseline condition may be generated as a function of apparatus 4004 collecting data in an ongoing manner. Apparatus 4004 may compare the monitored data to the model and/or baseline. Detection of changes from the baseline condition may include detecting a louder overall level of audible sounds, greater structural vibrations, unusual audio detections, and the like thereof. A subject 4012 may include one or more persons who are authorized to enter subject area and/or one or more persons who are not authorized to enter subject area. Subjects 4012 may be identified, tracked, imaged, recorded, analyzed, hailed and/or subjected to deterrent actions by apparatus 4004 while within subject area, as described in further detail below.

Figure 41:
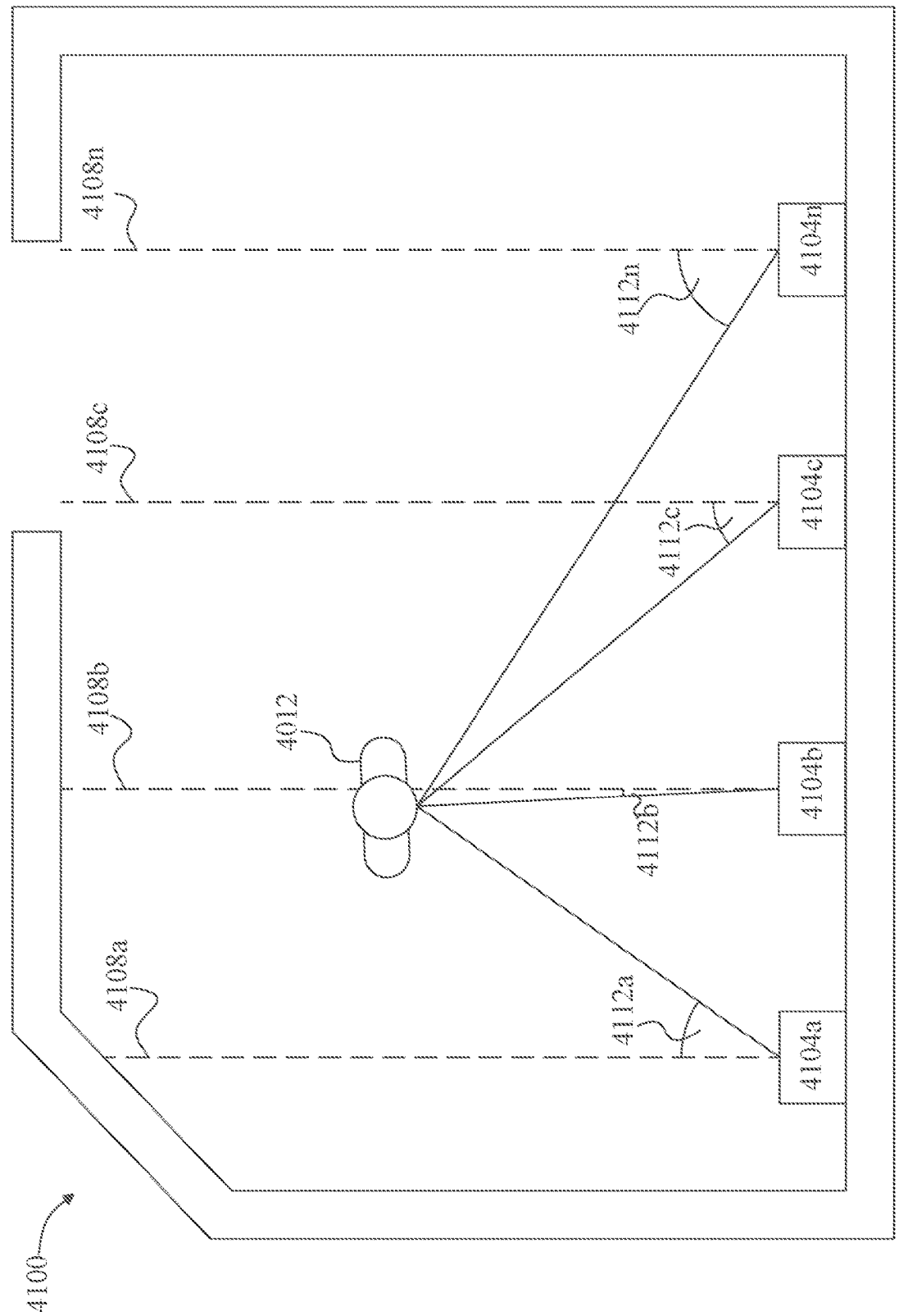
FIG. 41 is a schematic diagram of an embodiment of a speech localization.

Referring now to FIG. 41, an embodiment 4100 of a subject area for sound and/or speech localization is illustrated. Subject 4012 may be projecting audio signals, such as speaking a language, wherein a microphone 4104 may be positioned to receive audio signals. As used in this disclosure a "microphone" is an instrument for converting sound waves and/or audio signals into electrical energy vibrations that may be amplified, transmitted, and/or recorded. Microphone 4104 may include one or more microphones positioned at one or more locations in a subject area. As a non-limiting example a first microphone 4104a may be located in a far-left position, wherein a second microphone 4104b may be located to the right of first microphone 4104a, but to the left of a third microphone 4104c. As a further non-limiting example a fourth microphone 4104d may be located to the far right of the room, wherein the fourth microphone is located to the right of third microphone 4104c. Microphone 4104 may include one or more arrays of multi-directional microphones. As used in this disclosure a "multi-directional microphone" is a microphone that may receive audio signals from a plurality of angles and/or directions. For example, and without limitation, a multi-directional microphone may include a microphone that receives audio signals from directions within a 360° degree area. Microphone 4104 may include a directionally determined sensitivity that varies with respect to a reference vector 4108. As used in this disclosure a "reference vector" is a vector that is perpendicular to microphone 4104. First microphone 4104a, second microphone 4104b, third microphone 4104c, and/or 4104d may be configured to have a reference vector. For example, and without limitation, first microphone 4104a may be configured to include a first reference vector 4108a. For example, and without limitation, second microphone 4104b may be configured to include a second reference vector 4108b. For example, and without limitation, third microphone 4104c may be configured to include a third reference vector 4108c. For example, and without limitation, fourth microphone 4104d may be configured to include a fourth reference vector 4108d.

Still referring to FIG. 41, apparatus 4004 may utilize microphone 4104 and/or reference vector 4108 to determine an angular difference 4112. As used in this disclosure an "angular difference" is the angle between the detected sound wave and/or audio signal by microphone 4104 and the reference vector 4108. As a non-limiting example, a first angular difference 4112a may include an angle of 36° from audio signals and/or sound waves emitted by subject 4012. As a further non, limiting example, a second angular difference 4112b may include an angle of −0.1° from audio signals and/or sound waves emitted by subject 4012. As a further non, limiting example, a third angular difference 4112c may include an angle of −28° from audio signals and/or sound waves emitted by subject 4012. As a further non, limiting example, a fourth angular difference 4112d may include an angle of −78° from audio signals and/or sound waves emitted by subject 4012. Additionally or alternatively, one or more highly directional microphones may be utilized to determine a direction of origin of sound, wherein an "origin of sound", as used herein is the point at which an audio signal originates. As used in this disclosure a "highly directional microphone" is a microphone with a primary axis that points in a single direction. As a non-limiting example, a highly directional microphone may include an omnidirectional microphone, bidirectional microphone, cardioid microphone, supercardioid microphone, hypercardioid microphone, subcardioid microphone, hemispherical microphone, boundary microphone, shotgun microphone, lobar microphone, and the like thereof. Highly directional microphones may identify the direction of the origin of sound as a function of a quantitative polar pattern graph. As used in this disclosure a "quantitative polar pattern graph" is a graph that represents the microphones directional responses. Quantitative polar pattern graph may be represented as a 2-dimensional plane around the primary axis of the highly directional microphone. The primary axis of the highly directional microphone is shown on the graph at 0°, and the polar graph extends to 360° clockwise. The outer circle is denoted by 0 dB and the on-axis response of the highly directional microphone always reaches this outer circle at 0 db. Quantitative polar pattern graph may include a polar response line that is drawn on the polar graph that represents the angle at which a sound and/or audio signal is received along with the intensity values. Apparatus 4004 may determine the location of subject 4012 as a function of the emitted sound waves and/or audio signals that are detected by the array of multi-directional microphones and/or highly directional microphones. These devices and/or techniques may be used to determine the direction of the sound and/or the intensity of the sound, which can be linked to a subject detected by imaging device 4008 and/or other devices.

In an embodiment and still referring to FIG. 41, apparatus 4004 may determine a specific location of the sound being emitted by subject 4012 and combine information received by imaging device 4008. The combination of the sound and/or acoustic information from microphone 4104 and the imaging information from imaging device 4008 may allow apparatus 4004 to determine a particular subject in a room with n number of subjects. For example, and without limitation, speech associated with abusive language may be determined in a particular location of a subject area, wherein imaging device 4044 may characterize a particular subject that is emitting the words as a function of both the speech localization and the imaging information. Microphones 4104 and/or audio deterrent 4024 may then be directed to that particular subject exhibiting the aggressive behavior such that the remained of the subjects are not affected by the audio deterrent signal.

In an embodiment and still referring to FIG. 41, apparatus 4004 may output a subject-specific message. As used in this disclosure an "subject-specific message" is an audio signal to convey a message and our direction to subject 4012. For example, and without limitation, apparatus 4004 may output a subject-specific message such as "you with the orange scarf, step away from the counter!" As a further non-limiting example, apparatus 4004 may output a subject specific message such as "sir in the brown trousers, you are not authorized in this subject area, please leave." As a further non limiting example, apparatus 4004 may output a subject specific message such as "you in the green blouse and red shoes, if you do not cease and desist a deterrent action will be emitted." Additionally or alternatively, apparatus 4004 may output subject-specific messages and listen to the subject's response. For example, and without limitation, a subject may response "I am sorry, I will leave this subject area." As a further non-limiting example, a subject may respond "Shut up, I will not listen to you!" As a further non-limiting example, a subject may respond with no verbal communication, rather only a gesture and/or behavior. Apparatus may respond to the subject's response in a manner similar to the subject-specific message. For example, and without limitation, apparatus 4004 may output a response such as "Thank you for cooperating, no further action will be taken". As a further non-limiting example apparatus 4004 may output a response such as "You have not complied with the request, a deterrent will be emitted in 3 seconds." As a further non-limiting example apparatus 4004 may respond to an obscene gesture displayed by the subject in response to subject-specific message by outputting an audio signal such as "please do not conduct that behavior again or further action will be taken." Apparatus 4004 may output subject-specific messages, receive subject audio and/or visual responses, and respond in an iterative manner. For example, apparatus 4004 may output a first subject-specific message, receive a first subject response, output a first apparatus response, receive a second subject response, and output a second apparatus response.

In an embodiment, a multimodal deterrent apparatus with an internal watchdog system includes a deterrent suite, the deterrent suit including a first deterrent component including a first deterrent and a first output reduction element and a second deterrent component including a second deterrent distinct from the first deterrent and a second output reduction element, and an internal watchdog system, the internal watchdog system including a detector component configured to detect a first parameter of the first deterrent component and a second parameter of the second deterrent component and a control component configured to compare each of the first parameter and the second parameter to a reference value and activate at least one of the first output reduction element and the second output reduction element as a function of the comparing.

First deterrent component may include a directed light deterrent. First output reduction element may include a shutter. First output reduction element may include an optical modulator. First parameter may include irradiance generated by the directed light deterrent. Second deterrent component may include an audio deterrent. Second parameter may include a measure of acoustic intensity. At least one of the first parameter and the second parameter may include an electrical parameter. Electrical parameter may include a voltage level. Electrical parameter may include a current. At least one of the first parameter and the second parameter may include a temperature. At least one of the first parameter and the second parameter may include a cumulative energy value. Cumulative energy value may include a per-engagement value. Control component may be further configured to determine that an engagement has terminated and reset the per-engagement value. At least one of the first parameter and the second parameter may include a location-dependent parameter. At least one of the first parameter and the second parameter may include a distance-dependent parameter. At least one of first output reduction element and second output reduction element may include a power regulation control element. Control component may be configured to receive the reference value from a processor. Internal watchdog system may be configured to transmit at least a sensor output to the processor, and wherein receiving the reference value further includes receiving the reference value as a function of the transmitted sensor output. Control component may be configured to transmit an indication of output reduction activation to a processor.

In an embodiment, an autonomous safety system for a deterrent apparatus includes a processor configured to detect, using at least a detection component communicatively connected to at least a deterrent of a deterrent apparatus, at least a deterrent parameter, compare the at least a deterrent parameter to a safety threshold, determine a corrective action as a function of the comparison, and initiate the corrective action.

In an embodiment, parameter may include irradiance generated by a directed light deterrent, a measure of acoustic intensity, a temperature, and/or an electrical parameter; electrical parameter may include a voltage level and/or a current. At least one of the first parameter and the second parameter may include a cumulative energy value. Cumulative energy value may include a per-engagement value. Processor may be further configured to transmit the corrective action to the apparatus.

In an embodiment, a method of operating an autonomous safety system for a deterrent apparatus includes detecting, by a processor and using at least a detection component communicatively connected to at least a deterrent of a deterrent apparatus, at least a deterrent parameter, comparing, by the processor, the at least a deterrent parameter to a safety threshold, determining, by the processor, a corrective action as a function of the comparison, and initiating, by the processor, the corrective action.

In an embodiment, an automated threat detection and deterrence apparatus is configured to identify a behavior of an individual as a function of at least a datum regarding the individual, determine a candidate deterrent space as a function of the behavior and at least a deterrent component, receive a target impact level function of the candidate deterrent space, wherein the target impact level function is generated as a function of an impact machine-learning process and at least an impact training set, select a deterrent from the candidate deterrent space that minimizes the target impact level function, and initiate the selected deterrent.

In an embodiment, identifying the behavior may include receiving a recognition element. Identifying the behavior may include identifying the behavior as a function of the at least a datum, and a behavior machine-learning model. Identifying the behavior may include receiving a psychological indicator. Receiving a target impact level function may include receiving from a remote device the target impact level function. Apparatus may be further configured to initiate the selected deterrent and receive at least a feedback input using at least a sensor. Receiving the feedback input may include obtaining a first behavioral response associated with the selected deterrent and determining a corrected impact level function as a function of the first behavioral response. Minimizing the target level impact may include generating a behavior modification function and determining a behavior modification as a function of the candidate deterrent space and the behavior modification function. Generating the behavior modification function may include generating the behavior modification function as a function of the identified behavior and a modification machine-learning model. Minimizing the target level impact function may include minimizing with respect to at least a deterrent output constraint.

In an embodiment, a method of an automated threat detection and deterrence apparatus includes identifying, by an apparatus, a behavior of an individual as a function of at least a datum regarding the individual, determining, by the apparatus, a candidate deterrent space as a function of the behavior, generating, by the apparatus, a target impact level function of the candidate deterrent space, wherein generating also includes determining at least a deterrent impact, determining at least a behavior response, and generating a target impact level function as a function of the at least deterrent impact, at least behavior response, and candidate deterrent space, selecting, by the apparatus, a deterrent from the candidate deterrent space that minimizes the target impact level function, and initiating, by the apparatus, the selected deterrent.

In an embodiment, an automated threat detection and deterrence apparatus with position dependent deterrence is configured to identify a behavior of an individual as a function of at least a datum regarding the individual, determine at least a deterrent that impacts the behavior, identify at least a spatiotemporal element related to the individual and the at least deterrent, generate a safety modifier as a function of the spatiotemporal element, wherein generating includes identifying a distance parameter as a function of the spatiotemporal element, determining a velocity parameter as a function of the spatiotemporal element, and generating the safety modifier as a function of the distance parameter and velocity parameter, modify the at least a deterrent as a function of the safety modifier, and initiate a modified deterrent.

In an embodiment, identifying the behavior may include receiving a recognition element. Identifying the behavior may include receiving at least a user action from the plurality of sensors, identifying an at least accepted standard, and identifying a behavior as a function of the user action and at least accepted standard. Determining the at least a deterrent may include identifying candidate deterrents from a deterrent database, determining a behavior impact value, and selecting at least a deterrent that improves the behavior impact value. Spatiotemporal element may be identified from a sensor of a plurality of sensors. Spatiotemporal element may include at least a movement of the individual at a specific time that relates to a deterrent location. Generating the safety modifier may include determining a deterrent impact and generating the safety modifier as a function of the at least spatiotemporal element and the deterrent impact. Generating the safety modifier may include generating the safety modifier as a function of the spatiotemporal element and a safety machine-learning model. Modifying a deterrent may include determining a deterrent element of the at least a deterrent that differs from the safety modifier and modifying the deterrent as a function of the deterrent element. Deterrent element may control the deterrent output.

In an embodiment, a method of position-dependent deterrence includes identifying, by an apparatus, a behavior of an individual as a function of at least a datum regarding the individual, determining, by the apparatus, at least a deterrent that impacts the behavior, identifying, by the apparatus, at least a spatiotemporal element related to the individual and the at least deterrent, generating, by the apparatus, a safety modifier as a function of the spatiotemporal element, wherein generating includes identifying a distance parameter as a function of the spatiotemporal element, determining a velocity parameter as a function of the spatiotemporal element, and generating the safety modifier as a function of the distance parameter and velocity parameter, modifying, by the apparatus, the at least a deterrent as a function of the safety modifier, and initiating, by the apparatus, a modified deterrent.

In an embodiment, an apparatus for altering an individual behavior is configured to receive a plurality of sensor data, identify a behavior of a first individual of a plurality of individuals as a function of the plurality of sensor data, determine as a function of the individual behavior at least a behavior element, generate a behavioral remedy that alters at least the behavior element, wherein generating includes identifying at least a deterrent of a plurality of deterrents, determining a collateral parameter related to the deterrent, and generating a behavioral remedy as a function of the collateral parameter and a congestion variable, and administer as a function of the behavioral remedy a deterrent that alters the behavior of the first individual.

In an embodiment, receiving a plurality of sensor data includes may include receiving a recognition element from a plurality of sensors, obtaining an identification element of an individual from an identification database, and relating the recognition element to the identification element using a recognition model. Identifying the behavior of the first individual may include identifying at least a physiological action as a function of the plurality of sensor data and identifying the behavior as a function of the at least a physiological action. Identifying the behavior may include identifying the behavior as a function of the physiological action, at least an accepted standard, and a behavior model. At least an accepted standard may be obtained from an ethical construct. Determining a behavior element may include receiving an assemblage comparator and determining a behavior element as a function of the assemblage comparator and an assemblage model. Assemblage comparator may include a measurable reference of behaviors associated with the assemblage. Apparatus may be further configured to generate the congestion variable, and generating the congestion variable may include receiving a spatiotemporal element of an individual of a plurality of individuals in the assemblage, identifying a social distance metric relating to the at least an individual, and determining a congestion variable as a function of the social distance metric. Administering the deterrent may include identifying the at least a deterrent as a function of the plurality of deterrents and a linear programming algorithm. Identifying the deterrent may include creating a distance metric from the at least plurality of candidate deterrents to the behavior remedy and determining the deterrent that at least minimizes the distance metric.

In an embodiment, a method of an apparatus for altering an individual behavior includes receiving, by an apparatus, a plurality of sensor data, identifying, by the apparatus, a behavior of a first individual of a plurality of individuals as a function of the plurality of sensor data, determining, by the apparatus, as a function of the individual behavior at least a behavior element, generating, by the apparatus, a behavioral remedy that alters at least the behavior element, wherein generating includes identifying at least a deterrent of a plurality of deterrents, determining a collateral parameter related to the deterrent, generating a behavioral remedy as a function of the collateral parameter and a congestion variable, and administering, by the apparatus, as a function of the behavioral remedy a deterrent that alters the behavior of the first individual.

In an embodiment, an automated threat detection and deterrence apparatus for commanding a deterrent as a function of importance level includes an imaging device configured to detect a subject in a subject area, a deterrent component, wherein the deterrent component includes a first deterrent mode and a second deterrent mode, the deterrent component is configured to perform a first deterrent action on the subject when in the first mode, the deterrent component is configured to perform a second deterrent action on the subject when in the second mode, and the first deterrent action is distinct from the second deterrent action, and a control circuit communicatively connected to the imaging device and the deterrent component, wherein the processor is configured to identify an object to be protected, determine an importance level of the object being protected, select, as a function of the importance level, a mode of the first deterrent action and the second deterrent mode, detect the subject as a function of the detection of the subject, and command the deterrent component to perform an action of the first deterrent action and the second deterrent action as a function of the importance level.

In an embodiment, identifying the object being protected may include receiving a user input. In an embodiment, identifying the object may include obtaining at least a sensor datum. Identifying at least an object being protected may include determining at least a recognition element from the sensor datum and identifying at least an object as a function of the at recognition element. Determining an importance level may include receiving an originality metric as a function of the object being protected, determining an expendable element as a function of the originality vector, and generating an importance level as a function of the expendable element and at least an importance model. Determining an importance level may include determining an at least support metric. Determining the at least support metric may include receiving at least a support advisor from a support database, identifying at least a geolocation of the at least support advisor, and determining the at least support metric as a function of the at least geolocation. Determining an importance level may include receiving at least an updated importance model from a remote device, replacing the importance model with the updated importance model, and generating the importance level as a function of the expendable element and the updated importance model. Determining the at least deterrent may include receiving candidate deterrents from a deterrent database, identifying an impact parameter that relates to the importance level, and selecting a deterrent as a function of the impact parameter. Impact parameter may include at least a parameter of collateral impact.

In an embodiment, a method of commanding a deterrent as a function of importance level includes detecting, by a processor communicatively connected to an imaging device and a deterrent component, a subject as a function of an imaging device, identifying, by the processor, an object to be protected, determining, by the processor, an importance level associated with the object, selecting, by the processor, a mode of a first deterrent mode and a second deterrent mode as a function of the importance level, and commanding, by the processor, the deterrent component to perform an action of a first deterrent action and a second deterrent action as a function of the importance level, wherein the first deterrent action is distinct from the second deterrent action.

In an embodiment, a system for transmitting a notification includes an automated threat deterrence apparatus configured to obtain a plurality of sensory inputs from a recognition sensor, identify an individual of a plurality of individuals as a function of the plurality of sensory inputs, determine at least a behavior of the individual as a function of the plurality of sensory inputs, wherein determining further comprises identifying at least a behavioral element and determining at least a behavior as a function of the behavioral elements and the plurality of sensory inputs, generate a behavior value as a function of the at least a behavior, determine a threshold constraint, and transmit a notification as a function of the behavior value and threshold constraint.

In an embodiment, at least a behavior may include a plurality of behaviors, and determining the behavior value may include generating a behavior grouping element, arranging the plurality of behaviors according to a behavior grouping element, and determining the behavior value as a function of the behavior grouping element. Determining the behavior grouping element as a function of the determined behavior may include receiving a behavior grouping element, wherein the behavior grouping element is generated as a function of a grouping machine-learning model and at least a receiving training set. Generating a behavior value may include identifying a vector outcome as a function of the behavior using a vector model, wherein a vector model is comprised of a many-valued logic algorithm. A vector outcome may include receiving an actual outcome of an individual from at least a recognition sensor, correlating the actual outcome to a psyche databank, and generating a vector outcome using statistical inference. Determining a constraint threshold may include grouping at least a behavior value of a plurality of behavior values to a threshold qualifier. Threshold qualifier may include heuristic algorithms. Threshold qualifier may include fuzzy logic algorithms. Notification may include a behavior of the at least a behavior that at least violates a threshold constraint. Violation may include receiving a behavior value of a behavior, receiving a threshold constraint relating to the behavior, and determining a violation relating the behavior value and the threshold constraint as a function of a behavior algorithm.

In an embodiment, a method of transmitting a notification includes obtaining, by an apparatus, a plurality of sensory inputs from a recognition sensor, identifying, by the apparatus, an individual of a plurality of individuals as a function of the plurality of sensory inputs, determining, by the apparatus, at least a behavior of the individual as a function of the plurality of sensory inputs, wherein determining includes identifying at least a behavioral element and determining at least a behavior as a function of the behavioral elements and the plurality of sensory inputs, generating, by the apparatus, a behavior value as a function of the at least a behavior, determining, by the apparatus, a threshold constraint, and transmitting, by the apparatus, a notification as a function of the behavior value and threshold constraint.

In an embodiment, an automated threat detection and deterrence apparatus includes an imaging device configured to detect a subject in a subject area, a threat response component including an audio deterrent, wherein the audio deterrent is configured to perform a first deterrent action on the subject, the first deterrent action corresponding to a first threat level, the audio deterrent is configured to perform a second deterrent action on the subject, the second deterrent action corresponding to a second threat level, and the first deterrent action is distinct from the second deterrent action and a processor communicatively connected to the imaging device and the threat response component, wherein the processor is configured to identify the subject as a function of the detection of the subject, determine a threat level, of the first threat level and the second threat level, associated with the subject, and command the audio deterrent to perform an action of the first deterrent action and the second deterrent action as a function of the determined threat level.

In an embodiment, the imaging device may include an optical camera, an infrared camera, and/or a light radar component. Processor may be further configured to determine a distance from the apparatus to the subject using the light radar component. Audio deterrent may include a directed sound source. Processor may be configured to determine a personal identity of the subject as a function of the detection of the subject. Processor may be configured to determine an authorization level of the subject as a function of the personal identity. Processor may be configured to determine a distance to the subject and determine the threat level as function of the distance. Processor may be configured to determine a time of day and determine the threat level as function of the time of day. Processor may be configured to detect a behavior of the subject and determine the threat level as function of behavior. Processor may be configured to identify an object in possession of the subject and determine the threat level as a function of the object. Processor may be configured to detect a speech of the subject and determine the threat level as a function of the speech. Detecting the speech may include determining a semantic tone and detecting the speech as a function of the semantic tone.

In an embodiment, a method of automated threat detection and deterrence includes identifying, by a processor communicatively connected to an imaging device and a threat response component including an audio deterrent, a subject as a function of a detection of the subject by the imaging device, determining, by the processor, a threat level associated with the subject, selecting, by the processor, a mode of a first deterrent action and a second deterrent action as a function of the threat level, and commanding, by the processor, the audio deterrent to perform an action of a first deterrent action and a second deterrent action as a function of the mode, wherein the first deterrent action is distinct from the second deterrent action.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 42:
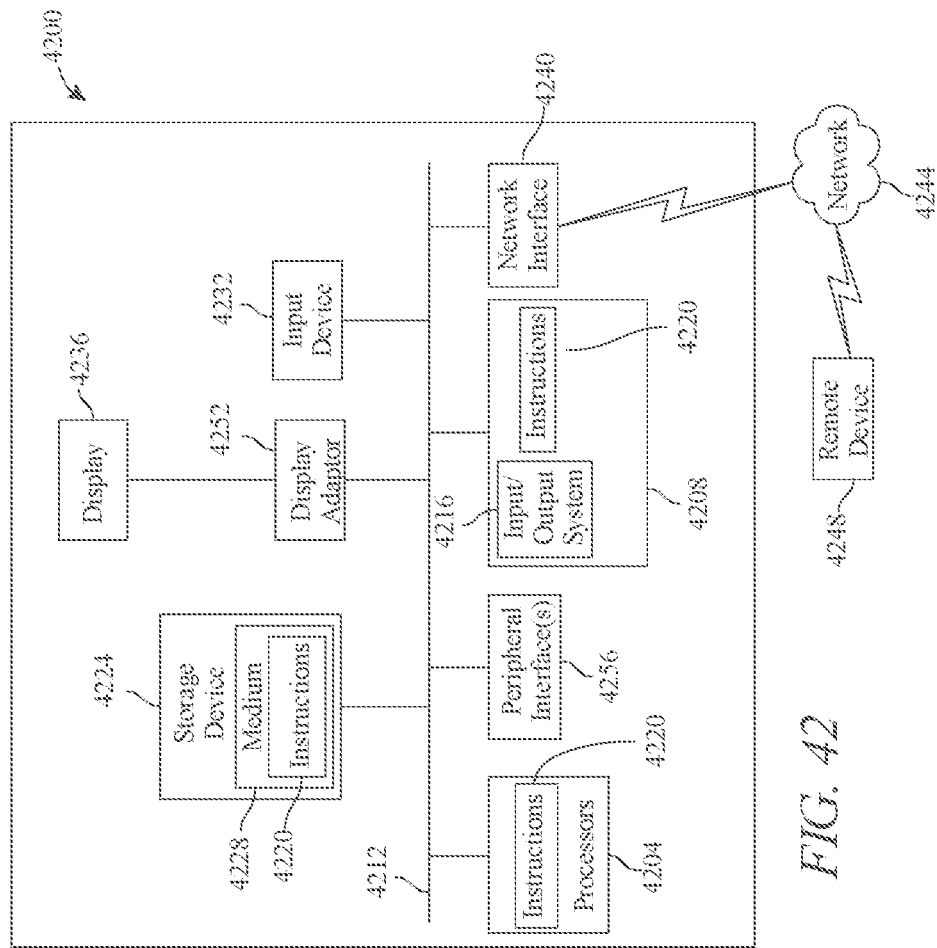
FIG. 42 is a block diagram of a computing system that can be used to implement any one or more of the methodologies disclosed herein and any one or more portions thereof.

FIG. 42 shows a diagrammatic representation of one embodiment of a computing device in the exemplary form of a computer system 4200 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 4200 includes a processor 4204 and a memory 4208 that communicate with each other, and with other components, via a bus 4212. Bus 4212 may include any of several types of bus structures including, but not limited to, a memory bus, a memory controller, a peripheral bus, a local bus, and any combinations thereof, using any of a variety of bus architectures.

Processor 4204 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 4204 may be organized according to Von Neumann and/or Harvard architecture as a non-limiting example. Processor 4204 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 4208 may include various components (e.g., machine-readable media) including, but not limited to, a random-access memory component, a read only component, and any combinations thereof. In one example, a basic input/output system 4216 (BIOS), including basic routines that help to transfer information between elements within computer system 4200, such as during start-up, may be stored in memory 4208. Memory 4208 may also include (e.g., stored on one or more machine-readable media) instructions (e.g., software) 4220 embodying any one or more of the aspects and/or methodologies of the present disclosure. In another example, memory 4208 may further include any number of program modules including, but not limited to, an operating system, one or more application programs, other program modules, program data, and any combinations thereof.

Computer system 4200 may also include a storage device 4224. Examples of a storage device (e.g., storage device 4224) include, but are not limited to, a hard disk drive, a magnetic disk drive, an optical disc drive in combination with an optical medium, a solid-state memory device, and any combinations thereof. Storage device 4224 may be connected to bus 4212 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 4224 (or one or more components thereof) may be removably interfaced with computer system 4200 (e.g., via an external port connector (not shown)). Particularly, storage device 4224 and an associated machine-readable medium 4228 may provide nonvolatile and/or volatile storage of machine-readable instructions, data structures, program modules, and/or other data for computer system 4200. In one example, software 4220 may reside, completely or partially, within machine-readable medium 4228. In another example, software 4220 may reside, completely or partially, within processor 4204.

Computer system 4200 may also include an input device 4232. In one example, a user of computer system 4200 may enter commands and/or other information into computer system 4200 via input device 4232. Examples of an input device 4232 include, but are not limited to, an alphanumeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 4232 may be interfaced to bus 4212 via any of a variety of interfaces (not shown) including, but not limited to, a serial interface, a parallel interface, a game port, a USB interface, a FIREWIRE interface, a direct interface to bus 4212, and any combinations thereof. Input device 4232 may include a touch screen interface that may be a part of or separate from display 4236, discussed further below. Input device 4232 may be utilized as a user selection device for selecting one or more graphical representations in a graphical interface as described above.

A user may also input commands and/or other information to computer system 4200 via storage device 4224 (e.g., a removable disk drive, a flash drive, etc.) and/or network interface device 4240. A network interface device, such as network interface device 4240, may be utilized for connecting computer system 4200 to one or more of a variety of networks, such as network 4244, and one or more remote devices 4248 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 4244, may employ a wired and/or a wireless mode of communication. In general, any network topology may be used. Information (e.g., data, software 4220, etc.) may be communicated to and/or from computer system 4200 via network interface device 4240.

Computer system 4200 may further include a video display adapter 4252 for communicating a displayable image to a display device, such as display device 4236. Examples of a display device include, but are not limited to, a liquid crystal display (LCD), a cathode ray tube (CRT), a plasma display, a light emitting diode (LED) display, and any combinations thereof. Display adapter 4252 and display device 4236 may be utilized in combination with processor 4204 to provide graphical representations of aspects of the present disclosure. In addition to a display device, computer system 4200 may include one or more other peripheral output devices including, but not limited to, an audio speaker, a printer, and any combinations thereof. Such peripheral output devices may be connected to bus 4212 via a peripheral interface 4256. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An automated threat detection and deterrence apparatus, the apparatus comprising:
   an imaging device configured to detect a subject in a subject area, wherein the imaging device is further configured to detect retroreflected light from an eye of the subject;
   a deterrent component comprising a directed light deterrent component configured to perform a deterrent action on the subject; and
   a processor communicatively connected to the imaging device and the deterrent component, wherein the processor is configured to:
     receive input from the imaging device and identify the subject based on the received input;
     determine a behavior descriptor associated with the subject based on the received input;
     command the imaging device to track the subject until the subject exits the subject area;
     determine a target area of the eye of the subject based on the retroreflected light detected by the imaging device, the target area includes a fovea of the eye of the subject,
     command the deterrent component to automatically and persistently perform the deterrent action, wherein a level of intensity of the deterrent action is variable and calibrated based on the determined behavior descriptor;
     receive at least a feedback input from the imaging device, wherein the feedback input is a behavioral response of the subject to the performed deterrent action;
     determine a corrected deterrent action as a function of the feedback input, and command the deterrent component to automatically perform the corrected deterrent action,
   wherein the deterrent action is the directed light deterrent being fired at the target area of the eye, and
   the deterrent action is performed on the subject until the subject exits the subject area.

2. The apparatus of claim 1, wherein the imaging device further comprises a light radar component.

3. The apparatus of claim 1, wherein the imaging device further comprises a 3D camera, sensor, or computational method.

4. The apparatus of claim 1, wherein the imaging device further comprises a radar component.

5. The apparatus of claim 1, wherein the imaging device further comprises a thermal sensor.

6. The apparatus of claim 1, wherein:
   the directed light deterrent comprises a first deterrent mode and a second deterrent mode, the directed light deterrent is configured to perform a first deterrent action on the subject when in a first deterrent mode and a second deterrent action on the subject when in a second deterrent mode, the first deterrent action is distinct from the second deterrent action.

7. The apparatus of claim 6, wherein the directed light deterrent is configured to shut off automatically as a function of a preconfigured threshold amount.

8. The apparatus of claim 6, wherein:
   the first deterrent mode includes a first wavelength; and
   the second deterrent mode includes a second wavelength.

9. The apparatus of claim 6, wherein the first deterrent action includes a glare action, and the second deterrent action includes a dazzle action.

10. The apparatus of claim 1, wherein the processor is configured to determine a personal identity of the subject as a function of the detection of the subject.

11. The apparatus of claim 10, wherein the processor is configured to determine an authorization level of the subject as a function of the personal identity.

12. The apparatus of claim 1, wherein the processor is configured to determine a distance to the subject and determine the behavior descriptor as a function of the distance.

13. The apparatus of claim 1, wherein the processor is configured to determine a time of day and determine the behavior descriptor as a function of behavior.

14. The apparatus of claim 1, wherein the processor is configured to detect a behavior of the subject and determine the behavior descriptor as a function of behavior.

15. The apparatus of claim 1, wherein the processor is configured to identify an object in possession of the subject and determine the behavior descriptor as a function of the object.

16. The apparatus of claim 1, wherein the directed light deterrent is configured to emit a wavelength that causes ocular lens fluorescence in the subject.

17. The apparatus of claim 16, wherein the directed light deterrent is configured to alternatingly combine colors that cause ocular lens fluorescence by using a multiplexing mirror device.

18. The apparatus of claim 1, wherein the directed light deterrent is configured to dither a beam along a vertical axis while firing.

19. The apparatus of claim 1, wherein the deterrent component comprises a multiplexing mirror component.

20. The apparatus of claim 19, wherein:
   the directed light deterrent includes a mirror having a first position and a second position, wherein:
   light from a first emitter is transmitted toward the subject when the mirror is in the first position; and
   light from a second emitter is transmitted toward the subject when the mirror is in the second position.

21. The apparatus of claim 20, wherein the first emitter emits a first wavelength and the second emitter emits a second wavelength.

22. A method of automated threat detection and deterrence, the method comprising:
   identifying, by a processor communicatively connected to an imaging device and a deterrent component, a subject based on a detection of the subject by the imaging device, wherein the deterrent component includes a directed light deterrent configured to perform a deterrent action on the subject, and the imaging device is configured to detect retroreflected light from an eye of the subject;
   determining, by the processor, a behavior descriptor associated with the subject based on the received input from the imaging device;
   commanding, by the processor, the imaging device to track the subject until the subject exits the subject area;

determining, by the processor, a target area of the eye of the subject based on the retroreflected light detected by the imaging device, the target area includes a fovea of the eye of the subject;

commanding, by the processor, the deterrent component to automatically and persistently perform the deterrent action on the subject, wherein a level of intensity of the deterrent action is variable and calibrated based on the determined behavior descriptor;

receiving, by the processor, at least a feedback input from the imaging device, wherein the feedback input is a behavioral response of the subject to the performed deterrent action;

determining, by the processor, a corrected deterrent action as a function of the feedback input and commanding the deterrent component to automatically perform the corrected deterrent action, wherein the deterrent action is the directed light deterrent being fired at the target area of the eye, and the deterrent action is performed on the subject until the subject exits the subject area.

23. An automated threat detection and deterrence apparatus, the apparatus comprising:

an imaging device configured to detect a subject in a subject area, a deterrent component, and a processor communicatively connected to the imaging device and the deterrent component, wherein the processor is configured to:

instruct the imaging device to detect subjects in the subject area;

instruct the imaging device to persistently track a subject that is detected in the subject area;

instruct the apparatus to transmit an infrared light into an eye or head of the subject and detect retroflected light;

determine a target area of the eye of the subject based on the retroreflected light detected by the imaging device, instruct the deterrent component to perform a persistent deterrent action on the subject in the subject area;

wherein the deterrent component continues to perform the persistent deterrent action on the subject until the subject exits the subject area.

24. The automated threat detection and deterrence apparatus of claim 23, wherein the deterrent action comprises an interdiction of visible light into the target area of the subject designed to persistently obfuscate the subject's vision.

25. The automated threat detection and deterrence apparatus of claim 24, wherein the target area includes a fovea of the eye of the subject.

26. The automated threat detection and deterrence apparatus of claim 25 wherein if the amount of retroreflected light is not satisfactory, then the deterrent action comprises violet wavelength light to obfuscate vision.

27. The automated threat detection and deterrence apparatus of claim 24, wherein the processor is configured to adjust the deterrent action to not exceed the maximum permissible exposure limit on the subject.

28. The automated threat detection and deterrence apparatus of claim 23, wherein the deterrent action comprises an interdiction of sound onto the subject.

29. The automated threat detection and deterrence apparatus of claim 23, wherein the deterrent action comprises an interdiction of dermal agitation onto the subject.

30. The automated threat detection and deterrence apparatus of claim 23, wherein the deterrent action comprises a chemical interdiction onto the subject.

31. The automated threat detection and deterrence apparatus of claim 23, wherein the deterrent action comprises a kinetic interdiction onto the subject.

32. The automated threat detection and deterrence apparatus of claim 23 wherein the deterrent action is variable in intensity.

33. The automated threat detection and deterrence apparatus of claim 23 wherein the processor is further configured to:

receive detection data from the imaging device;

identify a behavior descriptor of the subject based on the detection data; and instruct the deterrent component to perform a deterrent action based on the behavior descriptor.

34. The automated threat detection and deterrence apparatus of claim 33, wherein the processor is further configured to:

receive second detection data from the imaging device after the deterrent component performs the deterrent action on the subject;

identify a second behavior descriptor of the subject based on the second detection data; and instruct the deterrent component to perform a second deterrent action based on the behavior descriptor;

wherein the second deterrent action is different than the deterrent action.

35. The automated threat detection and deterrence apparatus of claim 34, wherein the second deterrent action is greater in intensity than the deterrent action.

36. The automated threat detection and deterrence apparatus of claim 34, wherein the second deterrent action is lesser in intensity than the deterrent action.

37. The automated threat detection and deterrence apparatus of claim 33, wherein the behavior descriptor depends on a distance from the subject to an object to be protected in the subject area or the apparatus.

38. The automated threat detection and deterrence apparatus of claim 23, wherein the imaging device comprises a plurality of sensors.

39. The automated threat detection and deterrence apparatus of claim 23, wherein the imaging device comprises a 3D detector, and the 3D detector comprises a 3D camera or computational method.

40. The automated threat detection and deterrence apparatus of claim 23, wherein the processor determines the target area further based on identified anatomical landmarks on a body of the subject.

41. The automated threat detection and deterrence apparatus of claim 23, wherein the processor identifies anatomical landmarks on a body and head of the subject based on the retroreflected light from the eyes.

42. The automated threat detection and deterrence apparatus of claim 23, wherein the deterrent component is configured to perform a second deterrent action on the subject;

wherein the second deterrent action is different than the deterrent action.

43. The automated threat detection and deterrence apparatus of claim 42, wherein the second deterrent action is at least one of the following interdictions directed on the subject: sound, visible light, dermal agitation, and kinetic action.

44. The automated threat detection and deterrence apparatus of claim 42, wherein the deterrent action comprises directed sound deterrent and direct interdiction of visible light into the target area of the subject.

45. The automated threat detection and deterrence apparatus of claim 23, wherein the apparatus is mounted onto a drone.

46. The automated threat detection and deterrence apparatus of claim 23, wherein the processor instructs the imaging device to track the subject based on location of the eye.

47. The automated threat detection and deterrence apparatus of claim 23, wherein the deterrent action is configured to cause dermal agitation.

48. The automated threat detection and deterrence apparatus of claim 23, wherein the tracking is restricted to a subject's face or eye box, thereby requiring a less intensive computation process for tracking the subject.

49. The automated threat detection and deterrence apparatus of claim 23, wherein the apparatus is configured to manage power density of the performed deterrent action through variable beam expansion based proportionally to a distance between the apparatus and the subject so that energy density is constant.

50. The automated threat detection and deterrence apparatus of claim 23, wherein the processor is configured to calculate a total amount of exposure caused by the deterrent action on the subject, calculate a maximum permissible exposure limit of the subject, determine whether the calculated total amount of exposure on the subject exceeds the maximum permissible exposure limit of the subject.

51. The automated threat detection and deterrence apparatus of claim 23, wherein the deterrent action is a non-lethal deterrent action.

* * * * *